(12) United States Patent
Selgas et al.

(10) Patent No.: US 10,228,838 B2
(45) Date of Patent: Mar. 12, 2019

(54) DYNAMICALLY MODIFYING A TOOLBAR

(71) Applicant: MyMail, Ltd., Dallas, TX (US)

(72) Inventors: Thomas Drennan Selgas, Athens, TX (US); Michael Brian Massing, San Jose, CA (US); John Everett Gmuender, San Jose, CA (US)

(73) Assignee: MYMAIL, LTD., Dallas, TX (US)

( * ) Notice: Subject to any disclaimer, the term of this patent is extended or adjusted under 35 U.S.C. 154(b) by 694 days.

(21) Appl. No.: 14/466,221

(22) Filed: Aug. 22, 2014

(65) Prior Publication Data
US 2015/0046833 A1     Feb. 12, 2015

Related U.S. Application Data

(60) Continuation of application No. 13/923,115, filed on Jun. 20, 2013, now Pat. No. 9,021,070, which is a continuation of application No. 13/573,311, filed on Sep. 10, 2012, now Pat. No. 9,141,263, which is a continuation of application No. 10/417,853, filed on
(Continued)

(51) Int. Cl.
| | | |
|---|---|---|
| *H04L 29/08* | (2006.01) | |
| *H04L 29/06* | (2006.01) | |
| *H04L 29/12* | (2006.01) | |
| *G06F 3/0484* | (2013.01) | |
| *G06F 3/0482* | (2013.01) | |
| *G06F 21/31* | (2013.01) | |
| *G06Q 30/02* | (2012.01) | |

(52) U.S. Cl.
CPC ........ *G06F 3/04847* (2013.01); *G06F 3/0482* (2013.01); *G06F 21/31* (2013.01); *G06Q 30/0277* (2013.01); *H04L 29/06* (2013.01); *H04L 29/12009* (2013.01); *H04L 61/00* (2013.01); *H04L 63/04* (2013.01); *H04L 63/0428* (2013.01); *H04L 63/0464* (2013.01); *H04L 63/08* (2013.01); *H04L 63/083* (2013.01); *H04L 67/10* (2013.01)

(58) Field of Classification Search
None
See application file for complete search history.

(56) References Cited

U.S. PATENT DOCUMENTS

| 3,885,104 A | 5/1975 | Smith et al. |
|---|---|---|
| 4,430,702 A | 2/1984 | Schiebe et al. |
| (Continued) | | |

FOREIGN PATENT DOCUMENTS

| EP | 0233682 A2 | 8/1987 |
|---|---|---|
| EP | 0270882 A2 | 6/1988 |
| (Continued) | | |

OTHER PUBLICATIONS

U.S. Appl. No. 10/417,862; Office Action; dated Jul. 12, 2004.
(Continued)

*Primary Examiner* — Patrice L Winder
(74) *Attorney, Agent, or Firm* — Foley & Lardner LLP

(57) ABSTRACT

The present invention comprises a method of and apparatus for simplifying the process of access to a network for a roaming computer user, divides the responsibility of servicing a given user wanting to access the network between multiple parties and minimizes the possibility of improper dissemination of email header data as well as improper use of network resources (including server systems) by non-clients.

13 Claims, 138 Drawing Sheets

Related U.S. Application Data

Apr. 16, 2003, now Pat. No. 8,275,863, which is a division of application No. 09/100,619, filed on Jun. 19, 1998, now Pat. No. 6,571,290.

(60) Provisional application No. 60/050,186, filed on Jun. 19, 1997.

(56) References Cited

U.S. PATENT DOCUMENTS

| | | |
|---|---|---|
| 4,470,417 A | 9/1984 | Gruber |
| 4,529,870 A | 7/1985 | Chaum |
| 4,757,267 A | 7/1988 | Riskin |
| 4,825,354 A | 4/1989 | Agrawal et al. |
| 5,019,963 A | 5/1991 | Alderson et al. |
| 5,021,949 A | 6/1991 | Morten et al. |
| 5,115,501 A | 5/1992 | Kerr |
| 5,150,464 A | 9/1992 | Sidhu et al. |
| 5,155,847 A | 10/1992 | Kirouac et al. |
| 5,198,806 A | 3/1993 | Lord |
| 5,241,594 A | 8/1993 | Kung |
| 5,247,683 A | 9/1993 | Holmes et al. |
| 5,263,165 A | 11/1993 | Janis |
| 5,287,461 A | 2/1994 | Moore |
| 5,319,562 A | 6/1994 | Whitehouse |
| 5,347,632 A | 9/1994 | Filepp et al. |
| 5,367,635 A | 11/1994 | Bauer et al. |
| 5,410,543 A | 4/1995 | Seitz et al. |
| 5,426,427 A | 6/1995 | Chinnock et al. |
| 5,436,637 A | 7/1995 | Gayraud et al. |
| 5,455,863 A | 10/1995 | Brown et al. |
| 5,475,819 A | 12/1995 | Miller et al. |
| 5,483,596 A | 1/1996 | Rosenow et al. |
| 5,499,289 A | 3/1996 | Bruno et al. |
| 5,524,195 A | 6/1996 | Clanton, III et al. |
| 5,558,339 A | 9/1996 | Perlman |
| 5,572,643 A | 11/1996 | Judson |
| 5,579,472 A | 11/1996 | Keyworth, II et al. |
| 5,580,177 A | 12/1996 | Gase et al. |
| 5,586,257 A | 12/1996 | Perlman |
| 5,586,304 A | 12/1996 | Stupek, Jr. et al. |
| 5,604,542 A | 2/1997 | Dedrick |
| 5,617,526 A | 4/1997 | Oran et al. |
| 5,635,940 A | 6/1997 | Hickman et al. |
| 5,636,209 A | 6/1997 | Perlman |
| 5,638,433 A | 6/1997 | Bubien, Jr. et al. |
| 5,638,494 A | 6/1997 | Pinard et al. |
| 5,638,513 A | 6/1997 | Ananda |
| 5,642,419 A | 6/1997 | Rosen |
| 5,644,737 A | 7/1997 | Tuniman et al. |
| 5,644,739 A | 7/1997 | Moursund |
| 5,655,077 A | 8/1997 | Jones et al. |
| 5,657,246 A | 8/1997 | Hogan et al. |
| 5,657,452 A | 8/1997 | Kralowetz et al. |
| 5,675,507 A | 10/1997 | Bobo, II |
| 5,680,549 A | 10/1997 | Raynak et al. |
| 5,682,325 A | 10/1997 | Lightfoot et al. |
| 5,684,950 A | 11/1997 | Dare et al. |
| 5,689,563 A | 11/1997 | Brown et al. |
| 5,689,638 A | 11/1997 | Sadovsky |
| 5,694,546 A | 12/1997 | Reisman |
| 5,694,549 A | 12/1997 | Carlin et al. |
| 5,696,965 A | 12/1997 | Dedrick |
| 5,704,050 A | 12/1997 | Redpath |
| 5,706,502 A | 1/1998 | Foley et al. |
| 5,708,655 A | 1/1998 | Toth et al. |
| 5,708,780 A | 1/1998 | Levergood et al. |
| 5,710,884 A | 1/1998 | Dedrick |
| 5,717,923 A | 2/1998 | Dedrick |
| 5,721,780 A | 2/1998 | Ensor et al. |
| 5,724,521 A | 3/1998 | Dedrick |
| 5,732,219 A | 3/1998 | Blumer et al. |
| 5,737,414 A | 4/1998 | Walker et al. |
| 5,740,549 A | 4/1998 | Reilly et al. |
| 5,745,555 A | 4/1998 | Mark |
| 5,748,927 A | 5/1998 | Stein et al. |
| 5,749,075 A | 5/1998 | Toader et al. |
| 5,751,812 A | 5/1998 | Anderson |
| 5,752,238 A | 5/1998 | Dedrick |
| 5,752,244 A | 5/1998 | Rose et al. |
| 5,754,787 A | 5/1998 | Dedrick |
| 5,758,084 A | 5/1998 | Silverstein et al. |
| 5,761,683 A | 6/1998 | Logan et al. |
| 5,764,639 A | 6/1998 | Staples et al. |
| 5,764,902 A | 6/1998 | Rothrock |
| 5,768,508 A | 6/1998 | Eikeland |
| 5,768,521 A | 6/1998 | Dedrick |
| 5,774,670 A | 6/1998 | Montulli |
| 5,774,869 A | 6/1998 | Toader |
| 5,781,724 A | 7/1998 | Nevarez et al. |
| 5,790,548 A | 8/1998 | Sistanizadeh et al. |
| 5,790,800 A | 8/1998 | Gauvin et al. |
| 5,793,854 A | 8/1998 | Kashepava |
| 5,796,393 A | 8/1998 | MacNaughton et al. |
| 5,799,071 A | 8/1998 | Azar et al. |
| 5,801,702 A | 9/1998 | Dolan et al. |
| 5,802,304 A | 9/1998 | Stone |
| 5,802,502 A | 9/1998 | Gell et al. |
| 5,802,530 A | 9/1998 | Van Hoff |
| 5,806,043 A | 9/1998 | Toader |
| 5,809,242 A | 9/1998 | Shaw et al. |
| 5,809,251 A | 9/1998 | May et al. |
| 5,812,819 A | 9/1998 | Rodwin et al. |
| 5,815,665 A | 9/1998 | Teper et al. |
| 5,818,447 A | 10/1998 | Wolf et al. |
| 5,821,927 A | 10/1998 | Gong |
| 5,822,539 A | 10/1998 | van Hoff |
| 5,825,357 A | 10/1998 | Malamud et al. |
| 5,825,890 A | 10/1998 | Elgamal et al. |
| 5,826,000 A | 10/1998 | Hamilton |
| 5,826,025 A | 10/1998 | Gramlich |
| 5,828,837 A | 10/1998 | Eikeland |
| 5,828,843 A | 10/1998 | Grimm et al. |
| 5,835,583 A | 11/1998 | Hetz et al. |
| 5,835,712 A | 11/1998 | DuFresne |
| 5,835,725 A | 11/1998 | Chiang et al. |
| 5,835,914 A | 11/1998 | Brim |
| 5,838,906 A | 11/1998 | Doyle et al. |
| 5,845,070 A | 12/1998 | Ikudome |
| 5,845,073 A | 12/1998 | Carlin et al. |
| 5,845,075 A | 12/1998 | Uhler et al. |
| 5,845,077 A | 12/1998 | Fawcett |
| 5,852,722 A | 12/1998 | Hamilton |
| 5,854,901 A | 12/1998 | Cole et al. |
| 5,862,203 A | 1/1999 | Wulkan et al. |
| 5,862,220 A | 1/1999 | Perlman |
| 5,862,339 A | 1/1999 | Bonnaure et al. |
| 5,867,161 A | 2/1999 | Walsh |
| 5,881,234 A | 3/1999 | Schwob |
| 5,884,024 A | 3/1999 | Lim et al. |
| 5,889,958 A | 3/1999 | Willens |
| 5,890,158 A | 3/1999 | House et al. |
| 5,890,171 A | 3/1999 | Blumer et al. |
| 5,890,172 A | 3/1999 | Borman et al. |
| 5,893,091 A | 4/1999 | Hunt et al. |
| 5,894,556 A | 4/1999 | Grimm et al. |
| 5,896,444 A | 4/1999 | Perlman et al. |
| 5,898,780 A | 4/1999 | Liu et al. |
| 5,898,839 A | 4/1999 | Berteau |
| 5,905,492 A | 5/1999 | Straub et al. |
| 5,905,736 A | 5/1999 | Ronen et al. |
| 5,908,469 A | 6/1999 | Botz et al. |
| 5,913,040 A | 6/1999 | Rakavy et al. |
| 5,914,714 A | 6/1999 | Brown |
| 5,915,214 A | 6/1999 | Reece et al. |
| 5,918,013 A | 6/1999 | Mighdoll et al. |
| 5,918,016 A | 6/1999 | Brewer et al. |
| 5,918,019 A | 6/1999 | Valencia |
| 5,919,247 A | 7/1999 | Van Hoff et al. |
| 5,925,103 A | 7/1999 | Magallanes et al. |
| 5,928,333 A | 7/1999 | Landfield et al. |
| 5,930,258 A | 7/1999 | Dato Solis et al. |
| 5,933,490 A | 8/1999 | White et al. |
| 5,935,207 A | 8/1999 | Logue et al. |

(56) References Cited

U.S. PATENT DOCUMENTS

| | | |
|---|---|---|
| 5,940,074 A | 8/1999 | Britt, Jr. et al. |
| 5,944,824 A | 8/1999 | He |
| 5,950,010 A | 9/1999 | Hesse et al. |
| 5,953,504 A | 9/1999 | Sokal et al. |
| 5,956,391 A | 9/1999 | Melen et al. |
| 5,960,411 A | 9/1999 | Hartman et al. |
| 5,963,964 A | 10/1999 | Nielsen |
| 5,974,461 A | 10/1999 | Goldman et al. |
| 5,978,381 A | 11/1999 | Perlman et al. |
| 5,978,828 A | 11/1999 | Greer et al. |
| 5,983,244 A | 11/1999 | Nation |
| 5,983,273 A | 11/1999 | White et al. |
| 5,987,498 A | 11/1999 | Athing et al. |
| 5,987,611 A | 11/1999 | Freund |
| 5,991,807 A | 11/1999 | Schmidt et al. |
| 6,005,938 A | 12/1999 | Banker et al. |
| 6,006,034 A | 12/1999 | Heath et al. |
| 6,006,333 A | 12/1999 | Nielsen |
| 6,009,474 A | 12/1999 | Lu et al. |
| 6,011,794 A | 1/2000 | Mordowitz et al. |
| 6,011,910 A | 1/2000 | Chau et al. |
| 6,012,088 A | 1/2000 | Li et al. |
| 6,016,509 A | 1/2000 | Dedrick |
| 6,023,268 A | 2/2000 | Britt, Jr. et al. |
| 6,023,585 A | 2/2000 | Perlman et al. |
| 6,023,698 A | 2/2000 | Lavey, Jr. et al. |
| 6,023,729 A | 2/2000 | Samuel et al. |
| 6,026,079 A | 2/2000 | Perlman |
| 6,026,151 A | 2/2000 | Bauer et al. |
| 6,034,689 A | 2/2000 | White et al. |
| 6,035,330 A | 3/2000 | Astiz et al. |
| 6,038,599 A | 3/2000 | Black et al. |
| 6,052,458 A | 4/2000 | Amir-Ebrahimi |
| 6,057,836 A | 5/2000 | Kavalam et al. |
| 6,058,250 A | 5/2000 | Harwood et al. |
| 6,061,060 A | 5/2000 | Berry et al. |
| 6,061,650 A | 5/2000 | Malkin et al. |
| 6,061,798 A | 5/2000 | Coley et al. |
| 6,064,666 A | 5/2000 | Willner et al. |
| 6,067,568 A | 5/2000 | Li et al. |
| 6,070,192 A | 5/2000 | Holt et al. |
| 6,070,243 A | 5/2000 | See et al. |
| 6,073,168 A | 6/2000 | Mighdoll et al. |
| 6,088,451 A | 7/2000 | He et al. |
| 6,119,152 A | 7/2000 | Carlin et al. |
| 6,101,328 A | 8/2000 | Bakshi et al. |
| 6,101,510 A | 8/2000 | Stone et al. |
| 6,119,161 A | 9/2000 | Lita et al. |
| 6,125,388 A | 9/2000 | Reisman |
| 6,128,660 A | 10/2000 | Grimm et al. |
| 6,128,663 A | 10/2000 | Thomas |
| 6,130,933 A | 10/2000 | Miloslaysky |
| 6,134,590 A | 10/2000 | Perlman |
| 6,138,142 A | 10/2000 | Linsk |
| 6,141,694 A | 10/2000 | Gardner |
| 6,145,002 A | 11/2000 | Srinivasan |
| 6,151,600 A | 11/2000 | Dedrick |
| 6,151,643 A | 11/2000 | Cheng et al. |
| 6,178,505 B1 | 1/2001 | Schneider et al. |
| 6,182,229 B1 | 1/2001 | Nielsen |
| 6,185,625 B1 | 2/2001 | Tso et al. |
| 6,188,756 B1 | 2/2001 | Mashinsky |
| 6,192,045 B1 | 2/2001 | Williams et al. |
| 6,195,691 B1 | 2/2001 | Brown |
| 6,199,065 B1 | 3/2001 | Kenyon |
| 6,199,110 B1 | 3/2001 | Rizvi et al. |
| 6,205,126 B1 | 3/2001 | Moon |
| 6,208,656 B1 | 3/2001 | Hrastar et al. |
| 6,208,857 B1 | 3/2001 | Agre et al. |
| 6,247,054 B1 | 3/2001 | Malkin |
| 6,212,535 B1 | 4/2001 | Weikart et al. |
| 6,226,655 B1 | 5/2001 | Borman et al. |
| 6,259,442 B1 | 7/2001 | Britt, Jr. et al. |
| 6,266,681 B1 | 7/2001 | Guthrie |
| 6,282,548 B1 | 8/2001 | Burner et al. |
| 6,286,058 B1 | 9/2001 | Hrastar et al. |
| 6,304,902 B1 | 10/2001 | Black et al. |
| 6,308,212 B1 | 10/2001 | Besaw et al. |
| 6,311,197 B2 | 10/2001 | Mighdoll et al. |
| 6,311,207 B1 | 10/2001 | Mighdoll et al. |
| 6,314,516 B1 | 11/2001 | Cagle et al. |
| 6,332,157 B1 | 12/2001 | Mighdoll et al. |
| 6,339,830 B1 | 1/2002 | See et al. |
| 6,345,297 B1 | 2/2002 | Grimm et al. |
| 6,356,541 B1 | 3/2002 | Muller et al. |
| 6,360,366 B1 | 3/2002 | Heath et al. |
| 6,370,141 B1 | 4/2002 | Giordano, III et al. |
| 6,377,570 B1 | 4/2002 | Vaziri et al. |
| 6,404,736 B1 | 6/2002 | Arkko et al. |
| 6,405,253 B1 | 6/2002 | Schutte et al. |
| 6,408,336 B1 | 6/2002 | Schneider et al. |
| 6,421,694 B1 | 7/2002 | Nawaz et al. |
| 6,424,992 B2 | 7/2002 | Devarakonda et al. |
| 6,449,344 B1 | 9/2002 | Goldfinger et al. |
| 6,473,099 B1 | 10/2002 | Goldman et al. |
| 6,505,232 B1 | 1/2003 | Mighdoll et al. |
| 6,519,224 B2 | 2/2003 | Hrastar et al. |
| 6,529,517 B2 | 3/2003 | Hrastar et al. |
| 6,557,054 B2 | 4/2003 | Reisman |
| 6,560,704 B2 | 5/2003 | Dieterman et al. |
| 6,571,290 B2 | 5/2003 | Selgas et al. |
| 6,578,075 B1 | 6/2003 | Nieminen et al. |
| 6,606,654 B1 | 8/2003 | Borman et al. |
| 6,609,198 B1 | 8/2003 | Wood et al. |
| 6,614,786 B1 | 9/2003 | Byers |
| 6,618,353 B2 | 9/2003 | Merrill et al. |
| 6,671,272 B2 | 12/2003 | Vaziri et al. |
| 6,757,913 B2 | 6/2004 | Knox |
| 6,766,454 B1 | 7/2004 | Riggins |
| 6,795,415 B1 | 9/2004 | Suonvieri |
| 6,795,852 B1 | 9/2004 | Kleinrock et al. |
| 6,901,386 B1 | 5/2005 | Dedrick et al. |
| 6,937,566 B1 | 8/2005 | Forslow |
| 7,031,441 B1 | 4/2006 | Edwards et al. |
| 7,047,560 B2 | 5/2006 | Fishman et al. |
| 7,082,532 B1 | 7/2006 | Vick et al. |
| 7,363,245 B1 | 4/2008 | Dedrick et al. |
| 7,599,985 B2 | 10/2009 | Doyle et al. |
| 7,870,109 B2 | 1/2011 | Shilo et al. |
| 7,975,056 B2 | 7/2011 | Gmuender et al. |
| 8,234,575 B2 | 7/2012 | Hartin et al. |
| 8,275,863 B2 | 9/2012 | Selgas et al. |
| 8,516,132 B2 | 8/2013 | Selgas et al. |
| 8,732,318 B2 | 5/2014 | Selgas et al. |
| 9,021,070 B2 | 4/2015 | Selgas et al. |
| 9,137,240 B2 | 9/2015 | Selgas et al. |
| 9,141,263 B2 | 9/2015 | Selgas et al. |
| 2002/0029275 A1 | 3/2002 | Selgas et al. |
| 2002/0129064 A1 | 9/2002 | Guthrie |
| 2003/0195967 A1 | 10/2003 | Selgas et al. |
| 2003/0195968 A1 | 10/2003 | Selgas et al. |
| 2003/0204606 A1 | 10/2003 | Selgas et al. |
| 2004/0015592 A1 | 1/2004 | Selgas et al. |
| 2004/0030752 A1 | 2/2004 | Selgas et al. |
| 2011/0185411 A1 | 7/2011 | Selgas et al. |
| 2013/0139083 A1 | 5/2013 | Selgas et al. |
| 2013/0247157 A1 | 9/2013 | Selgas et al. |
| 2013/0291069 A1 | 10/2013 | Selgas et al. |
| 2013/0346895 A1 | 12/2013 | Selgas et al. |
| 2014/0373094 A1 | 12/2014 | Selgas et al. |
| 2016/0098182 A1 | 4/2016 | Selgas et al. |
| 2016/0156672 A1 | 6/2016 | Selgas et al. |

FOREIGN PATENT DOCUMENTS

| | | |
|---|---|---|
| EP | 0336079 A2 | 10/1989 |
| EP | 0396834 A1 | 11/1990 |
| EP | 0479660 B1 | 4/1992 |
| EP | 0601254 A1 | 6/1994 |
| EP | 0667579 A1 | 8/1995 |
| EP | 0745924 A2 | 12/1996 |
| EP | 0762297 A2 | 3/1997 |
| EP | 0779751 A2 | 6/1997 |
| EP | 0779752 A2 | 6/1997 |

(56) References Cited

FOREIGN PATENT DOCUMENTS

| | | | |
|---|---|---|---|
| EP | 0779753 A2 | 6/1997 | |
| EP | 0779754 A2 | 6/1997 | |
| EP | 0793170 A1 | 9/1997 | |
| EP | 0814589 B1 | 12/1997 | |
| EP | 0700625 A1 | 1/2002 | |
| GB | 2289598 B | 11/1995 | |
| JP | 08-340331 A | 12/1996 | |
| WO | WO-93/02419 A1 | 2/1993 | |
| WO | WO-93/24890 A1 | 12/1993 | |
| WO | WO-94/28683 A1 | 12/1994 | |
| WO | WO-95/24011 A1 | 9/1995 | |
| WO | WO-96/19771 A1 | 6/1996 | |
| WO | WO-96/39668 A1 | 12/1996 | |
| WO | WO-97/05549 A1 | 2/1997 | |
| WO | WO-97/09682 A1 | 3/1997 | |
| WO | WO-9707656 A3 | 3/1997 | |
| WO | WO-97/18662 A1 | 5/1997 | |
| WO | WO-99/66692 A1 | 12/1999 | |

OTHER PUBLICATIONS

U.S. Appl. No. 10/417,862; Response, Rule 131 Affidavit and Petition; dated Jan. 12, 2005.
U.S. Appl. No. 10/417,862; Office Action dated Jul. 26, 2005.
U.S. Appl. No. 10/417,862; Response; dated Sep. 12, 2005.
U.S. Appl. No. 10/417,862; Office Action; dated Nov. 29, 2005.
U.S. Appl. No. 10/417,862; Response; dated May 30, 2006.
U.S. Appl. No. 10/417,862; Supplemental Amendment; dated Jul. 31, 2006.
U.S. Appl. No. 10/417,862; Office Action; dated Aug. 23, 2006.
U.S. Appl. No. 10/417,862; Response with Petition; dated Jun. 25, 2007.
U.S. Appl. No. 10/417,862; Notice of Abandonment; dated Oct. 31, 2007.
U.S. Appl. No. 10/417,862; Decision on Petition; dated Dec. 27, 2007.
U.S. Appl. No. 10/417,862; Office Action; dated Aug. 11, 2008.
U.S. Appl. No. 10/417,862; Examiner's Interview Summary; dated Sep. 9, 2008.
U.S. Appl. No. 10/417,862; Response; dated Sep. 10, 2008.
U.S. Appl. No. 10/417,862; Office Action; dated Dec. 11, 2008.
U.S. Appl. No. 10/417,862; Response; dated Jun. 11, 2009.
U.S. Appl. No. 10/417,862; Final Office Action; dated Oct. 5, 2009.
U.S. Appl. No. 10/417,862; Response; dated Nov. 13, 2009.
U.S. Appl. No. 10/417,862; Office Action; dated Feb. 3, 2010.
U.S. Appl. No. 10/417,862; Response; dated Feb. 26, 2010.
U.S. Appl. No. 10/417,862; Applicant's Interview Summary; dated Mar. 15, 2010.
U.S. Appl. No. 10/417,862; Examiner's Interview Summary; dated Apr. 23, 2010.
U.S. Appl. No. 10/417,862; Applicant's Interview Summary; dated May 5, 2010.
U.S. Appl. No. 10/417,862; Applicant's Interview Summary; dated May 21, 2010.
U.S. Appl. No. 10/417,862; Applicant's Interview Summary; dated May 24, 2010.
U.S. Appl. No. 10/417,862; Supplemental Response; dated Jun. 11, 2010.
U.S. Appl. No. 10/417,862; Notice of Allowance; dated Aug. 17, 2010.
U.S. Appl. No. 10/417,862; Petition for Patent Term Adjustment; Sep. 17, 2010.
U.S. Appl. No. 10/417,862; Decision on Petition; dated Feb. 1, 2011.
U.S. Appl. No. 10/417,862; Issue Notification; dated Jul. 5, 2011.
U.S. Appl. No. 10/417,853; Office Action; dated Jul. 8, 2004.
U.S. Appl. No. 10/417,853; Examiner's Interview Summary; dated Oct. 13, 2004.
U.S. Appl. No. 10/417,853; Response with Petition; dated Jan. 10, 2005.
U.S. Appl. No. 10/417,853; Decision on Petition; dated May 4, 2005.
U.S. Appl. No. 10/417,853; Office Action (RR); dated Aug. 31, 2005.
U.S. Appl. No. 10/417,853; Response to Restriction Requirement; dated Sep. 12, 2005.
U.S. Appl. No. 10/417,853; Office Action (final); dated Feb. 10, 2006.
U.S. Appl. No. 10/417,853; Response; dated Jul. 31, 2006.
U.S. Appl. No. 10/417,853; Advisory Action; dated Aug. 9, 2006.
U.S. Appl. No. 10/417,853; Examiner's Interview Summary; dated Sep. 29, 2006.
U.S. Appl. No. 10/417,853; Office Action; dated Nov. 2, 2006.
U.S. Appl. No. 10/417,853; Examiner's Interview Summary; dated Dec. 6, 2006.
U.S. Appl. No. 10/417,853; Response; dated May 2, 2007.
U.S. Appl. No. 10/417,853; Notice of Non-Responsive Amendment; dated Aug. 3, 2007.
U.S. Appl. No. 10/417,853; Response; dated Sep. 4, 2007.
U.S. Appl. No. 10/417,853; Office Action (RR); dated Nov. 16, 2007.
U.S. Appl. No. 10/417,853; Response to Restriction Requirement; dated Dec. 17, 2007.
U.S. Appl. No. 10/417,853; Office Action (final); dated Mar. 26, 2008.
U.S. Appl. No. 10/417,853; Examiner's Interview Summary; dated May 28, 2008.
U.S. Appl. No. 10/417,853; Response; dated Jul. 3, 2008.
U.S. Appl. No. 10/417,853; Examiner's Interview Summary; dated Sep. 9, 2008.
U.S. Appl. No. 10/417,853; Office Action; dated Sep. 25, 2008.
U.S. Appl. No. 10/417,853; Examiner's Interview Summary; dated Feb. 2, 2009.
U.S. Appl. No. 10/417,853; Response with Petition, Affidavits/Exhibits; dated Mar. 19, 2009.
U.S. Appl. No. 10/417,853; Decision on Petition; dated Jun. 8, 2009.
U.S. Appl. No. 10/417,853; Examiner's Interview Summary; dated Sep. 29, 2009.
U.S. Appl. No. 10/417,853; Examiner's Interview Summary; dated Oct. 19, 2009.
U.S. Appl. No. 10/417,853; Applicant's Interview Summaries; dated Oct. 26, 2009.
U.S. Appl. No. 10/417,853; Applicant's Interview Summaries; dated Nov. 16, 2009.
U.S. Appl. No. 10/417,853; Examiner's Interview Summary; dated Nov. 23, 2009.
U.S. Appl. No. 10/417,853; Applicant's Interview Summary; dated Mar. 15, 2010.
U.S. Appl. No. 10/417,853; Office Action; dated Mar. 16, 2010.
U.S. Appl. No. 10/417,853; Examiner's Interview Summary; dated Apr. 23, 2010.
U.S. Appl. No. 10/417,853; Applicant's Interview Summary; dated May 5, 2010.
U.S. Appl. No. 10/417,853; Applicant's Interview Summary; dated May 21, 2010.
U.S. Appl. No. 10/417,853; Applicant's Interview Summary; dated May 24, 2010.
U.S. Appl. No. 10/417,853; Response; dated Jul. 2, 2010.
U.S. Appl. No. 10/417,853; Applicant's Summary of Interview with Examiner; dated Jul. 21, 2010.
U.S. Appl. No. 10/417,853; Applicant's Summary of Meeting with Technology Center Director; dated Aug. 2, 2010.
U.S. Appl. No. 10/417,853; Supplement to Interview Summaries filed Jul. 21, 2010; dated Aug. 17, 2010.
U.S. Appl. No. 10/417,853; Applicant's Summary of Interview with Examiner; dated Nov. 15, 2010.
U.S. Appl. No. 10/417,853; Interview Summary; dated Mar. 7, 2011.
U.S. Appl. No. 10/417,853; Supplemental Response; dated Mar. 21, 2011.
U.S. Appl. No. 10/417,853; Office Action; dated Jun. 9, 2011.
U.S. Appl. No. 10/417,853; Interview Summary; dated Jul. 14, 2011.

(56) References Cited

OTHER PUBLICATIONS

U.S. Appl. No. 10/417,853; Response; dated Sep. 2, 2011.
U.S. Appl. No. 10/417,853; Response to Amendment; dated Nov. 29, 2011.
U.S. Appl. No. 10/417,853; Response; dated Dec. 6, 2011.
U.S. Appl. No. 10/417,853; Final Office Action; dated Apr. 25, 2012.
U.S. Appl. No. 10/417,853; Response; dated Jun. 1, 2012.
U.S. Appl. No. 10/417,853; Applicant-Initiated Interview Summary; dated Jun. 7, 2012.
U.S. Appl. No. 10/417,853; Notice of Allowance; dated Jun. 20, 2012.
U.S. Appl. No. 10/417,853; Notice to File Corrected Application Papers—Notice of Allowance dated Aug. 7, 2012.
U.S. Appl. No. 10/417,853; Amendment in Response to Notice to File Corrected Application Papers—Notice of Allowance dated Aug. 8, 2012.
U.S. Appl. No. 10/417,853; Issue Notification; dated Sep. 25, 2012.
U.S. Appl. No. 10/417,871; Office Action; dated Feb. 6, 2007.
U.S. Appl. No. 10/417,871; Response; dated Aug. 6, 2007.
U.S. Appl. No. 10/417,871; Office Action; dated Oct. 15, 2007.
U.S. Appl. No. 10/417,871; Response; dated Jan. 15, 2008.
U.S. Appl. No. 10/417,871; Advisory Action; dated Jan. 25, 2008.
U.S. Appl. No. 10/417,871; Response; dated Apr. 15, 2008.
U.S. Appl. No. 10/417,871; Office Action; dated Oct. 15, 2008.
U.S. Appl. No. 10/417,871; Notice of Abandonment; dated Jun. 23, 2009.
U.S. Appl. No. 10/417,821; Office Action; dated Jul. 13, 2004.
U.S. Appl. No. 10/417,821; Response with Petition; dated Jan. 13, 2005.
U.S. Appl. No. 10/417,821; Decision on Petition; dated Mar. 2, 2005.
U.S. Appl. No. 10/417,821; Request Reconsideration of Petition; dated May 2, 2005.
U.S. Appl. No. 10/417,821; Office Action; dated May 11, 2005.
U.S. Appl. No. 10/417,821; Response; dated Jul. 11, 2005.
U.S. Appl. No. 10/417,821; Office Action; dated Aug. 1, 2005.
U.S. Appl. No. 10/417,821; Response; dated Sep. 12, 2005.
U.S. Appl. No. 10/417,821; Decision on Petition; dated Sep. 14, 2005.
U.S. Appl. No. 10/417,821; Office Action; dated Feb. 7, 2006.
U.S. Appl. No. 10/417,821; Response; dated Jul. 31, 2006.
U.S. Appl. No. 10/417,821; Office Action; dated Oct. 23, 2006.
U.S. Appl. No. 10/417,821; Examiner's Interview Summary; dated Dec. 6, 2006.
U.S. Appl. No. 10/417,821; Response; dated Apr. 23, 2007.
U.S. Appl. No. 10/417,821; Office Action, dated Jul. 13, 2007.
U.S. Appl. No. 10/417,821; Examiner's Interview Summary; dated Nov. 21, 2007.
U.S. Appl. No. 10/417,821; Response; dated Dec. 12, 2007.
U.S. Appl. No. 10/417,821; Office Action; dated Jun. 13, 2008.
U.S. Appl. No. 10/417,821; Response; dated Dec. 15, 2008.
U.S. Appl. No. 10/417,821; Office Action; dated Mar. 18, 2009.
U.S. Appl. No. 10/417,821; Response; dated Mar. 27, 2009.
U.S. Appl. No. 10/417,821; Office Action; dated Jun. 23, 2009.
U.S. Appl. No. 10/417,821; Response; dated Aug. 14, 2009.
U.S. Appl. No. 10/417,821; Office Action; dated Sep. 4, 2009.
U.S. Appl. No. 10/417,821; Examiner's Interview Summary; dated Oct. 7, 2009.
U.S. Appl. No. 10/417,821; Response; dated Mar. 4, 2010.
U.S. Appl. No. 10/417,821; Applicant's Interview Summary; dated Mar. 15, 2010.
U.S. Appl. No. 10/417,821; Examiner's Interview Summary; dated Apr. 23, 2010.
U.S. Appl. No. 10/417,821; Appeal Brief; dated May 4, 2010.
U.S. Appl. No. 10/417,821; Applicant's Interview Summary; dated May 5, 2010.
U.S. Appl. No. 10/417,821; Applicant's Interview Summary; dated May 21, 2010.
U.S. Appl. No. 10/417,821; Decision on Petition; dated Jun. 14, 2010.
U.S. Appl. No. 10/417,821; Advisory Action; dated Aug. 20, 2010.
U.S. Appl. No. 10/417,821; Examiner's Answer to Appeal Brief; dated Sep. 2, 2010.
U.S. Appl. No. 10/417,821; Reply Brief—Request for Oral Hearing Nov. 2, 2010.
U.S. Appl. No. 10/417,821; Miscellaneous Communication to Appellant; Dec. 6, 2010.
U.S. Appl. No. 10/417,821; Board of Patent Appeals and Interferences Docketing Notice; Dec. 14, 2010.
U.S. Appl. No. 10/417,821; Notice of Hearing; Jan. 24, 2013.
U.S. Appl. No. 10/417,821; Response to Notice of Hearing; Feb. 13, 2013.
U.S. Appl. No. 10/417,821; Decision on Appeal; Apr. 4, 2013.
U.S. Appl. No. 10/417,821; Notice of Allowance; dated Aug. 15, 2013.
U.S. Appl. No. 10/417,821; RCE; dated Oct. 31, 2013.
U.S. Appl. No. 10/417,821; Notice of Allowance; dated Mar. 14, 2014.
U.S. Appl. No. 10/417,756; Office Action; dated Jun. 19, 2006.
U.S. Appl. No. 10/417,756; Response; dated Dec. 19, 2006.
U.S. Appl. No. 10/417,756; Office Action; dated Jan. 26, 2007.
U.S. Appl. No. 10/417,756; Response; dated Jul. 26, 2007.
U.S. Appl. No. 10/417,756; Office Action; dated Sep. 12, 2007.
U.S. Appl. No. 10/417,756; Response; dated Mar. 12, 2008.
U.S. Appl. No. 10/417,756; Office Action; dated Apr. 24, 2008.
U.S. Appl. No. 10/417,756; Response; dated Oct. 24, 2008.
U.S. Appl. No. 10/417,756; Examiner's Interview Summary; dated Nov. 28, 2008.
U.S. Appl. No. 10/417,756; Office Action; dated Jan. 13, 2009.
U.S. Appl. No. 10/417,756; Response; dated Jul. 13, 2009.
U.S. Appl. No. 10/417,756; Office Action; dated Oct. 21, 2009.
U.S. Appl. No. 10/417,756; Response; dated Apr. 20, 2010.
U.S. Appl. No. 10/417,756; Office Action; dated May 16, 2012.
U.S. Appl. No. 10/417,756; Response; dated Nov. 15, 2012.
U.S. Appl. No. 10/417,756; Notice of Allowance; dated Nov. 28, 2012.
U.S. Appl. No. 10/417,756; RCE; dated Feb. 15, 2013.
U.S. Appl. No. 10/417,756; Notice of Allowance; dated May 31, 2013.
U.S. Appl. No. 10/417,756; Issue Notification; dated Aug. 20, 2013.
U.S. Appl. No. 08/827,691; Application as filed; Apr. 10, 1997; Inventor: John Guthrie.
U.S. Appl. No. 08/827,691; Office Action; dated Apr. 16, 1999.
U.S. Appl. No. 08/827,691; Response; dated Jul. 15, 1999.
U.S. Appl. No. 08/827,691; Final Office Action; dated Sep. 22, 1999.
U.S. Appl. No. 08/827,691; Examiner's Interview Summary; dated Jan. 10, 2000.
U.S. Appl. No. 08/827,691; Preliminary Amendment and RCE; dated Jan. 24, 2000.
U.S. Appl. No. 08/827,691; Final Office Action; dated Apr. 4, 2000.
U.S. Appl. No. 08/827,691; Appeal Brief; dated Nov. 30, 2000.
U.S. Appl. No. 08/827,691; Notice of Allowance, Notice of Allowability, Examiner's Amendment, Examiner's Interview Summary; dated Mar. 1, 2001.
U.S. Appl. No. 09/872,474; Application as filed Jun. 1, 2001.
U.S. Appl. No. 09/872,474; Office Action; dated May 23, 2002.
U.S. Appl. No. 13/079,015; Office Action; dated May 24, 2013.
U.S. Appl. No. 13/079,015; Amendment and Response, dated Sep. 24, 2013.
U.S. Appl. No. 13/079,015; Final Office Action dated Jan. 31, 2014.
U.S. Appl. No. 13/079,015; Amendment; dated Mar. 21, 2014.
U.S. Appl. No. 13/079,015; Advisory Action; dated Apr. 25, 2014.
U.S. Appl. No. 13/079,015; RCE and Response to Office Action; dated Apr. 30, 2014.
U.S. Appl. No. 13/079,015; Amendment; dated May 15, 2014.
U.S. Appl. No. 13/871,409 filed Apr. 26, 2013; first-named inventor: Selgas.
U.S. Appl. No. 13/871,409; Office Action; dated Oct. 2, 2013.
U.S. Appl. No. 13/871,409; Agenda for Examiner Interview; dated Nov. 20, 2013.

(56) References Cited

OTHER PUBLICATIONS

U.S. Appl. No. 13/871,409; Applicant-Initiated Interview Summary; dated Nov. 29, 2013.
U.S. Appl. No. 13/871,409; Response to Office Action dated Jan. 2, 2014.
U.S. Appl. No. 13/871,409; Amendment filed Mar. 21, 2014.
U.S. Appl. No. 13/871,409; Final Office Action dated Mar. 26, 2014.
U.S. Appl. No. 13/871,409; Applicant-Initiated Interview Summary; dated Jun. 5, 2014.
U.S. Appl. No. 13/923,115 filed Jun. 20, 2013; first-named inventor: Selgas.
U.S. Appl. No. 13/923,115; Terminal Disclaimer; dated Apr. 15, 2014.
U.S. Appl. No. 13/923,115; Notice of Allowance; dated May 9, 2014.
U.S. Appl. No. 13/871,432 filed Apr. 26, 2013; first-named inventor: Selgas.
U.S. Appl. No. 13/871,432; Amendment and Response to Office Action; dated Jan. 2, 2014.
U.S. Appl. No. 13/871,432; Amendment; dated Mar. 21, 2014.
U.S. Appl. No. 13/871,432; Final Office Action; dated Mar. 25, 2014.
U.S. Appl. No. 13/871,432; Applicant-Initiated Interview Summary; dated May 28, 2014.
U.S. Appl. No. 13/871,432; Office Action; dated Oct. 2, 2013.
U.S. Appl. No. 13/871,432; Applicant-Initiated Interview Summary; dated Nov. 29, 2013.
Aboba, Bernard, et al., "Dialup Roaming Requirements," ROAMOPS Working Group, Internet Draft, Dec. 30, 1996, SBCIMM 000488-000504.
Aboba, Bernard, et al., "Dialup Roaming Requirements," ROAMOPS Working Group, Internet Draft, Nov. 26, 1996, SBCIMM 000457-000472.
Aboba, Bernard, et al., "Review of Roaming Implementations," RFC 2194, Sep. 1997, SBCIMM 000383-000417.
Aboba, Bernard, et al., "The Network Access Identifier," ROAMOPS Working Group, Internet Draft, Mar. 6, 1997, SBCIMM 000511-000516.
Aboba, Bernard, et al., "The Network Access Identifier," ROAMOPS Working Group, Internet Draft, Feb. 25, 1997, SBCIMM 000505-000510.
Aboba, Bernard, et al., "The Network Access Identifier," ROAMOPS Working Group, Internet Draft, Nov. 26, 1996, SBCIMM 000473-000487.
Aboba, Bernard, et al., "The Network Access Indentifier," ROAMOPS Working Group, Internet Draft, May 22, 1997, SBCIMM 000517-000521.
Ads support 'free' e-mail services, Washington Post, Jun. 3, 1996, U 001090.
Advertising—Juno Would be delighted to handle your E-mail free, but she would like something in return, New York Times, 1996, U 001144.
Albinus, Philip, et al. "Ride the Wave with Graphical Online Services—Latest Offerings Promise Faster, Easier Suring (Hands-on Test Results)," Windows Magazine, Sep. 1, 1995 ELNKMM 005726-005735.
Allen, Mark, "The GNN Team in Ogden," Interaction, Jun. 1996, p. 13; AOL 032768.
AlterNet product literature, (Jun. 1992) MYMAIL 631808-631812.
America Online, version 3.0 installation materials, (1996) AOL 028466-028480.
American Heritage College Dictionary (excerpts), 3rd Ed., Houghton Mifflin Company, 1997; AOL078671-078690.
Anderson, Tim; "Visual Basic—A programming language and IDE developed by Microsoft"; Aug. 2008; http://knol.google.com/k/visual-basic.
Angus, Jeffrey Gordon, "Supra Simple offers fast 'net access with few hassles," Info World, vol. 18, No. 4, Jan. 22, 1996; ELNKMM 005704.

America Online, AOL executable files (as early as Apr. 28, 1997) AOL 028489.
America Online, GNN 1.2 set-up files (as early as Mar. 11, 1995), AOL 032703.
America Online, Single-User Version Internet in a Box, Disk 1 of 3, (as early as Nov. 15, 1993), AOL 116227.
America Online, Instantly Create Personalized Multimedia (as early as Sep. 15, 1995), AOL 116422.
America Online, Single-User Version Internet in a Box, Disk 2 of 3, (as early as Dec. 5, 1994), AOL 116229.
America Online, Single-User Version Internet in a Box, Disk 3 of 3, (as early as Dec. 5, 1994), AOL 116231.
America Online, CompuServe Internet in a Box, Disk 1, (as early as Jun. 30, 1995), AOL 116423.
America Online, CompuServe Internet in a Box, Disk 2, (as early as Oct. 24, 1995), AOL 116425.
America Online, CompuServe Internet in a Box, Disk 3, (as early as Oct. 20, 1995), AOL 116427.
America Online, CompuServe Internet in a Box, Disk 4, (as early as May 12, 1995), AOL 116429.
America Online, Spry Mosaic Direct disk, (as early as Aug. 9, 1995), AOL 116433.
America Online,Spry Mosaic Direct disk, (as early as Aug. 9, 1995), AOL 116435.
America Online, Spry Mosaic Direct in a Box disk, (as early as Jan. 16, 1995), AOL 116546.
America Online, The AOL Connection Process and the Aol Adapter, (Nov. 2, 1999), AOL 014417-014419.
Apple Computer, "Inside Macintosh: Networking With Open Transport"; Apple Computer, Inc., Jan. 15, 1998; (40 pgs) http://developer.apple.com/documentation/mac/NetworkingOT/NetworkingWOT-2.html.
Associated Press, "GTE with Uunet, Signs on the Internet," The New York Times, Jul. 11, 1996, GTE 16646.
AT&T Corp., AT&T Business Network launches on the Web, Database Magazine, vol. 19, Issue 4, p. 9, Aug./Sep. 1996, ATT 018247.
AT&T Corp., AT&T Combines, Information Week, Issue 589, p. 28, Jul. 22, 1996, ATT 018275.
AT&T Corp., AT&T drops Notes: Puts focus on Net, Electronic Buyer's News, Issue 997, p. 66, Mar. 11, 1996, ATT 018244.
AT&T Corp., AT&T WorldNet Service, version 1, Quick Start Guide, (Apr. 12, 1996), ATT 000005-000037.
AT&T Corp., AT&T WorldNet Service, version 2. Quick Start Guide, (1996), ATT 000247-000285 and ATT 003136-003169.
AT&T Corp., AT&T WorldNet Service, version 2.02 Quick Start Guide, (1996), ATT 000325-000363.
Bailey, George, "Establishing an IP Connection," No Name Newsletter, Sep. 1996, SBCCIMM 000445-000447.
Banner, The : Second-Generation Web Services Promise Advertisers a Faster, Smarter Experience, (Jul. 1996), U 001099-001101.
Bass, Steve, et al., "Hot Picks for the Home Office," PC World, vol. 14, Issue 12, Dec. 1996, ATT 018240-018241.
Bell Atlantic, Bell Atlantic.net, version 1.0 reference and installation materials, (1996), GTE 004564-004577.
Berners-Lee, T. et al; "Hypertext Transfer Protocol—HTTP/1.0"; Network Working Group, (May 1996); http://tools.ietf.org/html/rfc1945.
Bloom, Paul, et al., "A Network Solution for Improved Security for Computer Access," Computer Technologies for the 90s, Oct. 1988 ELNKMM004220-004223.
Bloomberg Business News, "Company News: Bell Atlantic to Offer Internet Access," The New York Times, Apr. 11, 1996, GTE 16647.
Bowen, Charles, "How to Get the Most Out of CompuServe," CompuServe Magazine, Dec. 1995, AOL 032743.
Bowen, Charles, et al. How to Get the Most Out of CompuServe, 5th Ed., New York, N.Y., Random House Electronic Publishing, 1993 SBCIMM000748-000750.
Brinkley, Joel. "Two Industries Fight for a $150 Billion Prize," The New York Times, Mar. 28, 1997, ATT 018369-018372.
Busch, David D., "The suite sell of access-Integrated application suites will let you finally take full advantage of the net," Netguide, No. 304, (1996), ELNKMM 005712-005725.

(56) References Cited

OTHER PUBLICATIONS

Caffrey, Brian, "Plugging into the power of the Internet," Electronic Buyer's News, Issue 995, p. 65, Feb. 26, 1996, ATT 019622-019626.
Carr, Gregory W., Letter to General Counsel USPTO via First Class Mail regarding U.S. Appl. No. 10/417,853, filed Feb. 2, 2010.
Carr, Gregory W., Letter to General Counsel USPTO via Hand Delivery regarding U.S. Appl. No. 10/417,853, filed Feb. 2, 2010.
Carr, Gregory W., Letter to General Counsel USPTO via First Class Mail regarding U.S. Appl. No. 10/417,821, filed Feb. 23, 2010.
Carr, Gregory W., Letter to General Counsel USPTO via Hand Delivery regarding U.S. Appl. No. 10/417,821, filed Feb. 24, 2010.
Carr, Gregory W., Letter to General Counsel USPTO via First Class Mail regarding U.S. Appl. No. 10/417,862, filed Feb. 23, 2010.
Carr, Gregory W., Letter to General Counsel USPTO via Hand Delivery regarding U.S. Appl. No. 10/417,862, filed Feb. 24, 2010.
Carr, Gregory W.; Letter to Director David Kappos, USPTO; Feb. 25, 2010.
Prodigy, installation disk, CD ROM, (date unknown)), SBCIMM 000786.
Access Net Direct, CD ROM, 1.0 Installation Disks (early kit later named Prodigy Internet), (date unknown), SBCIMM 000782.
Bell Atlantic, CD ROM re: Bell Atlantic 1.0 (1996), DR00001379.
GTE, CD ROM re: GTE Internet (1996), DR00001378.
Prodigy, CD ROM re: Prodigy Trial Offer Installation Disk, version 1.5, (as early as Dec. 31, 1969), SBCIMM 000784.
Prodigy, CD ROM re: Software Installation Disk, version 1.1, (date unknown), SBCIMM 000785.
Prodigy, CD ROM re: executable files, (as early as Mar. 11, 1998), SBCIMM 000781.
Prodigy, CD ROM re: executable files, (date unknown), SBCIMM 000783.
Charski, Mindy, et al., "Free E-Mail: A Viable Option for Careful Consumers," PC World, vol. 15, Issue 7, Jul. 1997, ATT 018237-018239.
Chen, Elaine, "Data net," Electronic News (North America), vol. 42, Issue 2118, May 27, 1996, ATT 018273-018274.
Chen, Elaine, "IBM first major firm to unveil NC. (IBM's Network Station Internet access terminal)," Electronic News, vol. 42, No. 2133, Sep. 9, 1996 ELNKMM004186.
Clegg, Steven G., "Apple Eases Internet Access," LAN Times, vol. 13, No. 8, Apr. 15, 1996 ELNKMM005705.
CNET staff, "PSINet sells consumer accounts," CNET News.com—Tech News First, Jun. 29, 1996 SBCCIMM000444.
Cole, David M., "The Cole Digest, Feb. 7, 1996," The Cole Digest, Feb. 7, 1996, SBCCIMM 000454-000456.
CompuServe Guide for New Members, Jan. 1996 AOL032706-032731.
CompuServe Guide for New Members, May 1996 AOL032749-032763.
CompuServe Magazine, Dec. 1995 AOL032732-032741.
CompuServe, Microsoft Forge Major Strategic Alliance, Microsoft PressPass, Jun. 4, 1996, ATT 018213-018215.
Compuserve, Network Access Numbers, (Aug. 1995), AOL 086221-086243.
Connect Atlanta, Access America Agreement, (Jan. 1995), ELNKMM 013101-013104 and ELNKMM 013107.
Cooney, Michael, "New software helps remote users access mainframe application," Network World, Jan. 11, 1993; ELNKMM004204.
Davis, Frederic E., "Windows 95: the Internet's Built in—Microsoft's Internet-savvy operation system will make online exploration a snap (Frontiers, Both Old and New)," Netguide, No. 210, (2004), ELNKMM 0057006-005711.
Davis, Steve, CompuServe: Complete Handbook and Membership Kit, 2nd Edition, Prima Publishing, (1996), AOL 085208-085740.
Dawson, Keith, "TBTF for Nov. 12, 1996: Where seek is find," Tasty Bits from the Technology Front, Nov. 13, 1996, SBCIMM 000418-000425.
Dear Windows 95 Beta Tester letter from Microsoft, Mar. 1995, MYMAIL 007263.
Dear Windows 95 Beta Tester letter from Microsoft, Oct. 1994, MYMAIL 007264.
Dear Windows Developer letter from Microsoft, Mar. 15, 1995, MYMAIL 007259-007261.
Messina, Judith, Delivering On-Line, Crain's New York Business, vol. 14, Issue 13, p. 3, (Mar. 30, 1998), 0001136-001137.
Dern, Daniel P., "Better self-installing 'Internet packages' begin to arrive," Networking Computing, vol. 6, Issue 8, p. 34, Jul. 1, 1995, ATT 018325-018326.
Di Carlo, Lisa, "Banyan's ENS for NetWare improves access to VINES," PC Week, Dec. 20, 1993 ELNKMM004196.
GNN, Did you say HTML?, Interaction, Jun. 1996, p. 12 AOL032767.
Dodd, Annabel Z., Essential Guide to Telecommunications, Second Edition., Prentice Hall PTR, 2000.
GTE Internet, executable files disk, (as early as Sep. 7, 1995), DR 001378.
Bell Atlantic, executable files disk, version 1.0 (as early as Sep. 7, 1995), DR 001379.
GTE, Internet Solutions executable files disk, (as early as Sep. 7, 1995), DR 001380.
Dunlap, Charlotte, "AT&T Business Network aims for corporate clients," Computer Reseller News, Issue 651 p. 49, Oct. 2, 1995, ATT 018353-018354.
Dunlap, Charlotte, "CompuServe pits NetScape v. Lotus," Computer Reseller News, Issue 684, p. 53, May 20, 1996, ATT 018346-018347.
Dunlap, Charlotte, "Internet access hooks vendors, resellers eager for new market," Computer Reseller News, Issue 629, p. 51, May 8, 1995, ATT 018344-018345.
Earthlink Network, EarthLink Announces 'Total Access' Complete Low Cost Internet Access, M2 Presswire, May 24, 1995, ELNKMM 008053-008054.
Earthlink Network, Earthlink Goes Nationwide; Hooks up in 150 Towns, NetGuide, vol. 2, Issue 11, Nov. 11, 1995, ELNKMM 008046.
Earthlink Network, Open the Door to the Internet, (May 1, 1995), ELNKMM 006038-006040.
Earthlink Network, Total Access Internet reference and installation materials, (1996), ELNKMM 014325-014342, ELNKMM 014366-014375, and ELNKMM 015597-015634.
Earthlink Pairs with UUNet, Computer Reseller News, Issue 647, Sep. 6, 1995, ELNKMM 008045.
Edell, Richard et al., "Billing Users and Pricing for TCP," IEEE Journal on Selected Areas in Communications, Sep. 1995, vol. 13, pp. 1162-1175.
Edwards, John, "Making a Good Thing Better," CompuServe Magazine, Jan. 1996, AOL 032727-032731.
Edwards, John, "Single Sign-On Technology Streamlines Network Access," Software Magazine, Nov. 1993; ELNKMM004198-004200.
Earthlink Network, TA 2.0 (Aug. 25, 1998); TA 1.69 WIN3.1 (Mar. 21, 1997); TA 2.0.0 45576 for WIN 95, ELNKMM 014281.
Earthlink Network, EarthLink Total Access Internet Installation CD 1996, ELNKMM 014296.
Earthlink Network, EarthLink Total Access Internet Installation CD 1996 w/ Netscape Navigator, ELNKMM 014297.
Earthlink Network, EarthLink Network Virtual Vineyards Epicurious Foods Installation CD 1996, ELNKMM 014298.
Earthlink Network, Total Access Internet w/ Netscape Navigator Installation CD 1996 (Black), ELNKMM 014299.
Earthlink Network, EarthLink Network Total Access Internet w/ Netscape Navigator Internet Phone Installation CD 1996, ELNKMM 014300.
Earthlink Network, EarthLink Network Total Access Internet CompUSA w/ Netscape Navigator Install CD 1996, ELNKMM 014301.
Earthlink Network, EarthLink Network Total Access Internet w/ Netscape Navigator, AirWarrior and Poker Installation CD 1996, ELNKMM 014302.
Earthlink Network, Total Access Internet Lollapalooza 1996, ELNKMM 014303.
Earthlink Network, Bruin ONline Gold Pilot Release, (Sep. 11, 1997), ELNKMM 014314.

(56) References Cited

OTHER PUBLICATIONS

Earthlink Network, Total Access Internet Windows 3.1, Disk 1, (as early as Mar. 20, 1996), ELNKMM 014327.
Earthlink Network, Total Access Internet Windows 3.1, Disk 2, (as early as Aug. 31, 1995), ELNKMM 014328.
Earthlink Network, Total Access Internet, Disk 1, (as early as Feb. 22, 1996), ELNKMM 014331.
Earthlink Network, Total Access Internet, Disk 2, (as early as Mar. 20, 1996), ELNKMM 014332.
Copending U.S. Appl. No. 14/254,487 filed Apr. 16, 2014; first-named inventor: Selgas.
Allwright, J., et al., A Methodology for Structuring Web Documents, Jan. 24, 1996, (CCMT00005340-5346).
Arpinar, I., et al., MoodView: An Advanced Graphical User Interface for OODBMSs, Sigmod Record, vol. 22, No. 4, Dec. 1993, pp. 11-18, (CCMT00005287-5294).
Beaudouin-Lafon, M., User Interface Support for the Integration of Software Tools: an Iconic Model of Interaction, ACM, 1988, pp. 143-152, (CCMT00005218-5227).
Bense, Booker, Systems Implementation of the Four Gopher Servers, Association for Computing Machinery, 1993, pp. 23-25, (CCMT00005347-5349).
Benson, P.H., et al., Online Data Base Level Control, IBM Technical Disclosure Bulletin, vol. 18, No. 8, Jan. 1976, 2 pgs., (CCMT00005707-5708).
Bowman, M., et al., Reasoning About Naming Systems, pp. 1-25, ACM, Nov. 1993, (CCMT00005715-5739).
Boyko, V., et al., Enhanced Imagemap 2.0: Web Design Advantages Conferred by Parameterization, New York University, Jul. 17, 1995, 10 pgs., (CCMT00005330-5339).
CNET News.com, "Microsoft Developers' conference in works" website article dated Oct. 18, 1996, located at http://news.com.com/2102-1001_3-2395335.html?tag=st.util.print (MYMAIL 645318).
Compton, Charles L., Internet CNN Newsroom: The Design of a Digital Video News Magazine, Department of Electrical Engineering and Computer Science, May 1995, (CCMT00005081-5138).
Debevc, M., Adaptive Bar, ACM, New York, NY, 1993, pp. 117-118, (CCMT00005327-5328).
Debevc, M., et al., Design and Evaluation of an Adaptive Icon Toolbar, Kluwer Academic Publishers, 1996, pp. 1-21, (CCMT00005295-5315).
Dingle, A., et al., Web Cache Coherence, Fifth International World Wide Web Conference, May 1996, 10 pages, (CCMT00005350-5359).
Edwards, Mark Joseph, "The Normandy Invasion," Feb. 1997, WindowsIT Pro (MYMAIL 645319-645327).
Earthlink Network, Total Internet Access for Windows 95, Disk 1 (as early as Sep. 2, 1995), ELNKMM 014339.
Earthlink Network, Total Internet Access for Windows 95, Disk 2, (Oct. 10, 1995), ELNKMM014340.
Earthlink Network, Total Access Internet for Windows 95, Disk 1, (as early as Mar. 20, 1996), ELNKMM 014343.
Earthlink Network, Total Access Internet for Windows 95, Disk 2, (as early as Apr. 9, 1996), ELNKMM 014344.
Earthlink Network, Windows 95—EarthLink Network Custom Masters v. 1.3.1, Disk 1, (as early as Mar. 19, 1996), ELNKMM 014345.
Earthlink Network, Windows 95—EarthLink Network Custom Masters v. 1.3.1, Disk 2, (as early as Apr. 9, 1996), ELNKMM 014346.
Earthlink Network, Windows 95—EarthLink Network Custom Masters v. 1.3.1, Disk 3, (as early as Apr. 18, 1996), ELNKMM 014347.
Earthlink Network, Backup with MACWEB TA 2.0.2 BOL Gold 980818, (as early as Dec. 31, 1969), ELNKMM 014353.
Govan, Dave, E-mail for free, Waterbury Republican-American, Jul. 14, 1996, U 001103.
Busch, Melanie, E-Mailer on WorldCom Lines, Tulsa World, Jun. 4, 1996, U 001091.
Engst, Adam C., et al., "Spry Internet in a Box," Chapter 11, Internet Starter Kit for Windows, Hayden Books, 1995.

Fisher, Shana M., "Making Your Site Dynamic With the Microsoft Commercial Internet System, Normandy Hits the Streets," Feb. 1997, Microsoft Interactive Developer (MYMAIL 645335 645344).
Flores, Michele Matassa, "Compuserve Agrees to Use 'Normandy' Technology," Jun. 4, 1996, The Seattle Times.
Flores, Michele Matassa, "Compuserve, Microsoft Are in Talks," Mar. 13, 1996, The Seattle Times.
Franks, Mike, the Internet Publishing Handbook: for Wolrd-Wide Web, Gopher, and WAIS, Oct. 1995, 9 pages, (CCMT00005209-5217).
Free E-mail with Advertising, Sarah Stambler's Marketing with Technology News, Aug. 25, 2995, U 001210.
Free e-mail, but with a Catch, Business Week, Apr. 29, 1996, U 001146.
Free Online Dictionary of Computing; "Database"; http://foldoc.org/index.cgi?query=database; Nov. 17, 2015.
Freed, N. et al.; "Multipurpose Internet Mail Extensions (MIME) Part One: Format of Internet Message Bodies"; Network Working Group RFC 2045; Nov. 1996; http://www.ietf.org/rfc/rfc2045.txt.
Freedman, Alan; "The Computer Glossary—The Complete Illustrated Dictionary, Eight Edition"; pp. 89-91, 428, 463; The Computer Language Company, Inc., Point Pleasant, PA / American Management Association, New York, NY; 1998.
Freemark, Juno Online Plan to Offer Free Electronic Mail Accounts for Those Prepared to Receive Ads with Mail, Aug. 15, 1995, U 001209.
Furr, Joe, "The Spirit in the Sky," NetGuide, vol. 2, Issue 5, May 1, 1995, ELNKMM 008050.
Gerwig, Kate, "Earthlink Expands Access," Interactive Age, vol. 2, Issue 21, p. 8, Aug. 14, 1995, ELNKMM 008055-008056.
GPT Communications Systems' new ISDN solution integrates calling line identification to safeguard corporate network from unauthorized access, Communicate, May 1996; ELNKMM004179.
Groves, Dawn with John Overbaugh, Mosaic in a Box/World Wide Web: 101—A step-by-step guide for getting connected to the Internet, 1995.
Gryphon, Robert, "Network Central eases file sharing; users can group files into projects for better access," InfoWorld, vol. 16, No. 37, Sep. 12, 1994.
GTE, Internet Access Kit, version Windows 95, (date unknown), GTE 004532-004563.
GTE, Internet Solutions Dial-Up Access Directory, (date unknown), GTE 004634-004644.
GTE, Internet Installation Guide, version 3.01, (1994-1996), GTE 004512-004531.
Haight, Timothy, et al., "No free lunch, but free Internet e-mail," Network Computing, vol. 6, Issue 10, p. 23, Sep. 1, 1995, ATT 018219.
Haller, N., et al., On Internet Authentication, RFC 1704, Oct. 1994; U003145-003156.
Halliday, Caroline M., The Trail Guide to Prodigy, Reading, MA, Addison-Wesley Publishing Company, 1995, SBCIMM 000760-000762.
Hardmeier, Sandi; "The History of Internet Explorer"; http://www.microsoft.com/windows/ie/community/columns/historyofie.mspx; Microsoft Corp., Aug. 25, 2005.
Heartland, Amanda. Prodigy DOS/IBM PC Quick Reference Guide, New York, N.Y., DDC Publishing, 1993, SBCIMM 000763-000765.
Hergert, Douglas. How to Use Prodigy, Emeryville, CA, Ziff-Davis Press, 1994, SBCIMM 000766-000768.
Herve, R., "A portable component for access control and network protection," Data Processing and Information, vol. 2., 1980 ELNKMM008105-008106.
Higgs, Scott, "Windows to the Internet," Byte, Jul. 1995.
Hoeck, Wolfgang G., InfoTrac TFD: a Microcomputer Implementation of the Transcription Factor Database TFD with a Graphical User Interface, vol. 10, Oxford University Press, pp. 323-327, (CCMT00005322-5326).
Holonet UUCP, product literature, (Dec. 17, 1994), ELNKMM 013123-013130.

(56) References Cited

OTHER PUBLICATIONS

Hsieh et al.; JAVA Bytecode to Native Code Translation: The Caffine Prototype and Preliminary Results, Proceedings of the 29th Annual IEEE/ACM Inter. Symposium on Microarchitecture, Dec. 1996, p. 90-97.
I'm Just Glad Somebody Wants My Business, PC Magazine, Jul. 1996, U 001093.
Intelitrak's Citadel Gatekeeper Uses Voice Verification for Secure Network Access, Jul. 1996 ELNKMM004273-004274.
Interaction—The Members Services Monthly, Aug. 1996, AOL 032766.
Interaction—The Members Services Monthly, Mar. 1996, AOL 032764-032765.
Internet Atlanta, Inc., product literature, (date unknown), ELNKMM 013118-013122.
Internet Connection, The, product literature re: The Internet Connection, Jan. 13, 1995, ELNKMM 013100 and ELNKMM 013141-013145.
Spry, Inc., Internet in a Box: Getting Started, O'Reilly & Associates, Inc., 1994.
Spry, Inc., Internet in a Box: Installation & Configuration Guide, O'Reilly & Associates, Inc., 1994.
Investment Perspective: The Digital World—America Online, Motley Fool, Jan. 30, 1996 AOL011277-011283.
Jed Savage: Juno's Point Man in Selling 'Free' Email, Marketing Computers, vol. 16, Issue 4, Apr. 1996, ATT 018218.
Johnson, Ned, Navigating the Internet with Prodigy, Indianapolis, IN, Sams.net Publishing, 1995, SBCIMM 000778-000780.
Juno Hints at shape of things to come, Financial Times, Jul. 29, 1996, U 001145.
Juno Launches America's First Free Internet E-Mail Service Today, (press release), Apr. 22, 1996, U 001165-001168.
Juno Launches Free E-mail Service, Wall Street & Technology, Jul. 1996 0001094.
Juno Set to Brand E-mail with $10M, Brandweek, Apr. 22, 1996, U 001148.
Kane, Pamela., Prodigy—Made Easy, Berkeley, CA, Osborne McGraw-Hill, 1991, SBCIMM 000775-000777.
Kemp, Fred, "ACW Connections: Accessing the World Wide Web, or Enlightenment Regarding the Internet and Browsing from Home in a Few Easy Concepts," 1995.
Kiely, Don; "Breezing to Visual Basic 4.0"; Information Week, Apr. 1996; http://www.informationweek.com/574/74advis.htm.
Kim, James, "E-mail soon to become free-mail", USA Today, Apr. 22, 1996, U 001147.
Klein, Amit; "Meta Refresh as a Response Header"; Beyond Security; Nov. 2006; http://www.securiteam.com/securityreviews/6Z00320HFQ.html.
Kronick, S.; "Netscape Navigator Handbook"; Netscape Communications Corp., ed. Aug. 1, 1996.
Landler, Mark, "Microsoft Near Deal to Acquire Cable TV Stake," The New York Times, Jun. 9, 1997, ATT 018367-018368.
LANtastic 7.0: Netscape Navigator 2.01 and SPRYNET, 1996.
Leech, M., Username/Password Authentication for Socks V5, RFC 1929, Mar. 1996; U003160-003161.
Lenuzza, Mara, "CompuServe dials the reseller channel to meet big customer needs," VARBusiness, vol. 11, Issue 12, p. 48, Aug. 1995, ATT 018365-018366.
Levine, Daniel B., "First Class E-Mail: Six tools that get your Internet message across," PC World, vol. 15, Issue 8, Aug. 1997, ATT 018223-018226.
Lewis, Peter H., "TV Screen Opens Onto Internet," The New York Times, Oct. 22, 1996, ATT 018375-018377.
Lewis, Peter H., "Microsoft Joins Compuserve in Internet Deal," The New York Times, Jun. 5, 1996 (2 pgs).
Fisher, Lawrence M., "5 Regional Phone Companies Select Netscape," The New York Times, Dec. 10, 1996, GTE 16653-16654.
Lichty, Tom, Official America Online Tour Guide for Windows 2.5, The, Ventana, 1994, AOL 033105.

Lichty, Tom, Official America Online Tour Guide for Windows 3.1, The, Ventana, 1996, AOL 033106.
Lindholm, Elizabeth, "Tools for Remote LAN Access," Datamataion, Apr. 1, 1994; ELNKMM004190-004191.
Lindstrom, Annie, "BellSouth to give users direct access to AIN (Advanced Intelligent Network)," Communications Week, No. 462, Jul. 12, 1993 ELNKMM004202-004203.
Lloyd, B., PPP Authentication Protocols, RFC 1334, Oct. 1992 SAN0190-0201.
Local Internet Access from Mindspring Enterprises, Inc., 1994, ELNKMM 013146-013148.
Lowe, Doug, Microsoft Network for Dummies, IDG Books Worldwide, 1995, AOL028484.
M.A.K., et al. "AT&T dials into the net," NetGuide, vol. 2, Issue 11, p. 21, Nov. 1995, ATT 018283-018284.
MacLean, A., et al., User-Tailorable Systems: Pressing the Issues with Buttons, ACM, 1990, pp. 175-182 (CCMT00005279-5286).
Maher, R.C.; Simple But Useful Tools for Interactive WWW Development, Proceedings of the 26th Annual Conf. Frontiers in Education Conference, Nov. 1996, p. 1035-1038 vol. 3.
Markoff, John, "U.S. Classifies Web TV Technology as a Weapon," The New York Times, Nov. 8, 1996, ATT 018378-018379.
Marshall, James; "HTTP Made Really Easy, A Practical Guide to Writing Clients and Servers"; (1997); http://www.jmarshall.com/easy/http.
Masud, Sam, "AT&T to fold NetWare service into Worldnet," Computer Reseller News, Issue 692, p. 2, Jul. 15, 1996, ATT 018348-018349.
Maybe More than E-mail Should be Free, PC Week, Jun. 10, 1996, U 001092.
McCusker, Tom, "Take Control of Remote Access," Datamation, Apr. 1, 1994 ELNKMM 004192-004194.
McFall, C., "An Object Infrastructure for Internet Middleware," IEEE Internet Computing, vol. 2, No. 2, pp. 46-51, Apr. 1998.
Merrriam-Webster Online, excerpts re "800 number" and "modified"; (Feb. 3, 2005).
Microsoft PressPass, "Microsoft Announces Delivery of 'Normandy' Beta II CD to Preview Customers," Sep. 30, 1996 (MYMAIL 645331-645332).
Microsoft PressPass, "Microsoft Announces Digital Is First 'Normandy' Systems Integrator" Sep. 11, 1996 (MYMAIL 645329-MYMAIL 645330).
(Defendant(s)/P.O. Preclude Submission: Microsoft Normandy Beta-2 Preview, Presentations and Handouts, dated Sep. 30, 1996, MYMAIL 007272-MYMAIL 007349).
Microsoft Corp.; "Microsoft Announces Internet Referral Server to Facilitate Selection of Internet Service Provider for Users of Windows, Microsoft Internet Explorer"; Jul. 30, 1996; http://www.microsoft.com/presspass/press/jul96/reflsvpr.mspx.
Microsoft Corp., Internet Explorer 2.1 for Windows 3.1 White Paper, Aug. 1996, 17 pages, (CCMT00005740-5756).
Microsoft Press Computer Dictionary (excerpts), 3rd Ed., Microsoft Press, 1997 AOL078691-078695; AOL078703-078705; one page not labeled.
Miller, Tracy Mygrant, "E-Mail Essentials," CompuServe, Feb. 1996, AOL 032744-032748.
Mindspring Enterprises, Inc., press release re: MindSpring Announces Second Quarter Results, Jul. 22, 1998, ELNKMM 013067-013070.
Mindspring Enterprises, Inc., press release re: America Gets Connected as MindSpring's World Wide Web Wagon Tours Across the Country, Sep. 23, 1998, ELNKMM 013063-013066.
Mindspring Enterprises, Inc., press release re: MindSpring Introduces Dedicated ISDN Service in Atlanta—Affordable, Full-Time Connections for Small or Home Offices, Jul. 1, 1998, ELNKMM 013075.
Mindspring Enterprises, Inc., press release re: MindSpring Introduces V.90 Service, Aug. 11, 1998, ELNKMM 013074.
Mindspring Enterprises, Inc., press release re: MindSpring Purchases SPRYNET Subscribers and Other Assets from America Online, Inc., Sep. 10, 1998, ELNKMM 013071.
Mindspring Enterprises, Inc., press release re: MindSpring to Offer Two-Way Cable Modem Service via Knology's Broadband Network, Aug. 31, 1998, ELNKMM 013072-013073.

(56) References Cited

OTHER PUBLICATIONS

Moltzen, Edward F., "IBM Eyes Remote NC Access: IBM is merging LDAP with its network computer platform, which will enable remote log-on and access to data," Computer Reseller News, May 12, 1997 ELNKMM004173-004174.
Netsafe, Inc., NEAT! Download Instructions for 2.1 Full Release, (date unknown), MYMAIL 058724-058728.
Netsafe, Inc., NEAT! Installation Help File print-out, (date unknown), MASS 000285-000288.
Nelson, Larry; "Developing and distributing audio applications with Visual Basic and ToolBook"; Australian Journal of Educational Technology 1994, 10(2), 119-127; http://www.ascilite.org.au/ajet/ajet10/nelson.html.
Netcom On-Line Communications Services, product literature, ELNKMM 013114-013117.
Netcom product literature, 1994, ELNKMM 013045-013062.
Netcom product literature, Jan. 13, 1995, ELNKMM 013131-013140.
Netsafe, Inc., Press Background Information, (date unknown), MYMAIL 003288-003301.
Netsafe, Inc., NetSafe Navigation information re: Email—Where to Get It, Mar. 21, 1996, MASS 000276-000283.
Netsafe, Inc., NEAT! Product literature, (date unknown), MYMAIL 001371-001417.
Netsafe, Inc., NEAT! product literature, (date unknown), MYMAIL 009231-009258.
Netsafe, Inc., NEAT! product literature, (date unknown), MYMAIL 009260-009268.
Netsafe, Inc., NEAT! product literature and installation materials, (date unknown), MYMAIL 009270-009289.
Netsafe, Inc., NEAT! product literature, (date unknown), MYMAIL 009301-009308.
Netsafe, Inc., NEAT! product literature, (May 26, 1997), MYMAIL 009677-009686.
Netsafe, Inc. NEAT! Quick Start Guide, (May 1997), MYMAIL 009690-009701.
Netsafe, Inc. NEAT! version 3.0 Beta Review, (Oct. 1996), MASS 000106-000109.
Netsafe, Inc. NEAT! Software Literature, (date unknown), MYMAIL 005131-005143.
Netsafe, Inc. Netrepreneur Introduction Manual, (Nov. 1996), MYMAIL 003368-003391.
Netsafe, Inc. Netrepreneur Training Course, (Nov. 7, 2004); pp. 1-40.
Netsafe, Inc. product literature re: system security, 1998, MYMAIL 009120-009139.
Netsafe, Inc., product literature, (date unknown), MYMAIL 003313-003342.
Netscape; "An Exploration of Dynamic Documents"; 1999; http://web.archive.org/web/20020802170847/http://wp.netscape.com/assist/net_sites/pushpull.html.
Network Security: U.S. Robotics and Security Dynamics Team for Enhanced Remote Access Security Solution; U.S. Robotics Adds to Existing Enterprise-Wide Network Access Security with SecurID Support, Edge, Sep. 23, 1996 ELNKMM004265-004266.
Neumann, A.J., "A Basis for Standardization of User-Terminal Protocols for Computer Network Access," U.S. Department of Commerce, National Bureau of Standards Technical Note 877, Jul. 1975; ELNKMM004227-004254.
Newrock, Melody, The Trail Guide to the Microsoft Network, Addison-Wesley Publishing Company, 1996 U002975-002988.
Newsome, M. et al., "HyperSQL: web-based query interfaces for biological databases," Proceedings of the Thirtieth Hawaii International Conference on System Science, Wailea, HI, USA, Jan. 7-10, 1997 (abstract).
O'Hara, Shelley, et al., "Official EarthLink Beginners Guide to the Internet," Chapter 3, Ventana Communications Group, 1997, ELNKMM 007952-008011.
Spry, Inc., Online Catalog: Internet in a Box, www.oreilly.com; (2005).
Olson, M., et al., Berkeley DB, Usenix Association, Jun. 6, 1999, 10 pages, (CCMT00005139-5148).
Online Service Banks on No-Fee Access, PROMO: The Magazine for Promotional Marketing, Jun. 1996, U 001089.
Online service connection, The, NetGuide, vol. 3, Issue 1, p. 66, Jan. 1996; ATT018303-018304.
Osier, Dan, et al.; "Sams Teach Yourself Delphi 3 in 14 days"; p. 277, SAMS Publishing, Indianapolis, Indiana; 1997.
Netsafe, Inc., Owning a Toll Booth on the Information Super Highway, (1996), MYMAIL 003398-003416.
Perkins, Doug, "Point-to-Point Protocol for the transmission of multi-protocol datagrams over Point-to-Point links," RFC 1171, Jul. 1990, SBCIMM 000543-000593.
Perkins, Doug, "Requirements for an Internet Standard Point-to-Point Protocol," RFC 1547, Dec. 1993, SBCIMM 000522-000542.
Perkins, Doug, et al., "Point-to-Point Protocol (PPP) Initial Configuration Options," RFC 1172, Jul. 1990, SBCIMM 000594-000633.
Phillips, Richard L., An Interpersonal Multimedia Visualization System, LA-UR-90-2614, Oct. 22-26, 1990, Los Alamos National Laboratory, New Mexico.
Phillips, Richard L., MediaView: A General Multimedia Digital Publication System, Jul. 1, 1991, Communications of the ACM.
Pogue, David and Biersdorfer, J. D.; "The Internet: The Missing Manual"; pp. 47-50; O'Reilly Media, Inc., Sebastopol, California; 2006.
Polilli, Steve, "Vendors enhance security across enterprises; IBM readies single sign-on software to speed access, keep security tight," InfoWorld, vol. 16, No. 13, Mar. 28, 1994; ELNKMM004195.
Pollard, K. et al, "User-centered design of Web sites and the redesign of LineOne", British Telecom Labs, BT Technology Jounal (UK), vol. 17, No. 1, pp. 69-75, Nov. 1998.
PR Newswire, "First Java-Based Finger Image Technology Provides 'Total' Intranet Security—Prevents Illegal Network Access Due to Security Flaws in Web Browsing Systems or Stolen Passwords/PINs," Mar. 19, 1997; ELNKMM004261-004262.
PR Newswire, "Microsoft Announces Digital is First 'Normandy' Systems Integrator," Sep. 11, 1996.
Netsafe, Inc., press release re: NetSafe Announces First Suite of Integrated Customizable Internet Tools and Services, Oct. 23, 1996, MYMAIL 003434-003437.
U.S. Robotics, Press Release, Sep. 18, 1996, ELNKMM 004271-004272.
Netsafe, Inc., product literature, Oct. 23, 1996, MYMAIL 005144-005177.
Netsafe, Inc., product literature re: Plans, Services, and Options, (1996), MYMAIL 000934-000937.
Mindspring Enterprises, Inc., Product literature, including press releases, 1998, ELNKMM 013076-013096.
Prometheus Information Network Group, Inc. (PING), product literature, (Apr. 1, 1994), ELNKMM 013108-013113.
Ragget, Dave et al (Ed.); "HTML 4.0 Specification—W3C Recommendation, revised on Apr. 24, 1998"; http://www.w3.org/TR/1998/Rec-html40-19980424/; W3C; Apr. 24, 1998.
Ragget, Dave et al (Ed.); "HTML 4.01 Specification—W3C Recommendation Dec. 24, 1999"; http://www.w3.org/TR/html401/; W3C; Dec. 24, 1999.
Ragget, Dave: "HyperText Markup Language Specification Version 3.0 <draft-ietf-html-specv3-00.txt>"; http://www.w3.org/MarkUp/htm13/CoverPage; Internet Engineering Task Force; Sep. 28, 1995.
Ragget, Dave; "HTML 3.2 Reference Specification—W3C Recommendation Jan. 14, 1997"; http://www.w3.org/TR/REC-htm132.html; W3C; Jan. 14, 1997.
Random Access, Inc., product literature, (date unknown), ELNKMM 013149-013152.
Ranum, Marcus, "Internet Firewall Protection," Open Computing, Sep. 1994.
Reiss, Levi, et al., Open Computing Guide to Mosaic—Your Guide to Accessing the World Wide Web, Berkeley, CA, McGraw-Hill, Inc., 1995.
Reiterer, Harold, IDA-A Design Environment for Ergonomic User Interfaces, Chapman & Hall, 1995, pp. 305-310 (CCMT00005316-5321).

(56) References Cited

OTHER PUBLICATIONS

Rendleman, John, "AT&T introduces Software Defined Network Virtual Office Connection service allowing remote access to corporate network from designated phone numbers," Communications Week, No. 570, Aug. 14, 1995 ELNKMM004180-004181.
Reprogramming D.E. Shaw, Investment Dealer's Digest, Sep. 4, 1995, U 001151-001156.
Richter, Jeffrey, "Extend the Windows 95 Shell with Application Desktop Toolbars" Mar. 1996, Microsoft Systems Journal (9 pgs), website article at http://www.microsoft.com/msj/archive/S274.aspx.
Riggs, Brian. "ISPs Offer Internet Globetrotting," LANTimes, Oct. 1996, SBCIMM 000426-000428.
Rigney, Carl, et al., "Remote Authentication Dial in User Service (RADIUS)", RFC 2058, Jan. 1997, SBCIMM 000634-00688.
Rogers, Amy, "Concentric Network Corp is offering a service that allows employees to dial into local Points of Presence to access their corporate LANs," Communications Week, No. 633, Oct. 14, 1996, ELNKMM 004177-004178.
Rogers, Diane, "Building Web enabled applications with Delphi 2.0," Jun. 12, 1996 CORN0280-0282.
Rohde, David, et al., "AT&T Preps low-cost SDN access; carriers new Virtual Office Connection remote access utilizing predefined ANIs," Network World, vol. 12, No. 28, Jul. 10, 1995; ELNKMM004187.
Rose, Michael, "The Windows95 TCP/IP Setup HOW-TO/FAQ v1.1," May 1, 1995, SBCIMM 000436-000444.
Rose, Michael, "The Windows95 TCP/IP Setup HOW-TO/FAQ v1.4," Nov. 19, 1995, SBCIMM 000429-000435.
Sachs, David, et al. Hands-On Mosaic—A Tutorial for Windows Users, Englewood Cliffs, NJ, Prentice Hall PTR, 1995, SBCIMM 000772-000774.
Sagman, Stephen W., Traveling the Microsoft Network, Microsoft Press, 1995; AOL028483.
Savetz, Kevin; "Browser Toolbar Roundup"; http://www.computerpoweruser.com/Editorial/article.asp?article=articles/archive/c0411/39c11.asp &guid=;CPU Computer Power User, Nov. 2004.
SBC Yahoo! set-up materials, (date unknown), SBCMM 051021-051051 and SBCMM 051684-051714.
Schilit, B., et al., Customizing Mobile Applications, Proceedings USENIX Symposium on Mobile & Location-independent Computing, Aug. 1993, pp. 1-9 (CCMT00005229-5237).
Schmutter, Rachel, et al., "'Free-Mail' Gravy Train Derails," NetGuide, vol. 4, Issue 4, Apr. 1997, ATT 018221-018222.
Schroeder, Erica, "MFS-UUNet Merger Talks Bode Well for Online Users," vol. 13, Issue 18, p. 116, (May 6, 1996), ELNKMM 008051-008052.
Schuler, Cathi, "Updating AOL," CeePrompt! Computer Connection, Jun. 1, 1996, AOL 011275-011276.
Scwabach, Bob, "Companies to offer free e-mail service thanks to ads," Star Tribune, Aug. 3, 1995, U 001211-001212.
Selgas, Thomas; "Admission by Applicant as Prior Art Under MPEP § 2129"; Apr. 24, 2009.
Selgas, Thomas; "Admission by Applicant as Prior Art Under MPEP § 2129"; Jun. 7, 2010.
Selgas, Thomas; "Admission by Applicant as Prior Art Under MPEP § 2129"; Jul. 21, 2010.
Selling Your Privacy, PC World, vol. 15, Issue 4, Apr. 1997, ATT 018220.
Shah, Rawn, "Getting Started with Windows remote connectivity," Sun World, Mar. 1996, SBCCIMM 000448-000453.
Sherman, Stephen A., et al., "Secure network Access Using Multiple Applications of AT&T's Smart Card," AT&T Technical Journal, Sep./Oct. 1994 ELNKMM004208-004219.
Sinha, Alok and Clore, Don and Phurrough, Dale; "Behind the Scenes at MSN 2.0: Architecting an Internet-Based Online Service"; tp://www.microsoft.com/msj/0497/msn20/msn20.aspx; Microsoft Systems Journal, Apr. 1997.
Sirbu, M.; "A Content-Type Header Field for Internet Messages"; Network Working Group RFC 1049; Mar. 1988; http://www.ietf.org/rfc/rfc1049.txt.
Sky Dayton, Chairman and CEO of EarthLink Network, One of the Nation's Largest Internet Providers, Says UUNet-MFS Merger Validates Internet Company Business Models, Business Wire, May 1, 1996; ELNKMM008057-008058.
Snow, A.P., "Internet Implications of Telephone Access," IEEE Computer, vol. 32, No. 9, pp. 108-110, Sep. 1999.
Spangler, Todd, "The Net Grows Wider," PC Magazine, vol. 15, No. 20, Nov. 19, 1996, ELNKMM 008013-008019.
SprintLink Customer Handbook 2.1 (Sprint Document #5953-2), Oct. 1995.
St. Johns, Mike, Identification Protocol, RFC 1413, Feb. 1993; U003139-003144.
Staff of Classroom Connect, Family Internet Companion, PrenticeHall, Inc., 1997.
Stahl, Stephani, "Web crawl continues," Information Week, Issue 581, p. 36, May 27, 1996, ATT 018329-018330.
Star hedge fund trader makes big bet on internet, Investment Dealers Digest, Jul. 17, 1995, U 001149-001150.
Strom, David, "Three strikes, you're out: network whiffs on lockouts, passwords, access," InfoWorld, vol. 16, No. 46, Nov. 14, 1994; ELNKMM004188.
Support an ad-supported free e-mail access service, Near North News, Jul. 13, 1996, U 001102.
Sykes, Rebecca, "Commercial ISPs Form Provider Group," PC World, May 21, 1997, GTE 16645.
Tatters, Wes, Navigating the Internet with CompuServe, Sams.Net Publishing, 1995; AOL085741-086220.
Taylor, R., et al., Chiron-1: A Software Architecture for User Interface Development, Maintenance, and Run-Time Support, ACM Transactions on Computer-Human Interaction, vol. 2, No. 2, Jun. 1995, pp. 105-144, (CCMT00005239-5278).
Tech Bytes: MasterCard in Deal with Net Access Provider; Announces agreement with Concentric Network to furnish Internet access kits with pre-installed security software, American Banker, Mar. 27, 1997; ELNKMM004259-004260.
Telstra has announced that it will invest $300 million over five years to upgrade the ISDN access network (Industry Wakes Up to Potential of ISDN), Exchange Telecommunications Newsletter, vol. 7, No. 5, Feb. 17, 1995; ELNKMM004182-004183.
Thorbjornsen, Thorbjorn; "Make Profit Reading Internet ADS"; CORDIS Archive; May 22, 1997; http://cordis.europa.eu/infowin/acts/ienm/newsclips/arch1997/970597no.htm.
Earthlink Network, Inc., Total Access Internet installation materials, (2004), ELNKMM 008112-008117 and ELNKMM 008125-008147.
Travel on the Information Highway, Byte.com, Apr. 1994; AOL117828-117829.
U.S. Robotics and Security Dynamics Team for Enhanced Remote Access Security Solution; U.S. Robotics Adds to Existing Enterprise-Wide Network Access Security with SecurID Support, Business Wire, Sep. 18, 1996; ELNKMM004269-004270.
Van Hefner, William, "GTE to Offer Internet Access," Discount Long Distance Digest, Issue No. 69, Vantek Communications, Jun. 7, 1996, GTE 16648-16652.
Venditto, Gus, Prodigy for Dummies, Foster City, CA, IDG Books Worldwise, Inc., 1995, SBCIMM 000769-000771.
Viescas, John L., The Official Guide to Prodigy Service, Redmond, WA, Microsoft Press, 1991, SBCIMM 000745-000747.
Voelker, G., et al., Mobisaic: An Information System for a Mobile Wireless Computing Environment, Dec. 1994, (CCMT00005709-5714).
Vollmart, Sarah, "How to Implement a PC Security System," The Office, Feb. 1992; ELNKMM004206-004207.
Webster's New World Dictionary, Third College Edition, Warner Books, Inc., 1990.
WebTV Networks—Company Background, WebTV Networks Inc., Aug. 19, 1997, MYMAIL 001703-001706.
WebTV Technical Specifications, Aug. 19, 1997, MMAIL 001707-001710.

(56) References Cited

OTHER PUBLICATIONS

Weekly briefs: Internet reseller, Computer Reseller News, Issue 717, p. 63, Jan. 6, 1997, ATT 018355-018356.
Weingarten, Jan, et al., "The Microsoft Network Tour Guide," Ventanna Communications Group, Inc., 1995.
Wikipedia, "AppleTalk"; Jun. 3, 2009; (7 pgs) http://en.wikipedia.org/wiki/AppleTalk.
Wikipedia; "HTTP location"; Wikimedia Foundation, Inc.; Mar. 2010; http://en.wikipedia.org/wiki/HTTP_location.
Wikipedia; "Hypertext Transfer Protocol"; Wikimedia Foundation, Inc.; May 2010; http://en.wikipedia.org/wiki/Hypertext_Transfer_Protocol.
Wikipedia; "Meta element"; Wikimedia Foundation, Inc.; May 2010; http://en.wikipedia.org/wiki/Meta_element.
Wikipedia; "Meta refresh"; Wikimedia Foundation, Inc.; May 2010; http://en.wikipedia.org/wiki/Meta_element.
Wikipedia; "URL redirection"; Wikimedia Foundation, Inc.; May 2010; http://en.wikipedia.org/wiki/URL_redirection.
Wikipedia; "Visual Basic Extension"; Wikimedia Foundation, Inc.; Jun. 2010 http://en.wikipedia.org/wiki/Visual_Basic_Extension.
Wilder, Clinton, "Normandy Lands," Information Week, Issue 583, p. 37, Jun. 10, 1996, ATT 018278-018279.
Wilder, Clinton, et al., "Online with AT&T," Information Week, Issue 534, p. 22, Jul. 3, 1995, ATT 018281-018282.
Willis, David, et al., "Domestic Internet service providers: Adapt or perish," Network Computing, vol. 7, Issue 9, p. 100, Jun. 1, 1996, ATT 018305-018313.
Willis, David, et al., "Interexchange carriers as ISPs: Long-distance runaround," Network Computing, Issue 13, p. 104, Sep. 1, 1996, ATT 018314-018324.
WinCIM Spell-Checker Add-On!, CompuServe Magazine, Dec. 1995, AOL 032742.
Yamada, Ken, et al., "CompuServe plans major over haul of online services," Computer Reseller News, Issue 644, p. 43, Aug. 21, 1995, ATT 018350-018352.
Yamada, Ken, et al., "MSN Lacks ISDN Drivers; Support to be Added in Future OS Updates," Computer Reseller News, Issue 647, Sep. 6, 1995, ELNKMM 008042-008044.
Yoshida, Junko, "WebTV: Microsoft's Consumer Foothold," Electronic Engineering Times, May 1997, MYMAIL 009743-009744.
Zixit Corporation, ZixMail marketing brochure, (Mar. 2000), MYMAIL 001594-001597.
Chen, Elaine, et al., "Data net," Electronic News (North America), vol. 42, Issue 2126, Jul. 22, 1996.
Covell, Andy, "Online services and the Internet: The network managers friend or foe?", Network Computing, vol. 7, Issue 1, Jan. 15, 1996.
Gibbel, Stuart, et al. "CivNet hookup," HomePC, vol. 3, Issue 3, p. 157, Mar. 1996.
Heim, Judy, "The great e-mail shoot-out," PC World, vol. 14, Issue 2, p. 183, Feb. 1996.
Heim, Judy, et al., "42 tips for taming cyberspace," PC World, vol. 14, Issue 8, p. 122, Aug. 1996.
Jain, R., Fundamentals of Telecommunications, Ohio State University, Department of Computer Science, Apr. 3, 1999.
Lake, Matt, et al., "New looks for CompuServe and Prodigy," PC World, vol. 15, Issue 2, p. 92, Feb. 1997.
Log on and be counted, NetGuide, vol. 3, Issue 4, p. 20, Apr. 1996.
Net help online, Information Week, Issue 563, p. 90, Jan. 22, 1996.
Network Protocols Handbook, Second Edition, 2004-2005 Javvin Technologies Inc., Javin.com.
Newton, Harry, Newton's Telecom Dictionary, Eight Edition, Flatiron Publishing, Inc., (1994).
Performance Systems International, Inc., "PSI Interramp: Personal Internet Access Users Guide," Herndon, VA, PSI Inc., Oct. 1994.
Stallings, Willliam, Data and Computer Communications, Seventh Edition, Pearson Prentice Hall, 2004.
Tanenbaum, Andrew S., Computer Networks, Third Edition, Prentice Hall, (1996).

Escrow Agreement between AT&T Corp. and MyMail, Ltd., Feb. 8, 2005.
Patent License Agreement between AT&T Corp. and MyMail, Ltd., Feb. 8, 2005.
Settlement and Release Agreement between AT&T Corp. and MyMail, Ltd., Feb. 8, 2005.
AT&T Corp.'s and MyMail, Ltd.'s Joint Stipulation and [Proposed] Order of Dismissal with Prejudice, Mar. 11, 2005.
Order granting AT&T Corp.'s and MyMail, Ltd.'s Joint Stipulation and [Proposed] Order of Dismissal with Prejudice, Mar. 15, 2005.
Excerpt from Patent License Agreement between America Online, Inc. and MyMail Ltd., Aug. 30, 2005.
America Online, Inc.'s and MyMail, Ltd.'s Agreed Motion to Dismiss with Prejudice, Aug. 31, 2005.
Order granting America Online, Inc.'s and MyMail, Ltd.'s Agreed Motion to Dismiss with Prejudice, Sep. 1, 2005.
Patent License Agreement between GTE.Net LLC and MyMail, Ltd., Jul. 6, 2005.
Settlement and Release Agreement between GTE.Net LLC and MyMail, Ltd., Jul. 6, 2005.
GTE.Net LLC's and MyMail, Ltd's Agreed Motion to Dismiss with Prejudice, Jul. 7, 2005.
Order granting GTE.Net LLC's and MyMail, Ltd's Agreed Motion to Dismiss with Prejudice, Jul. 13, 2005.
PACER docket sheet for litigation as of Apr. 20, 2007.
MyMail's Second Amended Complaint, Oct. 27, 2004, with attached Exhibit A.
America Online, Inc.'s Answer to Plaintiffs Second Amended Complaint, Nov. 15, 2004, including: Defendant America Online, Inc.'s Motion to Unseal its Answer to Plaintiffs Second Amended Complaint, Jan. 12, 2005; Order granting Defendant America Online, Inc.'s Motion to Unseal its Answer to Plaintiffs Second Amended Complaint, Jan. 26, 2005.
Plaintiff MyMail's Reply to Defendant AT&T Corp.'s Counterclaims, Nov. 22, 2004.
MyMail's Third Amended Complaint, Jul. 26, 2005.
Defendant Earthlink, Inc.'s Answer and Counterclaims to Plaintiffs Third Amended Complaint, Aug. 2, 2005.
Answer and Counterclaim of Defendants NetZero, Inc., Juno Online Services, Inc., and Netbrands, Inc. to MyMail's Third Amended Complaint, Aug. 2, 2005.
America Online, Inc.'s Answer to Plaintiffs Third Amended Complaint, Aug. 3, 2005.
Defendants Prodigy Communications Corporation and Southwestern Bell Internet Services, Inc.'s Answer to MyMail's Third Amended Complaint, Aug. 3, 2005.
Defendant SBC Internet Services, Inc.'s Answer to MyMail's Third Amended Complaint, Aug. 16, 2005.
Plaintiff MyMail's Reply to Counterclaims of Defendants NetZero, Inc., Juno Online Services, Inc., and Netbrands, Inc., Aug. 16, 2005.
Plaintiff MyMail's Reply to Defendant Earthlink, Inc.'s Answer and Counterclaims to Plaintiffs Third Amended Complaint, Aug. 17, 2005.
MyMail, Ltd.'s Preliminary Infringement Contentions, Aug. 2, 2004, including: MyMail, Ltd.'s Infringement Claim Chart for U.S. Pat. No. 6,571,290 B2 re: America Online, Inc.; MyMail, Ltd.'s Infringement Claim Chart for U.S. Pat. No. 6,571,290 B2 re: AT&T Corp.; MyMail, Ltd.'s Infringement Claim Chart for U.S. Pat. No. 6,571,290 B2 re: NetZero, Inc.; MyMail, Ltd.'s Infringement Claim Chart for U.S. Pat. No. 6,571,290 B2 re: Juno Online Services, Inc.; MyMail, Ltd.'s Infringement Claim Chart for U.S. Pat. No. 6,571,290 B2 re: Netbrands, Inc.; MyMail, Ltd.'s Infringement Claim Chart for U.S. Pat. No. 6,571,290 B2 re: Earthlink, Inc.; MyMail, Ltd.'s Infringement Claim Chart for U.S. Pat. No. 6,571,290 B2 re: SBC Communications, Inc.; and MyMail, Ltd.'s Infringement Claim Chart for U.S. Pat. No. 6,571,290 B2 re: Verizon Communications, Inc.
MyMail. Ltd.'s Preliminary Infringement Contentions for GTE.Net LLC, Oct. 25, 2004.
MyMail, Ltd.'s Preliminary Infringement Contentions for U.S. Pat. No. 6,571,290 B2 re: Prodigy Communications Corp., Nov. 30, 2004.

(56) References Cited

OTHER PUBLICATIONS

MyMail, Ltd.'s Preliminary Infringement Contentions for Prodigy Communications Corp. and Southwestern Bell Internet Services, Inc., Nov. 30, 2004.
Plaintiff MyMail, Ltd.'s Final Infringement Contentions, Jul. 5, 2005.
Expert Report of Jeffrey O. Smith, Jul. 1, 2005.
MYMAIL 000331-000333, Facsimile re: *provider architecture* v. *NetSafe architecture*, May 21, 1996.
MYMAIL 000334, Email dated Apr. 23, 1997.
MYMAIL 000335, Email dated Dec. 31, 1997.
MYMAIL 000336, Email dated Mar. 16, 1998.
MYMAIL 000337, Email dated Mar. 18, 1998.
MYMAIL 000338, Email dated Mar. 26, 1998.
MYMAIL 000339, Email dated Apr. 8, 1998.
MYMAIL 000340, Email dated Oct. 27, 1997.
MYMAIL 000341, Email dated Dec. 12, 1997.
MYMAIL 000342, Email dated Jan. 28, 1998.
MYMAIL 000343, Email dated Jan. 28, 1998.
MYMAIL 000344-000345, Email dated Jan. 30, 1998.
MYMAIL 000346, Email dated Feb. 7, 1998.
MYMAIL 000347, Email dated Feb. 19, 1998.
MYMAIL 000359-000360, Email dated Jul. 28, 1998.
MYMAIL 000361, Email dated Aug. 29, 1998.
MYMAIL 000362, Email dated Aug. 31, 1998.
MYMAIL 000363, Email dated Jul. 22, 1998.
MYMAIL 000364, Email dated Aug. 12, 1998.
MYMAIL 000503-000505, Microsoft Normandy Beta overview (1996).
Netsafe, Inc., NetSafe Plans, Services and Options summary, (Nov. 1996), MYMAIL 000934-000937.
MYMAIL 001031-001033, Texas Secretary of State Service of Process Information, Aug. 31, 1999.
MYMAIL 001034-001040, Facsimile of Nov. 24, 1999.
MYMAIL 001041, Letter for Jul. 29, 1999.
Texas Secretary of State, documents re: NetSafe, Inc., with cover page (Apr. 6, 2000), MYMAIL 001042-001054.
MYMAIL 001576-001580, Email dated Nov. 16, 1999.
Network Solutions, Inc., Service Agreement (date unknown), MYMAIL 001584-001586.
Zixit Corporation, Marketing Alliance Agreement and company literature, (Mar. 24, 2000) MYMAIL 001594-001597.
Network Solutions, Inc., Service Agreement and invoices, (Jan. 2001), MYMAIL 001652-001666.
Verisign, Domain name registration documents for mymail.com, (Nov. 10, 2001), MYMAIL 001739-001754.
Verisign, Domain name registration documents for mymail.com, (Dec. 6, 2002), MYMAIL 002222-002227.
MYMAIL 002576-002694, NetSafe Confidential Business Plan, 1999-2001, Dec. 10, 1998.
MYMAIL 002940-002970, NetSafe Confidential Business Plan, Feb. 1, 1999.
MYMAIL 003082-003084, Email dated Feb. 15, 1999.
MYMAIL 003096-003102, NetSafe product information, Dec. 21, 1996.
MYMAIL 003288-003301, NetSafe, Inc. Press Background Information, 1996.
MYMAIL 003368-003391, NetSafe Netrepreneur Introduction Manual, 1996.
Netsafe, Inc., Owning a Toll Booth on the Information Superhighway! (date unknown), MYMAIL 003398-003414.
MYMAIL 003415-003416, NetSafe, Inc. registration form, Oct. 1, 1996.
MYMAIL 003434-003437, NetSafe press release, Oct. 23, 1996.
MYMAIL 003601, Encryption Worksheet, Sep. 15, 1998.
MYMAIL 003602-003607, NetSafe's Proposal for Smith Barney's Internet Project, Aug. 1995.
Netsafe, Inc., NEAT! product literature/NetSafe company literature, (1996), MYMAIL 005131-005143.
Netsafe, Inc., NetSafe Announces First Suite of Integrated, Customizable Internet Tools and Services/ other product literature; (Oct. 23, 1996), MYMAIL 005144-005177.
MYMAIL 007259-007261, Microsoft Corporation letter to Dear Windows Developer, Mar. 15, 1995.
Microsoft Corporation, undated letter from Microsoft Corporation to Tom and Michelle Selgas, MYMAIL 007262.
MYMAIL 007263, Dear Windows 95 Beta Tester letter, Mar. 15, 1995.
MYMAIL 007264, Microsoft Corporation letter to Dear Windows 95 Beta Tester, Oct. 28, 1994.
Netsafe, Inc., NetSafe's Security product literature (1998), MYMAIL 009120-009139.
Netsafe, Inc., NEAT! product literature/NetSafe company literature, (date unknown), MYMAIL 009231-009258.
Netsafe, Inc., NetSafe company literature (date unknown), MYMAIL 009260-009268.
Netsafe, Inc., NEAT! product literature/NetSafe company literature (date unknown), MYMAIL 009270-009289.
Netsafe, Inc., NEAT! product literature/NetSafe company literature, (date unknown), MYMAIL 009301-009308.
Netsafe, Inc., NEAT! product literature/NetSafe company literature (draft version), (May 26, 1997), MYMAIL 009677-009686.
MYMAIL 009690-009701, NEAT! Quick Start Guide, 1997.
Gmuender, John notebook (Jun. 11, 1996-Aug. 2, 1996), MYMAIL 009746-009788.
Netsafe, Inc., Non-Disclosure Agreements with various entities/individuals (1995-1996), MYMAIL 009789, MYMAIL 009088-009104, MYMAIL 003392-003397.
Selgas, TOM notebook, (Mar. 1995-Jun. 1997), MYMAIL 010650-010758.
MYMAIL 013972-013974, Promissory Note, Nov. 25, 1996.
MYMAIL 015169-015872, Form S-4 for Microsoft Corporation, May 2, 1997.
Microsoft Corp., Form S-4/A for Microsoft Corporation filed with the SEC (Jun. 13, 1997), MYMAIL 015873-016076.
Microsoft Corp., Registration Statement on Form 2-8 as filed with the SEC, Aug. 18, 1998, MYMAIL 016077-016084.
Microsoft Corp., Form SC 13D for Microsoft Corporation as filed with the SEC, Dec. 29, 1997, MYMAIL 016085-016088.
Microsoft Corp., Form SC 13D for Microsoft Corporation as filed with the SEC, Sep. 26, 1997, MYMAIL 016089-016093.
Microsoft Corp., Form SC 13D/A for Microsoft Corporation as filed with the SEC, Jan. 6, 1998, MYMAIL 016094-016097.
Microsoft Corp., Form SC 13G for Microsoft Corporation as filed with the SEC, Mar. 9, 1998, MYMAIL 016098-016101.
Microsoft Corp., Form SC 13G for Microsoft Corporation as filed with the SEC, Feb. 13, 1998, MYMAIL 016102-016106.
Microsoft Corp., Form SC 13G for Microsoft Corporation as filed with the SEC, Feb. 19, 1997, MYMAIL 016107-016111.
Microsoft Corp., Form SC 13G for Microsoft Corporation as filed with the SEC, Feb. 14, 1997, MYMAIL 016112-016114.
MYMAIL, Ltd., NEAT! product literature, (date unknown), MYMAIL 003421-003433.
Defendant America Online, Inc.'s Initial Disclosures, Aug. 23, 2004.
Defendant AT&T Corp.'s Initial Disclosures, Aug. 23, 2004.
Defendant Earthlink, Inc.'s Initial Disclosures Pursuant to Federal Rule of Civil Procedure 26(a)(1) and the Court's Discovery Order, Aug. 23, 2004.
MyMail, Ltd.'s Initial Disclosures, Aug. 23, 2004.
Initial Disclosures of NetZero, Inc., Juno Online Services, Inc. and Netbrands, Inc. Pursuant to F.R.C.P. 26(a)(1) and Rule 1 of the Court's Discovery Order, Aug. 23, 2004.
Defendants' Proposed Terms and Claim Elements for Construction, Nov. 23, 2004.
Rule 26(a) Initial Disclosures and Discovery Order Disclosures of Defendant SBC Communications Inc., Aug. 23, 2004.
Rule 26(a) Initial Disclosures and Discovery Order Disclosures of Defendants Prodigy Communication Corp. and Southwestern Bell Internet Services, Inc , Dec. 23, 2004.
GTE.Net LLC's Initial Disclosures, Nov. 15, 2004.

(56) References Cited

OTHER PUBLICATIONS

Defendants' Preliminary Claim Constructions and Identification of Extrinsic Evidence, Feb. 3, 2005.
GTE.Net LLC's First Amended Disclosures, Feb. 23, 2005.
MyMail, Ltd.'s First Amended Disclosures, May 17, 2005.
Amended Rule 26(a) Initial Disclosures and Discovery Order Disclosures of Defendants Prodigy Communication Corp. and Southwestern Bell Internet Services, Inc., Jun. 15, 2005.
MyMail, Ltd.'s First Supplemental Disclosures, Jul. 11, 2005.
MyMail, Ltd.'s Second Supplemental Disclosures, Jul. 21, 2005.
Defendant America Online, Inc.'s Supplemental Initial Disclosures, Jul. 22, 2005.
MyMail, Ltd.'s Third Supplemental Disclosures, Jul. 25, 2005.
Defendant America Online, Inc.'s Second Supplemental Initial Disclosures, Jul. 25, 2005.
Defendant America Online, Inc.'s Third Supplemental Initial Disclosures, Jul. 28, 2005.
Earthlink, Inc.'s First Supplemental Initial Disclosures, Aug. 2, 2005.
Supplemental Disclosures of NetZero, Inc., Juno Online Services, Inc. and Netbrands, Inc. Pursuant to F.R.C.P. 26(a)(1) and Rule 1 of the Court's Discovery Order, Aug. 15, 2005.
Protective Order from MyMail, Ltd. v. American Online, Inc., et al., Sep. 17, 2004.
Defendants' Preliminary Invalidity Contentions (w/ Defendants' Responsive Claim Charts), Sep. 16, 2004.
Defendant SBC Communications, Inc.'s Preliminary Invalidity Contentions and Accompanying Document Production, Sep. 16, 2004.
GTE.Net LLC's Preliminary Invalidity Contentions (w/ GTE.Net LLC's Invalidity Chart), Dec. 1, 2004.
Defendants Southwestern Bell Internet Services Inc and Prodigy Communications Corporation Preliminary Invalidity Contentions and Accompanying Document Production, Jan. 10, 2005.
Final Invalidity Contentions of Defendants Netzero, Inc., Juno Online Services, Inc., and Netbrands, Inc., Jul. 25, 2005.
Defendant America Online, Inc.'s Final Invalidity Contentions, Jul. 25, 2005.
Earthlink, Inc.'s Final Invalidity Contentions, Jul. 25, 2005.
Prodigy's and SBIS's Final Invalidity Contentions, Jul. 25, 2005.
AT&T Worldnet Service, QuickStart Guide, Version 1.0, (date unknown), ATT 000005-000037.
AT&T Worldnet Service, QuickStart Guide, Version 2.0, (1996), ATT 000247-000285.
AT&T Worldnet Service, QuickStart Guide, Version 2.02 (1996), ATT000325-000363.
DR 00001378, GTE.Internet CD ROM, 1996.
DR 00001379, Bell Atlantic 1.0 CD ROM, 1996.
Earthlink Network, Inc., Total Access Internet installation materials (date unknown), ELNKMM 014325-014342.
GTE, Internet Installation Guide and materials (date unknown), GTE 04512-04531.
GTE, Internet Solutions Installation Guide—The Insiders Guide to the Outside World (date unknown), GTE 04532-04563.
Bell Atlantic, installation materials, (date unknown), GTE 04564-04577.
GTE, Internet Solutions Dial-Up Access Directory, (date unknown), GTE 04634-04644.
MYMAIL, Ltd., Collection of emails re: NetSafe (Jun. 1996), GTE 16684-16702.
Netsafe, Inc., Presentation Materials, (date unknown), MYMAIL 003313-003343.
MYMAIL 004971-004973, Memo to Tex Wooters from Bob Derby, Oct. 22, 1996.
MYMAIL 004994-005004, NetSafe, Inc. facsimile from Tex Wooters, Dec. 3, 1996.
Netsafe, Inc., Non-Disclosure Agreements with various entities/individuals (May 1995-Jul. 1998), MYMAIL 009790-009805.
Netsafe, Inc., Non-Disclosure Agreements with various entities/individuals (May 1995-Jul. 1998), MYMAIL 016115-016133.
Netsafe, Inc., Customer Listing (Jun. 1996), MYMAIL 039909-039921.
MYMAIL 040105-040115, GTE Intelligent Network Services NetSafe 800 Usage reports, Jul. 1996-Aug. 1996.
MYMAIL 040150, NetSafe, Inc. report re: GTE Invoices 1996.
MYMAIL 040203-040268, GTE Intellingent Network Services NetSafe 800 Usage reports, May 1996-Jan. 1997.
Netsafe, Inc., Customer Listing (Jun. 1996), MYMAIL 044123-044138.
Netsafe, Inc., Customer Listing (May 1996), MYMAIL 058620-058627.
Netsafe, Inc., Customer Listing (Apr.-May 1996), MYMAIL 058834-058922.
Netsafe, Inc., Customer Listing (May 1996), MYMAIL 161095-161144.
Prodigy, The Prodigy Internet System installation disks, (date unknown), SBCIMM 000781-000786.
Patent Rule 4-3 Joint Claim Construction and Brief Statement (Feb. 14, 2005).
Appendix A to Patent Rule 4-3 Joint Claim Construction and Brief Statement, Feb. 14, 2005.
Appendix B to Patent Rule 4-3 Joint Claim Construction and Brief Statement, Feb. 14, 2005—Support for Defendants' Proposed Constructions, Feb. 14, 2005.
Plaintiff's Markman Tutorial PowerPoint presentation, Mar. 21, 2005.
Federal Communications Commission, CCB Pol. 96, Plan to Offer Comparably Efficient Interconnection, by Bell Atlantic (Mar. 8, 1996), GTE 16655-16683.
ETSI ETS 300 535 GSM 03.22 V4.8.1 (Released on Feb. 1995).
ETSI ETS 300 599 GSM 09.02 V4.11.1 (Released on Nov. 1995).
ETSI ETS 300 557 GSM 04.08 V4.10.1 (Released on Feb. 1995).
ETSI ETS 300 596 GSM 08.58 V4.70 (Released on Jul. 1995).
Netscape Communications Corporation, AT&T Uses Netscape and the Web to Build a New Infrastructure for Information Access and Communication, 1997.
Legere, John, New Technologies, New Environment: A Blueprint for Continued Success in Asia Pacific, Nov. 22, 1996, AT&T.
AT&T, AT&T House of Style Planning, Programming Guidelines, product literature, 1997.
Draft of an online book, "Viola in a Nutshell, The Viola World Wide Web Toolkit," located at <http://www.viola.org/viola/book/preface.html>, printed Aug. 29, 2013; apparently still being updated, as indicated on first page "Very Draft, in Progress, Wet Glue & Paint."
Internet Archive WaybackMachine, calendar view for archived pages of http://www.viola.org, printed Sep. 6, 2013.
Internet Archive WaybackMachine, of viola.org, The Viola Home Page as it appeared on Oct. 13, 1999, printed Sep. 6, 2013.
*MyMail, Ltd.* v. *Conduit Ltd. et al* filed Nov. 14, 2013; Civil Action No. 2:13-cv-00961; USDC, Eastern District of Texas (Marshall); Attached is a copy of the following documents: Docket Report as of Nov. 20, 2013; Complaint (with Exhibits A-K) (filed Nov. 14, 2013).
*MyMail, Ltd.* v. *Conduit Ltd. et al* filed Nov. 14, 2013; Civil Action No. 2:13-cv-00961; USDC, Eastern District of Texas (Marshall); Attached is a copy of the following documents: Docket Report as of Dec. 11, 2013.
*MyMail, Ltd.* v. *Conduit Ltd.* et al filed Nov. 14, 2013; Civil Action No. 2:13-cv-00961; USDC, Eastern District of Texas (Marshall); Attached is a copy of the following documents: Docket Report as of Jun. 20, 2014.
*MyMail, Ltd.* v. *Conduit Ltd. et al* filed Nov. 14, 2013; Civil Action No. 2:13-cv-00961; USDC, Eastern District of Texas (Marshall); Attached is a copy of the following documents: First Amended Complaint and Jury Demand (with Exhibits) (filed Dec. 18, 2013).
*MyMail, Ltd.* v. *Conduit Ltd. et al* filed Nov. 14, 2013; Civil Action No. 2:13-cv-00961; USDC, Eastern District of Texas (Marshall); Attached is a copy of the following documents: Docket Report as of Sep. 6, 2014.
Olsen, J.W., Big Three On-Line Services Reach Out to the Internet, PC Magazine, Jun. 27, 1995 ClientConnect Ex 1007-1 through 1007-18.

(56) References Cited

OTHER PUBLICATIONS

December, John et al, The World Wide Web Unleashed (2d ed. 1995) ClientConnect Ex 1008-1 through1008-12.
*ClientConnect, Ltd.* v. *MyMail, Ltd.*; Petition for Inter Partes Review of U.S. Pat. No. 8,275,863 filed Nov. 14, 2014 before the Patent Trial and Appeal Board.
*ClientConnect, Ltd.* v. *MyMail, Ltd.*; Declaration of Benjamin B. Bederson, Ph.D., Nov. 14, 2014, ClientConnect Ex 1009-1 through 1009-100.
*ClientConnect, Ltd.* v. *MyMail, Ltd.*; List of Materials Considered by Benjamin B. Bederson, Ph.D., Nov. 14, 2014, ClientConnect Ex 1010-1 through 1010-4.
*ClientConnect, Ltd.* v. *MyMail, Ltd.*; Curriculum Vitae of Benjamin B. Bederson, Ph.D., Nov. 8, 2014, ClientConnect Ex 1011-1 through 1011-40.
Oxford Dictionary of Computing, Fourth Edition, Oxford University Press, 1996, p. 28, ClientConnect Ex 1013-1 through 1013-3.
American Heritage College Dictionary, 3rd Ed., Houghton Mifflin Company, 1993, p. 93, ClientConnect Ex 1014-1 through 1014-3.
Wikipedia: "Web Browser" Apr. 3, 2009; http://en.wikipedia.org/w/index.php?title=Web_browser&oldid=281450574; ClientConnect Ex 1015-1 through 1015-4.
MacMillan Dictionary, "Web Browser" (printed Nov. 12, 2014) from http://www.macmillandictionary.com/dictionary/american/web-browser, ClientConnect Ex 1016-1.
Cambridge Dictionaries Online, "Web Browser", (printed Nov. 12, 2014) http://dictionary.cambridge.org/dictionary/british/web-browser, ClientConnect Ex 1017-1.
U.S. Appl. No. 13/871,432; Response to Office Action and RCE; dated Jun. 25, 2014.
U.S. Appl. No. 13/871,432; Office Action; dated Aug. 15, 2014.
U.S. Appl. No. 13/923,115; Corrected Notice of Allowability; dated Jul. 14, 2014.
U.S. Appl. No. 13/923,115; Petition to Withdraw from Issue and RCE; dated Sep. 2, 2014.
U.S. Appl. No. 13/923,115; Decision Granting Petition and Patent Withdrawal Notice; dated Sep. 4, 2014.
U.S. Appl. No. 13/923,115; Preliminary Amendment; dated Sep. 25, 2014.
U.S. Appl. No. 13/871,409; Response to Office Action and RCE; dated Jun. 26, 2014.
Copending U.S. Appl. No. 14/254,487, filed Apr. 16, 2014; first-named inventor: T. Selgas.
Defendant America Online, Inc.'s Claim Construction Brief, Mar. 16, 2005, including: Exhibit 1—U.S. Pat. No. 6,571,290 (Selgas), May 27, 2003; Exhibit 2—Notice of Allowance re: U.S. Appl. No. 09/100,619/U.S. Pat. No. 6,571,290 (Selgas), dated Oct. 2, 2002; Exhibit 3—Interview Summary re: U.S. Appl. No. 09/100,619/U.S. Pat. No. 6,571,290 (Selgas), dated Sep. 17, 2002; Exhibit 4—Excerpts from Webster's New World Dictionary of Computer Terms, Sixth Edition, 1997; Exhibit 5—Excerpts from The American Heritage College Dictionary, Third Edition, 1993; Exhibit 6—Excerpts from Microsoft Press Computer Dictionary, Third Edition, 1997; Exhibit 7—Merriam-Webster Online entry re: "800 number" and "modified"; Exhibit 8—Declaration of R. Greg Lavender [cover page only]; Exhibit 9—Excerpts from transcript of deposition of Thomas Selgas, Sep. 16, 2004; Exhibit 10—Excerpts from transcript of deposition of Thomas Selgas, Oct. 27, 2004; Exhibit 11—Excerpts from transcript of deposition of Thomas Selgas, Nov. 3, 2004; Exhibit 12—Letter from Bradley W. Caldwell to All Defense Counsel, Feb. 18, 2005; Exhibit 13—Letter from Lauren A. Dregnan to Bradley W. Caldwell, Feb. 28,2005; Exhibit 14—Letter from Bradley W. Caldwell to Lauren A. Dregnan, Mar. 4, 2005; and Exhibit 15—Letter from Lauren A. Dregnan to Bradley W. Caldwell, Mar. 14, 2005
Responsive Markman Brief of Defendants Netzero, Inc., Juno Online Services, Inc., NetBrands, Inc., Earthlink, Inc., Prodigy Communications Corp., Southwestern Bell Internet Services, Inc., and GTE.Net, LLC, Mar. 16, 2005, including exhibits: Exhibit 1—U.S. Pat. No. 6,571,290 (Selgas), May 27, 2003; Exhibit 2—U.S. Appl. No. 09/100,619/U.S. Pat. No. 6,571 ,290 (Selgas), Jun. 19 1998; Exhibit 3—Redacted version of Network Services Agreement between UUNET Technologies, Inc. and Earthlink Network, Inc., Jul. 12, 1995, ELNKMM010090; Exhibit 4—Interview Summary re: U.S. Appl. No. 09/100,619/U.S. Pat. No. 6,571,290 (Selgas), dated Sep. 17, 2002; Exhibit 5—Preliminary Amendment re: U.S. Appl. No. 09/100,619/U.S. Pat. No. 6,571,290 (Selgas), dated Aug. 15, 2001; Exhibit 6—Excerpts from transcript of deposition of Michael B. Massing, Nov. 9, 2004; Exhibit 7—Excerpt from U.S. Appl. No. 09/100,619/U.S. Pat. No. 6,571,290 (Selgas), Jun. 19, 1998; Exhibit 8—File History of U.S. Appl. No. 60/050,186 (Selgas); Exhibit 9—Preliminary Amendment re: U.S. Appl. No. 09/100,619/U.S. Pat. No. 6,571,290 (Selgas), dated May 10, 2000; Exhibit 10—Excerpts from American Heritage College Dictionary, Third Edition, 1993; Exhibit 11—Excerpts from Microsoft Press Computer Dictionary, Third Edition, 1997; Exhibit 12—Excerpts from Webster's New World Dictionary of Computer Terms, Sixth Edition, 1997; Exhibit 13—Excerpts from transcript of deposition of John Everett Gmuender, Nov. 7, 2004; and Exhibit 14—File History of U.S. Pat. No. 6,571,290 (Selgas).
Plaintiff MyMail's Reply in Support of its Markman Claim Construction Brief, Mar. 23, 2005, including: Exhibit A—Interview Summary re: U.S. Appl. No. 09/100,619/U.S. Pat. No. 6,571,290 (Selgas); and Exhibit B—Excerpts from Webster's New World Dictionary, 1990.
Defendants' [Earthlink, Inc., America Online, Inc., NetZero, Inc., Juno Online Services, Inc., NetBrands, Inc., Prodigy Communications Corp., and Southwestern Bell Internet Services, Inc.] Motion for Summary Judgment of Invalidity Based on the On-Sale Bar, Jul. 26, 2005, including exhibits: Defendants' Exhibit A—Plaintiff MyMail, Ltd.'s Objections and Responses to Defendants' Second Set of Common Interrogatories (Nos. 13-14), Oct. 29, 2004; Defendants' Exhibit B—Excerpts from transcript of deposition of Thomas D. Selgas, May 5, 2005; Defendants' Exhibit C—Excerpts from transcript of deposition of Thomas D. Selgas, Dec. 9, 2004; Defendants' Exhibit D—Excerpts from transcript of deposition of Thomas D. Selgas, Mar. 1, 2005; Defendants' Exhibit E—U.S. Appl. No. 60/050,186; Defendants' Exhibit F—Excerpt from U.S. Appl. No. 09/100,619 (now U.S. Pat. No. 6,571,290 (Selgas)) 186; Defendants' Exhibit G—Excerpt from U.S. Pat. No. 6,571,290 (Selgas); Defendants' Exhibit H—Excerpt from Preliminary Amendment re: U.S. Appl. No. 09/100,619 (now U.S. Pat. No. 6,571,290 (Selgas)), dated Aug. 15, 2001; and Defendants' Exhibit I—Excerpt from U.S. Appl. No. 09/100,619 (now U.S. Pat. No. 6,571,290 (Selgas)), May 8, 2000.
UOL Defendants' Motion for Summary Judgment of Patent Invalidity, Aug. 2, 2005, including exhibits: Exhibit 1—Declaration of Abhijit Khale; Exhibit 2—Memorandum Opinion 186; and Exhibit 3—Expert Report of M.Y. Sanadidi.
Defendants' Motion for Summary Judgment of Invalidity Under Section 102(B) Based on Sales and Public Use of the Inventors' "NEAT" Software System and Memorandum in Support Thereof, Aug. 2, 2005, Proposed Order, including exhibits: Exhibit A—Statement of Material Facts Pursuant to Local Rule CV-56; Exhibit B—Wooter E-mail of Dec. 8. 1996, MYMAIL 4994-5004; Exhibit C—Selgas & Derby e-mail of Jun. 22, 1997, MYMAIL 64377-64378; Exhibit D—U.S. Pat. No. 6,571,290 (Selgas); Exhibit E—Excerpts from Plaintiff MyMail, Ltd.'s Objections and Responses to Defendants' First Set of Common Interrogatories (Nos. 1-12), Aug. 13, 2004; Exhibit F—Excerpts from transcript of deposition of John Everett Gmuender, Nov. 7, 2004; Exhibit G—Excerpts from Plaintiff MyMail, Ltd.'s Objections and Responses to Defendants' Second Set of Common Interrogatories (Nos. 13-14), Oct. 29, 2004; Exhibit H—MyMail, Ltd. Capital Ownership report, MYMAIL 647043-647054, May 3, 2005; Exhibit I—Excerpts from transcript of deposition of Thomas D. Selgas, May 5, 2005; Exhibit J—Excerpts from transcript of deposition of Thomas D. Selgas, Dec. 9, 2004; Exhibit K—Statement of Holman (Tex) H. Wooters, GTE 19829-19830; Exhibit L—Excerpts from transcript of deposition of Holman (Tex) H. Wooters, Jul. 28, 2005; Exhibit M — Excerpts from transcript of deposition of Michael B. Massing, Nov. 9, 2004; Exhibit N—Netsafe Powerpoint presentation, MYMAIL 3313-3343; Exhibit O—Excerpts from transcript of deposition of Chan-

(56) References Cited

OTHER PUBLICATIONS ning Corn, Jun. 3, 2005; Exhibit P—Customer Growth Data, GTE 18677-18679; Exhibit Q—GTE Invoice, MYMAIL 40150; and Exhibit R—GTE 800 Number Usage Data, MYMAIL 40240-40268.
Earthlink, Inc.'s Motion in the Alternative for Summary Judgment of Invalidity Based on Anticipation of Claims 3-8 and 11, Aug. 3, 2005, including exhibits: Earthlink's Exhibit A—Declaration of Gregory Collins, Aug. 3, 2005; Earthlink's Exhibit B—Excerpt from the transcript of the deposition of Cyrus Pejournand; Earthlink's Exhibit C—Expert Report of Jeffrey O. Smith, Jul. 1, 2005; Earthlink's Exhibit D—*Upsher-Smith Laboratories, Inc.* v. *Pamlab, L.L.C.*, 2005 U.S. App. LEXIS 11527, Jun. 17, 2005; Earthlink's Exhibit E—*Prima Tek II, L.L.C.* v. *Southpac Trust International, Inc.*, 412 F.3d 1284, Jun. 22, 2005; Earthlink's Exhibit F—Initial Expert Report of Ellen W. Zegura Regarding the Invalidity of U.S. Pat. No. 6,571,290, Jul. 1, 2005; Earthlink's Exhibit G—Declaration of Kevin Lu, Aug. 2, 2005; Earthlink's Exhibit H—Rebuttal Expert Report of Jeffrey O. Smith, Jul. 29, 2005; Earthlink's Exhibit I—MyMail claim chart comparing U.S. Pat. No. 6,571,290 and Earthlink Total Access 1.0; Earthlink's Exhibit J—MyMail claim chart comparing U.S. Pat. No. 6,571,290 and Earthlink Total Access 1.0; and Earthlink's Exhibit K—MyMail claim chart comparing U.S. Pat. No. 6,571,290 and Earthlink Total Access 1.0.
Plaintiff MyMail's Response to Defendants' Motion for Summary Judgment of Invalidity Under Section 102(B) Based on Sales and Public Use of the Inventors'"NEAT" Software System and Memorandum in Support Thereof, Aug. 26, 2005, including exhibits: Exhibit A—Declaration of Thomas D. Selgas, Aug. 25, 2005; Exhibit B—Excerpts from transcript of deposition of Thomas D. Selgas, Dec. 8, 2004; Exhibit C—Non-Disclosure or Confidentiality Agreements between Netsafe, Inc. and Comm Group, GTE, MarketArts, Inc., The Paradigm Group, Inc., Jim Edward Leo, Channing Corn, Richard Phillips, GTE Intelligent Network Services, Inc., Smith Barney, Inc., E. David Johnson, and Nancy Goodstein, and The Fidelis Group, and GCT, Inc.; Exhibit D—Internet Access Service Agreement between GTE Intelligent Network Services Incorporated and Netsafe, Inc., Dec. 5, 1995, MYMAIL 3103-3119; Exhibit E—Excerpts from transcript of deposition of Thomas D. Selgas, Sep. 16, 2004; Exhibit F—Excerpts from transcript of deposition of Thomas D. Selgas, Mar. 1, 2005; Exhibit G—Excerpts from transcript of deposition of Thomas D. Selgas, Dec. 10, 2004; Exhibit H—Netrepreneurial Network Training Course manual, Nov. 7, 2004; Exhibit I—Excerpts from transcript of deposition of Holman Wooters, Jul. 28, 2005; Exhibit J—Excerpts from transcript of deposition of Michael B. Massing, Nov. 9, 2004; Exhibit K—Excerpts from transcript of deposition of Thomas D. Selgas, Dec. 9, 2004; Exhibit L—Excerpts from transcript of deposition of Thomas D. Selgas, May 5, 2005; Exhibit M—Netsafe NEAT Version 3.0 Beta Review, MASS 106-109; Exhibit N—Excerpts from transcript of deposition of Thomas D. Selgas, Jun. 2, 2005; Exhibit O—Netsafe Announces First Suite of Integrated Customizable Internet Tools and Services, Oct. 23, 1996, MYMAIL 3285-3287; Exhibit P—Information Disclosure Statement re: U.S. Appl. No. 09/100,619 (now U.S. Pat. No. 6,571,290), Mar. 27, 2003, MYMAIL 1555-1559; Exhibit Q—Excerpts from transcript of deposition of John Everett Gmuender, Nov. 7, 2004; Exhibit R—Excerpts from transcript of deposition of Channing Corn, Jun. 3, 2005; and Exhibit S—Task listing, MASS 1597-1598.
MyMail's Response to Defendants' Motion for Summary Judgment of Invalidity Based on the On-Sale Bar, Aug. 26, 2005, including exhibits: MyMail's Exhibit A—Excerpts from the Provisional Application That Preceded U.S. Pat. No. 6,571,290; MyMail's Exhibit B—Defendant Earthlink, Inc.'s Second Supplemental Responses to Plaintiff MyMail, Ltd.'s First Set of Interrogatories; MyMail's Exhibit C—Excerpt from U.S. Pat. No. 6,571,290 (Selgas); and MyMail's Exhibit D—Hand-drawn figures from provisional application.

Defendants' Reply in Support of Their Motion for Summary Judgment of Invalidity Based on Sales and Public Use of the "NEAT" Software System, Sep. 6, 2005.
Defendants' Reply in Support of Their Motion for Summary Judgment of Invalidity Based on On-Sale Bar, Sep. 6, 2005, including exhibits: Defendants' Exhibit A—Earthlink Claim Chart; and Defendants' Exhibit C—Excerpt from transcript of Markman Hearing Before the Honorable Leonard Davis, Apr. 6, 2005.
UOL Defendants' Reply in Support of Motion for Summary Judgment of Patent Invalidity, Sep. 6, 2005, including: UOL Defendants' Errata Sheet re: UOL Defendants' Reply in Support of Motion for Summary Judgment of Patent Invalidity, Sep. 7, 2005.
Prodigy's Reply in Support of its Motion for Summary Judgment of Invalidity, Sep. 13, 2005, including exhibits: Exhibit A—Declaration of Bruce Phillips in Support of Prodigy's Reply in Support of its Motion for Summary Judgment of Invalidity, Sep. 13, 2005; and Exhibit 1 to Exhibit A—Press release re: Prodigy, Inc. Launches Prodigy Internet 1.1, Oct. 16, 1996.
Defendants' [Earthlink, Inc., NetZero, Inc. Juno Online Services, Inc., NetBrands, Inc., Prodigy Communications Corp., SouthwesternBell Internet Services, Inc. and SBC Internet, Inc.] Reply in Support of AOL's Motion for Summary Judgment of Invalidity Under Section 102(b) Based on AT&T WorldNet, Sep. 13, 2005.
MyMail's Sur-Reply to Defendants' Motion for Summary Judgment of Invalidity Based on the On-Sale Bar, Sep. 16, 2005, including exhibits: MyMail's Exhibit A —Excerpts from U.S. Pat. No. 6,571,290; and MyMail's Exhibit B —Excerpt from transcript of Markman Hearing Before the Honorable Leonard Davis, Apr. 6, 2005.
Plaintiff MyMail's Sur-Reply to UOL Defendants' Motion for Summary Judgment of Patent Invalidity, Sep. 16, 2005.
Plaintiff MyMail's Sur-Reply to Defendants' Motion for Summary Judgment of Invalidity Under Section 102(B) Based on Sales and Public Use of the Inventors' "NEAT" Software System and Memorandum in Support Thereof, Sep. 21, 2005.
Plaintiff MyMail's Sur-Reply to AOL's Motion for Summary Judgment of Patent Invalidity, Sep. 23, 2005.
Defendants' Joint Motion for Summary Judgment of Unenforceability Due to Inequitable Conduct, Aug. 2, 2005, including exhibits: Exhibit A—Excerpt from U.S. Pat. No. 6,571,290 (Selgas), MYMAIL 1180; Exhibit B—File History of U.S. Appl. No. 09/100,619/ U.S. Pat. No. 6,571,290, MYMAIL 1216-1418; Exhibit C—U.S. Appl. No. 60/050,186, MYMAIL 8917-9085; Exhibit D—Excerpts from WebTV Technical Spec., Aug. 19, 1997, MYMAIL 1707-1710; Exhibit E—Excerpts from WebTV Technical Spec., MYMAIL 1703-1706; Exhibit F—Excerpts from transcript of deposition of Thomas D. Selgas, Dec. 9, 2004; Exhibit G—Email from Tom Selgas to Bob Derby, Jun. 22, 1997, MYMAIL 643877; Exhibit H—Letter from Thomas D. Selgas to Gregory W. Carr, Jul. 22, 1997, MYMAIL 644207; Exhibit I—Excerpt from transcript of the deposition of Gregory W. Carr, Dec. 7, 2004; Exhibit J—WebTV: Microsoft's Consumer Foothold, MYMAIL 9743-9744; Exhibit K—Email from Tom Selgas to Bob Derby, Aug. 23, 1997, MYMAIL 643848; Exhibit L—Combined Declaration and Power of Attorney re U.S. Appl. No. 09/100,619/ U.S. Pat. No. 6,571,290, MYMAIL 1285-1286; Exhibit M—Carr & Storm, LLP invoice to Netsafe, Inc., Aug.7, 1998, MYMAIL 644637; Exhibit N—Memo from Gregory W. Carr to Tom Selgas re: Valuation of Certain Netsafe, Inc. Intellectual Properties, Jul. 24, 1998, MYMAIL 2578-5780.
Defendants' Joint Motion for Summary Judgment of Unenforceability Due to Inequitable Conduct, Aug. 2, 2005, including exhibits: Exhibit O—Memo from Gregory W. Carr to Tom Selgas re: Search for Patent of WebTV Technology, Oct. 7, 1998, MYMAIL 644205-644206; Exhibit P—Index re: WebTV patent search, MYMAIL 645133-645144; Exhibit Q—Confidential Business Plan, MYMAIL 2578-2580; Exhibit R—Excerpt from the transcript of the deposition of Carl A. Erickson, Jul. 27, 2005; Exhibit S—Information Disclosure Statement re U.S. Appl. No. 09/100,619/ U.S. Pat. No. 6,571,290, Sep. 9, 1999, MYMAIL 1427-1428; Exhibit T—Office Action U.S. Appl. No. 09/100,619/ U.S. Pat. No. 6,571,290, dated Dec. 20, 2000, MYMAIL 1432-1441; Exhibit U—Preliminary Amendment re: U.S. Appl. No. 09/100,619/ U.S. Pat. No. 6,571,290, dated Aug. 15, 2001, MYMAIL 1447-1476; Exhibit V—Office

(56) References Cited

OTHER PUBLICATIONS

Action re: U.S. Appl. No. 09/100,619/ U.S. Pat. No. 6,571,290, dated Jun. 5, 2002, MYMAIL 1521-1528; Exhibit W—Excerpt from Manual of Patent Examining Procedure, Latest Revision, Feb. 2000; Exhibit X—Examiner Interview Summary re U.S. Appl. No. 09/100,619/ U.S. Pat. No. 6,571,290, dated Sep. 17, 2002, MYMAIL 1533-1535; Exhibit Y—Draft Amendment re: U.S. Appl. No. 09/100,619/ U.S. Pat. No. 6,571,290, MYMAIL 1536-1539; and Exhibit Z—Notice of Allowability re: U.S. Appl. No. 09/100,619/ U.S. Pat. No. 6,571,290, dated Sep. 26, 2002, MYMAIL 1541-1546.
Defendants' Joint Motion for Summary Judgment of Unenforceability Due to Inequitable Conduct, Aug. 2, 2005, including exhibits: Exhibit AA—Request for Continued Examination re: U.S. Appl. No. 09/100,619/ U.S. Appl. No. 09/100,619/ U.S. Pat. No. 6,571,290, dated Mar. 27, 2003, MYMAIL 1555-1559; Exhibit CC—Notice of Allowance and Fees Due re: U.S. Appl. No. 09/100,619/ U.S. Pat. No. 6,571,290, dated Sep. 26, 2002, MYMAIL 1561-1564; Exhibit DD—Excerpt from Plaintiff MyMail, Ltd.'s Objections and Responses to Defendants' Second Set of Common Interrogatories (Nos. 13-14); Exhibit EE—Excerpts from transcript of deposition of John Everett Gmuender, Nov. 7, 2004; Exhibit FF—NetSafe Customer Records; Exhibit GG—Statement of Holman (Tex) H. Wooters, Feb. 2, 2005; Exhibit HH—Netsafe PowerPoint presentation, 1997, MYMAIL 3313-3342; Exhibit II—PowerPoint presentation, MYMAIL 9259-9268; Exhibit JJ—Attorney Notes, MYMAIL 643335; and Exhibit KK—Draft IDS for MyMail Application, MYMAIL 643336-643337.
Plaintiff's Response to Defendants' Joint Motion for Summary Judgment of Unenforceability Due to Inequitable Conduct, Aug. 29, 2005 Plaintiff's Declaration of Scott L. Cole, with exhibits: Exhibit A—U.S. Pat. No. 5,862,339 (Bonnaure), MYMAIL 16155-16186; Exhibit B—Expert Report of Gregory Lavender, Ph.D.; Exhibit C—Excerpts from the transcript of the deposition of Richard D. Grauer, Aug. 15, 2005; Exhibit D—Excerpts from the transcript of the deposition of Gregory W. Carr, Dec. 7, 2004 ; Exhibit E—Excerpts from the transcript of the deposition of Gregory W. Carr, Dec. 8, 2004; Exhibit F—Excerpts from the transcript of the deposition of Thomas D. Selgas, Dec. 10, 2004; and Exhibit G—Excerpt from Manual of Patent Examining Procedure § 2004 (8th Ed., 2002) entitled "Aids to Compliance with Duty of Disclosure".
Defendants' Reply in Support of Their Motion for Summary Judgment of Unenforceability Due to Inequitable Conduct, Sep. 9, 2005, including exhibits: Exhibit A—Excerpt from transcript of the deposition of Gregory W. Carr, Aug. 31, 2004; Exhibit B—Excerpt from transcript of the deposition of Richard Grauer, Aug. 15, 2005; Exhibit C—Excerpt from transcript of the deposition of Gregory W. Carr, Dec. 7, 2004; Exhibit D—Excerpt from transcript of the deposition of Gregory W. Carr, Dec. 7, 2004; Exhibit E—Excerpt from transcript of the deposition of Gregory W. Carr, Jun. 1, 2005; Exhibit F—Excerpt from transcript of the deposition of Gregory W. Carr, Dec. 8, 2004; Exhibit G—Excerpt from transcript of the deposition of Richard Grauer, Aug. 15, 2005; Exhibit H—Excerpt from transcript of the deposition of Thomas D. Selgas, Dec. 9, 2004 ; and Exhibit I—Excerpt from transcript of the deposition of Thomas D. Selgas, Dec. 10, 2004.
Plaintiff's Sur-Reply to Defendants' Joint Motion for Summary Judgment of Unenforceability Due to Inequitable Conduct, Sep. 19, 2005.
Defendants' Motion to Dismiss for Lack of Standing, Jul. 26, 2005 Defendants' Exhibit A—Excerpt of transcript of deposition of Thomas D. Selgas, Dec. 8, 2004 Defendants' Exhibit B—Excerpt of transcript of deposition of Robert T. Derby, Jun. 16, 2005 Defendants' Exhibit C—Purchase Agreement/Letter of Intent between Netsentinel and Netsafe Inc., MYMAIL 3029-3032 Defendants' Exhibit D—Patent Assignment Records re: U.S. Pat. No. 6,571,290 Defendants' Exhibit E—Record of Assignment re: U.S. Pat. No. 6,571,290, MYMAIL 643974643975 Defendants' Exhibit F—Promissory Note between Robert T. Derby and Netsafe, Inc., MYMAIL 1008 Defendants' Exhibit G—Original Petition from *Robert T. Derby v. Netsafe, Inc.*, MYMAIL 18836 Defendants' Exhibit H—Judgment from *Robert T. Derby v. Netsafe, Inc.*, MYMAIL 1003 Defendants' Exhibit I—Original Petition from *Robert T. Derby v. Netsafe, Inc.*, MYMAIL 18836, and Promissory Note between Robert T. Derby and Netsafe, Inc., MYMAIL 1008 Defendants' Exhibit J—Title Page from U.S. Pat. No. 6,571,290, MYMAIL 644049, and handwritten notes, MYMAIL 1030.
MyMail, Ltd.'s Response to Defendants' Motion to Dismiss for Lack of Standing, Aug. 12, 2005, including exhibits: MyMail's Exhibit 1—Declaration of Thomas Selgas, Aug. 10, 2005, with: Exhibit A to MyMail's Exhibit 1—Cyrix Corporation Employee Stock Purchase Plan, MYMAIL 653552-653560; Exhibit B to MyMail's Exhibit 1—Cyrix Corporation Incentive Stock Option Agreement, MYMAIL 653516-653524; and Exhibit C to MyMail's Exhibit 1—Assignment, Jun. 19, 1997, MYMAIL 14023. MyMail's Exhibit 2—Declaration of Andrew Viger, Aug. 10, 2005, with: Exhibit A to MyMail's Exhibit 2—Cyrix Corporation Employee Stock Purchase Plan, MYMAIL 653552-653560; and Exhibit B to MyMail's Exhibit 2—Cyrix Corporation Incentive Stock Option Agreement, MYMAIL 653516-653524. MyMail's Exhibit 3—Promissory Note, MYMAIL 647983-647984; MyMail's Exhibit 4—Texas Certificate of Involuntary Dissolution, MYMAIL 647985-647986; MyMail's Exhibit 5—Judgment from *Robert T. Derby v. Netsafe, Inc.*, MYMAIL 647989-647990; MyMail's Exhibit 6—Declaration of James Keffer, with: Exhibit A to MyMail's Exhibit 6—Assignment of Invention, MYMAIL 8775; and Exhibit B to MyMail's Exhibit 6—Articles of Conversion, MYMAIL 1065-1070. MyMail's Exhibit 7—Excerpts from transcript of deposition of Thomas D. Selgas, Jan. 25, 2005 (w/ attached Deposition Exhibit 5—copy of U.S. Pat. No. 6,571,290); MyMail's Exhibit 8—Excerpts from transcript of deposition of Michael B. Massing, Nov. 9, 2004; MyMail's Exhibit 9—Declaration of Lucien Ostenkowski, with: Exhibit A to MyMail's Exhibit 9—Cyrix Corporation Employee Stock Purchase Plan, MYMAIL 653552-653560; and Exhibit B to MyMail's Exhibit 1—Cyrix Corporation Incentive Stock Option Agreement, MYMAIL 653516-653524.
Southwestern Bell Internet Services, Inc.'s and Prodigy Communications Corporation's Reply Brief in Support of Defendants' Motion to Dismiss for Lack of Standing, Aug. 22, 2005, including exhibits: Exhibit A—Excerpt from transcript of the deposition of Holman Wooters, Jul. 28, 2005; Exhibit B—Netsafe balance sheet, Jun. 1998; Exhibit C—Excerpt from transcript of the deposition of Robert Derby, Jun. 16, 2005; and Exhibit D—Excerpt from transcript of the deposition of Andrew Viger, Aug. 15, 2005.
MyMail, Ltd.'s Sur-Reply to Defendants' Reply Brief in Support of Defendants' Motion to Dismiss for Lack of Standing, Aug. 30, 2005, including exhibit: MyMail's Exhibit A—Excerpt from transcript of the deposition of Andrew Viger, Aug. 15, 2005.
Supplement in Support of Defendants' Motion to Dismiss for Lack of Standing, Sep. 29, 2005, including exhibits: Defendants' Exhibit A—Docket sheet re: *Robert T. Derby v. Netsafe, Inc.*, Jan. 24, 2000; Defendants' Exhibit B—Texas Secretary of State documents; Defendants' Exhibit C—Original Petition from *Robert T. Derby v. Netsafe, Inc.*; Defendants' Exhibit D—Certificate of Unclaimed Service, Sep. 26, 2005; Defendants' Exhibit E—Transmittal letter re: Certificate of Unclaimed Service, Apr. 6, 2000, MYMAIL 1017; and Defendants Exhibit F—Judgment from *Robert T. Derby v. Netsafe, Inc.*, Apr. 12, 2000.
MyMail's Motion to Strike Defendants' Emergency Supplement in Support of Defendants' Motion to Dismiss for Lack of Standing, Sep. 30, 2005.
Draft version of Defendants' Standing Presentation (date unknown).
Earthlink's Notice of Reliance on Supplemental Authority Regarding Defendants' Motion for Summary Judgment of Invalidity Based on the On-Sale Bar, Sep. 27, 2005, including: Earthlink's Exhibit A—Case cite re: *Pandrol USA, LP, et al. v. AirBoss Railway Products, Inc., et al.*, 2005 U.S. App. LEXIS 20054, Sep. 19, 2005.
Transcript of Pretrial Conference and Summary Judgment Hearing Before the Honorable Leonard David, Oct. 3, 2005.
Memorandum Opinion and Order re: Earthlink's Motion for Summary Judgment of Non-Infringement, UOL's Motion for Summary Judgment of Non-Infringement, Southwestern Bell Internet Services and Prodigy's Motion for Summary Judgment of Non-

(56) References Cited

OTHER PUBLICATIONS

Infringement, and MyMail's Motion for Leave to Supplement the Summary Judgment Record, Oct. 28, 2005.
Non-Confidential Brief for Plaintiff/Appellant MyMail, Ltd., Mar. 7, 2006.
Non-Confidential Brief for Defendants/Appellees/Cross-Appellants NetZero, Inc., Juno Online Services, Inc. and Netbrands, Inc., May 17, 2006.
Non-Confidential Brief of Defendant/Counterclaimaint/Cross-Apellant Earthlink, Inc. and Defendants/Appellees Prodigy Communications Corporation, SBC Internet Services, Inc. and Southwestern Bell Internet Services, Inc., May 17, 2006.
Non-Confidential Reply Brief of Plaintiff/Appellant MyMail, Ltd., Jul. 13, 2006.
Corrected Non-Confidential Reply Brief of Defendant/Cross Appellant Earthlink, Inc. and Defendants/Cross Appellants NetZero, Inc., Juno Online Services, Inc. and NetBrands, Inc.; Aug. 24, 2006.
U.S. Court of Appeals for the Federal Circuit, Non-Confidential Joint Appendix, vol. 1, with Protective Order, (Aug. 21, 2006) containing: U.S. Pat. No. 5,571,290, pp. A 1-35; Final Judgment, p. A 36; Memorandum and Opinion, pp. A 37-48; Civil Docket, pp. A 49-98; Claim Construction Memorandum and Opinion, pp. A 99-122; Plaintiffs Markman Claim Construction Brief, pp. A 123-219; and Responsive Markman Brief of Defendants Netzero, Inc., Juno Online Services, Inc., Netbrands, Inc., Earthlink, Inc., Prodigy Communications Corp., Southwestern Bell Internet Services, Inc., and GTE.Net LLC, pp. A 220-712.
U.S. Court of Appeals for the Federal Circuit (Aug. 21, 2006), Non-Confidential Joint Appendix, vol. 2, containing: Defendant America Online, Inc. Claim Construction Brief, pp. A 713-1101 (Defendants/P.O. Precludes Submission: Declaration of Dr. R. Greg Lavender, pp. A 1066-1079).
U.S. Court of Appeals for the Federal Circuit (Aug. 21, 2006), Non-Confidential Joint Appendix, vol. 3, containing: Plaintiff's Reply in Support of its Markman Claim Construction Brief, pp. A 1102-1142; (Defendant(s)/P.O. Preclude Submission: Defendant AOL Motion for Summary Judgment of Noninfringement and Memorandum in Support Thereof, pp. A 1143-1420) (Defendant(s)/ P.O. Preclude Submission: MyMail's Response to AOL's Motion for Summary Judgment of Noninfringement, pp. A 1421-1696); Earthlink's Motion for Summary Judgment of Non-Infringement, pp. A 1697-1802; MyMail's Response to Earthlink's Motion for Summary Judgment of Non-Infringement, pp. A 1803-2011.
U.S. Court of Appeals for the Federal Circuit, Non-Confidential Joint Appendix, vol. 4, (Aug. 29, 2006) containing: MyMail Response to UOL Defendants' Motion for Summary Judgment on Non-Infringement, pp. A 2460-2736; UOL's Reply in Support of its Motion for Summary Judgment on Non-Infringement, pp. A 2737-2795; MyMail's Sur-Reply to UOL's Motion for Summary Judgment on Non-Infringement, pp. A 2796-2805; MyMail Motion for Leave to Supplement the Summary Judgment Record with Testimony of UOL Witness First Deposed After the Summary Judgment Hearing Pursuant to the Court's Order, pp. A 2806-2820 UOL's Opposition to MyMail's Motion for Leave to Supplement the Summary Judgment Record, pp. A2821-2827; MyMail's Reply in Support of its Motion for Leave to Supplement the Summary Judgment Record, pp. A 2828-2836; Transcript of Markman Hearing (excerpts), pp. A 2837-3015; Transcript of Pretrial Conference and Summary Judgment Hearing (excerpts), pp. A 3016-3065; (Defendant(s)/P.O. Preclude Submission: excerpt from Pretrial Conference and Summary Judgment Hearing transcript, pp. A 3066-3217); MyMail's Third Amended Complaint, pp. A 3218-3262; (Defendant(s)/P.O. Preclude submission: MyMail's Response to Defendants' Motion to Dismiss for Lack of Standing, pp. A 3263-3409); (Defendant(s)/P.O. Preclude Submission: Defendants' Motion to Dismiss for Lack of Standing, pp. A 3410-3462); (Defendant(s)/ P.O. Preclude Submission: MyMail's Response to Defendants' Motion to Dismiss for Lack of Standing, pp. A 3463-3627); (Defendant(s)/P.O. Preclude Submission: Reply Brief in Support of Defendants' Motion to Dismiss for Lack of Standing, pp. A 3628-3648) MyMail's Sur-Reply to Defendants' Motion to Dismiss for Lack of Standing, pp. A 3649-3682; MyMail's Motion to Strike Defendants' Emergency Supplement in Support of Defendants' Motion to Dismiss for Lack of Standing, pp. A 3683-3720; Defendants Prodigy Communications Corporation and Southwestern Bell Internet Services, Inc.'s Answer to MyMail's Third Amended Complaint, pp. A 3721-3730; Answer and Counterclaim of Defendants Netzero, Inc., Juno Online Services, Inc., and Netbrands, Inc. To MyMail's Third Amended Complaint, pp. A 3731-3740; Defendants Earthlink, Inc. 's Answer and Counterclaims to Plaintiffs' Third Amended Complaint, pp. A 3741-3746; Statement of Holman (Tex) H. Wooters, pp. A 3747-3748; and Joint Final Pretrial Order, pp. A 3749-3771.
Court Opinion, Feb. 20, 2007.
Deposition of Thomas Blahuta, Jul. 22, 2005.
Deposition of Gregory W. Carr, Dec. 7, 2004, with deposition exhibits: Exhibit 30—Subpoena; Exhibit 31—37 CFR 1.56; Exhibit 32—Email from Bob Derby; Exhibit 33—Mr. Carr's Objections and Responses to America Online's subpoena; Exhibit 34—Nondisclosure or Confidentiality Agreements between NetSafe, Inc.; Exhibit 35—Memorandum from Mr. Carr to Mr. Selgas; Exhibit 36—Document titled NetSafe, Inc. with listing of 10 items; Exhibit 37—Provisional patent application file; Exhibit 38—MyMail file history leading to patent; Exhibit 39—Information Disclosure Statement; and Exhibit 40—Bonnaure U.S. Pat. No. 5,862,339
Deposition of Gregory W. Carr, Dec. 8, 2004, with deposition exhibits: Exhibit 41—U.S. Patent issued to Mighdoll; Exhibit 42—Office Action, MYMAIL 8819-8828; Exhibit 43—Draft IDS for MyMail Applications; Exhibit 44—Nondisclosure or Confidentiality Agreement with handwritten notes; and Exhibit 45—Document titled Netscape or MMAIL 132002.
Deposition of Gregory W. Carr, Jun. 1, 2005, with deposition exhibits: Exhibit 46—Subpoena; Exhibit 47—Email to O'Neil from Carr, Sep. 21, 1998, MYMAIL 646329; Exhibit 49—Newspaper article, MYMAIL 9743; Exhibit 50—WebTV Company Background, MYMAIL 1703; Exhibit 51—Letter to Carr from Selgas, Jul. 22, 1997, MYMAIL 644205; Exhibit 52—Email to O'Neil from Carr, Sep. 21, 1998, MYMAIL 645943; Exhibit 53—Letter to Selgas from Carr, Oct. 7, 1998, MYMAIL 644205; Exhibit 54—NetSafe Confidential Busines Plan, MYMAIL 2576; Exhibit 55—Fax to Selgas from Carr, Jul. 24, 1998, MYMAIL 644579; Exhibit 56—Carr & Storm Invoice 1026, MYMAIL 644181; Exhibit 57—Email to Erickson from Carr, Mar. 24, 1999, MYMAIL 645935; Exhibit 58—Handwritten stickie note, MYMAIL 645223; Exhibit 59—Carr's Handwritten notes, MYMAIL 645050; Exhibit 60—Carr & Storm Invoices 154, 436, 437, 438, 475, 439, 788, 834, 2062; Exhibit 61—Email to Wall from Carr, Sep. 25, 1998, MYMAIL 645940; Exhibit 62—Email to Gibson from Carr, May 4, 1999, MYMAIL 646386; and Exhibit 63—Email to Maynard from Carr, Sep. 1998, MYMAIL 646821.
Deposition of Gregory W. Carr, Aug. 31, 2005, with deposition exhibit: Exhibit 1—Amended Deposition Notice.
Deposition of Greg Collins, Oct. 13, 2004.
Deposition of Greg Collins, Jun. 27, 2005, with deposition exhibits: Exhibit 1—Notice of Deposition, Sep. 20, 2004.
Deposition of Channing Corn, Jun. 3, 2005, with deposition exhibits: Exhibit 1—Subpoena; Exhibit 2—Confidentiality and Nondisclosure Agreement; Exhibit 3—Page of Code; Exhibit 4—Service Ticket; Exhibit 5—Customer and User List; Exhibit 6—Internal Use Definitions; Exhibit 7—PowerPoint Presentation; Exhibit 8—Gmuender Task List; Exhibit 9—Software Module—Test Application; Exhibit 10—Massing Associative Array Source Code; Exhibit 11—Massing Dialer Test Application; Exhibit 12—Corn 38-40; Exhibit 13—Database Dump; Exhibit 14—Gmuender GTE Account Source Code; Exhibit 15—Netrepreneur Registration Form; Exhibit 16—'290 Patent; Exhibit 17—Witness Handwritten Note; Exhibit 18—Gmuender Task List; Exhibit 19—Witness Toolbar Application Code, Feb. 28, 1996; Exhibit 20—Witness Toolbar Application Code, Mar. 2, 1996; Exhibit 21—Witness Toolbar Application Code, Mar. 4, 1996; Exhibit 22—Witness Toolbar Application Code, Mar. 5, 1996; Exhibit 23—Witness Toolbar Application Code, Mar. 6, 1996; Exhibit 24—Text File of WSFTP Program; Exhibit 25—Witness FTP Code File; Exhibit 26—Delphi 2.0 Web

(56) References Cited

OTHER PUBLICATIONS

Apps Printout; Exhibit 27—Mar. 1999 E-mail string; Exhibit 28—"Message of the Day" software; and Exhibit 29—Packet of Customer Service Tickets.
30(b)(6) Deposition of Sky Dayton (Earthlink), Aug. 24, 2005, with deposition exhibit: Exhibit 1—Notice of Deposition, Aug. 5, 2005.
Deposition of Robert T. Derby, Sep. 15, 2005, with deposition exhibits: Exhibit 1—Subpoena; Exhibit 2—Promissory Note not signed by Selgas; Exhibit 3—MyMail, Ltd.'s Objections and Responses to Southwestern Bell Internet Services, Inc.'s Interrogatories (Nos. 1-4); Exhibit 4—Verification; Exhibit 5—Plaintiff MyMail Ltd.'s Objections and Responses to Defendants' First Set of Common Interrogatories (Nos. 1-12); and Exhibit 6—Plaintiff MyMail Ltd.'s Amended Objections and Responses to Defendants' First Set of Common Interrogatories (Nos. 1-12).
Deposition of Robert T. Derby, Jun. 16, 2005, with deposition exhibits: Exhibit 1—Limited Partnership Agreement of MyMail, Ltd.; Exhibit 2—Jul. 15, 1996 letter regarding employment confirmation; Exhibit 3—Handwritten document, not identified by witness; Exhibit 4—Compilation of documents beginning with Judgment, re: *Derby v. NetSafe*; Exhibit 5—Oct. 22, 1996 memo from Derby to Tex Wooters; Exhibit 6—Jun. 22, 1997 e-mail string between Derby and Selgas; Exhibit 7—Original Petition, re: *Derby v. NetSafe*; Exhibit 8—NetSafe, Inc. Presentation, MYMAIL 3313-3343; Exhibit 9—Dec. 3, 1996 e-mail from Tex Wooters to John Gmuender, Joe Gallagher, Tom Selgas, Subject: Spouse involvement; Exhibit 10—Handwritten documents, not identified by witness; Exhibit 11—Spreadsheet of the ownership as of Dec. 31, 2004 for MyMail, Ltd.; Exhibit 12—MyMail, Ltd. Loan Request, Jul. 16, 2004; Exhibit 13—Aug. 22, 1997 e-mail from Bob Derby to Tom Selgas; and Exhibit 14—Aug. 23, 1997 e-mail from Bob Derby to Tom Selgas.
Deposition of Bradley Ellis, Jun. 1, 2005, with deposition exhibits: Exhibit 1—Non-disclosure of Confidentiality Agreements, MYMAIL 16115; Exhibit 2—Non-disclosure of Confidentiality Agreements with handwritten notes, MYMAIL 643335;.Exhibit 3—USPTO Patent Full-Text and Image Database, MYMAIL 645147; Exhibit 4—USTPO Patent search with Refined Search for AN/WebTV; Exhibit 5—USPTO Patent search with Refined Search for AN/WebTV and IN/"mighdoll"; Exhibit 6—USPTO Patent search, search 1999-2003; and Exhibit 7—Mighdoll patents.
Deposition of Carl Erickson, Jul. 27, 2005, with deposition exhibits: Exhibit 1—Subpoena to Tony Erickson; Exhibit 2—Memo to Tom Selgas from G. Carr, Jul. 24, 1998; Exhibit 3—Confidential Business Plan, 1999-2001; Exhibit 4—NetSafe, Inc. Business Plan Synopsis;.Exhibit 5—E-mail to various persons from Tony Erickson, Mar. 24, 1999; Exhibit 6—Letter to Tony Erickson from Sparrow Marcioni, Apr. 3, 1999; Exhibit 7—Memo to NetSafe, Inc. Employees from Tony Erickson, Mar. 4, 1999; Exhibit 8—Series of E-mails; Exhibit 9—E-mail to toms@netsafe.net from William Wall, Apr. 6, 1999; Exhibit 10—NetSafe Expense Summary; Exhibit 11—E-mail to Tony Erickson from toms@netsafe.net, Mar. 5, 1999; and Exhibit 12—Memo to Tony Erickson from Lewis Parson, Mar. 8, 1999.
Deposition of Tim Gelinas, Aug. 9, 2005, with deposition exhibits: Exhibit 1—Installation and Configuration Guide dated Jan. 1995, AOL 115420-11537; Exhibit 2—Getting Started dated Aug. 1994; 118 pages, AOL 115540-115686; Exhibit 3—Remote Account Maintenance Protocol DOF (RAMP); undated, AOL 117753-11754; Exhibit 4—"Windows to the Internet" Byte.com dated Jul. 1995, AOL 117741-117747; Exhibit 5—ACW Connections by Fred Kemp undated; 5 pages, AOL 117748-117752; Exhibit 6—"Travel the Information Highway on Your PC", Byte.com dated Apr. 1994, AOL 117828-117829; Exhibit 7—oreilly.com Online Catalog undated AOL 117830-117832; Exhibit 8—SprintLink Customer Handbook 2.1 dates Oct. 11, 1995 AOL 117757-117795; Exhibit 9—LANtastic 7.0: Netscape Navigator 2.01 and SPRYNET Module NOS7006 dated May 28, 1996, AOL 117796-117827 Exhibit 10—Claim Construction Document dated Jun. 3, 2005; Exhibit 11—U.S. Pat. No. 6,571,290 B2 dated May 27, 2003; and Exhibit 12—Mosaic in a Box Product Information; undated, AOL 116437-116545.
Deposition of Richard C. Gibson, Jul. 26, 2005, with deposition exhibits: Exhibit 1—Notice of Deposition of Richard Gibson; Exhibit 2—Letter to R. Douglas from Richard Gibson, Jul. 29, 1999; Exhibit 3—E-mail from Tony Erickson, re: Tom Selgas rights to prior art held at Cyrix; Exhibit 4—Minutes of special meeting of the shareholders of NetSafe, lnc., Mar. 27, 1999; Exhibit 5—Letter to Tony Erickson from Sparrow Marcioni, Apr. 2, 1999; Exhibit 6—Memorandum to Tom Selgas from Gregory Carr, Jul. 24, 1998; Exhibit 7—Notice of NetSafe, Inc. shareholders meeting; Exhibit 8—Memo to NetSafe, lnc. employees; Exhibit 9—E-mail from Gibsondick@aol.com, Jun. 29, 1999; Exhibit 10—NetSafe expense summary, Mar. 21, 1999; Exhibit 11—Judgment, *Derby v. NetSafe*; and Exhibit 12—Confidential Business Plan, 1999-2001.
Deposition of John Everett Gmuender, Nov. 7, 2004, with deposition exhibits: Exhibit 1—Subpoena; Exhibit 2—NetSafe, Inc. Press Background Information; Exhibit 3—E-mail string, May 3, 2004; Exhibit 4—NetSafe, Inc. Presentation; Exhibit 5—U.S. Pat. No. 6,571,290; Exhibit 6—File History of U.S. Pat. No. 6,571,290; Exhibit 7—Notes on NetSafe avigation Center and attached e-mails; Exhibit 8—NetSafe Agreement, Aug. 4, 1997; Exhibit 9—Memorandum of Understanding, Aug. 29, 1997; Exhibit 10—Fax memo to Tex Wooters, Oct. 22, 1996; Exhibit 11—E-mail, Dec. 3, 1996, with attachments; Exhibit 12—Listing of accounts; Exhibit 13—GTE Invoices, 1996; Exhibit 14—Listings of usage; Exhibit 15—Assignment of Invention; Exhibit 16—Netrepreneur Training Course printout, Mar. 21, 1996; Exhibit 17—Netrepreneurial Network, Netrepreneur Training Course; and Exhibit 18—NetSafe NEAT Version 3.0 Beta Review.
Deposition of Richard D. Grauer, Aug. 15, 2005.
Deposition of James P. Keffer, Sep. 8, 2005, with deposition exhibits: Exhibit 1—Amended Notice of Deposition to Plaintiff MyMail, Ltd. of Defendants NetZero, Inc., Juno Online Services, Inc., and NetBrands, Inc.; and Exhibit 2—Handwritten notes.
Deposition of Bruce Lutz, Jun. 2, 2005, with deposition exhibits: Exhibit 1—Notice of Service of Subpoena Duces Tecum and Testification by Defendant GTE.Net LLC; and Exhibit 2—Carr & Storm Invoice Nos. 154, 436m 437, 438, 439, 788, 834 and 2062.
Deposition of Michael B. Massing, Nov. 9, 2004, with deposition exhibits: Exhibit 19—Subpoena; Exhibit 20—Document info; and Exhibit 21—E-mail string, Mar. 14, 1996.
Deposition of Robert D. McCutcheon, Jun. 2, 2005, with deposition exhibits: Exhibit 1—Notice of Service of Subpoena Duces Tecum and Testificandum by Defendant GTE.Net LLC; and Exhibit 2—Provisional patent application filing, MYMAIL 8911.
Deposition of Lucien Ostenkowski, Sep. 15, 2004, with deposition exhibits: Exhibit 1—Notice of Deposition; Exhibit 2—U.S. Pat. No. 6,571,290; Exhibit 3—MyMail's Preliminary Infringement Contentions; Exhibit 4—Slide Presentation to AOL; Exhibit 5—Serial Monitor Screenshots; and Exhibit 6—Drawing.
Deposition of Lucien Ostenkowski, Sep. 16, 2004.
Deposition of Lucien Ostenkowski, Aug. 3, 2005, with deposition exhibit: Exhibit 1—Presentation to SBC Yahoo!
Deposition of Mohammad Sanadidi, Oct. 5, 2005, with deposition exhibits: Exhibit 1—U.S. Pat. No. 6,571,290; Exhibit 2—Court's Claim Construction; Exhibit 3—Expert Report, Jun. 22, 2005; Exhibit 4—Rebuttal Expert Report, Jul. 29, 2005; Exhibit 5—Screen shots produced by MyMail; Exhibit 6—Attachment to Expert Report re Juno 1.0 Use Cases; and Exhibit 7—Claim chart pertaining to Juno 1.0.
30(b)(6) Deposition of Alex Sarafian (United Online Companies), Jul. 12, 2005, with deposition exhibit: Exhibit 1—Plaintiff's Amended Notice of Deposition, Jun. 10, 2005.
Deposition of Michelle Selgas, Jun. 23, 2005, with deposition exhibits: Exhibit 1—MyMail, Ltd. Capital Ownership, May 3, 2005, MYMAIL 647043-647054; and Exhibit 2—U.S. Pat. No. 6,571,290.
Deposition of Thomas Selgas, Sep. 16, 2004, with deposition exhibits: Exhibit 7—Notice of Deposition; Exhibit 8—Slide Presentation to Earthlink; Exhibit 9—MyMail's Preliminary Infringement Contentions; and Exhibit 10—Drawing.

(56) References Cited

OTHER PUBLICATIONS

Deposition of Thomas Selgas, Oct. 27, 2004, with deposition exhibits: Exhibit 11—Def. AT7T Corp.'s Amended First Notice of Deposition of Plaintiff MyMail, Ltd.; Exhibit 12—'290 Patent Presentation to AT&T; Exhibit 13—Handwritten Diagram by Mr. Selgas; Exhibit 14—'290 Patent Presentation to AT&T; Exhibit 15—Sam Spade related document; Exhibit 16—Screen shot regarding MyMail testing; Exhibit 17—Sam Spade related document; Exhibit 18—Ethereal document; Exhibit 19—Ethereal document; Exhibit 20—Document pertaining to //cookies.js; and Exhibit 21—Document regarding MyMail testing.
Deposition of Thomas Selgas, Nov. 3, 2004, with deposition exhibits: Exhibit 3A—Preliminary Infringement Claim Chart for the '290 patent; Exhibit 22—America Online's first amended notice of deposition to MyMail; Exhibit 23—Hand-drawn sketch; Exhibit 24—MYMAIL 518463-518472; Exhibit 25—MYMAIL 517937-517941; Exhibit 26—MYMAIL 443353-443390; Exhibit 27—MYMAIL 440043-440365; and Exhibit 28—MYMAIL 439800-439816.
Deposition of Thomas Selgas, Dec. 8, 2004, with deposition exhibits: Exhibit 46—Notebook; MYMAIL 642124-64218; and Exhibit 47—Notebook; MYMAIL 642181-642227.
Deposition of Thomas Selgas, Dec. 9, 2004, with deposition exhibits: Exhibit 48—MYMAIL 2559-2560; Exhibit 49—MYMAIL 643828-643835; Exhibit 50—MYMAIL 1555-1560; Exhibit 51—MYMAIL 642375-642416; Exhibit 52—MYMAIL 16115-16133; Exhibit 53—MYMAIL 517674-517700; Exhibit 54—MYMAIL 643759-643764; Exhibit 55—MYMAIL 328-329; Exhibit 56—MYMAIL 642008; Exhibit 57—MYMAIL 642027; and Exhibit 58—MYMAIL 642971.
Deposition of Thomas Selgas, Dec. 10, 2004, with deposition exhibits: Exhibit 59—E-mail string, MYMAIL 985-986; Exhibit 60—Business plan, MYMAIL 2576-2694; Exhibit 61—MYMAIL 2815-2970; and Exhibit 62—MYMAIL 631808-631812.
Deposition of Thomas Selgas, Jan. 25, 2005, with deposition exhibits: Exhibit 1—Defendant GTE.Net LLC's First Notice of Deposition to Plaintiff MyMail, Ltd.; Exhibit 2—MyMail's Preliminary Infringement Contentions for GTE.Net LLC; Exhibit 3—Preliminary Infringement Claim Chart for U.S. Pat. No. 6,571,290 B2, GTE.Net LLC; Exhibit 4—Dec. 15, 2004 MyMail presentation to GTE.Net; and Exhibit 5—U.S. Pat. No. 6,571,290.
Deposition of Thomas Selgas, Mar. 1, 2005, with deposition exhibits: Exhibit 6—Defendant GTE.Net LLC's Notice of Deposition to Plaintiff MyMail, Ltd. Regarding Source Code; Exhibit 7—MYMAIL 334344 CD directories and files list; Exhibit 8—MYMAIL 334343 CD directories and files list; Exhibit 9—ASCII representation of NetSafe database; Exhibit 10—ASCII representation of database and index files; Exhibit 11—Version 3.0 database index files; Exhibit 12—2.0 Beta Release Candidate 10; Exhibit 13—ASCII representation of NSDB and NSDBX; Exhibit 14—Wise installation script in ASCII form; Exhibit 15—Wise installation script in ASCII form; Exhibit 16—Version 3.0 Beta Review; NetSafe 3.0 (RC20) Beta Test; Exhibit 17—Web page prototype; Exhibit 18—Proposed help file and walk-through for alpha testers; Exhibit 19—Netrepreneur Training Course; Exhibit 20—Wise manifest, script summary; Exhibit 21—Wise manifest document; Exhibit 22—Wise manifest document, NEAT Phone Update; Exhibit 23—Registration Wizard version 1.5 source code; Exhibit 24—Combination of Wise manifest with complete Wise dump; Exhibit 25—Wise Installation System Script; Exhibit 26—Wise Installation System Script version 4.23; Exhibit 27—Wise Installation System Script for NetSafe registration and configuration; Exhibit 28—Snippet of code belonging to the Navigation Center; Exhibit 29—Wise script for stamping tool; Exhibit 30—Program Hwiz code; Exhibit 31—Program credstf document; Exhibit 32—Pascal unit PCODUtil; Exhibit 33—Pascal unit PingUtl; Exhibit 34—Pascal unit RegUtil; Exhibit 35—Pascal unit Srvtype; Exhibit 36—Pascal code NetSafe Dialer; Exhibit 37—Pascal code unit Dialer16; Exhibit 38—Pascal code unit Dialer32; Exhibit 39—Pascal code unit Dutil; Exhibit 40—PERL code ISP Processing Module; Exhibit 41—PERL code Transaction Processing Module; * Exhibit 42—PERL code Open Test DB; Exhibit 43—Print-out not identified; and Exhibit 44—Print-out not identified.
Deposition of Thomas Selgas, May 5, 2005, with deposition exhibits: Exhibit 200—Selgas Amended Deposition Notice; Exhibit 201—MyMail Objections to UOL Amended Deposition Notice; Exhibit 202—Presentation to Juno; Exhibit 203—Presentation to Juno; Exhibit 204—Presentation to NetZero; Exhibit 205—Presentation to BlueLight; Exhibit 206—MYMAIL 517725-517750; Exhibit 207—MYMAIL 449038-449055; Exhibit 208—MYMAIL 470273-470543; Exhibit 209—MYMAIL 451426-451480; Exhibit 210—MYMAIL 503456-503708; Exhibit 211—MYMAIL 470544-470574; Exhibit 212—MYMAIL 485810-486670; Exhibit 213—MYMAIL 491789; Exhibit 214—Exhibit 5 U.S. Pat. No. 6,571,290; Exhibit 215—Preliminary Infringement Claim Chart for U.S. Pat. No. 6,571,290 B2 NetZero, Inc.; Exhibit 216—Preliminary Infringement Claim Chart for U.S. Pat. No. 6,571,290 B2 Juno Online Services, Inc.; Exhibit 217—Preliminary Infringement Claim Chart for U.S. Pat. No. 6,571,290 B2 NetZero, Inc. NetBrands, Inc.; and Exhibit 218—MyMail's Preliminary Infringement Contentions.
Deposition of Thomas Selgas, May 13, 2005.
Deposition of Thomas Selgas, Jun. 2, 2005, with deposition exhibits: Exhibit 64—Notice of Service of Subpoena; Exhibit 65—E-mail to Derby from Selgas, Jun. 22, 1997, MYMAIL 643877; Exhibit 66—E-mail to Selgas from Derby, Aug. 22, 1997, MYMAIL 643847; Exhibit 67—Email to Selgas from Derby, Aug. 23, 1997, MYMAIL 643848; and Exhibit 68—Email to O'Neil from Carr, Sep. 21, 1998, MYMAIL 646329.
Deposition of Thomas Selgas, Sep. 16, 2005, with deposition exhibits: Exhibit 1—Subpoena; Exhibit 2—NetSafe, Inc. Net Cash Projection; Exhibit 3—E-mail from Wooters to Gmuender, Gallagher and Selgas; Exhibit 4—Unsigned promissory note; Exhibit 5—Promissory note signed by Selgas; Exhibit 6—Memo to NetSafe, Inc. Employees from Erickson, Mar. 4, 1999; Exhibit 7—Timeline; Exhibit 8—Memorandum Opinion; and Exhibit 9—Selgas presentation to Earthlink.
Deposition of Jeffrey O. Smith, Aug. 18, 2005.
Deposition of Jeffrey O. Smith, Mar. 30, 2005, with deposition exhibits: Exhibit 1—Subpoena for Appearance at Deposition; Exhibit 2—Declaration of Jeff Smith; Exhibit 3—U.S. Pat. No. 6,571,290; and Exhibit 4—VIN Drawing by Mr. Smith.
Deposition of Jeffrey O. Smith, Aug. 22, 2005, with deposition exhibits: Exhibit 11—U.S. Pat. No. 6,571,290; Exhibit 230—Subpoena; Exhibit 237—Court's Claim Construction Opinion; and Exhibit 239—SPI Record Display.
Deposition of Andrew Viger, Aug. 15, 2005, with deposition exhibit: Exhibit 1—Aug. 10, 2005 Declaration of Andrew Viger.
Deposition of Homan Wooters, Jul. 28, 2005, with deposition exhibits: Exhibit 1—Notice of Subpoena; Exhibit 2—Statement of Holman Wooters; Exhibit 3—E-mail re: Spouse involvement; Exhibit 4—Public announcement; Exhibit 5—Nondisclosure Agreement for Jim Leo; Exhibit 6—Nondisclosure Agreement for David Johnson; and Exhibit 8—Promissory Note.
Non-confidential excerpt of confidential 30(b)(6) deposition of Abhijit Khale (NetBrands, NetZero, Juno) with deposition exhibit 1 (Jul. 11, 2005).
Non-confidential excerpt of confidential deposition of Justin Newton, Nov. 10, 2004, with deposition exhibit 2 and 3.
Non-confidential excerpt of confidential deposition of Cyrus Pejoumand, May 26, 2005, with deposition exhibit 5.
Non-confidential excerpt of confidential deposition of Michael Sharp, Aug. 11, 2005, with deposition exhibit 1.
U.S. Appl. No. 13/573,311; Office Action; dated Sep. 10, 2014.
Plaintiff MyMail's Markman Claim Construction Brief, Mar. 3, 2005, including: Exhibit A—Declaration of Jeff Smith in Support of Claim Construction of U.S. Pat. No. 6,571,290, Mar. 5, 2005 (with attached Curriculum Vitae); and Exhibit B—U.S. Pat. No. 6,571,290 (Selgas).
Plaintiff's Markman Presentation, Opening, Apr. 6, 2005.
Plaintiff's Markman Presentation, Claim Terms, Apr. 6, 2005.
Plaintiff's Presentation Slides unavailable on Apr. 6, 2005 (submitted Apr. 7, 2005).

(56) References Cited

OTHER PUBLICATIONS

Claim Construction Memorandum Opinion issued by the Honorable Leonard Davis, Jun. 3, 2005.
Transcript of Markman Hearing Before the Honorable Leonard Davis, Apr. 6, 2005.
Richard D. Grauer Expert Report, Jun. 30, 2005.
M.Y. Sanadidi Expert Report, Jun. 22, 2005 Exhibit A—Curriculum Vita of M.Y. Sanadidi, Ph.D. Exhibit B—Listing re: Materials Review for Preparation of Report Exhibit C—Summary chart re: '290 patent and Juno 1.0 prior art Exhibit D—Illustrations re: Juno 1.0 operating system Exhibit E—Summary chart re: '290 patent and IBM TDB Exhibit F—Summary chart re: '290 patent and Kleinrock patent.
Jeffrey O. Smith Expert Report, Mar. 5, 2005.
Jeffrey O. Smith Supplemental Expert Report, Sep. 30, 2005.
Jeffrey O. Smith Expert Report, Jul. 1, 2005.
John R. Vollbrecht Expert Report, Jul. 1, 2005.
Ellen W. Zegura Addendum to Initial Expert Report, Oct. 19, 2005.
America Online, Inc., program files, (1996), including: AOL 028466-028480, America Online Program Diskettes; AOL 116227, Internet in a Box, Disk 1 of 3; AOL 116229, Interent in a Box, Disk 2 of 3 AOL; 116229, Interent in a Box, Disk 3 of 3; AOL 116422, Studio M Lite Gold Disk; AOL 116422, Studio M Lite Gold Disk; AOL 116423, Internet in a Box, Disk 1; AOL 116425, Internet in a Box Disk 2; AOL 116427, Internet in a Box, Disk 3; AOL 116429, Internet in a Box Disk 4; AOL 116433, Spry Mosaic Direct CD ROM; and AOL 116435, Spry Mosaic Direct CD ROM; AOL 116546, Spry Mosaic in a Box CD ROM.
AT&T Corp., AT&T WorldNet Service Quick Start Guide, Internet Access, Version 1.0 (Apr. 12, 1996), ATT 003136-003169.
Earthlink Network, Total Access in the Internet, Earthlink Program Diskettes (1995), ELNKMM 008107-008117.
Earthlink Network, Earthlink Screen Shots (2004), ELNKMM 008125-008147.
ELNKMM 013042-013152, Mindspring materials (as early as 1994).
Earthlink Network, program file ELN Browserless Cammel Build, Burn #1 (Oct. 18, 1999), ELNKMM014304.
Earthlink Network, program file Startrek 400065513 Certified Master 200105240947, W5.068-67, M:2-253/2.5.7 (Aug. 31, 2001), ELNKMM014305.
Earthlink Network, program file E5.01 Certified Master Source Copy (Dec. 28, 1999), ELNKMM014306.
Earthlink Network, program file Earthlink 5.0, Build#2D, Win 98/99, TA2.3.2 WIN95, TA2.1.5 MAC, (Nov. 17, 1999), ELNKMM014307.
Earthlink Network, program file Earthlink 5.0 DSL, Build#1d, Copy Certified Master, Win 98/99SE, TA.2.1.5MAC, (Nov. 17, 1999), ELNKMM014308.
Earthlink Network, program file Earthlink Network TA 2.3. 2REF#5, Reg#rf2004, Build#1, (Jun. 4, 1999), ELNKMM014309.
Earthlink Network, program file Earthlink, Certified Master Build#4, PACPPC 68k2.1.7, Pergrine, (Jul. 11, 2000), ELNKMM014310.
Earthlink Network, program File ELN IE Canned, Build Domestic 1286t, Build#1p (Oct. 17, 1999), ELNKMM014311.
Earthlink Network, program file ELN IE Canned build, International 40 bit, Build#1p, (Oct. 18, 1999), ELNKMM014312.
Earthlink Network, program file Packard Bell Rebate Offer-2, Reg#050005, (Oct. 20, 1998), ELNKMM014313.
Earthlink Network, program file BOL Gold 980812, (Jun. 3, 2005), ELNKMM014315.
Earthlink Network, program file BOL Gold, (Aug. 18, 1998), ELNKMM014316.
Earthlink Network, program file Direct Partners, GM CD#1, Build#3, Peregrine, (Apr. 18, 2000), ELNKMM014317.
Earthlink Network, program file COMPUSA OEM, Browserless Build, Reg#RET099, Job#12, 179981024, Earthlink Network, Inc., (Dec. 23, 1998), ELNKMM014318.
Earthlink Network, program file Tribune Marketing, Capetal Hill People Fair, Reg#400052260, Build#1 D, Earthlink WIN98/E5, PPC2.1.5, (Jun. 3, 2005), ELNKMM014319.
Earthlink Network, program file Earthlink, Inc. E5.06 #19, 400042822, Build#3, SANWISE, Job:071120001200, WIN9X 5.03#19, (Jul. 12, 2000), ELNKMM014320.
Earthlink Network, program file Reference Build 1, 5.03.42 Affinity Mem, Earthlink, Inc. 121820, (Jan. 3, 2001), ELNKMM014321.
Earthlink Network, program file Earthlink E5.06.8re12, 400042822 / AMD 54, Burn 1s, Job 200107131942, W.5.06.8, Dialup#4, (Jul. 24, 2001), ELNKMM014322.
Earthlink Network, program file Carolina Mudcats, 60 Days for 1, 400051300, Build#1 SAMWISE, Job: 050320001134, (May 9, 2000), ELNKMM014323.
Earthlink Network, program file UCLA BOL Gold, TA2.02 MAC, TA2.2 Win 95/98, Job#082419980537, (Aug. 17, 1998), ELNKMM014324.
Earthlink Network, program file MAC0101070514252206, Earthlink Pwc., OSC 2.5.5 ref#6, Classic 2.5.1, (Aug. 3, 2001), ELNKMM014348.
Earthlink Network, program file MAE0001070510252203, Earthlink Pwc., OSC 2.5.5, ref#3, Classic 2.5.1, (Aug. 2, 2001), ELNKMM014349.
Earthlink Network, program file MAZ0101070514252206, Earthlink Pwc., OSX2.5.3 ref#6, Classic 2.5.1, (Aug. 10, 2001), ELNKMM014350.
Earthlink Network, program file Earthlink 2.565/2.5261, Classic Carbo, 010619, Mac World CD Reference, (date unknown), ELNKMM014351.
Earthlink Network, program file TA 2.1.761, 000612 (date unknown), ELNKMM014352.
Earthlink Network, program file P08022001084758, Earthlink Pwc, M2.2.166, DSL, (Mar. 2, 2001), ELNKMM014354.
Earthlink Network, program file 2.5.1/2.5.3, Original Media, Dev. Ref. Build, Earthlink Genesis Project, Star Tile K.Net, 012407, 260 megs, (date unknown), ELNKMM014355).
Earthlink Network, program file E5 Source Backup, 5.07.7 R2 Thru 5.07.9 R1, SAMWISE (Feb. 8, 2002), ELNKMM014356.
Earthlink Network, program file E5.06.7, E5.06.8, Source Backup, 200104726, (Jun. 21, 2001), ELNKMM014357.
Earthlink Network, program file Job#092419981507, Earthlink Network, Packard Bell Rebate Offer, Reg#802133, Uncertified Copy, (Sep. 25, 1998), ELNKMM014358.
Earthlink Network, program file E5.05.4 and E5.05.5 (Jan. 26, 2001), ELNKMM014359.
Earthlink Network, program file E5.07.1 and E5.01.2 (Sep. 11, 2001), ELNKMM014360.
Earthlink Network, program file E506.90 and E5.06.91 (Sep. 16, 2001), ELNKMM014361.
Earthlink Network, program file Old USAA 5.02 (Apr. 18, 2000), ELNKMM014362.
Earthlink Network, program file Earthlink TotalAccess 2.3 (Mar. 10, 1999), ELNKMM014364.
Earthlink Network, program file Sprint ION, 400048961, Build#1 R, Job#122819991502, (Dec. 29, 1999), ELNKMM014277.
Earthlink Network, program file UCLA BOL GOLD, Build#3, Peregrine, Job:062320001100, (Jul. 6, 2000), ELNKMM014278.
Earthlink Network, program file Earthlink E5.03#39, 400042822, Build#1, SAMWISE, Job:10172000145915, (Oct. 18, 2000), ELNKMM014279.
Earthlink Network, program file DOT Planet, 400060445, Burn#1 P, 200101081443, (Jan. 18, 2001), ELNKMM014280.
Earthlink Network, program file Hewlet Packard, OMNI Book Pall, Burn#2, (2001), ELNKMM014282.
Earthlink Network, program file BM Fall 2001, OEMXP 400065204, Burn '1CS, W.5.06.9 lite 2, Dialup OEM, (Aug. 2, 2001), ELNKMM014283.
Earthlink Network, program file E5.06.8Rev2, 400042822, Burn#1S, WIN20010713194253, W.5.06.8, Dialup#3, (Jul. 27, 2001), ELNKMM014284.
Earthlink Network, program file Sony UaoLINE, Fall 2001Y, 400065244, Burn#1C-S, 200107200853, W.5.06.9, LITE2, Dialup OEM, (Aug. 2, 2001), ELNKMM014285.
Earthlink Network, program file Earthlink E05.6 Rev:1, Burn#1 SAMWISE, P01182001165633, WIN9X/ME5.05.6, Dialup, (Jan. 19, 2001), ELNKMM014286.

(56) References Cited

OTHER PUBLICATIONS

Earthlink Network, program file Direct Partners, 6M CD1, 400054757/400050901, Build#1, Peregrine, (Apr. 20, 2000), ELNKMM014287.
Earthlink Network, program file Earthlink, Inc., E5.03F09 AMID, 400042822, Build#1 SAMWISE, Job:P1617200014551, win9x 5.03 #39, (Oct. 8, 2000), ELNKMM014288.
Earthlink Network, program file Earthlink, Inc., TA 2.1.7-E.502, Small Media Ref, Build 1 Frodo, 062720001439, (Jul. 14, 2000), ELNKMM014289.
Earthlink Network, program file DP GMCD#1, Build#5, Peregrine (Apr. 18, 2000), ELNKMM014290.
Earthlink Network, program file Earthlink 5.0, Ifs Your Internet, B70.1-R2-0100, (2000), ELNKMM014291.
Earthlink Network, program file Earthlink Gold, vol. 6, WIN95/98V.2.3, MAC V2.1, Premium Internet Access, (1999), ELNKMM014292.
Earthlink Network, program file TA GOLD, Build#1, (Jun. 7, 2000), ELNKMM014293.
Earthlink Network, program file Earthlink 5.01, E5.01 Test Build, Build#8, Burn#1 (Dec. 20, 1999), ELNKMM014294.
Earthlink Network, program file USAA 5.03 Test, No. elnbonus.cfg; .cnt; .exe; .hlp (Dec. 8, 2000), ELNKMM014295.
Earthlink Network, Inc., Total Access Internet (1996), ELNKMM 014366-014375.
Mindspring Enterprises, Inc., Internet Access Software Windows version 2.0, (1995), ELNKMM 014385-014388.
Betty, Gary, Organizational Chart, (date unknown), ELNKMM 014394-014395.
Earthlink Network, Screen shots, Total Access 1.0 (date unknown), ELNKMM 015597-015634.
SBC Yahoo!, Software Installation Guide (date unknown), SBC 051021-051051.
SBC Yahoo! Software Installation Guide (date unknown), SBCMM 051684-051714.
U 003118-003119, Juno and Netzero executables (Jun. 27, 2005).
Juno, Illustration of claims 1, 11, 12, 13 with respect to use case 1 (registration and regular use), (date unknown).
Juno, Illustration of claims 1, 11, 12, 13 with respect to use case 2 (mail server rebinding), (date unknown).
Juno, Illustration of claims 3, 4, 5, 6, 8 with respect to use case 3 (phone number update), (date unknown).
Juno, Illustrations summarizing Juno 1.0 Use Cases (date unknown).
Print-out re: dialwiz.cpp, (date unknown), SAN0293-0315.
Print-out re: freemail.cpp, (date unknown), SAN0237-0253.
Print-out re: options.cpp, (date unknown), SAN0268-0274.
Print-out re: pop.nv, (date unknown), SAN0225-0233.
Print-out re: sample_bindings, (date unknown), SAN0326.
Print-out re: scripts, (date unknown), SAN0234-0236.
Print-out re: servuser.cpp, (date unknown), SAN0316-0318.
Print-out re: spooler.cpp, (date unknown), SAN0275-0292.
Print-out re: tcom.cpp, (date unknown), SAN0254-0267.
Print-out re: udb_create_fsm.cpp, (date unknown), SAN0319-0325.
Compuserve, Network Access Numbers, CompuServe Network Services (date unknown), AOL 086221-086256.
UOL's Reply in Support of its Motion for Summary Judgment of Noninfringment, Sep. 6, 2005; Exhibit A—Excerpts from transcript of deposition of Jeffrey O. Smith, Aug. 18, 2005 Exhibit B—Excerpts from transcript of deposition of Michael Sharp, Aug. 11, 2005 Exhibit C—Excerpts from transcript of deposition of Jeffrey O. Smith, Aug. 22, 2005.
MyMail's Sur-Reply to UOL Defendants' Motion for Summary Judgment of Non-Infringement, Sep. 16, 2005.
Plaintiff MyMail's Sur-Reply to Prodigy and SBIS' Reply in Support of its Motion for Summary Judgment of Non-Infringement, Sep. 29, 2005.
Engst, Adam C., et al., "Spry Internet in a Box," Internet Starter Kit for Windows, Hayden Books, 1995.
Higgs, Scott, "Windows to the Internet," Byte, Jul. 1995, AOL 117741-117747.
Internet in a Box: Getting Started, O'Reilly & Associates, Inc., 1994.
Internet in a Box: Installation & Configuration Guide, O'Reilly & Associates, Inc., 1994.
Online Catalog: Internet in a Box, www.oreilly.com (Jun. 1995), AOL117830-117832.
Travel the Information Highway on Your PC, Byte.com, Apr. 1994.
U.S. Appl. No. 13/079,015, filed Apr. 4, 2011, Method of Obtaining a Network Address.
Copending U.S. Appl. No. 14/860,633, filed Sep. 21, 2015; first-named inventor: Selgas.
Copending U.S. Appl. No. 14/853,849, filed Sep. 14, 2015; first-named inventor: Selgas.
HAProxy, The Reliable, High Performance TCP/HTTP Load Balancer, Nov. 1, 2015, ClientConnect Ex. 1022-1 through 1022-14.
Microsoft MS-DOS User's Guide, Version 5.0, May 17, 1990, ClientConnect Ex. 1021-1 through 1021-148.
U.S. Appl. No. 14/254,487; Office Action dated Feb. 16, 2016.
Hot Stuff!, Home PC, vol. 3, Issue 2, Feb. 1996, ATT 019619-019621.
Juno Signs up 100,000 Members in First Two Months, (press release), Jul. 2, 1996, U 001176-001177.
Kane, Pamela., Prodigy!!!, Wilmington, DE, Panda Press, 1994, SBCIMM 000754-000756.
Merriam-Webster; "Database—Definition from the Merriam-Webster Online Dictionary"; http://www.merriam-webster.com/dictionary/database, Apr. 8, 2009.
Meyer, B. et al.; Enabling networking between heterogeneous distributed platforms, Distributed Platforms: Client/Server and Beyond: DCE, CORBA, ODP and Advanced Distributed Applications, Proceedings of the IFIP/IEEE International Conference on; p. 329-341; Feb./Mar. 1996 (abstract).
Microsoft Announces 'Normandy,' a New Platform for Commercial Internet Services: First Solution Designed Specifically for ISPs, Commercial Web Sites, Microsoft PressPass, Jun. 4, 1996, ATT 018210-018212.
Microsoft Corp., "Customizing the Standard Buttons toolbar in Internet Explorer"; http://support.microsoft.com/kb/198177; Microsoft Corp., May 10, 2007.
Microsoft Corp., "How to Customize the Quick Launch Toolbar"; http://support.microsoft.com/kb/171206; Microsoft Corp., Jun. 5, 2007.
Microsoft Corp., "How to Customize the Toolbars in Internet Explorer"; http://support.microsoft.com/kb/153593; Microsoft Corp., Jan. 19, 2007.
Microsoft Corp., "How to Re-create the View Channels Icon on Quick Launch Toolbar"; http://support.microsoft.com/kb/195737; Microsoft Corp., Feb. 27, 2007.
Microsoft Corp.; "About Dynamic Data Exchange"; http://msdn.microsoft.com/en-us/library/ms648774(printer).aspx; Microsoft Corp., 2009.
Microsoft Corp.; "Introduction to ActiveX Controls"; http://msdn.microsoft.com/en-us/library/aa751972(VS.85,printer).aspx; Microsoft Corp., 2009.
Microsoft Corp.; "Windows History—Internet Explorer History"; http://www.microsoft.com/windows/WinHistoryIE.mspx; Microsoft Corp., Jun. 30, 2003.
Microsoft Corp.; "How to Package Components for Internet Distribution"; http://msdn.microsoft.com/en-us/library/aa741200(VS. 85).aspx Apr. 6, 2009.
Microsoft Corp.; "Registry (Windows)", http://msdn.microsoft.com/en-us/library/ms724871.aspx, Apr. 2, 2009.
Microsoft Corp.; "NT 4.0 Resource Kit Utilities Corrections and Comments"; http://support.microsoft.com/kb/159564, Jan. 19, 2007.
Microsoft Corp.; "SysAdmin Installs Incorrectly from Normandy Beta 2 CD"; http://support.microsoft.com/kb/158988, Sep. 30, 2003.
Microsoft Corp.; "Microsoft Announces Record Fiscal 1996 Revenues and Income"; http://download.microsoft.com/download/9/6/7/9671cf43-454f-4cde-b2d6-dc49c9a4a57a/FY1996Q4_earnings.doc, Jul. 22, 1996.
Miller, Michael, Using Prodigy—The Fast and Easy Way to Learn, Indianapolis, IN, Que Corporation, 1995, SBCIMM 000751-000753.

(56) References Cited

OTHER PUBLICATIONS

More Big Guns Enter Microsoft—Justice Fray, Newsbytes, Aug. 9, 1995, ELNKMM 008059-008061.
NC State College; "Parts of a Web Browser;" http://www.ncstatecollege.edu/Webpub/ccraig/images/Searching_the_Web.pdf; North Carolina State College; Jan. 31, 2006.
News in Brief, Electronic Advertising & Marketplace Report, vol. 11, Issue 14, Jul. 15, 1997, ATT 018242-018243.
Schnoll, Scott; "The History of Internet Explorer"; http://www.nwnetworks.com/iehistory.htm; 2001.
Seidman, Robert, "Seidman's Online Insider", vol. 3, No. 23, Jun. 7, 1996, AOL 011268-011274.
Sinha, Alok and Clore, Don and Phurrough, Dale; "Behind the Scenes at MSN 2.0: Architecting an Internet-Based Online Service"; http://www.microsoft.com/msj/0497/msn20/msn20.aspx; Microsoft Systems Journal, Apr. 1997.
Wall Streets King Quant, Fortune, Feb. 5, 1996, U 001157-001161.
Web Basics Tutorial; "Parts of a Web Browser: Overview"; http://www.lib.unc.edu/instruct/community_tutorials/web/browsers/overview.html; University of North Carolina Library, Jan. 31, 2006.
Webopedia; "Browser"; http://www.webopedia.com/TERM/B/browser.html; WebMediaBrands Inc., May 5, 2008.
Webster's New World Dictionary of Computer Terms (excerpts), 6th Ed., Simon & Schuster, Inc., 1997; AOL078657.
Wikipedia; "Browser Helper Object"; http://en.wikipedia.org/wiki/Browser_Helper_Object; . Wikimedia Foundation, Inc., Feb. 16, 2009.
Wikipedia; "History of Internet Explorer"; http://en.wikipedia.org/wiki/History_of_Internet_Explorer; Wikimedia Foundation, Inc., Feb. 11, 2009.
Wikipedia; "Internet Explorer 3"; http://en.wikipedia.org/wiki/Internet_Explorer_3; Wikimedia Foundation, Inc., Feb. 28, 2009.
Wikipedia; "Internet Explorer"; http://en.wikipedia.org/wiki/Internet_Explorer; Wikimedia Foundation, Inc., Mar. 2, 2009.
Wikipedia; "Layout Engine"; http://en.wikipedia.org/wiki/Layout_engine; Wikimedia Foundation, Inc., Feb. 2, 2009.
Wikipedia; "List of Microsoft Windows application programming interfaces and frameworks"; http://en.wikipedia.org/wiki/List_of_Microsoft_Windows_application_programming_interfaces_and_frameworks; Wikimedia Foundation, Inc., Feb. 7, 2009.
Wikipedia; "Netscape Navigator"; http://en.wikipedia.org/wiki/Netscape_Navigator; Wikimedia Foundation, Inc., Feb. 26, 2009.
Wikipedia; "Window (computing)"; http://en.wikipedia.org/wiki/Window_(computing); Wikimedia Foundation, Inc., Apr. 4, 2009.
Wikipedia; "ActiveX"; http://en.wikipedia.org/wiki/ActiveX; Wikimedia Foundation, Inc., Apr. 2, 2009.
Wikipedia; "Browser"; http://en.wikipedia.org/wiki/Browser; Wikimedia Foundation, Inc., Mar. 15, 2009.
Wikipedia; "DDE"; http://en.wikipedia.org/wiki/DDE; Wikimedia Foundation, Inc., Jan. 14, 2009.
Wikipedia; "Dynamic Data Exchange"; http://en.wikipedia.org/wiki/Dynamic_Data_Exchange; Wikimedia Foundation, Inc., Mar. 5, 2009.
Wikipedia; "MIME"; http://en.wikipedia.org/wiki/MIME; Wikimedia Foundation, Inc., Apr. 1, 2009.
Wikipedia; "MIME Type"; http://en.wikipedia.org/wiki/MIME_type; Wikimedia Foundation, Inc., Mar. 24, 2009.
Wikipedia; "Tabbed Browsing"; http://en.wikipedia.org/wiki/Tabbed_browsing; Wikimedia Foundation, Inc., Mar. 30, 2009.
Wikipedia; "Web Browser"; http://en.wikipedia.org/wiki/Web_browser; Wikimedia Foundation, Inc., Apr. 3, 2009.
Wikipedia; "Database"; http://en.wikipedia.org/wiki/Database; Wikimedia Foundation, Inc., Mar. 30, 2009.
Wikipedia; "Mosaic (web browser)"; http://en.wikipedia.org/wiki/Mosaic_(web_browser); Wikimedia Foundation, Inc., Apr. 22, 2009.
Zorn, Glen, "Dialup Roaming," Microsoft Corporation, Apr. 8, 1997, SBCIMM 000357-000382.
Clancy, Heather, "Internet service providers: Long term survival tied to value-added offerings," Computer Reseller News, Issue 674, p. 68, Mar. 11, 1996.

Copending U.S. Appl. No. 14/466,221, filed Aug. 22, 2014; first-named inventor: T. Selgas.
Office Action for U.S. Appl. No. 14/853,849, dated Mar. 9, 2017.
Preliminary Amendment for U.S. Appl. No. 14/853,849, dated Aug. 12, 2016.
U.S. Appl. No. 13/871,409; Notice of Allowance; dated Dec. 29, 2014.
U.S. Appl. No. 13/573,311; Notice of Allowance; dated Jul. 7, 2015.
Copending U.S. Appl. No. 14/466,221 field Aug. 22, 2014; first-named inventor: T. Selgas.
Office Action for U.S. Appl. No. 14/254,487, dated Feb. 16, 2016.
Final Office Action for U.S. Appl. No. 14/254,487, dated Nov. 30, 2016.
U.S. Appl. No. 09/872,474; Application as filed Jun. 1, 2001; Inventor: John Guthrie.
Ask Apache; "Alexa Toolbar Add-On for Firefox Works!"; http://www.askapache.com/tools/alexa-toolbar-firefox.html; Aug. 20, 2007.
Automatic Local Access Number Selection, IBM Technical Disclosure Bulletin, vol. 38, No. 8, pp. 237-238, Aug. 1995, U 003121-003122.
Berners-Lee, T. and Connolly, D.; "Hypertext Markup Language—2.0"; http://tools.ietf.org/html/rfc1866; Network Working Group, Nov. 1995.
Connolly, D. and Masinter, L.; "The 'text/html' Media Type"; http://tools.ietf.org/html/rfc2854; Network Working Group, The Internet Society; Jun. 2000.
Cutts, Matt; "Gadgets, Google, and SEO—Toolbar Beta 4"; http://www.mattcutts.com/blog/toolbar-beta-4/; Jan. 30, 2006.
dictionary.com; "database definition"; http://dictionary.reference.com/browse/database, Apr. 8, 2009.
Digital Shelf Space, Wired, Dec. 1995, U 001142-001143.
Fielding, R. et al; "Hypertext Transfer Protocol—HTTP/1.1"; Network Working Group, Jan. 1997; http://tools.ietf.org/html/rfc2068.
Fielding, R. et al; "Hypertext Transfer Protocol—HTTP/1.1"; Network Working Group, Jun. 1999; http://tools.ietf.org/html/rfc2616.
Firdman, Eric, "How to Unclog the Internet," The New York Times, Feb. 9, 1997, ATT 018373-018374.
Free e-mail service Juno says has 100,000 members, Reuters America, Inc., Jul. 2, 1996, U 001095-001096.
Free Mail, Part Two: Two Companies Announce Free Internet E-mail Services, Multimedia & Videodisc Monitor, Aug. 1995, U 001181-001182.
Free Online Dictionary of Computing; "Browser"; http://foldoc.org/?query=browser; May 31, 1996.
Free Online Dictionary of Computing; "Database"; http://foldoc.org/index.cgi?query=database; Nov. 17, 2005.
Free Online Dictionary of Computing; "Document"; http://foldoc.org/index.cgi?query=document; Oct. 25, 2003.
Free Online Dictionary of Computing; "MIME==> Multipurpose Internet Mail Extensions"; http://foldoc.org/?query=MIME; Apr. 4, 1995.
Free Online Dictionary of Computing; "Toolbar"; http://foldoc.org/?query=toolbar; Oct. 24, 2003.
Free Online Dictionary of Computing; "Window System"; http://foldoc.org/?query=window+system; Mar. 3, 2009.
Going Beyond, Media Week, Jul. 8, 1996, U 001097-001098.
Gonzalez, Fred; "Massing/Gmuender Declaration" Electronic Mail of Mar. 12, 2009.
Hardmeier, Sandi; "The History of Internet Explorer"; http://www.microsoft.com/windows/ie/community/columns/historyofie.mspx; Microsoft Corp., 0825-2005.
Highbeam Research; "Free utility from Infoseek adds live search box to browser"; http://www.highbeam.com/doc/1G1-18752480.html; Information Today, Oct. 1, 1996.
Highbeam Research; "Infoseek Introduces Utility to Add Search Capabilities to Netscape Navigator"; http://www.highbeam.com/DocPrint.aspx?DocId=1G1:18633135; PR Newswire, Sep. 3, 1996.
Highbeam Research; "New Version of Infoseek Quickseek Lets Users Search the Internet Directly From the Browser Address/Locator Bar"; http://www.highbeam.com/DocPrint.aspx?DocId=1G1:19146270; PR Newswire, Feb. 24, 1997.
I Own, Therefore I Am, NetGuide, vol. 2, Issue 8, Aug. 1, 1995, ELNKMM 008047-008049.

(56) References Cited

OTHER PUBLICATIONS

Juno Enters Free E-mail Race, Electronic Marketplace Report, Jul. 18, 1995, U 001213-001214.
Juno Jumps on Free E-Mail Bandwagon, DM News, Jan. 15, 1996, U 001183—001184.
U.S. Appl. No. 13/079,015; Non-Final Office Action dated Jan. 14, 2015.
U.S. Appl. No. 13/079,015; Final Office Action dated Sep. 14, 2015.
U.S. Appl. No. 13/079,015; Non-Final Office Action dated Aug. 26, 2016.
U.S. Appl. No. 13/079,015; Notice of Allowance dated Jun. 14, 2017.
*United Patents, Inc.* v. *MyMail, Ltd.*; Petition for Inter Partes Review of U.S. Pat. No. 6,757,913, IPR2017-00967, filed Feb. 24, 2017, 67 pgs.
U.S. Appl. No. 13/923,115; Notice of Allowance; dated Jan. 22, 2015.
U.S. Appl. No. 13/573,311 filed Sep. 10, 2012 entitled Method of Modifying a Toolbar; first-named inventor: Selgas.
U.S. Appl. No. 09/100,619, filed Jun. 19, 1998 entitled, "Method and Apparatus for Providing Fungible Intercourse Over a Network"; First-Named Inventor: Selgas.
U.S. Appl. No. 10/417,862, filed Apr. 16, 2003 entitled, "Method for Providing a Network Address"; First-Named Inventor: Selgas.
IBM, Systems Network Architecture, 11th Ed., Jun. 1989, 562 pgs.
Microsoft Press Computer Dictionary (excerpts), 2nd Ed., Microsoft Press, 1994, 3 pgs.
Microsoft Press Computer Dictionary (excerpts), Microsoft Press, 1998, 3 pgs.
Microsoft Press Computer Dictionary (excerpts), 4th Ed., Microsoft Press, 1999, 3 pgs.
Microsoft Press Computer Dictionary (excerpts), 5th Ed., Microsoft Press, 2002, 3 pgs.
McGraw Hill Dictionary (excerpts), 4th Ed., Microsoft Press, 1994, 4 pgs.
Meyer, The Best of the Worst, The Wall St. J. (May 3, 2006), 8 pgs.
Krol, The Whole Internet, 2nd Ed., (1994), 4 pgs.
Information Week—Connecting the Business Technology Community, "Y2K Shuts Down Prodigy Classic," Jan. 25, 1999 (http://www.informationweek.com/y2kshuts-down-prodigy-classic/ d/ d-id/.1 006 720), 2 pgs.
Mannes, "Prodigy in Web Revamp," Daily News (New York), Oct. 17, 1996 (http://www.nydailynews.com/archives/money/prodigy-web-revamp-article-1 .738779), 1 pg.
*MyMail, Ltd.* V. *Conduit Ltd., Conduit Inc., Conduit USA Inc., ClientConnect Ltd., and ClientConnect Inc.*, Case No. 2:13-cv-00961, filed Nov. 14, 2013.
*MyMail, Ltd.* V. *Nasdaq, Inc.*, Complaint for Patent Infringement, Case No. 2:16-cv-00889, filed Aug. 10, 2016.
*MyMail, Ltd.* V. *Yahoo!, Inc.*, Complaint for Patent Infringement, Case No. 2:16-cv-01000, filed Sep. 7, 2016.
*MyMail, Ltd.* V. *Oracle Corporation*, Complaint for Patent Infringement, Case No. 2:16-cv-01249, filed Nov. 9, 2016.
*MyMail, Ltd.* V. *Comcast Corporation*, Complaint for Patent Infringement, Case No. 2:16-cv-01280, filed Nov. 18, 2016.
*MyMail, Ltd.* V. *ooVoo, LLC*, Complaint for Patent Infringement, Case No. 2:16-cv-01281, filed Nov. 18, 2016.
*MyMail, Ltd.* V. *Panda Distribution, Inc.* d/b/a Panda Security US, Complaint for Patent Infringement, Case No. 2:16-cv-01282, filed Nov. 18, 2016.
*MyMail, Ltd.* V. *IAC Search & Media, Inc.*, Complaint for Patent Infringement, Case No. 2:16-cv-01434, filed Dec. 20, 2016.
*MyMail, Ltd.* V. *Duck Duck Go, Inc.*, Complaint for Patent Infringement, Case No. 2:16-cv-01474, filed Dec. 29, 2016.
*MyMail, Ltd.* V. *ESPN, Inc.*, Complaint for Patent Infringement, Case No. 2:17-cv-00200, filed Mar. 14, 2017.
*MyMail, Ltd.* v. *Huawei Technologies Co., Ltd. et al*, Complaint for Patent Infringement, Case No. 2:16-cv-01293, filed Nov. 23, 2016.
*MyMail, Ltd.* V. *ZTE USA, Inc, and ZTE Solutions, Inc.*, Complaint for Patent Infringement, Case No. 2:16-cv-01294, filed Nov. 23, 2016.
*MyMail, Ltd.* V. *HiSense USA Corporation*, Complaint for Patent Infringement, Case No. 2:16-cv-01352, filed Dec. 2, 2016.
*MyMail, Ltd.* V. *Lexmark International, Inc.*, Complaint for Patent Infringement, Case No. 2:16-cv-01353, filed Dec. 2, 2016.
*MyMail, Ltd.* V. *Fujifilm Corporation; Fujifilm Holdings Corporation; et al.*, Complaint for Patent Infringement, Case No. 2:16-cv-01357, filed Dec. 5, 2016.
*MyMail, Ltd.* V. *Acer America Corporation and Acer Inc.*, Complaint for Patent Infringement, Case No. 2:17-cv-00253, filed Apr. 3, 2017.
*MyMail, Ltd.* V. *Konica Minolta Holdings, U.S.A., Inc. and Konica Minolta Business Solutions, U.S.A., Inc.*, Complaint for Patent Infringement, Case No. 2:17-cv-00254, filed Apr. 3, 2017.
*MyMail, Ltd.* V. *Nikon Corporation a/k/a Tochigi Nikon Corporation, Nikon Inc., and Nikon Americas, Inc.*, Complaint for Patent Infringement, Case No. 2:17-cv-00255, filed Apr. 3, 2017.
*MyMail, Ltd.* V. *Pantech Corporation, Pantech Co., Ltd., and Pantech Wireless Inc. a/k/a Pantech North America*, Complaint for Patent Infringement, Case No. 2:17-cv-00256, filed Apr. 3, 2017.
*MyMail, Ltd.* V. *TCL Corporation, et al.*, Complaint for Patent Infringement, Case No. 2:17-cv-00257, filed Apr. 3, 2017.
*MyMail, Ltd.* V. *Honeywell International, Inc.*, Complaint for Patent Infringement, Case No. 2:17-cv-00391, filed May 3, 2017.
*MyMail, Ltd.* v. *Ricoh Company, Ltd. et al*, Complaint for Patent Infringement, Case No. 2:17-cv-00605, filed Aug. 23, 2017.
*MyMail, Ltd.* v. *Panasonic Corporation et al*, Complaint for Patent Infringement, Case No. 2:17-cv-00606, filed Aug. 23, 2017.
U.S. Appl. No. 13/079,015, filed Apr. 4, 2011 entitled Method of Obtaining a Network Address; First-Named Inventor: Selgas.
U.S. Appl. No. 13/079,015; Notice of Allowance dated Nov. 29, 2017.
Office Action for U.S. Appl. No. 14/254,487, dated Oct. 6, 2017.
Office Action for U.S. Appl. No. 14/853,849, dated Dec. 18, 2017.
Petition for Inter Partes Review, *IAC Search & Media, Inc.* v. *MyMail, Ltd.*, IPR2018-00118, Filed Nov. 17, 2017, Paper No. 1.
Petition for Inter Partes Review, *IAC Search & Media, Inc.* v. *MyMail, Ltd.*, IPR2018-00117, Filed Nov. 17, 2017, Paper No. 1.
Complaint in *MyMail, Ltd.* v. *ooVoo LLC*, c.a. No. 5:17-cv-04487 (N.D. Cal.) (exhibits omitted) (transferred from E.D. Tex.), Filed Nov. 18, 2016.
Complaint in *MyMail, Ltd.* v. *IAC Search & Media, Inc.*, c.a. No. 3:17-cv-04488 (N.D. Cal.) (exhibits omitted) (transferred from E.D. Tex.), Filed Dec. 20, 2016.
Complaint in *My Mail, Ltd.* v. *Yahoo Holdings, Inc.*, c.a. No. 3:17-cv-03098 (E.D. Tex.) (exhibits omitted), Filed Nov. 9, 2017.
Allen, Finding a Needle in a Virtual Haystack: Whois++ and the Whois++ Client Library, USENIX 9th Sys. Admin. Conf., pp. 25-34 (Sep. 1995).
Fielding, et al., "Hypertext Transfer Protocol—HTTP/1.1," HTTP Working Group, Internet-Draft <draft-ietf-http-v11-spec-07> (Aug. 12, 1996).
Freedman, The Computer Glossary, 8th ed., pp. 375 (1998).
Freedman, The Computer Glossary, 8th ed., pp. 89-90, 428, 463 (1998).
Glassman, S., A Caching Relay for the World Wide Web, Comp. Networks and ISDN Sys., pp. 69-76 (1994).
Hot Prospect: Desktop Delivery of Web Pages, PC Magazine, vol. 15, No. 10, p. 75 (May 28, 1996).
HTML3.2 Reference Specification Publication History, https://www.w3.org/standards/history/REC-html32.
I-D ACTION:draft-ietf-http-v11-spec-07.txt, IETF Mail Archive, https://mailarchive.ietf.org/arch/msg/ietf/XulqKkEFt4fIn8_BssbSq-YwFBY (Aug. 13, 1996).
Off-Line Browsers, PC Magazine, vol. 16, No. 17, pp. 207-218 (Apr. 8, 1997).
Osel, et al., OpenDist—Incremental Software Distribution, USENIX 9th Sys. Admin. Conf., pp. 181-194 (Sep. 1995).
Protocol Action: Hypertext Transfer Protocol—HTTP 11.1 to Proposed Standard, IETF Mail Archive, https://mailarchive.ietf.org/arch/msg/ietf/dt_QclzEoPofg61ED8EgxRXh_ok (Aug. 30, 1996).

(56) References Cited

OTHER PUBLICATIONS

Raggett, HTML 3.2 Reference Specification: W3C Working Draft, Published at https://www.w3.org/TR/WD-htm132-960909 (Sep. 9, 1996).
RFC 729, Internet Protocol: DARPA Internet Program Protocol Specification, DARPA (Sep. 1981).
RFC 791, "Internet Protocol: DARPA Internet Program Protocol Specification," DARPA (Sep. 1981).
Sankar, Internet Explorer Plug-In and Activex Companion, QUE Corp., pp. 1-30, 173-230 (Mar. 1997).
Tody, PC-IRAF: The Choice of a GNU Generation, Astronomical Data Anal. Software and Sys. V, vol. 101, pp. 322-326 (1996).
Web Browser Add-Ons: Off-Line Readers Deliver the World of the Web to Your Hard Disk, PC Magazine, vol. 15, No. 14, pp. 43-44 (Aug. 1996) (date stamped Jul. 31, 1996).
Order in *MyMail, Ltd.* v. *ooVoo LLC*, c.a. No. 5:17-cv-04487 (N.D. Cal.), Filed Mar. 16, 2018, 24 pgs.
Judgment in *MyMail, Ltd.* v. *ooVoo LLC*, c.a. No. 5:17-cv-04487 (N.D. Cal.), filed Mar. 16, 2018, 1 pg.
Order in *MyMail, Ltd.* v. *IAC Search & Media, Inc.*, c.a. No. 3:17-cv-04488 (N.D. Cal.), filed Mar. 16, 2018, 24 pg.
Judgment in *MyMail, Ltd.* v. *IAC Search & Media, Inc.*, c.a. No. 3:17-cv-04488 (N.D. Cal.), filed Mar. 16, 2018, 1 pg.
U.S. Appl. No. 14/860,633, filed Sep. 21, 2015, Method of Modifying a Toolbar.
U.S. Appl. No. 14/853,849, filed Sep. 14, 2015, Method for Accessing a Digital Network by Way of One or More Internet Service Providers.
U.S. Appl. No. 14/254,487, filed Apr. 16, 2014, Method of Connecting a User to a Network.
Final Office Action for U.S. Appl. No. 14/254,487, dated Jul. 9, 2018.
U.S. Appl. No. 14/860,633, Non-Final Office Action dated May 31, 2018.
U.S. Appl. No. 14/853,849, Notice of Allowance, dated Jul. 2, 2018.

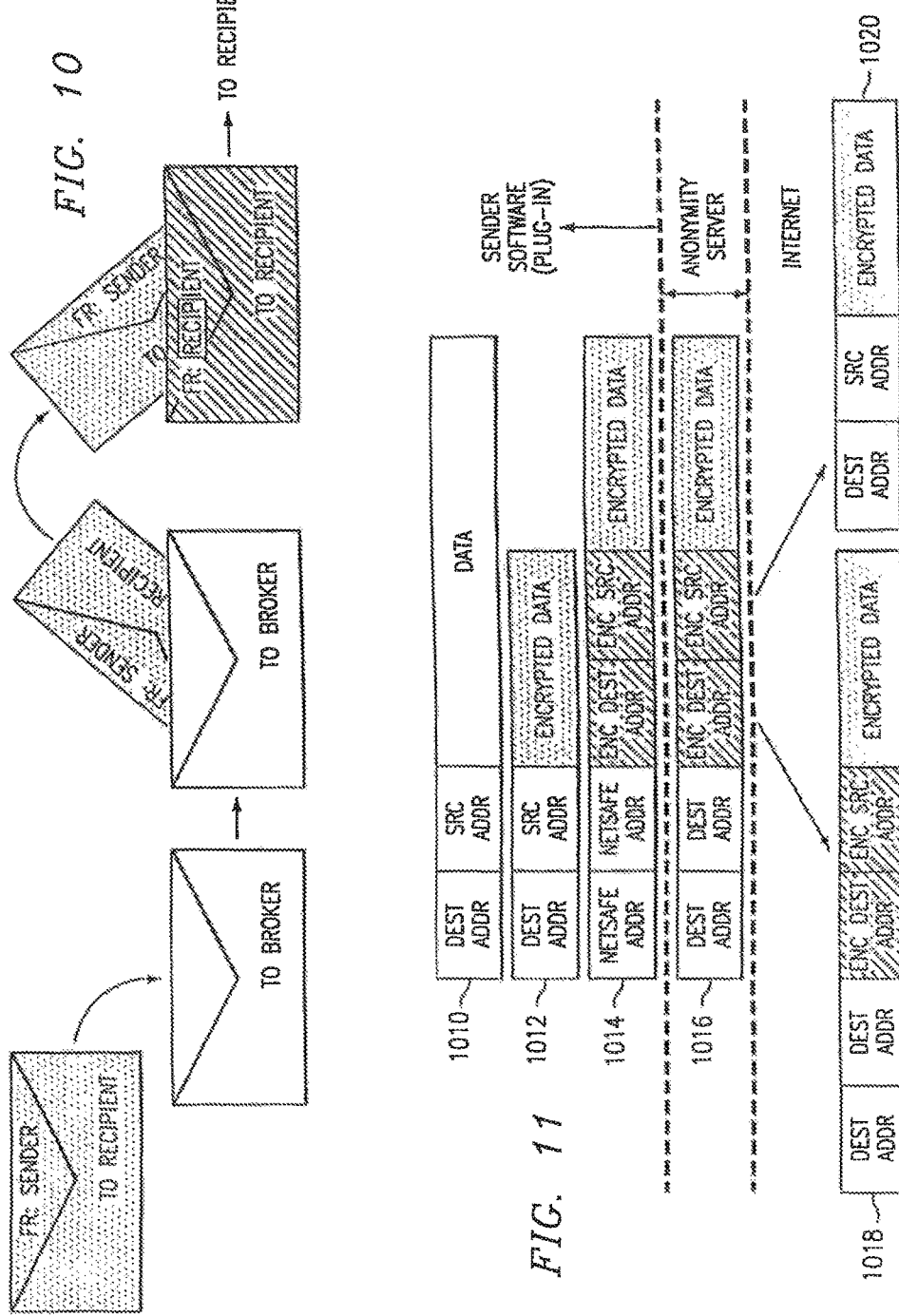

```
                                              APP_A.TXT
Docket No. MMAIL 1532001
(formerly NETS-641001 )
Serial No. 09/100,619
Filed June 19, 1998
METHOD AND APPARATUS FOR PROVIDING FUNGIBLE
INTERCOURSE OVER A NETWORK
Inventors:
Thomas Drennan Selgas
Michael Brian Massing
John Everett Gmuender

APPENDIX A

PHONE.DB

RAM/LOCATION/000=0|800|None Available|1|000|0000000|0|1|1|1
RAM/LOCATION/001=1|AL|AUBURN/OPELIKA|1|334|5028036|1|R|B|1
RAM/LOCATION/002=1|AL|BIRMINGHAM K56|1|205|2549001|1|R|B|1
RAM/LOCATION/003=1|AL|DECATUR|1|205|3535029|1|R|B|1
RAM/LOCATION/004=1|AL|GADSDEN K56|1|205|5438511|1|R|B|1
RAM/LOCATION/005=1|AL|HUNTSVILLE|1|205|5330409|1|R|B|1
RAM/LOCATION/006=1|AL|MOBILE|1|334|4316706|1|R|B|1
RAM/LOCATION/007=1|AL|MONTGOMERY K56|1|334|2230902|1|R|B|1
RAM/LOCATION/008=1|AL|TUSCALOOSA|1|205|5070302|1|R|A|1
RAM/LOCATION/009=1|CA|LOS ANGELES (Non-ISDN) |1|213|3300518|1|R|A|1
RAM/LOCATION/010=1|AR|FAYETTEVILLE|1|501|4425203|1|R|B|1
RAM/LOCATION/011=1|AR|FORT SMITH K56|1|501|4946080|1|R|B|1
RAM/LOCATION/012=1|AR|LITTLE ROCK K56|1|501|9186020|1|R|B|1
RAM/LOCATION/013=1|AR|PINE BLUFF (Non ISDN) |1|870|5342288|1|R|A|1
RAM/LOCATION/014=1|TX|DENTON K56|1|940|3830203|1|R|B|1
RAM/LOCATION/015=1|AZ|TUCSON|1|520|6200872|1|R|B|1
RAM/LOCATION/016=1|CA|ANAHEIM|1|714|8710966|1|R|B|1
RAM/LOCATION/017=1|CA|BAKERSFIELD K56|1|805|3219804|1|R|B|1
RAM/LOCATION/018=1|CA|CARLSBAD|1|760|9298643|1|R|B|1
RAM/LOCATION/019=1|CA|CHICO|1|530|8911086|1|R|B|1
RAM/LOCATION/020=1|CA|COLTON|1|909|3704823|1|R|B|1
RAM/LOCATION/021=1|CA|CONCORD|1|510|6096318|1|R|B|1
RAM/LOCATION/022=1|CA|FREMONT|1|510|7420207|1|R|B|1
RAM/LOCATION/023=1|CA|FRESNO|1|209|4951007|1|R|B|1
RAM/LOCATION/024=1|CA|HUNTINGTON BEACH|1|714|3770278|1|R|B|1
RAM/LOCATION/025=1|CA|INGLEWOOD|1|310|3389007|1|R|B|1
RAM/LOCATION/026=1|CA|LIVERMORE|1|510|4490339|1|R|B|1
RAM/LOCATION/027=1|CA|LONG BEACH K56|1|562|4378325|1|R|B|1
RAM/LOCATION/028=1|CA|LOS ANGELES|1|213|6208910|1|R|B|1
RAM/LOCATION/029=1|CA|MODESTO K56|1|209|3420103|1|R|B|1
RAM/LOCATION/030=1|CA|MODESTO2|1|209|5311416|1|R|B|1
RAM/LOCATION/031=1|CA|OAKLAND|1|510|7048599|1|R|B|1
RAM/LOCATION/032=1|CA|ONTARIO K56|1|909|9238359|1|R|B|1
RAM/LOCATION/033=1|CA|PALM SPRINGS|1|760|3202378|1|R|B|1
RAM/LOCATION/034=1|CA|PALO ALTO|1|650|3220489|1|R|B|1
RAM/LOCATION/035=1|CA|PASADENA|1|626|5850100|1|R|B|1
RAM/LOCATION/036=1|CA|PLACENTIA|1|714|5770144|1|R|B|1
RAM/LOCATION/037=1|CA|RANCHO CUCAMONGA|1|909|4819468|1|R|B|1
RAM/LOCATION/038=1|CA|REDDING K56|1|530|2439556|1|R|B|1
RAM/LOCATION/039=1|CA|RIALTO|1|909|8792490|1|R|B|1
RAM/LOCATION/040=1|CA|SACRAMENTO|1|916|4473613|1|R|B|1
RAM/LOCATION/041=1|CA|SALINAS|1|408|7510530|1|R|B|1
RAM/LOCATION/042=1|CA|SAN BERNARDINO|1|909|8840625|1|R|B|1
RAM/LOCATION/043=1|CA|SAN DIEGO|1|619|3380612|1|R|B|1
RAM/LOCATION/044=1|CA|SAN DIEGO2|1|619|2688236|1|R|B|1
RAM/LOCATION/045=1|CA|SAN FRANCISCO|1|415|3579923|1|R|B|1
                                    Page 1
```

*FIG. 22*

```
                                    APP_A.TXT
RAM/LOCATION/046=1 CA SAN JOSE|1|408|2680582|1|R|B|1
RAM/LOCATION/047=1 CA SAN LUIS OBISPO|1|805|5468060|1|R|B|1
RAM/LOCATION/048=1 CA SAN MATEO|1|415|3128208|1|R|B|1
RAM/LOCATION/049=1 CA SAN RAFAEL|1|415|4720761|1|R|B|1
RAM/LOCATION/050=1 CA SAN RAMON|1|510|8671220|1|R|B|1
RAM/LOCATION/051=1 CA MALIBU K56|1|310|3179832|1|R|B|1
RAM/LOCATION/052=1 CA SANTA MONICA K56|1|310|5759530|1|R|B|1
RAM/LOCATION/053=1 CA SANTA CLARA K56|1|408|3549502|1|R|B|1
RAM/LOCATION/054=1 CA SANTA MONICA|1|310|4511209|1|R|B|1
RAM/LOCATION/055=1 CA SANTA ROSA|1|707|5221914|1|R|B|1
RAM/LOCATION/056=1 CA SHERMAN OAKS (ISDN Only)|1|818|3402888|1|R|I|1
RAM/LOCATION/057=1 CA STOCKTON|1|209|4630351|1|R|B|1
RAM/LOCATION/058=1 CA THOUSAND OAKS|1|805|3731859|1|R|B|1
RAM/LOCATION/059=1 CA VACAVILLE|1|707|4485608|1|R|B|1
RAM/LOCATION/060=1 CA VISILIA|1|209|6350181|1|R|B|1
RAM/LOCATION/061=1 CA WILMINGTON|1|310|5138684|1|R|B|1
RAM/LOCATION/062=1 CO COLORADO SPRINGS K56|1|719|3272180|1|R|B|1
RAM/LOCATION/063=1 CO DENVER|1|303|5756188|1|R|B|1
RAM/LOCATION/064=1 CO FORT COLLINS|1|970|2822080|1|R|B|1
RAM/LOCATION/065=1 CT HARTFORD (Non ISDN)|1|860|7240636|1|R|A|1
RAM/LOCATION/066=1 CT STAMFORD|1|203|3577638|1|R|A|1
RAM/LOCATION/067=1 DC WASHINGTON DC|1|202|2221021|1|R|B|1
RAM/LOCATION/068=1 DE WILMINGTON|1|302|5760357|1|R|B|1
RAM/LOCATION/069=1 FL BRADENTON|1|941|7461921|1|R|B|1
RAM/LOCATION/070=1 FL CLEARWATER|1|813|5627000|1|R|A|1
RAM/LOCATION/071=1 FL DAYTONA BEACH|1|904|2550389|1|R|B|1
RAM/LOCATION/072=1 FL FORT LAUDERDALE K56|1|954|4864806|1|R|B|1
RAM/LOCATION/073=1 FL FORT PIERCE|1|561|4620510|1|R|B|1
RAM/LOCATION/074=1 FL GAINESVILLE K56|1|352|3722840|1|R|B|1
RAM/LOCATION/075=1 FL JACKSONVILLE|1|904|3532059|1|R|B|1
RAM/LOCATION/076=1 FL LAKELAND (Non ISDN)|1|941|6685000|1|R|A|1
RAM/LOCATION/077=1 FL MELBOURNE|1|407|7231064|1|R|B|1
RAM/LOCATION/078=1 FL MIAMI|1|305|3586951|1|R|B|1
RAM/LOCATION/079=1 FL NEW PORT RICHEY K56 (Non-ISDN) |1|813|8366000|1|R|A|1
RAM/LOCATION/080=1 FL ORLANDO|1|407|6482090|1|R|B|1
RAM/LOCATION/081=1 FL SARASOTA|1|941|9066000|1|R|A|1
RAM/LOCATION/082=1 FL TALLAHASSEE K56|1|850|2220763|1|R|B|1
RAM/LOCATION/083=1 FL TAMPA (Non ISDN) |1|813|3076000|1|R|A|1
RAM/LOCATION/084=1 FL WEST PALM BEACH K56|1|561|6819557|1|R|B|1
RAM/LOCATION/085=1 GA ALBANY|1|912|4300136|1|R|B|1
RAM/LOCATION/086=1 GA ATHENS|1|706|2080448|1|R|B|1
RAM/LOCATION/087=1 GA ATLANTA|1|404|8178166|1|R|B|1
RAM/LOCATION/088=1 GA AUGUSTA|1|706|8210025|1|R|B|1
RAM/LOCATION/089=1 GA COLUMBUS|1|706|6419942|1|R|B|1
RAM/LOCATION/090=1 GA MACON|1|912|7659958|1|R|B|1
RAM/LOCATION/091=1 GA SAVANNA|1|912|6519899|1|R|B|1
RAM/LOCATION/092=1 GA SMYRNA|1|770|4324637|1|R|B|1
RAM/LOCATION/093=1 HI HAWAII (HILO) K56|1|808|9616616|1|R|B|0
RAM/LOCATION/094=1 IA CEDAR RAPIDS|1|319|3681500|1|R|B|1
RAM/LOCATION/095=1 IA DAVENPORT|1|319|3885480|1|R|B|1
RAM/LOCATION/096=1 IA DES MOINES K56|1|515|3657060|1|R|B|1
RAM/LOCATION/097=1 IA IOWA CITY K56|1|319|3417010|1|R|B|1
RAM/LOCATION/098=1 ID BOISE|1|208|3816880|1|R|B|1
RAM/LOCATION/099=1 IL BLOOMINGTON|1|309|4346030|1|R|B|1
RAM/LOCATION/100=1 IL CHAMPAIGN|1|217|3983250|1|R|B|1
RAM/LOCATION/101=1 IL CHICAGO|1|312|9862476|1|R|B|1
RAM/LOCATION/102=1 IL DEKALB|1|815|7483932|1|R|B|1
RAM/LOCATION/103=1 IL ELK GROVE (ISDN Only) |1|847|2287840|1|R|I|1
RAM/LOCATION/104=1 IL FRANKLIN PARK (ISDN Only) |1|312|9841580|1|R|I|1
RAM/LOCATION/105=1 IL HINSDALE|1|630|2415600|1|R|B|1
RAM/LOCATION/106=1 IL IRVING (ISDN Only) |1|773|5092301|1|R|I|1
RAM/LOCATION/107=1 IL NAPERVILLE (ISDN Only) |1|630|5058070|1|R|I|1
RAM/LOCATION/108=1 IL NORTHBROOK (ISDN Only) |1|847|4803110|1|R|I|1
                                    Page 2
```

FIG. 23

```
                              APP_A.TXT
RAM/LOCATION/109=1|IL|SPRINGFIELD (ISDN Only) |1|217|5273440|1|R|I|1
RAM/LOCATION/110=1|IL|CHICAGO SOUTH - STEWART|1|773|8730070|1|R|B|1
RAM/LOCATION/111=1|IN|BLOOMINGTON|1|812|3234330|1|R|B|1
RAM/LOCATION/112=1|IN|ELKHART|1|219|2933577|1|R|B|1
RAM/LOCATION/113=1|IN|EVANSVILLE K56|1|812|4362055|1|R|B|1
RAM/LOCATION/114=1|IN|INDIANAPOLIS|1|317|9771010|1|R|B|1
RAM/LOCATION/115=1|IN|LAFAYETTE|1|765|7723000|1|R|B|1
RAM/LOCATION/116=1|IN|SOUTH BEND (ISDN Only) |1|219|2392090|1|R|I|1
RAM/LOCATION/117=1|IN|TERRE HAUTE|1|812|2385600|1|R|A|1
RAM/LOCATION/118=1|IN|VALPARAISO|1|219|5314152|1|R|B|1
RAM/LOCATION/119=1|KS|TOPEKA|1|913|3689804|1|R|B|1
RAM/LOCATION/120=1|KS|WICHITA|1|316|3830018|1|R|B|1
RAM/LOCATION/121=1|KY|LEXINGTON|1|606|2525628|1|R|B|1
RAM/LOCATION/122=1|KY|LOUISVILLE|1|502|5834400|1|R|B|1
RAM/LOCATION/123=1|LA|BATON ROUGE K56|1|504|3839080|1|R|B|1
RAM/LOCATION/124=1|LA|MONROE K56|1|318|3232277|1|R|B|1
RAM/LOCATION/125=1|LA|NEW ORLEANS K56|1|504|5881231|1|R|B|1
RAM/LOCATION/126=1|LA|SHREVEPORT|1|318|6760748|1|R|B|1
RAM/LOCATION/127=1|MA|BOSTON (ISDN Only) |1|617|9274200|1|R|I|1
RAM/LOCATION/128=1|MA|BRAINTREE|1|781|3803400|1|R|B|1
RAM/LOCATION/129=1|MA|BURLINGTON (ISDN Only) |1|781|2210500|1|R|I|1
RAM/LOCATION/130=1|MA|CAMBRIDGE (ISDN Only) |1|617|6790500|1|R|I|1
RAM/LOCATION/131=1|MA|DANVERS|1|978|7395000|1|R|B|1
RAM/LOCATION/132=1|MA|FRAMINGHAM (ISDN Only) |1|508|6284600|1|R|I|1
RAM/LOCATION/133=1|MA|SPRINGFIELD|1|413|8464500|1|R|B|1
RAM/LOCATION/134=1|MA|WALTHAM (ISDN Only) |1|781|6727400|1|R|I|1
RAM/LOCATION/135=1|MD|ANNAPOLIS|1|410|2633325|1|R|B|1
RAM/LOCATION/136=1|MD|BALTIMORE|1|410|7270315|1|R|B|1
RAM/LOCATION/137=1|MD|FREDERICK|1|301|6638403|1|R|B|1
RAM/LOCATION/138=1|ME|PORTLAND K56|1|207|7716000|1|R|B|1
RAM/LOCATION/139=1|MI|ANN ARBOR|1|734|2132220|1|R|B|1
RAM/LOCATION/140=1|MI|BELLEVILLE (ISDN Only) |1|734|9571268|1|R|I|1
RAM/LOCATION/141=1|MI|DETROIT (ISDN Only) |1|313|2254994|1|R|I|1
RAM/LOCATION/142=1|MI|FARMINGTON (ISDN Only) |1|248|4420016|1|R|I|1
RAM/LOCATION/143=1|MI|GRAND RAPIDS K56|1|616|7421404|1|R|B|1
RAM/LOCATION/144=1|MI|MT PLEASANT|1|517|7727284|1|R|B|1
RAM/LOCATION/145=1|MI|MUSKEGON|1|616|7273116|1|R|B|1
RAM/LOCATION/146=1|MI|SOUTHFIELD (ISDN Only) |1|248|2623138|1|R|I|1
RAM/LOCATION/147=1|MI|WARREN (ISDN Only) |1|810|5759931|1|R|I|1
RAM/LOCATION/148=1|MN|MINNEAPOLIS K56|1|612|6300770|1|R|B|1
RAM/LOCATION/149=1|MN|ST CLOUD K56|1|320|5292920|1|R|B|1
RAM/LOCATION/150=1|MO|COLUMBIA (Non ISDN) |1|573|8868621|1|R|A|1
RAM/LOCATION/151=1|MO|HARVESTER K56|1|314|9406910|1|R|B|1
RAM/LOCATION/152=1|MO|KANSAS CITY|1|816|2830607|1|R|B|1
RAM/LOCATION/153=1|MO|ST LOUIS|1|314|2137700|1|R|B|1
RAM/LOCATION/154=1|MO|SPRINGFIELD|1|417|8756902|1|R|B|1
RAM/LOCATION/155=1|MS|BILOXI/GULFPORT|1|601|8633593|1|R|B|1
RAM/LOCATION/156=1|MS|JACKSON K56|1|601|3558311|1|R|B|1
RAM/LOCATION/157=1|MT|BUTTE|1|1|406|4964080|1|R|A|1
RAM/LOCATION/158=1|NC|CHARLOTTE K56|1|704|3422011|1|R|B|1
RAM/LOCATION/159=1|NC|DURHAM|1|919|3619127|1|R|B|1
RAM/LOCATION/160=1|NC|FAYETTEVILLE|1|910|3233915|1|R|A|1
RAM/LOCATION/161=1|NC|GOLDSBORO|1|919|7368100|1|R|A|1
RAM/LOCATION/162=1|NC|GREENSBORO K56|1|336|5740544|1|R|B|1
RAM/LOCATION/163=1|NC|RALEIGH|1|919|8726557|1|R|B|1
RAM/LOCATION/164=1|NC|ROCKY MOUNT (ISDN Only) |1|919|9720919|1|R|I|1
RAM/LOCATION/165=1|ND|FARGO|1|701|2717800|1|R|B|1
RAM/LOCATION/166=1|NE|OMAHA K56|1|402|9431640|1|R|B|1
RAM/LOCATION/167=1|NH|NASHUA|1|603|5946600|1|R|B|1
RAM/LOCATION/168=1|NJ|CHERRY HILL K56|1|609|4149072|1|R|B|1
RAM/LOCATION/169=1|NJ|HACKENSACK|1|201|2870315|1|R|B|1
RAM/LOCATION/170=1|NJ|HOLMDEL|1|732|3321001|1|R|B|1
RAM/LOCATION/171=1|NJ|LONG BRANCH|1|908|9331114|1|R|B|1
                              Page 3
```

*FIG. 24*

```
                                            APP_A.TXT
RAM/LOCATION/172=1  NJ LONG BRANCH2|1|908|2292761|1|R|B|1
RAM/LOCATION/173=1  NJ MERCERVILLE|1|609|5867747|1|R|B|1
RAM/LOCATION/174=1  NJ MORRISTOWN K56|1|973|3601710|1|R|B|1
RAM/LOCATION/175=1  NJ NEW BRUNSWICK|1|732|4632172|1|R|B|1
RAM/LOCATION/176=1  NJ NEWARK|1|973|6221592|1|R|B|1
RAM/LOCATION/177=1  NJ PATERSON|1|973|2791225|1|R|B|1
RAM/LOCATION/178=1  NJ PLEASANTVILLE|1|609|3697800|1|R|A|1
RAM/LOCATION/179=1  NJ RAHWAY|1|908|3820026|1|R|B|1
RAM/LOCATION/180=1  NJ TRENTON|1|609|7775551|1|R|B|1
RAM/LOCATION/181=1  NJ WHITE HORSE K56|1|609|4063820|1|R|B|1
RAM/LOCATION/182=1  NM ALBUQUERQUE K56|1|505|2224980|1|R|B|1
RAM/LOCATION/183=1  NV LAS VEGAS|1|702|3828340|1|R|B|1
RAM/LOCATION/184=1  NY ALBANY|1|518|4266070|1|R|B|1
RAM/LOCATION/185=1  NY BINGHAMTON K56|1|607|7211200|1|R|B|1
RAM/LOCATION/186=1  NY BRENTWOOD|1|516|2312680|1|R|B|1
RAM/LOCATION/187=1  NY BUFFALO|1|716|8433000|1|R|B|1
RAM/LOCATION/188=1  NY FARMINGDALE|1|516|5772500|1|R|B|1
RAM/LOCATION/189=1  NY GARDEN CITY|1|516|2281980|1|R|B|1
RAM/LOCATION/190=1  NY ITHACA K56|1|607|2663900|1|R|B|1
RAM/LOCATION/191=1  NY NEW YORK (ISDN Only)|1|212|2384220|1|R|I|1
RAM/LOCATION/192=1  NY PORT CHESTER (ISDN Only)|1|914|9332820|1|R|I|1
RAM/LOCATION/193=1  NY POUGHKEEPSIE|1|914|4514240|1|R|B|1
RAM/LOCATION/194=1  NY ROCHESTER|1|716|3277189|1|R|B|1
RAM/LOCATION/195=1  NY ROME/UTICA|1|315|3386900|1|R|B|1
RAM/LOCATION/196=1  NY SYRACUSE|1|315|4421220|1|R|B|1
RAM/LOCATION/197=1  NY WHITE PLAINS (ISDN Only)|1|914|6813900|1|R|I|1
RAM/LOCATION/198=1  OH AKRON|1|330|2539990|1|R|B|1
RAM/LOCATION/199=1  OH CINCINNATI K56|1|513|6210526|1|R|B|1
RAM/LOCATION/200=1  OH CLEVELAND|1|216|5792593|1|R|B|1
RAM/LOCATION/201=1  OH COLUMBUS|1|614|2220025|1|R|B|1
RAM/LOCATION/202=1  OH DAYTON K56|1|937|2233267|1|R|B|1
RAM/LOCATION/203=1  OH TOLEDO K56|1|419|2442088|1|R|B|1
RAM/LOCATION/204=1  OK OKLAHOMA CITY|1|405|2700346|1|R|B|1
RAM/LOCATION/205=1  OK TULSA|1|918|5820535|1|R|B|1
RAM/LOCATION/206=1  OR BEAVERTON|1|503|6772210|1|R|B|1
RAM/LOCATION/207=1  OR EUGENE|1|541|3020140|1|R|B|1
RAM/LOCATION/208=1  OR PORTLAND (ISDN Only)|1|503|2945600|1|R|I|1
RAM/LOCATION/209=1  OR SALEM K56|1|503|5876060|1|R|B|1
RAM/LOCATION/210=1  PA ALLENTOWN K56|1|610|7822530|1|R|B|1
RAM/LOCATION/211=1  PA ALTOONA K56|1|814|9461318|1|R|B|1
RAM/LOCATION/212=1  PA CONSHOHOCKEN (ISDN Only)|1|610|9419491|1|R|I|1
RAM/LOCATION/213=1  PA ERIE K56|1|814|4535683|1|R|B|1
RAM/LOCATION/214=1  PA GREENSBURG|1|724|8539601|1|R|B|1
RAM/LOCATION/215=1  PA HARRISBURG|1|717|7200671|1|R|B|1
RAM/LOCATION/216=1  PA HERSHEY|1|717|5334574|1|R|B|1
RAM/LOCATION/217=1  PA PAOLI (ISDN Only)|1|610|7259325|1|R|I|1
RAM/LOCATION/218=1  PA PHILADELPHIA (ISDN Only)|1|215|4480370|1|R|I|1
RAM/LOCATION/219=1  PA PHILADELPHIA|1|215|4405580|1|R|B|1
RAM/LOCATION/220=1  PA PITTSBURGH|1|412|3942280|1|R|B|1
RAM/LOCATION/221=1  PA WILKES BARRE|1|717|8252150|1|R|B|1
RAM/LOCATION/222=1  PA YORK|1|717|8551023|1|R|B|1
RAM/LOCATION/223=1  RI PROVIDENCE|1|401|2767700|1|R|B|1
RAM/LOCATION/224=1  SC COLUMBIA|1|803|7998828|1|R|B|1
RAM/LOCATION/225=1  SC FLORENCE|1|803|6730446|1|R|B|1
RAM/LOCATION/226=1  SD SIOUX FALLS|1|605|3673553|1|R|B|1
RAM/LOCATION/227=1  TN CHATTANOOGA|1|423|7563830|1|R|B|1
RAM/LOCATION/228=1  TN JACKSON|1|901|4224222|1|R|B|1
RAM/LOCATION/229=1  TN KNOXVILLE K56|1|423|5225249|1|R|B|1
RAM/LOCATION/230=1  TN MEMPHIS|1|901|7613312|1|R|B|1
RAM/LOCATION/231=1  TN MEMPHIS2|1|901|5431500|1|R|B|1
RAM/LOCATION/232=1  TN NASHVILLE|1|615|7488011|1|R|B|1
RAM/LOCATION/233=1  TX ABILENE K56|1|915|6271000|1|R|B|1
RAM/LOCATION/234=1  TX AMARILLO|1|806|3547500|1|R|B|1
                                            Page 4
```

*FIG. 25*

```
                                              APP_A.TXT
RAM/LOCATION/235=1 TX AUSTIN|1|512|4331957|1|R|B|1
RAM/LOCATION/236=1 TX BAYTOWN K56|1|281|4205539|1|R|B|1
RAM/LOCATION/237=1 TX BEAUMONT|1|409|9800190|1|R|B|1
RAM/LOCATION/238=1 TX COLLEGE STATION|1|409|8466549|1|R|B|1
RAM/LOCATION/239=1 CA SAN JOSE (Non ISDN) |1|408|2731520|1|R|A|1
RAM/LOCATION/240=1 CA SUNNYVALE (Non ISDN) |1|408|9902226|1|R|A|1
RAM/LOCATION/241=1 TX EL PASO K56|1|915|4969010|1|R|B|1
RAM/LOCATION/242=1 CA REDWOOD CITY (Non ISDN) |1|650|4810017|1|R|A|1
RAM/LOCATION/243=1 TX HARLINGEN|1|956|4287010|1|R|A|1
RAM/LOCATION/244=1 TX HOUSTON|1|713|5670439|1|R|B|1
RAM/LOCATION/245=1 TX LONGVIEW|1|903|2342700|1|R|A|1
RAM/LOCATION/246=1 TX LUBBOCK K56|1|806|4721040|1|R|B|1
RAM/LOCATION/247=1 TX MIDLAND K56|1|915|4985700|1|R|B|1
RAM/LOCATION/248=1 TX ODESSA|1|915|4982004|1|R|B|1
RAM/LOCATION/249=1 TX SAN ANTONIO|1|210|3544059|1|R|B|1
RAM/LOCATION/250=1 TX TEMPLE|1|254|7781025|1|R|A|1
RAM/LOCATION/251=1 TX WACO|1|254|2992000|1|R|B|0
RAM/LOCATION/252=1 TX WESTHEIMER|1|281|6259900|1|R|B|1
RAM/LOCATION/253=1 UT OGDEN|1|801|3991119|1|R|B|1
RAM/LOCATION/254=1 UT PROVO|1|801|3432720|1|R|B|1
RAM/LOCATION/255=1 UT SALT LAKE CITY K56|1|801|2365320|1|R|B|1
RAM/LOCATION/256=1 CA MILLBREA (Non ISDN) |1|650|6510903|1|R|A|1
RAM/LOCATION/257=1 VA FREDERICKSBURG (Chancelor) K56|1|540|7868440|1|R|B|1
RAM/LOCATION/258=1 VA HARRISONBURG|1|540|5742554|1|R|B|1
RAM/LOCATION/259=1 VA LYNCHBURG|1|804|9479090|1|R|B|1
RAM/LOCATION/260=1 VA MANASSAS|1|703|3315982|1|R|B|1
RAM/LOCATION/261=1 VA NORFOLK|1|757|5335140|1|R|B|1
RAM/LOCATION/262=1 VA NORFOLK2|1|757|4238640|1|R|B|1
RAM/LOCATION/263=1 VA PRINCESS ANNE|1|757|5639922|1|R|B|1
RAM/LOCATION/264=1 VA RICHMOND K56|1|804|2760978|1|R|B|1
RAM/LOCATION/265=1 VA ROANOKE K56|1|540|7258319|1|R|B|1
RAM/LOCATION/266=1 CA SAN MATEO (Non ISDN) |1|415|6532754|1|R|A|1
RAM/LOCATION/267=1 WA EVERETT K56|1|425|2611320|1|R|B|1
RAM/LOCATION/268=1 WA KENNEWICK|1|509|7340697|1|R|B|1
RAM/LOCATION/269=1 WA OLYMPIA|1|360|3571091|1|R|B|1
RAM/LOCATION/270=1 WA PULLMAN|1|509|3325402|1|R|B|1
RAM/LOCATION/271=1 WA REDMOND|1|425|7390181|1|R|B|1
RAM/LOCATION/272=1 WA SEATTLE|1|206|4412632|1|R|B|1
RAM/LOCATION/273=1 WA SEATTLE (ISDN Only) |1|206|2239651|1|R|I|1
RAM/LOCATION/274=1 WA SPOKANE|1|509|3280087|1|R|B|1
RAM/LOCATION/275=1 WA TACOMA K56|1|253|5931290|1|R|B|1
RAM/LOCATION/276=1 WI GREEN BAY|1|414|5929060|1|R|B|1
RAM/LOCATION/277=1 WI MADISON|1|608|2526580|1|R|B|1
RAM/LOCATION/278=1 WI MILWAUKEE K56|1|414|2703090|1|R|B|1
RAM/LOCATION/279=1 WV CHARLESTON K56|1|304|3459059|1|R|B|1
RAM/LOCATION/280=1 WV CLARKSBURG|1|304|6244023|1|R|B|1
RAM/LOCATION/281=1 WV HUNTINGTON K56|1|304|5235372|1|R|B|1
RAM/LOCATION/282=1 WV MORGANTOWN K56|1|304|2912513|1|R|B|1
RAM/LOCATION/283=1 WV WHEELING K56|1|304|2334895|1|R|B|1
RAM/LOCATION/284=1 CA SAN FRANCISCO (Non ISDN) |1|415|6592193|1|R|A|1
RAM/LOCATION/285=1 PA READING K56|1|610|3725192|1|R|B|1
RAM/LOCATION/286=1 CA SANTA CRUZ|1|408|4540327|1|R|B|1
RAM/LOCATION/287=1 FL FEATHERSOUND|1|813|5730863|1|R|B|1
RAM/LOCATION/288=1 CA SAN FRANCISCO2|1|415|2834722|1|R|B|1
RAM/LOCATION/289=1 TX RICHARDSON (ISDN Only) |1|972|2353493|1|R|I|0|DALTX|000
RAM/LOCATION/290=1 CA Sacramento K56|1|916|4460187|1|R|B|1
RAM/LOCATION/291=1 CA CLOVIS|1|209|2910167|1|R|B|1
RAM/LOCATION/292=1 CA IRVINE|1|714|7147269091|1|R|B|1
RAM/LOCATION/293=1 CA MONTEREY K56|1|408|3750320|1|R|B|1
RAM/LOCATION/294=1 CA OAKLAND (ISDN Only) |1|510|4330258|1|R|I|1
RAM/LOCATION/295=1 HI KAUAI (Lihue) K56|1|808|2457776|1|R|B|0
RAM/LOCATION/296=1 HI MAUI (Wailuku) K56|1|808|2442277|1|R|B|0
RAM/LOCATION/297=1 HI OAHU (Waipahu) K56|1|808|6772981|1|R|B|0
                                              Page 5
```

*FIG. 26*

```
                                              APP_A.TXT
RAM/LOCATION/298=1 |LA|HOUMA K56|1|504|8687808|1|R|B|1
RAM/LOCATION/299=1 |MA|LAWRENCE|1|978|9742000|1|R|B|1
RAM/LOCATION/300=1 |NJ|FREEHOLD|1|908|7927770|1|R|B|1
RAM/LOCATION/301=1 |OH|MARION|1|614|3825869|1|R|B|1
RAM/LOCATION/302=1 |PA|LANCASTER|1|717|8727887|1|R|B|1
RAM/LOCATION/303=1 |SC|GREENVILLE|1|864|2336876|1|R|B|1
RAM/LOCATION/304=1 |TX|DENTON|1|940|8910005|1|R|A|1
RAM/LOCATION/305=1 |CA|OXNARD|1|805|2401063|1|R|B|1
RAM/LOCATION/306=1 |IN|FORT WAYNE|1|219|4390840|1|R|B|1
RAM/LOCATION/307=1 |LA|LAFAYETTE|1|318|2890058|1|R|B|1
RAM/LOCATION/308=1 |NJ|PRINCETON|1|609|4972463|1|R|B|1
RAM/LOCATION/309=1 |NY|NEW YORK (ISDN Only) |1|212|4161980|1|R|I|1
RAM/LOCATION/310=1 |OH|YOUNGSTOWN|1|330|2705600|1|R|B|1
RAM/LOCATION/311=1 |SC|CHARLESTON|1|803|7224079|1|R|B|1
RAM/LOCATION/312=1 |SC|MYRTLE BEACH|1|803|9132102|1|R|B|1
RAM/LOCATION/313=1 |TX|SAN ANGELO|1|915|6530039|1|R|A|0
RAM/LOCATION/314=1 |KY|BOWLING GREEN/CLARKSVILLE|1|502|7838200|1|R|B|1
RAM/LOCATION/315=1 |PA|KING OF PRUSSIA (ISDN Only) |1|610|6304770|1|R|I|1
RAM/LOCATION/316=1 |WA|BELLINGHAM/FERNDALE K56|1|360|3831000|1|R|B|1
RAM/LOCATION/317=1 |MS|HATTIESBURG K56|1|601|2716051|1|R|B|1
RAM/LOCATION/318=1 |FL|PENSACOLA|1|850|9699884|1|R|B|1
RAM/LOCATION/319=1 |FL|BOCA RATON K56|1|561|3688801|1|R|B|1
RAM/LOCATION/320=1 |CA|SAUSALITO|1|415|2891317|1|R|B|1
RAM/LOCATION/321=1 |IL|JOLIET|1|815|7257702|1|R|B|1
RAM/LOCATION/322=1 |IL|ROCKFORD|1|815|4891510|1|R|B|1
RAM/LOCATION/323=1 |IL|LIBERTYVILLE (ISDN Only) |1|847|2476470|1|R|B|1
RAM/LOCATION/324=1 |MI|LANSING K56|1|517|3744467|1|R|B|1
RAM/LOCATION/325=1 |MI|PONTIAC (ISDN Only) |1|248|3710500|1|R|I|1
RAM/LOCATION/326=1 |NE|LINCOLN K56|1|402|4206349|1|R|B|1
RAM/LOCATION/327=1 |NJ|IRVINGTON|1|973|3712007|1|R|B|1
RAM/LOCATION/328=1 |TX|CORPUS CHRISTI|1|512|6932000|1|R|B|1
RAM/LOCATION/329=1 |MI|SAGINAW|1|517|7558725|1|R|B|1
RAM/LOCATION/330=1 |WV|MARTINSBURG|1|304|2622708|1|R|B|1
RAM/LOCATION/331=1 |IN|ANGOLA K56 (Non-ISDN) |1|219|6687116|1|R|A|1
RAM/LOCATION/332=1 |TX|BROWNWOOD K56|1|915|6410101|1|R|A|1
RAM/LOCATION/333=1 |CA|SANTA BARBARA|1|805|8923456|1|R|B|1
RAM/LOCATION/334=1 |NC|WINSTON SALIM|1|336|7883789|1|R|B|1
RAM/LOCATION/335=1 |NJ|MARLTON K56|1|609|5665800|1|R|B|1
RAM/LOCATION/336=1 |IN|GARY|1|219|9772330|1|R|B|1
RAM/LOCATION/337=1 |MA|BURLINGTON|1|781|8520103|1|R|A|1
RAM/LOCATION/338=1 |MA|CAMBRIDGE|1|617|5880103|1|R|A|1
RAM/LOCATION/339=1 |PA|SCRANTON|1|717|9611654|1|R|B|1
RAM/LOCATION/340=1 |IL|CHICAGO2|1|312|4530725|1|R|A|1
RAM/LOCATION/341=1 |IL|ELK GROVE|1|847|6310901|1|R|A|1
RAM/LOCATION/342=1 |IL|NAPERVILLE2|1|630|3000568|1|R|A|1
RAM/LOCATION/343=1 |IL|NORTHBROOK|1|847|4000891|1|R|A|1
RAM/LOCATION/344=1 |CA|SANTA BARBARA|1|805|8922163|1|R|B|1
RAM/LOCATION/345=1 |CA|ALAMEDA|1|510|2140563|1|R|A|1
RAM/LOCATION/346=1 |CA|CONCORD2|1|510|8260637|1|R|A|1
RAM/LOCATION/347=1 |CA|FREMONT2|1|510|4040962|1|R|A|1
RAM/LOCATION/348=1 |CA|IRVINE2|1|714|9300874|1|R|A|1
RAM/LOCATION/349=1 |CA|LOS ANGELES2|1|213|3300866|1|R|A|1
RAM/LOCATION/350=1 |CA|MENLO PARK|1|650|6870796|1|R|A|1
RAM/LOCATION/351=1 |CA|PASADENA2|1|626|6390584|1|R|A|1
RAM/LOCATION/352=1 |CA|SAN DIEGO3|1|619|8811511|1|R|A|1
RAM/LOCATION/353=1 |CA|SAN FRANCISCO3|1|415|6591592|1|R|A|1
RAM/LOCATION/354=1 |CA|SAN JOSE2|1|408|2730562|1|R|A|1
RAM/LOCATION/355=1 |CA|SAN MATEO2|1|415|6530598|1|R|A|1
RAM/LOCATION/356=1 |CA|SAN PEDRO (Non ISDN) |1|310|5071506|1|R|A|1
RAM/LOCATION/357=1 |NM|SANTA FE K56|1|505|4385860|1|R|B|1
RAM/LOCATION/358=1 |NY|NEW YORK|1|212|2717103|1|R|A|1
RAM/LOCATION/359=1 |CT|STAMFORD (ISDN Only) |1|203|4623457|1|R|I|1
RAM/LOCATION/360=1 |FL|PANAMA CITY|1|850|8722927|1|R|B|1
                                              Page 6
```

*FIG. 27*

```
                             APP_A.TXT
RAM/LOCATION/361=1 | OR | PORTLAND|1|503|7316020|1|R|B|1
RAM/LOCATION/362=1 | IN | LAFAYETTE|1|765|7722025|1|R|B|1
RAM/LOCATION/363=1 | NH | DOVER K56|1|603|7402000|1|R|B|1
RAM/LOCATION/364=1 | MO | JOPLIN|1|417|6271090|1|R|A|1
RAM/LOCATION/365=1 | NJ | NEW BRUNSWICK2|1|732|4481071|1|R|B|1
RAM/LOCATION/366=1 | ~~ | EDMONTON - CANADA|1|403|4235600|1|R|B|1
RAM/LOCATION/367=1 | AK | ANCHORAGE K56|1|907|2729547|1|R|A|1
RAM/LOCATION/368=1 | AK | JUNEAU|1|907|4635355|1|R|A|1
RAM/LOCATION/369=1 | CA | PALO ALTO (Non ISDN) |1|650|6872187|1|R|A|1
RAM/LOCATION/370=1 | ~~ | VANCOUVER K56 - CANADA|1|604|6023300|1|R|B|1
RAM/LOCATION/371=1 | CO | LOVELAND|1|970|5933220|1|R|B|1
RAM/LOCATION/372=1 | CT | BRIDGEPORT K56|1|203|5760404|1|R|B|1
RAM/LOCATION/373=1 | CT | DANBURY|1|203|7306262|1|R|B|1
RAM/LOCATION/374=1 | CT | HARTFORD (ISDN Only) |1|860|6929057|1|R|I|1
RAM/LOCATION/375=1 | CT | NEW HAVEN (ISDN Only) |1|203|7812619|1|R|I|1
RAM/LOCATION/376=1 | CT | NEW LONDON|1|860|4410059|1|R|B|1
RAM/LOCATION/377=1 | FL | BONITA SPRINGS (ISDN ONLY) |1|941|9477700|1|R|I|1
RAM/LOCATION/378=1 | FL | FORT MYERS|1|941|3327323|1|R|B|1
RAM/LOCATION/379=1 | GA | ATLANTA2|1|404|9650102|1|R|A|1
RAM/LOCATION/380=1 | GA | SMYRNA2|1|770|3080102|1|R|A|1
RAM/LOCATION/381=1 | KS | LAWRENCE|1|913|7490796|1|R|B|1
RAM/LOCATION/382=1 | KS | MANHATTAN|1|913|5391206|1|R|B|1
RAM/LOCATION/383=1 | LA | LAKE CHARLES|1|318|4786964|1|R|B|1
RAM/LOCATION/384=1 | MA | WORCESTER|1|508|4213000|1|R|B|1
RAM/LOCATION/385=1 | ~~ | WINNIPEG - CANADA|1|204|9561440|1|R|B|1
RAM/LOCATION/386=1 | MI | FARMINGTON|1|248|9570516|1|R|B|1
RAM/LOCATION/387=1 | CA | OAKLAND K56 (Non ISDN) |1|510|2140787|1|R|A|1
RAM/LOCATION/388=1 | NC | ASHEVILLE (ISDN Only) |1|704|2511626|1|R|I|1
RAM/LOCATION/389=1 | NJ | TOMS RIVER|1|908|2407151|1|R|B|1
RAM/LOCATION/390=1 | ~~ | OTTAWA - CANADA|1|613|5949044|1|R|B|1
RAM/LOCATION/391=1 | ~~ | TORONTO - CANADA|1|416|3639625|1|R|B|1
RAM/LOCATION/392=1 | PA | LEVITTOWN|1|215|9467513|1|R|B|1
RAM/LOCATION/393=1 | ~~ | SAN JUAN - Puerto Rico|1|787|2895841|1|R|B|1
RAM/LOCATION/394=1 | ~~ | MONTREAL - CANADA|1|514|8665278|1|R|B|1
RAM/LOCATION/395=1 | TX | DALLAS|1|214|7411839|1|R|B|1|DALTX|001
RAM/LOCATION/396=1 | TX | FORT WORTH|1|817|8509253|1|R|B|1
RAM/LOCATION/397=1 | TX | IRVING (ISDN Only)  |1|972|4386530|1|R|B|1|DALTX|002
RAM/LOCATION/398=1 | TX | WICHITA FALLS K56|1|940|7168900|1|R|B|1
RAM/LOCATION/399=1 | VA | LORTON|1|703|5514627|1|R|B|1
RAM/LOCATION/400=1 | VT | BURLINGTON|1|802|6522600|1|R|B|1
RAM/LOCATION/401=1 | WA | AUBURN K56|1|253|9311380|1|R|B|1
RAM/LOCATION/402=1 | WA | EVERETT K56|1|425|2611398|1|R|B|1
RAM/LOCATION/403=1 | WY | CHEYENNE|1|307|6332980|1|R|B|1
RAM/LOCATION/404=1 | MA | BROCKTON|1|508|8958600|1|R|B|1
RAM/LOCATION/405=1 | FL | CLEARWATER|1|813|5625327|1|R|I|1
RAM/LOCATION/406=1 | ~~ | CALGARY - CANADA|1|403|7815200|1|R|B|1
RAM/LOCATION/407=1 | FL | LAKELAND|1|941|6669202|1|R|I|1
RAM/LOCATION/408=1 | FL | SARASOTA|1|941|3624404|1|R|I|1
RAM/LOCATION/409=1 | FL | TAMPA|1|813|2477863|1|R|I|1
RAM/LOCATION/410=1 | NJ | PLEASANTVILLE|1|609|5691830|1|R|B|1
RAM/LOCATION/411=1 | OH | MARION|1|614|3874751|1|R|B|1
RAM/LOCATION/412=1 | OR | BEAVERTON K56|1|503|6260996|1|R|B|1
RAM/LOCATION/413=1 | CA | CONCORD K56 (Non ISDN) |1|510|8260729|1|R|A|1
RAM/LOCATION/414=1 | CA | WALNUT CREEK K56 (Non ISDN) |1|510|9481609|1|R|A|1
RAM/LOCATION/415=1 | CA | BERKLEY K56 (Non ISDN) |1|510|9821757|1|R|A|1
RAM/LOCATION/416=1 | CA | CARLSBAD K56|1|760|7100582|1|R|A|1
RAM/LOCATION/417=1 | CA | SAN DIEGO K56 (Non ISDN) |1|619|8811662|1|R|A|1
RAM/LOCATION/418=1 | CA | SANTA ROSA (Non ISDN) |1|707|5391690|1|R|A|1
RAM/LOCATION/419=1 | CA | HUNTINGTON BEACH K56|1|714|3799710|1|R|B|1
RAM/LOCATION/420=1 | CA | ANAHEIM (Non ISDN) |1|714|7820914|1|R|A|1
RAM/LOCATION/421=1 | CA | FULLERTON (Non ISDN) |1|714|8690721|1|R|A|1
RAM/LOCATION/422=1 | CA | IRVINE|1|714|9301555|1|R|B|1
RAM/LOCATION/423=1 | CA | PLACENTIA (Non ISDN) |1|714|9830625|1|R|A|1
                              Page 7
```

*FIG. 28*

```
                           APP_A.TXT
RAM/LOCATION/424=1|CA|OXNARD 2|1|805|2409662|1|R|B|1
RAM/LOCATION/425=1|CA|THOUSAND OAKS 2|1|805|4801991|1|R|B|1
RAM/LOCATION/426=1|CA|SANTA BARBRA2 K56|1|805|8923122|1|R|B|1
RAM/LOCATION/427=1|CA|LANCASTER K56|1|805|9496213|1|R|B|1
RAM/LOCATION/428=1|CA|EL MONTE (Non ISDN)|1|626|5320716|1|R|A|1
RAM/LOCATION/429=1|CA|GLENDALE (Non ISDN)|1|818|6380887|1|R|A|1
RAM/LOCATION/430=1|CA|PASEDENA (Non ISDN)|1|818|6390630|1|R|A|1
RAM/LOCATION/431=1|CA|SAN FERNANDO K56|1|818|8379682|1|R|B|1
RAM/LOCATION/432=1|CA|RIALTO|1|909|8752490|1|R|A|1
RAM/LOCATION/433=1|DC|WASHINGTON DC (Non ISDN)|1|202|4780571|1|R|A|1
RAM/LOCATION/434=1|FL|TAMPA|1|813|2761023|1|R|B|1
RAM/LOCATION/435=1|FL|CLEARWATER|1|813|5625905|1|R|B|1
RAM/LOCATION/436=1|FL|ST PETERSBURG K56|1|813|8270117|1|R|B|1
RAM/LOCATION/437=1|FL|SARASOTA K56|1|941|3624985|1|R|B|1
RAM/LOCATION/438=1|FL|SARASOTA 2|1|941|3627983|1|R|B|1
RAM/LOCATION/439=1|FL|LAKELAND K56|1|941|6651506|1|R|B|1
RAM/LOCATION/440=1|FL|LAKELAND 2|1|941|6662931|1|R|B|1
RAM/LOCATION/441=1|FL|WINTER HAVEN|1|941|6799638|1|R|B|1
RAM/LOCATION/442=1|FL|BRADENTON K56|1|941|7468563|1|R|B|1
RAM/LOCATION/443=1|GA|ATLANTA (Non ISDN)|1|404|9652446|1|R|A|1
RAM/LOCATION/444=1|TX|SAN ANTINO K56|1|210|3572849|1|R|B|1
RAM/LOCATION/445=1|GA|SMYRNA (Non ISDI)|1|770|3080620|1|R|A|1
RAM/LOCATION/446=1|OH|TROY K56|1|937|3329058|1|R|B|1
RAM/LOCATION/447=1|IL|SPRINGFIELD K56 (Non ISDN)|1|217|4837404|1|R|A|1
RAM/LOCATION/448=1|IL|CHAMPAIGN K56 (Non ISDN)|1|217|8922269|1|R|A|1
RAM/LOCATION/449=1|IL|BLOOMINGTON K56|1|309|8270536|1|R|B|1
RAM/LOCATION/450=1|IL|CHICAGO (Non ISDN)|1|312|4530828|1|R|A|1
RAM/LOCATION/451=1|IL|HINSDALE (Non ISDN)|1|630|2031682|1|R|A|1
RAM/LOCATION/452=1|IL|LOMBARD (Non ISDN)|1|630|2820629|1|R|A|1
RAM/LOCATION/453=1|IL|NAPERVILLE (Non ISDN)|1|630|3000650|1|R|A|1
RAM/LOCATION/454=1|IL|SCHAUMBURG (Non ISDN)|1|847|2730608|1|R|A|1
RAM/LOCATION/455=1|IL|NORTHBROOK K56 (Non ISDN)|1|847|4001618|1|R|A|1
RAM/LOCATION/456=1|IL|ELK GROVE K56 (Non-ISDN)|1|847|6311672|1|R|A|1
RAM/LOCATION/457=1|IL|SKOKIE K56 (Non-ISDN)|1|847|7450582|1|R|A|1
RAM/LOCATION/458=1|IL|WHEELING K56 (Non ISDN)|1|847|7770624|1|R|A|1
RAM/LOCATION/459=1|IL|LIBERTYVILLE K56 (Non ISDN)|1|847|9900034|1|R|A|1
RAM/LOCATION/460=1|IN|FORT WAYNE|1|219|4390592|1|R|B|1
RAM/LOCATION/461=1|IN|FORT WAYNE (Non ISDN)|1|219|5229612|1|R|A|1
RAM/LOCATION/462=1|IN|SOUTH BEND K56|1|219|6334827|1|R|B|1
RAM/LOCATION/463=1|IN|VALPARAISO K56|1|219|7628346|1|R|B|1
RAM/LOCATION/464=1|IN|WESTFIELD K56|1|317|8969601|1|R|B|1
RAM/LOCATION/465=1|IN|RICHMOND K56|1|765|9352965|1|R|B|1
RAM/LOCATION/466=1|KY|ASHLAND K56|1|606|3291807|1|R|B|1
RAM/LOCATION/467=1|MD|GAITHERSBURG|1|301|3370662|1|R|A|1
RAM/LOCATION/468=1|MD|BALTIMORE|1|410|2468024|1|R|A|1
RAM/LOCATION/469=1|MD|GLENBURNIE|1|410|4870001|1|R|A|1
RAM/LOCATION/470=1|MA|FRAMINGHAM K56 (Non ISDN)|1|508|8610845|1|R|A|1
RAM/LOCATION/471=1|MA|NEW BEDFORD K56 (Non ISDN)|1|508|9102400|1|R|A|1
RAM/LOCATION/472=1|MA|BILLERICA K56 (Non-ISDN)|1|978|9640651|1|R|A|1
RAM/LOCATION/473=1|MA|QUINCY K56 (Non ISDN)|1|617|2490571|1|R|A|1
RAM/LOCATION/474=1|MA|MALDEN K56 (Non-ISDN)|1|781|4800571|1|R|A|1
RAM/LOCATION/475=1|MA|BOSTON K56 (Non ISDN)|1|617|5315304|1|R|A|1
RAM/LOCATION/476=1|MA|CAMBRIDGE K56 (Non ISDN)|1|617|5881641|1|R|A|1
RAM/LOCATION/477=1|MA|MEDFORD K56 (Non-ISDN)|1|781|6580770|1|R|A|1
RAM/LOCATION/478=1|MA|WALTHAM K56 (Non-ISDN)|1|781|6631563|1|R|A|1
RAM/LOCATION/479=1|MA|LEXINGTON K56 (Non-ISDN)|1|781|7780831|1|R|A|1
RAM/LOCATION/480=1|MA|NEWTON K56 (Non ISDN)|1|617|8310579|1|R|A|1
RAM/LOCATION/481=1|MA|BURLINGTON K56 (Non-ISDN)|1|781|8520607|1|R|A|1
RAM/LOCATION/482=1|MA|BROOKLINE K56 (Non ISDN)|1|617|9920579|1|R|A|1
RAM/LOCATION/483=1|MI|WAYNE K56 (Non ISDN)|1|734|6290545|1|R|A|1
RAM/LOCATION/484=1|MI|MT PLEASANT K56|1|517|7731838|1|R|B|1
RAM/LOCATION/485=1|MI|MUSKEGON|1|616|7271913|1|R|A|1
RAM/LOCATION/486=1|MI|PONTIAC K56 (Non ISDN)|1|248|3650543|1|R|A|1
                           Page 8
```

*FIG. 29*

```
                                               APP_A.TXT
RAM/LOCATION/487=1|MI|WARREN K56 (Non ISDN) |1|810|8190779|1|R|A|1
RAM/LOCATION/488=1|MI|SOUTHFIELD K56 (Non ISDN) |1|248|9368823|1|R|A|1
RAM/LOCATION/489=1|MI|FRAMINGTON K56 (Non ISDN) |1|248|9570588|1|R|A|1
RAM/LOCATION/490=1|MO|O'FALLON|1|314|9802410|1|R|A|1
RAM/LOCATION/491=1|MO|COLUMBIA|1|573|8140200|1|R|B|1
RAM/LOCATION/492=1|MO|KANSAS CITY K56|1|816|5020200|1|R|B|1
RAM/LOCATION/493=1|NY|MANHATTAN|1|212|6553000|1|R|A|1
RAM/LOCATION/494=1|NY|SYRACUSE|1|315|4791430|1|R|B|1
RAM/LOCATION/495=1|NY|ALBANY K56|1|518|4352800|1|R|B|1
RAM/LOCATION/496=1|NY|BUFFALO (DA) |1|716|8576020|1|R|B|1
RAM/LOCATION/497=1|NC|MONROE K56|1|704|2965750|1|R|B|1
RAM/LOCATION/498=1|NC|SYLVA K56|1|704|5868578|1|R|B|1
RAM/LOCATION/499=1|NC|ASHEVILLE K56|1|704|6456969|1|R|B|1
RAM/LOCATION/500=1|NC|WILMINGTON|1|910|7636609|1|R|B|1
RAM/LOCATION/501=1|NC|DURHAM K56|1|919|5445741|1|R|B|1
RAM/LOCATION/502=1|OH|CLEVELAND K56|1|216|9024858|1|R|B|1
RAM/LOCATION/503=1|OH|MEDINA K56|1|330|7226088|1|R|B|1
RAM/LOCATION/504=1|OH|DELAWARE K56|1|614|3625200|1|R|B|1
RAM/LOCATION/505=1|OK|OKLAHOMA CITY K56|1|405|2807940|1|R|B|1
RAM/LOCATION/506=1|PA|HERSHEY K56|1|717|5342792|1|R|B|1
RAM/LOCATION/507=1|SC|MYRTLE BEACH K56|1|803|6263853|1|R|B|1
RAM/LOCATION/508=1|SC|SUMTER K56|1|803|7731830|1|R|B|1
RAM/LOCATION/509=1|TX|LOREDO|1|956|7644800|1|R|B|1
RAM/LOCATION/510=1|TX|DALLAS K56 (Non ISDN) |1|214|2100645|1|R|A|1|DALTX|003
RAM/LOCATION/511=1|TX|STAFFORD K56|1|281|4036103|1|R|B|1
RAM/LOCATION/512=1|TX|CORPUS CHRISTI K56|1|512|3870405|1|R|B|1
RAM/LOCATION/513=1|TX|HOUSTON (DA) |1|713|3000125|1|R|A|1
RAM/LOCATION/514=1|TX|GRAPEVINE K56|1|817|4210506|1|R|B|1
RAM/LOCATION/515=1|TX|TEXARKANA K56|1|903|7924914|1|R|B|1
RAM/LOCATION/516=1|TX|SANANGELO K56|1|915|6555424|1|R|B|1
RAM/LOCATION/517=1|TX|RICHARDSON K56 (Non ISDN) |1|972|3670025|1|R|A|1|DALTX|004
RAM/LOCATION/518=1|TX|ADDISON K56 (Non ISDN) |1|972|5600506|1|R|A|1|DALTX|005
RAM/LOCATION/519=1|TX|PLANO K56|1|972|8810366|1|R|B|1|DALTX|006
RAM/LOCATION/520=1|TX|GRAND PRAIRIE K56(Non ISDN) |1|972|8900515|1|R|A|1|DALTX|007
RAM/LOCATION/521=1|TX|IRVING K56 (Non ISDN) |1|972|8910530|1|R|A|1|DALTX|008
RAM/LOCATION/522=1|VA|HARRISONBURG K56|1|540|4320816|1|R|B|1
RAM/LOCATION/523=1|VA|MANASSAS|1|703|3925494|1|R|B|1
RAM/LOCATION/524=1|VA|RESTON (Non ISDN) |1|703|9950509|1|R|A|1
RAM/LOCATION/525=1|VA|WILLIAMSBURG|1|757|2217347|1|R|B|1
RAM/LOCATION/526=1|VA|PRINCESS ANNE K56|1|757|5471692|1|R|B|1
RAM/LOCATION/527=1|WA|SPOKANE K56|1|509|3634480|1|R|B|1
RAM/LOCATION/528=1|WA|EVERETT K56|1|425|3399387|1|R|B|1
RAM/LOCATION/529=1|WA|SEATTLE|1|206|4610250|1|R|B|1
RAM/LOCATION/530=1|WA|REDMOND K56|1|425|8818022|1|R|B|1
RAM/LOCATION/531=1|WA|KENNEWICK K56|1|509|7348201|1|R|B|1
RAM/LOCATION/532=1|WI|GREEN BAY K56 (Non ISDN) |1|414|8635901|1|R|A|1
RAM/LOCATION/533=1|WI|WAUSAU K56|1|715|3554128|1|R|B|1
RAM/LOCATION/534=1|AL|TUSCALOOSA K56|1|205|3305809|1|R|B|1
RAM/LOCATION/535=1|AL|DOTHAN K56|1|334|6738234|1|R|B|1
RAM/LOCATION/536=1|TX|SHERMAN K56|1|903|8681614|1|R|A|1
RAM/LOCATION/537=1|CA|FREMONT K56|1|510|7710580|1|R|A|1
RAM/LOCATION/538=1|CA|SAN RAMON|1|510|7710580|1|R|A|1
RAM/LOCATION/539=1|FL|MIAMI K56|1|305|7020000|1|R|A|1
RAM/LOCATION/540=1|FL|ORLANDO K56|1|407|2452969|1|R|B|1
RAM/LOCATION/541=1|GA|AUGUSTA K56|1|706|8210050|1|R|B|1
RAM/LOCATION/542=1|GA|ALBANY K56|1|912|4300075|1|R|B|1
RAM/LOCATION/543=1|IL|FREEPORT K56|1|815|2322426|1|R|B|1
RAM/LOCATION/544=1|SC|SIMPSONVILLE K56|1|864|9672648|1|R|B|1
RAM/LOCATION/545=1|IL|BELLWOOD K56|1|708|4010000|1|R|A|1
RAM/LOCATION/546=1|IL|SUMMIT K56|1|708|9290065|1|R|A|1
RAM/LOCATION/547=1|IL|IRVING K56|1|773|4421520|1|R|A|1
RAM/LOCATION/548=1|IL|BELVIDERE K56|1|815|5444438|1|R|B|1
RAM/LOCATION/549=1|IL|ROCKFORD K56|1|815|8740157|1|R|B|1
                                               Page 9
```

*FIG. 30*

```
                                          APP_A.TXT
RAM/LOCATION/550=1| PA| YORK K56|1|717|8454650|1|R|B|1
RAM/LOCATION/551=1| KS| LAWRENCE K56|1|913|8381860|1|R|B|1
RAM/LOCATION/552=1| KY| LEXINGTON K56|1|606|2582178|1|R|B|1
RAM/LOCATION/553=1| LA| LAKE CHARLES K56|1|318|4774925|1|R|B|1
RAM/LOCATION/554=1| MI| ANN ARBOR K56|1|734|5850041|1|R|B|1
RAM/LOCATION/555=1| MI| DETROIT K56 (Non ISDN) |1|313|9139092|1|R|A|1
RAM/LOCATION/556=1| NV| RENO K56|1|702|3244740|1|R|B|1
RAM/LOCATION/557=1| OH| COLUMBUS K56|1|614|2363605|1|R|B|1
RAM/LOCATION/558=1| AL| HUNTSVILLE K56|1|205|5331663|1|R|B|1
RAM/LOCATION/559=1| CO| FORT COLLINS K56|1|970|2067380|1|R|B|1
RAM/LOCATION/560=1| FL| FORT MYERS K56|1|941|3374228|1|R|B|1
RAM/LOCATION/561=1| FL| BOCA RATON|1|561|3681136|1|R|B|1
RAM/LOCATION/562=1| GA| SAVANNAH K56|1|912|6444260|1|R|B|1
RAM/LOCATION/563=1| IL| CALUMET CITY K56|1|708|7304150|1|R|B|1
RAM/LOCATION/564=1| IL| OAK LAWN K56|1|708|3469000|1|R|B|1
RAM/LOCATION/565=1| IL| BARRINGTON K56|1|847|2772210|1|R|B|1
RAM/LOCATION/566=1| IL| WAUKEGAN K56|1|847|6255650|1|R|B|1
RAM/LOCATION/567=1| IN| TERRE HAUTE K56|1|812|2353900|1|R|B|1
RAM/LOCATION/568=1| LA| LAFAYETTE K56|1|318|2911001|1|R|B|1
RAM/LOCATION/569=1| LA| SHREVEPORT K56|1|318|6753888|1|R|B|1
RAM/LOCATION/570=1| NM| HOBBS K56|1|505|3971964|1|R|B|1
RAM/LOCATION/571=1| NY| WHITE PLAINS K56 (Non ISDN) |1|914|4603054|1|R|A|1
RAM/LOCATION/572=1| OH| YOUNGSTOWN K56|1|330|2702060|1|R|B|1
RAM/LOCATION/573=1| OK| BROKEN ARROW K56|1|918|4612859|1|R|B|1
RAM/LOCATION/574=1| PA| GREENSBURG K56|1|724|8536660|1|R|B|1
RAM/LOCATION/575=1| TN| JACKSON K56|1|901|4225426|1|R|B|1
RAM/LOCATION/576=1| TX| AUSTIN K56|1|512|4210030|1|R|B|1
RAM/LOCATION/577=1| CT| STAMFORD K56 (Non ISDN) |1|203|7051764|1|R|A|1
RAM/LOCATION/578=1| CT| HARTFORD K56 (Non ISDN) |1|860|7060407|1|R|A|1
RAM/LOCATION/579=1| GA| MACON K56|1|912|7654247|1|R|B|1
RAM/LOCATION/580=1| IL| JOLIET K56|1|815|7416430|1|R|B|1
RAM/LOCATION/581=1| KS| WICHITA K56|1|316|2908120|1|R|B|1
RAM/LOCATION/582=1| KS| TOPEKA K56|1|913|3689823|1|R|B|1
RAM/LOCATION/583=1| KY| LOUISVILLE K56|1|502|5821147|1|R|B|1
RAM/LOCATION/584=1| OH| AKRON K56|1|330|7614531|1|R|B|1
RAM/LOCATION/585=1| PA| PHILADELPHIA K56|1|215|3990897|1|R|A|1
RAM/LOCATION/586=1| TX| WACO K56|1|254|2992002|1|R|B|1
RAM/LOCATION/587=1| UT| OGDEN K56|1|801|3996200|1|R|B|1
RAM/LOCATION/588=1| CA| STOCKTON K56|1|209|4638859|1|R|B|1
RAM/LOCATION/589=1| CA| COMPTON K56 (Non ISDN) |1|310|7350762|1|R|A|1
RAM/LOCATION/590=1| CA| INGLEWOOD K56 (Non ISDN) |1|310|8460656|1|R|A|1
RAM/LOCATION/591=1| CA| REDONDO BEACH K56|1|310|7982172|1|R|B|1
RAM/LOCATION/592=1| CA| SAN PEDRO K56 (Non ISDN) |1|310|5070686|1|R|A|1
RAM/LOCATION/593=1| DE| WILMINGTON K56|1|302|5718328|1|R|B|1
RAM/LOCATION/594=1| FL| CLEARWATER K56|1|813|4659301|1|R|B|1
RAM/LOCATION/595=1| NJ| MERCERVILLE K56|1|609|6317980|1|R|B|1
RAM/LOCATION/596=1| NJ| TRENTON K56|1|609|3942970|1|R|B|1
RAM/LOCATION/597=1| NV| LAS VEGAS K56|1|702|6786486|1|R|B|1
RAM/LOCATION/598=1| NY| ROCHESTER K56|1|716|3275670|1|R|B|1
RAM/LOCATION/599=1| OH| SYLVANIA K56|1|419|8247901|1|R|B|1
RAM/LOCATION/600=1| OR| COOS BAY K56|1|541|2692702|1|R|B|1
RAM/LOCATION/601=1| PA| LEVITTOWN K56|1|215|9218100|1|R|B|1
RAM/LOCATION/602=1| TN| NASHVILLE K56|1|615|7330044|1|R|B|1
RAM/LOCATION/603=1| TN| MEMPHIS K56|1|901|8209490|1|R|B|1
RAM/LOCATION/604=1| TX| BEAUMONT K56|1|409|9811200|1|R|B|1
RAM/LOCATION/605=1| TX| AMARILLO K56|1|806|3244000|1|R|B|1
RAM/LOCATION/606=1| TX| TYLER (Gladewater) K56|1|903|8451909|1|R|B|1
RAM/LOCATION/607=1| TX| COLLEGE STATION K56|1|409|8230117|1|R|B|1
RAM/LOCATION/608=1| AL| MOBILE K56|1|334|4316781|1|R|B|1
RAM/LOCATION/609=1| AZ| PHOENIX K56|1|602|6051880|1|R|B|1
RAM/LOCATION/610=1| CA| SAN LUIS OBISPO K56|1|805|5940149|1|R|B|1
RAM/LOCATION/611=1| CA| SHERMAN OAKS K56 (Non ISDN) |1|818|8305781|1|R|A|1
RAM/LOCATION/612=1| CA| CHICO K56|1|530|8940118|1|R|B|1
                                          Page 10
```

*FIG. 31*

```
                                            APP_A.TXT
RAM/LOCATION/613=1| CO|DENVER K56|1|303|5725920|1|R|B|1
RAM/LOCATION/614=1| CT|DANBURY K56 (Non ISDN) |1|203|7780576|1|R|A|1
RAM/LOCATION/615=1| FL|MELBORNE K56|1|407|7231352|1|R|B|1
RAM/LOCATION/616=1| FL|DAYTONA BEACH K56|1|904|2556221|1|R|B|1
RAM/LOCATION/617=1| FL|BONITA SPRINGS K56|1|941|9488260|1|R|B|1
RAM/LOCATION/618=1| ID|BOISE K56|1|208|3958920|1|R|B|1
RAM/LOCATION/619=1| IL|STEWART K56|1|773|3712220|1|R|B|1
RAM/LOCATION/620=1| MA|SPRINGFIELD K56|1|413|8583700|1|R|B|1
RAM/LOCATION/621=1| MO|BRANSON K56|1|417|3340665|1|R|B|1
RAM/LOCATION/622=1| MO|SPRINGFIELD K56|1|417|8756960|1|R|B|1
RAM/LOCATION/623=1| ND|FARGO K56|1|701|2971900|1|R|B|1
RAM/LOCATION/624=1| OH|NEW PHILADELPHIA K56|1|330|6021708|1|R|B|1
RAM/LOCATION/625=1| PA|WILKES BARRE K56|1|717|8253160|1|R|B|1
RAM/LOCATION/626=1| TX|WESTHEIMER K56|1|281|5290005|1|R|B|1
RAM/LOCATION/627=1| VT|BURLINGTON K56 (Non ISDN) |1|802|6520500|1|R|A|1
RAM/LOCATION/628=1| WA|SEATTLE K56 (Non ISDN) |1|206|3366318|1|R|A|1
RAM/LOCATION/629=1| TX|MCALLEN K56|1|956|9843610|1|R|B|1
RAM/LOCATION/630=1| IL|DECATUR K56|1|217|8773410|1|R|B|1
RAM/LOCATION/631=1| MT|HELENA K56 (Non ISDN) |1|406|4449300|1|R|A|1
RAM/LOCATION/632=1| IA|CEDAR RAPIDS K56|1|319|8660100|1|R|B|1
RAM/LOCATION/633=1| AR|JACKSONVILLE K56|1|501|9851715|1|R|B|1
RAM/LOCATION/634=1| MS|GULFPORT K56|1|228|8630585|1|R|B|1
RAM/LOCATION/635=1| TN|CHATTANOOGA K56|1|423|7564045|1|R|B|1
RAM/LOCATION/636=1| CA|COVINA K56|1|626|3377690|1|R|A|1
RAM/LOCATION/637=1| CT|NEW LONDON K56 (Non ISDN) |1|860|4454101|1|R|A|1
RAM/LOCATION/638=1| HI|HONOLULU (ISDN Only) |1|808|9422844|1|R|I|1
RAM/LOCATION/639=1| IL|TAYLORVILLE K56 (Non ISDN) |1|217|8247060|1|R|A|1
RAM/LOCATION/640=1| IL|BELLVILLE K56|1|618|3466750|1|R|B|1
RAM/LOCATION/641=1| IL|CARBONDALE K56 (Non ISDN) |1|618|4570606|1|R|A|1
RAM/LOCATION/642=1| NC|ROCKY MOUNT K56 (Non ISDN) |1|919|9722658|1|R|A|1
RAM/LOCATION/643=1| NE|KEARNEY K56|1|308|8656000|1|R|B|1
RAM/LOCATION/644=1| NY|PORT CHESTER K56 (Non ISDN) |1|914|9963024|1|R|A|1
RAM/LOCATION/645=1| TX|HARLINGEN (Non ISDN) |1|956|4287010|1|R|A|1
RAM/LOCATION/646=1| IL|LINCOLN K56|1|217|7351805|1|R|B|1
RAM/LOCATION/647=1| NH|MANCHESTER K56|1|603|6564300|1|R|B|1
RAM/LOCATION/648=1| CA|VISALIA K56|1|209|7349606|1|R|B|1
RAM/LOCATION/649=1| KY|ELIZABETHTOWN K56|1|502|7652701|1|R|B|1
RAM/LOCATION/650=1| MD|BEL AIR K56|1|410|8380394|1|R|B|1
RAM/LOCATION/651=1| WA|COUPEVILLE K56|1|360|6780383|1|R|B|1
RAM/LOCATION/652=1| WA|MOUNT VERNON K56|1|360|3369586|1|R|B|1
RAM/LOCATION/653=1| WA|WENATCHEE K56|1|509|6621464|1|R|B|1
RAM/LOCATION/654=1| CA|NOVATO K56|1|415|8982652|1|R|B|1
RAM/LOCATION/655=1| AZ|TUCSON K56|1|520|6292980|1|R|B|1
RAM/LOCATION/656=1| CA|FRESNO K56|1|209|2330439|1|R|B|1
RAM/LOCATION/657=1| CA|SALINAS K56|1|408|7510578|1|R|B|1
RAM/LOCATION/658=1| CA|VACAVILLE K56|1|707|4551399|1|R|B|1
RAM/LOCATION/659=1| CT|NEW HAVEN K56 (Non ISDN) |1|203|4959570|1|R|A|1
RAM/LOCATION/660=1| GA|ROME K56 (Non ISDN) |1|706|6023000|1|R|A|1
RAM/LOCATION/661=1| CA|SAN BERNARDINO K56|1|909|8890207|1|R|B|1
RAM/LOCATION/662=1| CA|CLOVIS K56|1|209|2971739|1|R|B|1
RAM/LOCATION/663=1| CA|HEMET K56|1|909|9296384|1|R|B|1
RAM/LOCATION/664=1| CA|LIVERMORE K56|1|510|6060163|1|R|B|1
RAM/LOCATION/665=1| IL|ORLAND PARK K56|1|708|4605760|1|R|B|1
RAM/LOCATION/666=1| IN|BLOOMINGTON K56|1|812|3303320|1|R|B|1
RAM/LOCATION/667=1| MI|SAGINAW K56|1|517|7760060|1|R|B|1
RAM/LOCATION/668=1| NC|WILMINGTON K56|1|910|7631099|1|R|B|1
RAM/LOCATION/669=1| NJ|NEW BRUNSWICK K56|1|732|8859304|1|R|B|1
RAM/LOCATION/670=1| PA|HARRISBURG K56|1|717|2322025|1|R|B|1
RAM/LOCATION/671=1| PA|JOHNSTOWN K56|1|814|5358298|1|R|B|1
RAM/LOCATION/672=1| VA|LORTON K56|1|703|4945975|1|R|B|1
RAM/LOCATION/673=1| VA|WILLIAMSBURG K56|1|757|2532105|1|R|B|1
RAM/LOCATION/674=1| WA|PULLMAN K56|1|509|3340489|1|R|B|1
RAM/LOCATION/675=1| WI|MADISON K56|1|608|8378295|1|R|B|1
                                            Page 11
```

*FIG. 32*

```
                                    APP_A.TXT
RAM/LOCATION/676=1|MD|FREDERICK K56|1|301|8467907|1|R|B|1
RAM/LOCATION/677=1|NJ|IRVINGTON K56|1|973|3744210|1|R|B|1
RAM/LOCATION/678=1|NJ|PATERSON K56|1|973|3457040|1|R|B|1
RAM/LOCATION/679=1|CA|SANTA MARIA K56|1|805|9256950|1|R|B|1
RAM/LOCATION/680=1|CA|REDLANDS K56|1|909|7938713|1|R|B|1
RAM/LOCATION/681=1|FL|TITUSVILLE K56|1|407|2688898|1|R|B|1
RAM/LOCATION/682=1|FL|JACKSONVILLE K56|1|904|3506641|1|R|B|1
RAM/LOCATION/683=1|ID|COEUR D ALENE K56|1|208|7655961|1|R|B|1
RAM/LOCATION/684=1|IL|BELLEVILLE K56|1|618|3467180|1|R|B|1
RAM/LOCATION/685=1|IL|LA SALLE K56|1|815|2248701|1|R|B|1
RAM/LOCATION/686=1|TX|HARLINGEN K56|1|956|3890979|1|R|B|1
RAM/LOCATION/687=1|VA|WARRENTON K56|1|540|3491387|1|R|B|1
RAM/LOCATION/688=1|--|TORONTO K56 (Canada) |1|416|3682622|1|R|B|1
RAM/LOCATION/689=1|IL|ELMHURST K56 (Non ISDN) |1|630|5890578|1|R|A|1
RAM/LOCATION/690=1|IL|KEDZIE K56 (Non ISDN) |1|773|5845020|1|R|A|1
RAM/LOCATION/691=1|IL|LAKEVIEW K56 (Non ISDN) |1|773|5983020|1|R|A|1
RAM/LOCATION/692=1|IL|O HARE K56 (Non ISDN) |1|773|9170012|1|R|A|1
RAM/LOCATION/693=1|IL|MCHENRY K56 (Non ISDN) |1|815|2712004|1|R|A|1
RAM/LOCATION/694=1|IL|ELGIN K56 (Non ISDN) |1|847|8410035|1|R|A|1
RAM/LOCATION/695=1|IL|FRANKLIN K56 (Non ISDN) |1|847|9160501|1|R|A|1
RAM/LOCATION/696=1|NJ|NEWARK K56|1|973|5897536|1|R|B|1
RAM/LOCATION/697=1|NY|BROOKLYN K56 (Non ISDN) |1|718|2100455|1|R|A|1
RAM/LOCATION/698=1|PA|CONSHOHOCKEN K56 (Non ISDN) |1|610|2340527|1|R|A|1
RAM/LOCATION/699=1|PA|KING of PRUSSIA K56 (Non ISDN) |1|610|2330510|1|R|A|1
RAM/LOCATION/700=1|PA|PAOLI K56 (Non ISDN) |1|610|2320524|1|R|A|1
RAM/LOCATION/701=1|RI|PROVIDENCE K56|1|401|7528500|1|R|B|1
RAM/LOCATION/702=1|IN|ELKHART K56|1|219|5229612|1|R|B|1
RAM/LOCATION/703=1|PA|READING|1|610|7363030|1|R|B|1
RAM/LOCATION/704=1|CA|SAN RAMON K56 (Non ISDN) |1|510|5571663|1|R|A|1
RAM/LOCATION/705=1|IN|LAFAYETTE2 K56|1|765|4234864|1|R|B|1
RAM/LOCATION/706=1|TX|MCALLEN K56 (Non ISDN) |1|956|6319832|1|R|A|1
RAM/LOCATION/707=1|TX|BAYTOWN (ISDN Only) |1|281|4272418|1|R|I|1
RAM/LOCATION/708=1|UT|PROVO K56|1|801|3547960|1|R|B|1
RAM/LOCATION/709=1|AL|DECATUR K56|1|205|3550741|1|R|B|1
RAM/LOCATION/710=1|CA|CRESCENT CITY K56|1|707|4653603|1|R|B|1
RAM/LOCATION/711=1|CA|GILROY K56|1|408|8420358|1|R|B|1
RAM/LOCATION/712=1|CA|MURRIETA K56|1|909|6777536|1|R|B|1
RAM/LOCATION/713=1|CA|SAUSALITO K56|1|415|3320391|1|R|B|1
RAM/LOCATION/714=1|CA|SUNNYMEAD K56|1|909|9248508|1|R|B|1
RAM/LOCATION/715=1|FL|TAMPA K56|1|813|3076000|1|R|B|0
RAM/LOCATION/716=1|IL|NEW CASTLE K56|1|773|6323020|1|R|B|1
RAM/LOCATION/717=1|NC|GOLDSBORO K56|1|919|7319796|1|R|B|1
RAM/LOCATION/718=1|NY|POUGHKEEPSIE K56|1|914|4517960|1|R|B|1
RAM/LOCATION/719=1|OR|EUGENE K56|1|541|6844070|1|R|B|1
RAM/LOCATION/720=1|TX|BROWNWOOD K56|1|915|6462876|1|R|B|1
RAM/LOCATION/721=1|TX|WICHITA FALLS K56 (Non-ISDN) |1|940|3972210|1|R|B|1
RAM/LOCATION/722=1|VA|ARCOLA|1|703|3276825|1|R|B|1
RAM/LOCATION/723=1|WA|BERMERTON K56|1|360|3082280|1|R|B|1
RAM/LOCATION/724=1|WV|CLARKSBURG K56|1|304|6232108|1|R|B|1
RAM/LOCATION/725=1|ME|CAMDEN K56|1|207|5931000|1|R|B|1
RAM/LOCATION/726=1|CA|ADELANTO K56 (Non-ISDN) |1|760|2469157|1|R|A|1
RAM/LOCATION/727=1|CA|BARSTOW K56 (Non-ISDN) |1|760|2563218|1|R|A|1
RAM/LOCATION/728=1|CA|BISHOP K56 (Non-ISDN) |1|760|8728158|1|R|A|1
RAM/LOCATION/729=1|CA|BLYTHE K56 (Non-ISDN) |1|760|9210067|1|R|A|1
RAM/LOCATION/730=1|CA|INDIO K56|1|760|3422698|1|R|B|1
RAM/LOCATION/731=1|CA|MAMMOTH LAKE K56 (Non-ISDN) |1|760|9343329|1|R|A|1
RAM/LOCATION/732=1|CA|MURRIETA K56 (Non-ISDN) |1|909|6777536|1|R|A|1
RAM/LOCATION/733=1|CA|SANTA YNEZ K56|1|850|6882857|1|R|B|1
RAM/LOCATION/734=1|AK|JUNEAU K56 (Non-ISDN) |1|907|4632551|1|R|A|1
RAM/LOCATION/735=1|AL|AUBURN/OPELIKA K56|1|334|5021353|1|R|B|1
RAM/LOCATION/736=1|AR|FAYETTEVILLE K56|1|501|9735090|1|R|B|1
RAM/LOCATION/737=1|CA|BANNING K56|1|909|8493586|1|R|B|1
RAM/LOCATION/738=1|CA|PALM SPRINGS K56|1|760|4163979|1|R|B|1
                                    Page 12
```

*FIG. 33*

```
                                              APP_A.TXT
RAM/LOCATION/739=1|CA|PERRIS|1|909|9400166|1|R|B|1
RAM/LOCATION/740=1|CA|RIDGECREST K56 (Non-ISDN)  |1|760|3712529|1|R|A|1
RAM/LOCATION/741=1|CA|SANTA PAULA K56|1|805|5259475|1|R|B|1
RAM/LOCATION/742=1|FL|NORTH PORT K56|1|941|4290100|1|R|B|1
RAM/LOCATION/743=1|FL|PENSACOLA K56|1|850|4539550|1|R|B|1
RAM/LOCATION/744=1|FL|ZEPHYRHILLS K56|1|813|7880518|1|R|B|1
RAM/LOCATION/745=1|GA|CALHOUN K56 (Non-ISDN)  |1|706|6023000|1|R|A|1
RAM/LOCATION/746=1|IA|DAVENPORT K56|1|319|4455500|1|R|B|1
RAM/LOCATION/747=1|IL|JACKSONVILLE K56|1|217|4790236|1|R|B|1
RAM/LOCATION/748=1|MA|BROCKTON K56|1|508|8942400|1|R|B|1
RAM/LOCATION/749=1|MA|WORCESTER K56|1|508|9293200|1|R|B|1
RAM/LOCATION/750=1|MD|DAMASCUS K56|1|301|4820170|1|R|B|1
RAM/LOCATION/751=1|MI|BELLEVILLE K56|1|734|9575550|1|R|B|1
RAM/LOCATION/752=1|NC|DUCK K56 (Non-ISDN)  |1|919|2610430|1|R|A|1
RAM/LOCATION/753=1|NJ|HOLMDEL K56|1|732|8179100|1|R|B|1
RAM/LOCATION/754=1|NJ|LONG BEACH K56|1|732|2639803|1|R|B|1
RAM/LOCATION/755=1|NJ|RAHWAY K56|1|732|3819482|1|R|B|1
RAM/LOCATION/756=1|NY|NIAGARA FALLS K56|1|716|2781320|1|R|B|1
RAM/LOCATION/757=1|PA|PITTSBURGH K56|1|412|4714431|1|R|B|1
RAM/LOCATION/758=1|SC|FLORENCE K56|1|803|6625500|1|R|B|1
RAM/LOCATION/759=1|SD|SIOUX FALLS K56|1|605|3671880|1|R|B|1
RAM/LOCATION/760=1|IL|LITCHFIELD K56 (Non-ISDN)  |1|217|3247080|1|R|A|1
RAM/LOCATION/761=1|VA|CHARLOTTESVILLE K56|1|804|2970357|1|R|B|1
RAM/LOCATION/762=1|WA|OLYMPIA K56|1|360|7542790|1|R|B|1
RAM/LOCATION/763=1|CA|BIG BEAR LAKE K56 (Non-ISDN)  1|909|8565909|1|R|A|1
RAM/LOCATION/764=1|CA|JOSHUA TREE K56 (Non-ISDN)  1|760|3669336|1|R|A|1
RAM/LOCATION/765=1|MA|ANDOVER K56|1|978|6843200|1|R|B|1
RAM/LOCATION/766=1|MA|DANVERS K56|1|978|7399800|1|R|B|1
RAM/LOCATION/767=1|NC|FAYETTEVILLE K56 (Non-ISDN)  |1|910|3233464|1|R|A|1
RAM/LOCATION/768=1|NJ|PRINCETON K56|1|609|4302490|1|R|B|1
RAM/LOCATION/769=1|NJ|TOM RIVERS K56|1|732|2406816|1|R|B|1
RAM/LOCATION/770=1|NY|ROME/UTICA K56|315|7319120|1|R|B|1
RAM/LOCATION/771=1|PA|SCRANTON K56|1|717|9612518|1|R|B|1
RAM/LOCATION/772=1|SC|CHARLESTON K56|1|803|7721975|1|R|B|1
RAM/LOCATION/773=1|TX|CANTON K56 (Non-ISDN)  |1|903|5675869|1|R|A|1
RAM/LOCATION/774=1|AK|ANCHORAGE K56|1|907|8687594|1|R|B|1
RAM/LOCATION/775=1|NY|FARMINGDALE K56|1|516|5014180|1|R|B|1
RAM/LOCATION/776=1|SC|COLUMBIA K56|1|803|7790755|1|R|B|1
RAM/LOCATION/777=1|VA|CULPEPER K56|1|540|8294651|1|R|B|1
RAM/LOCATION/778=1|FL|FORT PIERCE K56|1|561|4620023|1|R|B|1
RAM/LOCATION/779=1|KY|BOWLING GREEN K56|1|502|7838512|1|R|B|1
RAM/LOCATION/780=1|NC|WINSTON SALEM K56|1|336|7210166|1|R|B|1
RAM/LOCATION/781=1|NJ|FREEHOLD K56|1|732|7861359|1|R|B|1
RAM/LOCATION/782=1|WV|MARTINSBURG K56|1|304|2622801|1|R|B|1
RAM/LOCATION/783=1|IL|MATTOON K56 (Non-ISDN)  |1|217|2585360|1|R|A|1
RAM/LOCATION/784=1|IL|CHICAGO HEIGHTS K56|1|708|7572690|1|R|B|1
RAM/LOCATION/785=1|IL|CRYSTAL LAKE K56 (Non-ISDN)  1|815|2612005|1|R|A|1
RAM/LOCATION/786=1|IL|PLAINFIELD K56 (Non-ISDN)  |1|815|2672005|1|R|A|1
RAM/LOCATION/787=1|IL|DeKALB K56|1|815|7482638|1|R|B|1
RAM/LOCATION/788=1|IL|ROCKFORD K56|1|815|8740157|1|R|B|1
RAM/LOCATION/789=1|MA|BRAINTREE K56|1|781|7940300|1|R|B|1
RAM/LOCATION/790=1|NY|GREAT NECK K56|1|516|4983580|1|R|B|1
RAM/LOCATION/791=1|NC|RESEARCH TRIANGLE PARK K56|1|919|3160901|1|R|B|1
RAM/LOCATION/792=1|PA|LANCASTER K56|1|717|8721135|1|R|B|1
RAM/LOCATION/793=1|WA|CASHMERE K56|1|509|7828171|1|R|B|1
RAM/LOCATION/794=1|--|St. THOMAS K56 (Non-ISDN)  |1|340|7775511|1|R|A|1

BTN.DB

Page 13
```

*FIG. 34*

```
                              APP_A.TXT
RAM/SYS/NNC/BUTTONS/0/1/CAPTION=Web Browser
RAM/SYS/NNC/BUTTONS/0/1/ENABLED=Y
RAM/SYS/NNC/BUTTONS/0/1/EXETYPE=U
RAM/SYS/NNC/BUTTONS/0/1/HINT=Press for Web Browser
RAM/SYS/NNC/BUTTONS/0/1/URL=F4:http://www.netsafe.net/start/
RAM/SYS/NNC/BUTTONS/0/2/CAPTION=Email
RAM/SYS/NNC/BUTTONS/0/2/ENABLED=Y
RAM/SYS/NNC/BUTTONS/0/2/EXEC=C:\netsafe\netsafe.exe nmail
RAM/SYS/NNC/BUTTONS/0/2/EXETYPE=X
RAM/SYS/NNC/BUTTONS/0/2/HINT=Press for Email
RAM/SYS/NNC/BUTTONS/0/3/CAPTION=Search Engine
RAM/SYS/NNC/BUTTONS/0/3/ENABLED=Y
RAM/SYS/NNC/BUTTONS/0/3/EXETYPE=U
RAM/SYS/NNC/BUTTONS/0/3/HINT=Press for Search Engine
RAM/SYS/NNC/BUTTONS/0/3/URL=F4:http://www.netsafe.net/search/
RAM/SYS/NNC/BUTTONS/0/4/CAPTION=NetSafe Chat
RAM/SYS/NNC/BUTTONS/0/4/ENABLED=Y
RAM/SYS/NNC/BUTTONS/0/4/EXETYPE=U
RAM/SYS/NNC/BUTTONS/0/4/HINT=Press for NetSafe Member Services Chat
RAM/SYS/NNC/BUTTONS/0/4/URL=F4:http://www.netsafe.net/chat/
RAM/SYS/NNC/BUTTONS/0/5/CAPTION=Newsgroups
RAM/SYS/NNC/BUTTONS/0/5/ENABLED=Y
RAM/SYS/NNC/BUTTONS/0/5/EXEC=C:\netsafe\agent\agent.exe
RAM/SYS/NNC/BUTTONS/0/5/EXETYPE=O
RAM/SYS/NNC/BUTTONS/0/5/HINT=Press for Internet Newsgroups
RAM/SYS/NNC/BUTTONS/0/5/URL=http://www.netsafe.net/neat/mot/inagent.mot
RAM/SYS/NNC/BUTTONS/1/1/CAPTION=My HomePage
RAM/SYS/NNC/BUTTONS/1/1/ENABLED=Y
RAM/SYS/NNC/BUTTONS/1/1/EXETYPE=U
RAM/SYS/NNC/BUTTONS/1/1/HINT=Press for your personal Home Page
RAM/SYS/NNC/BUTTONS/1/1/URL=F0:http://www.myhomepage.net/~
RAM/SYS/NNC/BUTTONS/1/2/CAPTION=Publishing Info
RAM/SYS/NNC/BUTTONS/1/2/ENABLED=Y
RAM/SYS/NNC/BUTTONS/1/2/EXETYPE=U
RAM/SYS/NNC/BUTTONS/1/2/HINT=Press for information on publishing your homepage
RAM/SYS/NNC/BUTTONS/1/2/URL=F1:http://www.myhomepage.net/hpcenter.htm
RAM/SYS/NNC/BUTTONS/1/3/CAPTION=FTP to Webspace
RAM/SYS/NNC/BUTTONS/1/3/ENABLED=Y
RAM/SYS/NNC/BUTTONS/1/3/EXEC=c:\netsafe\netsafe.exe webftp homepage
RAM/SYS/NNC/BUTTONS/1/3/EXETYPE=O
RAM/SYS/NNC/BUTTONS/1/3/HINT=Press to ftp personal web space.
RAM/SYS/NNC/BUTTONS/1/4/CAPTION=Home Page Wizard
RAM/SYS/NNC/BUTTONS/1/4/ENABLED=Y
RAM/SYS/NNC/BUTTONS/1/4/EXEC=C:\netsafe\hpwiz.exe
RAM/SYS/NNC/BUTTONS/1/4/EXETYPE=X
RAM/SYS/NNC/BUTTONS/1/4/HINT=Press to create or update your custom Home Page
RAM/SYS/NNC/BUTTONS/1/4/URL=F4:http://www.netsafe.net/homepages/wiz.htm
RAM/SYS/NNC/BUTTONS/1/5/CAPTION=FTP
RAM/SYS/NNC/BUTTONS/1/5/ENABLED=Y
RAM/SYS/NNC/BUTTONS/1/5/EXEC=C:\netsafe\netsafe webftp
RAM/SYS/NNC/BUTTONS/1/5/EXETYPE=O
RAM/SYS/NNC/BUTTONS/1/5/HINT=Press for File Transfer
RAM/SYS/NNC/BUTTONS/2/1/CAPTION=Register A Friend
RAM/SYS/NNC/BUTTONS/2/1/ENABLED=Y
RAM/SYS/NNC/BUTTONS/2/1/EXEC=c:\netsafe\netsafe register -remote
RAM/SYS/NNC/BUTTONS/2/1/EXETYPE=X
RAM/SYS/NNC/BUTTONS/2/1/HINT=Press to register new users
RAM/SYS/NNC/BUTTONS/2/2/CAPTION=Stamp NEAT! Disks
RAM/SYS/NNC/BUTTONS/2/2/ENABLED=Y
RAM/SYS/NNC/BUTTONS/2/2/EXEC=c:\netsafe\register supernet
RAM/SYS/NNC/BUTTONS/2/2/EXETYPE=X
RAM/SYS/NNC/BUTTONS/2/2/HINT=Press to Master NEAT! distribution disks
                              Page 14
```

*FIG. 35*

```
                                              APP_A.TXT
RAM/SYS/NNC/BUTTONS/2/3/CAPTION=Change Plans
RAM/SYS/NNC/BUTTONS/2/3/ENABLED=Y
RAM/SYS/NNC/BUTTONS/2/3/EXEC=c:\netsafe\netsafe.exe register -refresh
RAM/SYS/NNC/BUTTONS/2/3/EXETYPE=U
RAM/SYS/NNC/BUTTONS/2/3/HINT=Press to Change Service Plan or Representive Type
RAM/SYS/NNC/BUTTONS/2/3/URL=F4:http://www.npn.net/change/
RAM/SYS/NNC/BUTTONS/2/4/CAPTION=Add Email Account
RAM/SYS/NNC/BUTTONS/2/4/ENABLED=Y
RAM/SYS/NNC/BUTTONS/2/4/EXEC=c:\netsafc\netsafe.exe update addemail
RAM/SYS/NNC/BUTTONS/2/4/EXETYPE=X
RAM/SYS/NNC/BUTTONS/2/4/HINT=Add additional email accounts
RAM/SYS/NNC/BUTTONS/2/5/CAPTION=Account Profile
RAM/SYS/NNC/BUTTONS/2/5/ENABLED=Y
RAM/SYS/NNC/BUTTONS/2/5/EXETYPE=3
RAM/SYS/NNC/BUTTONS/2/5/HINT=Press for Account Profile
RAM/SYS/NNC/BUTTONS/3/1/CAPTION=ISP Homepage
RAM/SYS/NNC/BUTTONS/3/1/ENABLED=Y
RAM/SYS/NNC/BUTTONS/3/1/EXETYPE=U
RAM/SYS/NNC/BUTTONS/3/1/HINT=Press for ISP Homepage
RAM/SYS/NNC/BUTTONS/3/1/URL=F4:http://www.npn.net/
RAM/SYS/NNC/BUTTONS/3/2/CAPTION=Presentations
RAM/SYS/NNC/BUTTONS/3/2/ENABLED=Y
RAM/SYS/NNC/BUTTONS/3/2/EXETYPE =U
RAM/SYS/NNC/BUTTONS/3/2/HINT=Press for NetSafe presentations
RAM/SYS/NNC/BUTTONS/3/2/URL= F4:http://www.npn.net/presentation/
RAM/SYS/NNC/BUTTONS/3/3/CAPTION=ISP Materials
RAM/SYS/NNC/BUTTONS/3/3/ENABLED=Y
RAM/SYS/NNC/BUTTONS/3/3/EXETYPE=U
RAM/SYS/NNC/BUTTONS/3/3/HINT=Press for ISP Materials page
RAM/SYS/NNC/BUTTONS/3/3/URL=F4:http://www.npn.net/ispinfo/
RAM/SYS/NNC/BUTTONS/3/4/CAPTION=ISP Reports
RAM/SYS/NNC/BUTTONS/3/4/ENABLED=Y
RAM/SYS/NNC/BUTTONS/3/4/EXETYPE=U
RAM/SYS/NNC/BUTTONS/3/4/HINT=Press to see your NetSafe account status
RAM/SYS/NNC/BUTTONS/3/4/URL=F4:http://info.netsafe.net:443/ispreport.pl
RAM/SYS/NNC/BUTTONS/3/5/CAPTION=Account Profile
RAM/SYS/NNC/BUTTONS/3/5/ENABLED=Y
RAM/SYS/NNC/BUTTONS/3/5/EXETYPE=3
RAM/SYS/NNC/BUTTONS/3/5/HINT=Press for Account Profile
RAM/SYS/NNC/BUTTONS/4/1/CAPTION=PNC Preferences
RAM/SYS/NNC/BUTTONS/4/1/ENABLED=Y
RAM/SYS/NNC/BUTTONS/4/1/EXETYPE=1
RAM/SYS/NNC/BUTTONS/4/1/HINT=Press to view/update system preferences
RAM/SYS/NNC/BUTTONS/4/2/CAPTION=Account Profile
RAM/SYS/NNC/BUTTONS/4/2/ENABLED=Y
RAM/SYS/NNC/BUTTONS/4/2/EXETYPE=3
RAM/SYS/NNC/BUTTONS/4/2/HINT=Press for Account Profile
RAM/SYS/NNC/BUTTONS/4/3/CAPTION=Refresh Account Data
RAM/SYS/NNC/BUTTONS/4/3/ENABLED=Y
RAM/SYS/NNC/BUTTONS/4/3/EXEC=c:\netsafe\netsafe.exe register -refresh
RAM/SYS/NNC/BUTTONS/4/3/EXETYPE=X
RAM/SYS/NNC/BUTTONS/4/3/HINT=Updates account information on this system.
RAM/SYS/NNC/BUTTONS/4/4/CAPTION=Update Phone Numbers
RAM/SYS/NNC/BUTTONS/4/4/ENABLED=Y
RAM/SYS/NNC/BUTTONS/4/4/EXETYPE=U
RAM/SYS/NNC/BUTTONS/4/4/HINT=Press to automatically update your phone numbers
RAM/SYS/NNC/BUTTONS/4/4/URL=F4:http://www.netsafe.net/phone/
RAM/SYS/NNC/BUTTONS/4/5/CAPTION=Dialing Properties
RAM/SYS/NNC/BUTTONS/4/5/ENABLED=Y
RAM/SYS/NNC/BUTTONS/4/5/EXETYPE=4
RAM/SYS/NNC/BUTTONS/4/5/HINT=Press to set Dialing Properties
RAM/SYS/NNC/BUTTONS/5/1/CAPTION=NetSafe Help
RAM/SYS/NNC/BUTTONS/5/1/ENABLED=Y
                                              Page 15
```

*FIG. 36*

```
                                            APP_A.TXT
RAM/SYS/NNC/BUTTONS/5/1/EXEC=winhelp c:\netsafe\netsafe.hlp
RAM/SYS/NNC/BUTTONS/5/1/EXETYPE=X
RAM/SYS/NNC/BUTTONS/5/1/HINT=Help on the NetSafe Navigation Center
RAM/SYS/NNC/BUTTONS/5/2/CAPTION=Browser Help
RAM/SYS/NNC/BUTTONS/5/2/ENABLED=Y
RAM/SYS/NNC/BUTTONS/5/2/EXETYPE=U
RAM/SYS/NNC/BUTTONS/5/2/HINT=Help on the NetSafe Explorer Browser
RAM/SYS/NNC/BUTTONS/5/2/URL= file:c:\netsafe\help\topics.htm
RAM/SYS/NNC/BUTTONS/5/3/CAPTION=NEAT! Home Page
RAM/SYS/NNC/BUTTONS/5/3/ENABLED=Y
RAM/SYS/NNC/BUTTONS/5/3/EXETYPE=U
RAM/SYS/NNC/BUTTONS/5/3/HINT=Press for NEAT! homepage
RAM/SYS/NNC/BUTTONS/5/3/URL=F4:http://www.npn.net/neat/
RAM/SYS/NNC/BUTTONS/5/4/CAPTION=Online Help
RAM/SYS/NNC/BUTTONS/5/4/ENABLED=Y
RAM/SYS/NNC/BUTTONS/5/4/EXETYPE=U
RAM/SYS/NNC/BUTTONS/5/4/HINT=Press for online help
RAM/SYS/NNC/BUTTONS/5/4/URL=F4:http://www.netsafe.net/help/
RAM/SYS/NNC/BUTTONS/5/5/CAPTION=Dial Test
RAM/SYS/NNC/BUTTONS/5/5/ENABLED=Y
RAM/SYS/NNC/BUTTONS/5/5/EXEC=c:\netsafe\netsafe nsdial d
RAM/SYS/NNC/BUTTONS/5/5/EXETYPE=X
RAM/SYS/NNC/BUTTONS/5/5/HINT=Press for Network Dial Test
RAM/SYS/NNC/BUTTONS/6/1/CAPTION= ISR Homepage
RAM/SYS/NNC/BUTTONS/6/1/ENABLED=Y
RAM/SYS/NNC/BUTTONS/6/1/EXEC=winhelp c:\netsafe\netsafe.hlp
RAM/SYS/NNC/BUTTONS/6/1/EXETYPE=U
RAM/SYSINNC/BUTTONS/6/1/HINT=Press for ISR Homepage
RAM/SYS/NNC/BUTTONS/6/1/URL=F4:http://www.netrepreneur.net/
RAM/SYS/NNC/BUTTONS/6/2/CAPTION= Presentations
RAM/SYS/NNC/BUTTONS/6/2/ENABLED=Y
RAM/SYS/NNC/BUTTONS/6/2/EXETYPE=U
RAM/SYS/NNC/BUTTONS/6/2/HINT=Press for NetSafe presentations
RAM/SYS/NNC/BUTTONS/6/2/URL=F4:http://www.netrepreneur.net/presentation/
RAM/SYS/NNC/BUTTONS/6/3/CAPTION= ISR Materials
RAM/SYS/NNC/BUTTONS/6/3/ENABLED=Y
RAM/SYS/NNC/BUTTONS/6/3/EXETYPE=U
RAM/SYS/NNC/BUTTONS/6/3/HINT=Press for ISR Materials page
RAM/SYS/NNC/BUTTONS/6/3/URL=F4:http://www.netrepreneur.net/isrinfo/
RAM/SYS/NNC/BUTTONS/6/4/CAPTION=ISR Reports
RAM/SYS/NNC/BUTTONS/6/4/ENABLED=Y
RAM/SYS/NNC/BUTTONS/6/4/EXETYPE=U
RAM/SYS/NNC/BUTTONS/6/4/HINT=Press to see your NetSafe account status
RAM/SYS/NNC/BUTTONS/6/4/URL=F4:http://www.netrepreneur.net/account/
RAM/SYS/NNC/BUTTONS/6/5/CAPTION=Account Profile
RAM/SYS/NNC/BUTTONS/6/5/ENABLED=Y
RAM/SYS/NNC/BUTTONS/6/5/EXETYPE=3
RAM/SYS/NNC/BUTTONS/6/5/HINT=Press for Account Profile
RAM/SYS/NNC/BUTTONS/7/1/CAPTION=AMR  onBoard
RAM/SYS/NNC/BUTTONS/7/1/ENABLED=Y
RAM/SYS/NNC/BUTTONS/7/1/EXETYPE=U
RAM/SYS/NNC/BUTTONS/7/1/HINT=AMR, Parent Corporation of American Airlines
RAM/SYS/NNC/BUTTONS/7/1/URL=F1:http://www.amrcorp.com/
RAM/SYS/NNC/BUTTONS/7/2/CAPTION=American Airlines
RAM/SYS/NNC/BUTTONS/7/2/ENABLED=Y
RAM/SYS/NNC/BUTTONS/7/2/EXETYPE=U
RAM/SYS/NNC/BUTTONS/7/2/HINT=American Airlines Homepage
RAM/SYS/NNC/BUTTONS/7/2/URL=F1:http://www.americanair.com/aa_home.htm
RAM/SYS/NNC/BUTTONS/7/3/CAPTION= Flight Schedules
RAM/SYS/NNC/BUTTONS/7/3/ENABLED=Y
RAM/SYS/NNC/BUTTONS/7/3/EXETYPE=U
RAM/SYS/NNC/BUTTONS/7/3/HINT=American Airlines Flight Schedules
RAM/SYS/NNC/BUTTONS/7/3/URL=F1:http://www5.americanair.com/cgi-bin/ff/fs
                                            Page 16
```

*FIG. 37*

```
                                            APP_A.TXT
RAM/SYS/NNC/BUTTONS/7/4/CAPTION=Fare Quotes
RAM/SYS/NNC/BUTTONS/7/4/ENABLED=Y
RAM/SYS/NNC/BUTTONS/7/4/EXETYPE=U
RAM/SYS/NNC/BUTTONS/7/4/HINT=American Airlines Fare Quotes
RAM/SYS/NNC/BUTTONS/7/4/URL=F1:http://www4.americanair.com/cgi-bin/ff/fq
RAM/SYS/NNC/BUTTONS/7/5/CAPTION=AAdvantage
RAM/SYS/NNC/BUTTONS/7/5/ENABLED=Y
RAM/SYS/NNC/BUTTONS/7/5/EXETYPE=U
RAM/SYS/NNC/BUTTONS/7/5/HINT=Check your AAdvantage
RAM/SYS/NNC/BUTTONS/7/5/URL=F1:http://www.americanair.com/aa_home/aadvantage.htm
RAM/SYS/NNC/CAPTION1=AMR Client Navigator - Release
RAM/SYS/NNC/HELP=5
RAM/SYS/NNC/TABORDER/1-NONE=7,0,1,2,4,5
RAM/SYS/NNC/TABORDER/2-NONE=7,0,1,2,4,5
RAM/SYS/NNC/TABORDER/3-NONE=7,0,1,2,4,5
RAM/SYS/NNC/TABORDER/4-NONE=7,0,1,2,4,5
RAM/SYS/NNC/TABORDER/5-NONE=7,0,1,2,4,5
RAM/SYS/NNC/TABORDER/6-NONE=7,0,1,2,4,5
RAM/SYS/NNC/TABORDER/7-NONE=7,0,1,2,4,5
RAM/SYS/NNC/TABORDER/8-NONE=7,0,1,2,4,5
RAM/SYS/NNC/TABORDER/A=7,0,1,2,4,5
RAM/SYS/NNC/TABORDER/A-NONE=7,0,1,2,4,5
RAM/SYS/NNC/TABORDER/B=7,0,1,2,4,5
RAM/SYS/NNC/TABORDER/B-NONE=7,0,1,2,4,5
RAM/SYS/NNC/TABORDER/BOTH=7,0,1,2,4,5
RAM/SYS/NNC/TABORDER/C=7,0,1,2,4,5
RAM/SYS/NNC/TABORDER/C-NONE=7,0,1,2,4,5
RAM/SYS/NNC/TABORDER/D=7,0,1,2,4,5
RAM/SYS/NNC/TABORDER/D-NONE=7,0,1,2,4,5
RAM/SYS/NNC/TABORDER/ISR=7,0,1,2,4,5
RAM/SYS/NNC/TABS/0=Internet Tools
RAM/SYS/NNC/TABS/1=Homepage Tools
RAM/SYS/NNC/TABS/2=Member Services
RAM/SYS/NNC/TABS/3=ISP Tools
RAM/SYS/NNC/TABS/4=Configuration
RAM/SYS/NNC/TABS/5=Help
RAM/SYS/NNC/TABS/6=ISR Tools
RAM/SYS/NNC/TABS/7=American Air
BTNDB/VER=416
PHONEDB/NETISP/0=0,1
PHONEDB/NETISP/0/NAME=GTE
PHONEDB/NETISP/1=0,1
PHONEDB/NETISP/1/NAME=UUNET
PHONEDB/NETISP/2=2
PHONEDB/NETISP/2/NAME= PSINet
PHONEDB/NETISP/3=3
PHONEDB/NETISP/3/NAME=MCI
PHONEDB/VER=033
RAM/ACCT/DIAL/CWSTR/0=*70,
RAM/ACCT/DIAL/FLAGS/0=8
RAM/ACCT/DIAL/LD/0=0
RAM/ACCT/DIAL/OLSTR/0=9,
RAM/ACCT/DIAL/TONE=1
RAM/ACCT/REG/0/LOCATION/LOC=005
RAM/ACCT/REG/0/PAPID=nsregister
RAM/ACCT/REG/0/PAPPW=Ref28dhs
RAM/ACCT/REG/1/LOCATION/LOC=000
RAM/ACCT/REG/1/PAPID=ns000reg
RAM/ACCT/REG/1/PAPPW=457Dh346
RAM/ACCT/REG/2/LOCATION/LOC=1005
RAM/ACCT/REG/2/PAPID=nsregPS I
RAM/ACCT/REG/2/PAPPW=34gawehg245
RAM/ACCT/REG/3/LOCATION/LOC=000
                                            Page 17
```

*FIG. 38*

APP_A.TXT

```
RAM/ACCT/REG/3/PAPID=nsmcireg
RAM/ACCT/REG/3/PAPPW=few63AAs2r2
RAM/ACCT/REG/COUNT=0
RAM/ACCT/TEST/0/LOCATION/LOC=065
RAM/ACCT/TEST/0/PAPID=nsTEST
RAM/ACCT/TEST/0/PAPPW=zzzwww123
RAM/ACCT/TEST/1/LOCATION/LOC=519
RAM/ACCT/TEST/1/PAPID=nsTEST
RAM/ACCT/TEST/1/PAPPW=zzzwww123
RAM/ACCT/TEST/2/LOCATION/LOC=000
RAM/ACCT/TEST/2/PAPID=nsTEST000
RAM/ACCT/TEST/2/PAPPW=zrfwww123
RAM/ACCT/TEST/3/LOCATION/LOC=000
RAM/ACCT/TEST/3/PAPID=nsT4543
RAM/ACCT/TEST/3/PAPPW=ss312fG
RAM/ACCT/TEST/COUNT=1
RAM/ACCT/USER/0/ACCT=1
RAM/ACCT/USER/0/ACHKMAIL=0
RAM/ACCT/USER/0/ACH_KONLINE=0
RAM/ACCT/USER/0/ACHKSTART=0
RAM/ACCT/USER/0/ADDEMAIL/1/EID=clowe
RAM/ACCT/USER/0/ADDEMAIL/1/EMAIL=clowe@mymail.net
RAM/ACCT/USER/0/ADDEMAIL/1/EPW=4D39bgUaS
RAM/ACCT/USER/0/ADDEMAIL/1/FNAME=CLOWE
RAM/ACCT/USER/0/ADDEMAIL/1/LNAME=SMITH
RAM/ACCT/USER/0/ADDEMAIL/1/POPNAME=pop.mymail.net
RAM/ACCT/USER/0/ADDEMAIL/1/POPNUM=206.124.90.4
RAM/ACCT/USER/0/ADDEMAIL/1/SMTPNAME=mail.mymail.net
RAM/ACCT/USER/0/ADDEMAIL/1/SMTPNUM=206.124.90.4
RAM/ACCT/USER/0/ADDR=1 MAIN
RAM/ACCT/USER/0/ADDR2=THREE LINCOLN CENTRE
RAM/ACCT/USER/0/ANNMAIL=1
```

NS.DB

```
RAM/ACCT/USER/0/AUTOADD=1
RAM/ACCT/USER/0/AUTOURL=f4:http://www.netsafe.net/start/
RAM/ACCT/USER/0/BIRTH=022960
RAM/ACCT/USER/0/BUSNAME=PENATEK INDUSTRIES INC
RAM/ACCT/USER/0/CCEXPY=1996
RAM/ACCT/USER/0/CHKMINUTES=10
RAM/ACCT/USER/0/CIDSTATUS=Comp
RAM/ACCT/USER/0/CITY=DALLAS
RAM/ACCT/USER/0/CNTY=DALLAS
RAM/ACCT/USER/0/COLOR1=Blue
RAM/ACCT/USER/0/COLOR2=Silver
RAM/ACCT/USER/0/DELETEMAIL=1
RAM/ACCT/USER/0/DLST=TX
RAM/ACCT/USER/0/EMAIL=freddy@mymail.net
RAM/ACCT/USER/0/EMPTYTRASH=1
RAM/ACCT/USER/0/ERN=3787
RAM/ACCT/USER/0/ERROR=0
RAM/ACCT/USER/0/FNAME=FRED
RAM/ACCT/USER/0/FRIENDLY=Fred Astair
RAM/ACCT/USER/0/GROUP=NETSAFE
RAM/ACCT/USER/0/HEADERS=0
```

Page 18

*FIG. 39*

```
                                                    APP_A.TXT
RAM/ACCT/USER/0/HNUM=2145551234
RAM/ACCT/USER/0/HOMEPAGE=http://www.myhomepage.net/~freddy
RAM/ACCT/USER/0/HPSERVER=www.myhomepage.net
RAM/ACCT/USER/0/HPSERVER/INITIAILDIR=homepage
RAM/ACCT/USER/0/ISP=BOTH
RAM/ACCT/USER/0/LATTACH=0
RAM/ACCT/USER/0/LBOX=3
RAM/ACCT/USER/0/LNAME=ASTAIR
RAM/ACCT/USER/0/LOCATION/LOC=065
RAM/ACCT/USER/0/MBOX_M0=m0=Inbox
RAM/ACCT/USER/0/MBOX_M1=m1=Sent Items
RAM/ACCT/USER/0/MBOX_M2=m2=Trash
RAM/ACCT/USER/0/MBOX_M3=m3=Outbox
RAM/ACCT/USER/0/METHOD=2
RAM/ACCT/USER/0/MID=0
RAM/ACCT/USER/0/NEWSCASE=PAPID_PAPPW
RAM/ACCT/USER/0/NEWSNAME=news.mymail.net
RAM/ACCT/USER/0/NEWSNAME1=news.mymail.net
RAM/ACCT/USER/0/NID=freddy
RAM/ACCT/USER/0/NIDD=baduck
RAM/ACCT/USER/0/NNCLOCKED=0
RAM/ACCT/USER/0/NPIN=148u
RAM/ACCT/USER/0/NPINN=smyr
RAM/ACCT/USER/0/NPW=SAUYG E27w2
RAM/ACCT/USER/0/NUMREG=1
RAM/ACCT/USER/0/PAPID=na111234
RAM/ACCT/USER/0/PAPPW=SAEhwjrev34
RAM/ACCT/USER/0/PLANIO=D
RAM/ACCT/USER/0/POPNAME=pop.mymail.net
RAM/ACCT/USER/0/POPNAME1=pop.mymail.net
RAM/ACCT/USER/0/POPNUM=206.124.90.4
RAM/ACCT/USER/0/REGDELAY=0
RAM/ACCT/USER/0/REGVER=102
RAM/ACCT/USER/0/REMOTEERN=NONE
RAM/ACCT/USER/0/REMOTEERN1=6591
RAM/ACCT/USER/0/REMOTENID=NONE
RAM/ACCT/USER/0/REMOTENID1=luca
RAM/ACCT/USER/0/RNID=test
RAM/ACCT/USER/0/RNPIN=14ry
RAM/ACCT/USER/0/SAVESENT=1
RAM/ACCT/USER/0/SIGFILE=0
RAM/ACCT/USER/0/SMTPNAME=mail.mymail.net
RAM/ACCT/USER/0/SMTPNUM=206.24.90.4
RAM/ACCT/USER/0/SP=3u4knrt3uymngdsuh4ksgr645
RAM/ACCT/USER/0/SPELLCHECK=0
RAM/ACCT/USER/0/ST=TX
RAM/ACCT/USER/0/STATUS=0
RAM/ACCT/USER/0/VALID=1
RAM/ACCT/USER/0/WINOS=16
RAM/ACCT/USER/0/WNUM=2146907233
RAM/ACCT/USER/0/ZIP=75044
RAM/ACCT/USER/CURRENT=0
RAM/INF/PATH=C:\NETSAFE\INF
RAM/INI/IEDIAL.INI/CALLWAITING/0=Count=0
RAM/INI/IEDIAL.INI/DEFAULT/0=ToneDial=Yes
RAM/INI/IEDIAL.INI/DEFAULT/1=DefaultConnectionFile=NetSafe
RAM/INI/IEDIAL.INI/LOCATION0/0=LocationIndex=0
RAM/INI/IEDIAL.INI/LOCATION0/1=Description=Default Location
RAM/INI/IEDIAL.INI/LOCATION0/2=CallWaiting=0
RAM/INI/IEDIAL.INI/LOCATION0/3=DialASLO=0
RAM/INI/IEDIAL.INI/LOCATION0/4=AreaCode=214
RAM/INI/IEDIAL.INI/LOCATION0/5=ToneDial=1
RAM/INI/IEDIAL.INI/LOCATIONS/0=Locations=1
                                                   Page 19
```

FIG. 40

```
                                    APP_A.TXT
RAM/INI/IEDIAL.INI/LOCATIONS/1=NextLocationIndex=0
RAM/INI/IEDIAL.INI/LOCATIONS/2=CurrentLocation=Default Location
RAM/INI/IEDIAL.INI/SECTION/0=Default
RAM/INI/IEDIAL.INI/SECTION/1=Location0
RAM/INI/IEDIAL.INI/SECTION/2=CallWaiting
RAM/INI/IEDIAL.INI/SECTION/3=Locations
RAM/INI/MODEMS2.INI/PATH=c:\netsafe\
RAM/INI/NETSAFE.CON/DIAL-IN CONFIGURATION/0=Description=NetSafe
RAM/INI/NETSAFE.CON/DIAL-IN CONFIGURATION/1=UseCountryAndAreaCodes=No
RAM/INI/NETSAFE.CON/DIAL-IN CONFIGURATION/2=CountryId=0
RAM/INI/NETSAFE.CON/DIAL-IN CONFIGURATION/3=CountryCode=0
RAM/INI/NETSAFE.CON/DIAL-IN CONFIGURATION/4=LocalPhoneNumber=18006381483
RAM/INI/NETSAFE.CON/DIAL-IN CONFIGURATION/5=Phone=18006381483
RAM/INI/NETSAFE.CON/DIAL-IN CONFIGURATION/6=Modem=
RAM/INI/NETSAFE.CON/DIAL-IN CONFIGURATION/7=Name=
RAM/INI/NETSAFE.CON/DIAL-IN CONFIGURATION/8=Password=
RAM/INI/NETSAFE.CON/FRAMING/0=FrameSize=0
RAM/INI/NETSAFE.CON/FRAMING/1=FramingProtocol=PPP
RAM/INI/NETSAFE.CON/IEDIAL/0=StartExplorer=No
RAM/INI/NETSAFE.CON/IEDIAL/1=MinimizeConnectWindow=Yes
RAM/INI/NETSAFE.CON/IEDIAL/2=AutoConnect=Yes
RAM/INI/NETSAFE.CON/IEDIAL/3=DisconnectIfIdle=Yes
RAM/INI/NETSAFE.CON/IEDIAL/4=DisconnectTime=20
RAM/INI/NETSAFE.CON/IP/0=UseSpecificIpAddr=No
RAM/INI/NETSAFE.CON/IP/1=SpecificNameServers=No
RAM/INI/NETSAFE.CON/IP/2=SpecificIPAddress=0.0.0.0
RAM/INI/NETSAFE.CON/IP/3=IPAddress=0.0.0.0
RAM/INI/NETSAFE.CON/IP/4=DnsAddress=0.0.0.0
RAM/INI/NETSAFE.CON/IP/5=DnsAddress2=0.0.0.0
RAM/INI/NETSAFE.CON/IP/6=IPAddressWins=0.0.0.0
RAM/INI/NETSAFE.CON/IP/7=IPAddressWinsAlt=0.0.0.0
RAM/INI/NETSAFE.CON/IP/8=Enabled=Yes
RAM/INI/NETSAFE.CON/IPX/0=Enabled=No
RAM/INI/NETSAFE.CON/MODEM PICTURE/0=Enabled=No
RAM/INI/NETSAFE.CON/MULTILINK/0=Channels=0
RAM/INI/NETSAFE.CON/NETBEUI/0=Enabled=No
RAM/INI/NETSAFE.CON/OPTIONS/0=EnableVJCompression=No
RAM/INI/NETSAFE.CON/OPTIONS/1=RemoteDefaultGateway=No
RAM/INI/NETSAFE.CON/OPTIONS/2=DisableLcpExtensions=No
RAM/INI/NETSAFE.CON/OPTIONS/3=Compression=No
RAM/INI/NETSAFE.CON/OPTIONS/4=PromoteAlternates=No
RAM/INI/NETSAFE.CON/PATH=c:\netsafe\
RAM/INI/NETSAFE.CON/SECTION/0=Dial-In Configuration
RAM/INI/NETSAFE.CON/SECTION/1=IP
RAM/INI/NETSAFE.CON/SECTION/10=X25
RAM/INI/NETSAFE.CON/SECTION/11=Multilink
RAM/INI/NETSAFE.CON/SECTION/12=IEDial
RAM/INI/NETSAFE.CON/SECTION/2=Options
RAM/INI/NETSAFE.CON/SECTION/3=Security
RAM/INI/NETSAFE.CON/SECTION/4=Modem Picture
RAM/INI/NETSAFE.CON/SECTION/5=Framing
RAM/INI/NETSAFE.CON/SECTION/6=NetBEUI
RAM/INI/NETSAFE.CON/SECTION/7=IPX
RAM/INI/NETSAFE.CON/SECTION/8=Scripting
RAM/INI/NETSAFE.CON/SECTION/9=AutoDial
RAM/INI/NETSAFE.CON/SECURITY/0=TerminalBeforeDial=No
RAM/INI/NETSAFE.CON/SECURITY/1=SecurityDevice=No
RAM/INI/NETSAFE.CON/SECURITY/2=RequireEncryptedPassword=No
RAM/INI/NETSAFE.CON/SECURITY/3=RequireMsEncryptedPassword=No
RAM/INI/NETSAFE.CON/SECURITY/4=RequireDataEncryption=No
RAM/INI/NETSAFE.CON/SECURITY/5=NetworkLogon=No
RAM/INI/NETSAFE.CON/SECURITY/6=UseLogonCredentials=No
RAM/INI/NETSAFE.CON/SECURITY/7=SecurityEcho=No
                                    Page 20
```

*FIG. 41*

APP_A.TXT
```
RAM/INI/PATH=C:\NETSAFE
RAM/INI/SHIVAPPP.INI/COM1/0=IRQ=4
RAM/INI/SHIVAPPP.INI/COM1/1=IOAddress=03fs
RAM/INI/SHIVAPPP.INI/COM2/0=IRQ=3
RAM/INI/SHIVAPPP.INI/COM2/1=IOAddress=02fs
RAM/INI/SHIVAPPP.INI/COM3/0=IRQ=5
RAM/INI/SHIVAPPP.INI/COM3/1=IOAddress=03e8
RAM/INI/SHIVAPPP.INI/COM4/0=IRQ=3
RAM/INI/SHIVAPPP.INI/COM4/1=IOAddress=02e8
RAM/INI/SHIVAPPP.INI/DEFAULTS/0=ConnectionFile=netsafe.con
RAM/INI/SHIVAPPP.INI/DIAL-IN CONFIGURATION/0=Port=3
RAM/INI/SHIVAPPP.INI/DIAL-IN CONFIGURATION/1=BPSRate=38400
RAM/INI/SHIVAPPP.INI/DIAL-IN CONFIGURATION/2=ISDNSpeed=64000
RAM/INI/SHIVAPPP.INI/DIAL-IN CONFIGURATION/3=ID=al14651c
RAM/INI/SHIVAPPP.INI/DIAL-IN CONFIGURATION/4=Modem=
RAM/INI/SHIVAPPP.INI/DIAL-IN CONFIGURATION/5=DialString=ATDT
RAM/INI/SHIVAPPP.INI/INSTALLED DEVICES/0=Device1=
RAM/INI/SHIVAPPP.INI/MULTILINK/0=Enabled=Yes
RAM/INI/SHIVAPPP.INI/MULTILINK/1=FragmentSize=30
RAM/INI/SHIVAPPP.INI/MULTILINK/2=LongSequenceNumbers=No
RAM/INI/SHIVAPPP.INI/OPTIONS/0=Compression=No
RAM/INI/SHIVAPPP.INI/OPTIONS/1=EnableVJCompression=No
RAM/INI/SHIVAPPP.INI/PATH=c:\netsafe\
RAM/INI/SHIVAPPP.INI/RECONNECT/0=Automatic=No
RAM/INI/SHIVAPPP.INI/SECTION/0=COM1
RAM/INI/SHIVAPPP.INI/SECTION/1=COM2
RAM/INI/SHIVAPPP.INI/SECTION/10=Defaults
RAM/INI/SHIVAPPP.INI/SECTION/2=COM3
RAM/INI/SHIVAPPP.INI/SECTION/3=COM4
RAM/INI/SHIVAPPP.INI/SECTION/4=Reconnect
RAM/INI/SHIVAPPP.INI/SECTION/5=Options
RAM/INI/SHIVAPPP.INI/SECTION/6=Virtual Connections
RAM/INI/SHIVAPPP.INI/SECTION/7=Multilink
RAM/INI/SHIVAPPP.INI/SECTION/8=Installed Devices
RAM/INI/SHIVAPPP.INI/SECTION/9=Dial-In Configuration
RAM/INI/SHIVAPPP.INI/VIRTUAL CONNECTIONS/0=Enabled=No
RAM/ISP/0/MIDPREFIX=NSI/
RAM/ISP/1/MIDPREFIX=NSI/
RAM/SYS/CSERVER/1/ADDRESS=206.124.90.5
RAM/SYS/CSERVER/0/PORT=300
RAM/SYS/DISPLAY/HOMEPAGE=1
RAM/SYS/EXE/CON=NETSAFE.CON
RAM/SYS/EXE/HOOPTY=0
RAM/SYS/EXE/IEDIAL=IEDIAL.EXE
RAM/SYS/EXE/MPGR=NETSAFE MPGR
RAM/SYS/EXE/NSC32=NSC32.LIB
RAM/SYS/EXE/NSCOM32=NETSAFE NSCOM32
RAM/SYS/EXE/NSCOMM=NETSAFE NSCOMM
RAM/SYS/EXE/NSD=NETSAFE NSD
RAM/SYS/EXE/NSDIAL=NETSAFE NSDIAL
RAM/SYS/EXE/NSID=NSID.EXE
RAM/SYS/EXE/NSMOTD=NETSAFE MOTD
RAM/SYS/EXE/NSREGISTER=NETSAFE REGISTR
RAM/SYS/EXE/PHONER =PHONER.EXE
RAM/SYS/EXE/SDIAL=REGISTER.EXE sdial
RAM/SYS/EXE/TCPMAN=TCPMAN.EXE
RAM/SYS/EXE/TDIAL=TDIAL.EXE
RAM/SYS/EXE/WREGISTER=REG_ISTER.EXE
RAM/SYS/EXPIRE/DURATION=360
RAM/SYS/EXPIRE/MODE=DISABLE
RAM/SYS/EXPIRE/SDATE=07-15-96
RAM/SYS/EXPIRE/WDAYS=15
RAM/SYS/MODEM/0/ENTRY=netsafe_network
```
Page 21

*FIG. 42*

APP_A.TXT

```
RAM/SYS/MODEM/0/VALID=1
RAM/SYS/MODEM/LOCAL=1
RAM/SYS/MODEM/TIMEOUT=40
RAM/SYS/MOTD/LOCALMOTD=c:\netsafe\motd\motd.mot
RAM/SYS/MOTD/SCRIPT=motd\neatupg.mot
RAM/SYS/MOTD/URL=ftp://ftp.netsafe.net/motd/neatupg.mot
RAM/SYS/NETCODE=offline...
RAM/SYS/NETOK=0
RAM/SYS/NNC/AUTOBROWSER/URL=F1:http://www.amrcorp.com/
RAM/SYS/NNC/DDEEXE=c:\progra~1\intern~1\iexplore.exe -nohome
RAM/SYS/NNC/DDEITEM=,,-1,,,,,
RAM/SYS/NNC/DDESERVICE=IEXPLORE
RAM/SYS/NNC/DDEWINDOW=iexplorer_frame
RAM/SYS/NNC/LEFT=0
RAM/SYS/NNC/PREFER/AUTOBROWSER=0
RAM/SYS/NNC/PREFER/AUTOCONNECT=0
RAM/SYS/NNC/PREFER/HINTS=1
RAM/SYS/NNC/PREFER/MINIMIZE=1
RAM/SYS/NNC/PREFER/MOTD=0
RAM/SYS/NNC/PREFER/POSITION=1
RAM/SYS/NNC/TOP=0
RAM/SYS/NSCOMM/NSCOMMAUTO=0
RAM/SYS/NSCOMM/NSCOMMOK=0
RAM/SYS/NSDIAL/MSG=Offline...
RAM/SYS/NSDIAL/ONLINE=0
RAM/SYS/NSDIAL/STATE=9
RAM/SYS/NSDIAL/STATUS=19
RAM/SYS/NSERN/MSG=Updated Information
RAM/SYS/NSERN/STATE=1
RAM/SYS/NSERN/STATUS=1
RAM/SYS/NSIWIZ/STATUS=9263
RAM/SYS/PSERVER/0/ADDRESS=206.124.90.15
RAM/SYS/PSERVER/0/PORT=304
RAM/SYS/PSERVER/1/ADDRESS=206.124.90.13
RAM/SYS/PSERVER/1/PORT=304
RAM/SYS/PSERVER/2/ADDRESS=206.124.90.15
RAM/SYS/PSERVER/2/PORT=301
RAM/SYS/PSERVER/3/ADDRESS=206.124.90.13
RAM/SYS/PSERVER/3/PORT=301
RAM/SYS/PSERVER/4/ADDRESS=206.124.90.14
RAM/SYS/PSERVER/4/PORT=304
RAM/SYS/PSERVER/5/ADDRESS=206.124.90.12
RAM/SYS/PSERVER/5/PORT=304
RAM/SYS/PSERVER/6/ADDRESS=206.124.90.14
RAM/SYS/PSERVER/6/PORT=301
RAM/SYS/PSERVER/7/ADDRESS=206.124.90.12
RAM/SYS/PSERVER/7/PORT=301
RAM/SYS/PSERVER/D0=10800
RAM/SYS/PSERVER/D1=21600
RAM/SYS/PSERVER/ENABLED=1
RAM/SYS/PSERVER/I0=300
RAM/SYS/PSERVER/I1=1500
RAM/SYS/PSERVER/TIME=300
RAM/SYS/RASDEFAULT=276
RAM/SYS/REGISTER/DEFAULTPLAN=0
RAM/SYS/REGISTER/EMAILDOMAINS/0=mymail.net
RAM/SYS/REGISTER/EMAILDOMAINS/1=npn.net
RAM/SYS/REGISTER/EMAILDOMAINS/2=netrepreneur.net
RAM/SYS/REGISTER/FEES/0/ANNUALLY=$
RAM/SYS/REGISTER/FEES/0/MONTHLY=$ 17.95
RAM/SYS/REGISTER/FEES/0/QUARTERLY=$
RAM/SYS/REGISTER/FEES/0/SETUPFEE=$ 25.00
RAM/SYS/REGISTER/FEES/1/ANNUALLY=$
```

Page 22

*FIG. 43*

```
                                                    APP_A.TXT
RAM/SYS/REGISTER/FEES/1/MONTHLY=$ 19.95
RAM/SYS/REGISTER/FEES/1/QUARTERLY=$
RAM/SYS/REGISTER/FEES/1/SETUPFEE=$ 25.00
RAM/SYS/REGISTER/FEES/2/ANNUALLY=$
RAM/SYS/REGISTER/FEES/2/MONTHLY=$ 24.95
RAM/SYS/REGISTER/FEES/2/QUARTERLY=$
RAM/SYS/REGISTER/FEES/2/SETUPFEE=$ 25.00
RAM/SYS/REGISTER/FEES/3/ANNUALLY=$
RAM/SYS/REGISTER/FEES/3/MONTHLY=$ 39.95
RAM/SYS/REGISTER/FEES/3/QUARTERLY=$
RAM/SYS/REGISTER/FEES/3/SETUPFEE=$ 50.00
RAM/SYS/REGISTER/HTTP=hhttp://www.npn.net/products/
RAM/SYS/REGISTER/NSPHONE=972-690-7233
RAM/SYS/REGISTER/PLANENABLE/0=N  RAM/SYS/REGISTER/PLANENABLE/1=Y
RAM/SYS/REGISTER/PLANENABLE/2=Y
RAM/SYS/REGISTER/PLANENABLE/3=Y
RAM/SYS/REGISTER/PLANENABLE/4=N
RAM/SYS/REGISTER/PLANENABLE/5=N
RAM/SYS/REGISTER/PLANENABLE/6=N
RAM/SYS/REGISTER/PLANENABLE/7=N
RAM/SYS/REGISTER/PLANHELP/0=97
RAM/SYS/REGISTER/PLANHELP/1=98
RAM/SYS/REGISTER/PLANHELP/2=99
RAM/SYS/REGISTER/PLANHELP/3=100
RAM/SYS/REGISTER/PLANID/0=A
RAM/SYS/REGISTER/PLANID/1=B
RAM/SYS/REGISTER/PLANID/2=C
RAM/SYS/REGISTER/PLANID/3=D
RAM/SYS/REGISTER/PLANID/4=0
RAM/SYS/REGISTER/PLANID/5=1
RAM/SYS/REGISTER/PLANID/6=2
RAM/SYS/REGISTER/PLANID/7=3
RAM/SYS/REGISTER/PLANIDPHONETYPE/0=A,B
RAM/SYS/REGISTER/PLANIDPHONETYPE/0=A,B
RAM/SYS/REGISTER/PLANIDPHONETYPE/2=A,B
RAM/SYS/REGISTER/PLANIDPHONETYPE/3=A,B
RAM/SYS/REGISTER/PLANIDPHONETYPE/A=A,B
RAM/SYS/REGISTER/PLANIDPHONETYPE/B=A,B
RAM/SYS/REGISTER/PLANIDPHONETYPE/C=A,B
RAM/SYS/REGISTER/PLANIDPHONETYPE/D=A,B,1
RAM/SYS/REGISTER/PLANS/0=SP1 - Basic Dial-up Service Plan
RAM/SYS/REGISTER/PLANS/1=SP2- Enhanced Dial-up Service Plan
RAM/SYS/REGISTER/PLANS/2=SP3 - Professional Dial-up Service Plan
RAM/SYS/REGISTER/PLANS/3=SP4 - ISDN Dial-up Service Plan
RAM/SYS/REGISTER/PLANS/4=Netrepreneur Plan
RAM/SYS/REGISTER/PLANS/5=Family & Friends
RAM/SYS/REGISTER/PLANS/6=Personal Internet
RAM/SYS/REGISTER/PLANS/7=Business Credit Plan
RAM/SYS/REGISTER/REGOK=1
RAM/SYS/REGISTER/SERIALNUM=0
RAM/SYS/REVISION=417
RAM/SYS/SECURE/EMAILDOMAINS/0=mymail.net
RAM/SYS/SECURE/EMAILDOMAINS/1=npn.net
RAM/SYS/SECURE/EMAILDOMAINS/ENCRYPT/0=Blowfish
RAM/SYS/SECURE/EMAILDOMAINS/ENCRYPT/1=PGP
RAM/SYS/SECURE/EMAILDOMAINS/USEBROKER/0=No
RAM/SYS/SECURE/EMAILDOMAINS/USEBROKER/1=Yes
RAM/SYS/SECURE/BROKER/0=NONE
RAM/SYS/SECURE/BROKER/1=netsafe.com
RAM/SYS/SECURE/BROKER/PUBLICKEY/1=JjhehRW73872435h85
RAM/SYS/SECURE/REQRCPALAISE/0=YES
RAM/SYS/SECURE/REQRCPALAISE/1=NO
RAM/SYS/SECURE/PRIVATEKEY=323xcsghr954nHDsaDj49u64jna
                                                    Page 23
```

FIG. 44

```
                                          APP_A.TXT
RAM/SYS/SECURE/PUBLICKEY=4276saediGFDSFRI35neirt459546
RAM/SYS/SERVER/0/ADDRESS=206.124.90.5
RAM/SYS/SERVER/0/PORT=300
RAM/SYS/SERVERS/0/DNS1=206.124.64.253
RAM/SYS/SERVERS/0/DNS2=206.124.65.253
RAM/SYS/SETUP/ISPOFFER=YES
RAM/SYS/SETUP/NEATLOC=http://www.npn.net/neat/
RAM/SYS/SETUP/NID=neat
RAM/SYS/SETUP/NPIN=w 1xh
RAM/SYS/SETUP/PATH=C:\netsafe
RAM/SYS/SETUP/STAMPDUPPAGE=http://www.npn.net/neat/
RAM/SYS/SETUP/STAMPINTRO=0
RAM/SYS/SETUP/SUMMARY=0
RAM/SYS/SETUP/WINOS=32
RAM/SYS/SETUP/WREGISTER=0
RAM/SYS/STANDARD/INIT/0=A TX0&C1&D2
RAM/SYS/STANDARD/INIT/1=AT&FX0&C1&02
RAM/SYS/STANDARD/INIT/2=ATX0&C1&D3
RAM/SYS/STANDARD/INIT/3=ATZ
RAM/SYS/VERTEXT=4.17
RAM/SYS/WINDOWNAME/0=IExplorer_frame
RAM/SYS/WINDOWNAME/1=afxframeorview
RAM/SYS/WINDOWNAME/2=Internet Explorer_frame

USR.DB

RAM/ACCT/USER/0/ACCT=1
RAM/ACCT/USER/0/ACHKMAIL=0
RAM/ACCT/USER/0/ACHKONLINE=0
RAM/ACCT/USER/0/ACHKSTART=0
RAM/ACCT/USER/0/ALIASE/1/EID=joesmoe
RAM/ACCT/USER/0/ALIASE/1/EMAIL=joesmoe@mymail.net
RAM/ACCT/USER/0/ALIASE/1/EPW=Xfdwre857
RAM/ACCT/USER/0/ALIASE/1/FORWARD=N
RAM/ACCT/USER/0/ALIASE/1/FNAME=JOSEPH
RAM/ACCT/USER/0/ALIASE/1/LNAME=SMOE
RAM/ACCT/USER/0/ALIASE/1/POPNAME=pop.mymail.net
RAM/ACCT/USER/0/ALIASE/1/POPNUM=206.124.90.4
RAM/ACCT/USER/0/ALIASE/1/SMTPNAME=mail.mymail.net
RAM/ACCT/USER/0/ALIASE/1/SMTPNUM=206.124.90.4
RAM/ACCT/USER/0/ALIASE/2/EID=happy
RAM/ACCT/USER/0/ALIASE/2/EMAIL=happy@npn.net
RAM/ACCT/USER/0/ALIASE/2/EPW=Ssdewr434
RAM/ACCT/USER/0/ALIASE/2/FORWARD=Y
RAM/ACCT/USER/0/ALIASE/2/FORWARDADDR=freddy@mymail.net
RAM/ACCT/USER/0/ALIASE/2/FNAME=HAPPY
RAM/ACCT/USER/0/ALIASE/2/LNAME=DWARF
RAM/ACCT/USER/0/ALIASE/2/POPNAME=pop.mymail.net
RAM/ACCT/USER/0/ALIASE/2/POPNUM=206.124.90.4
RAM/ACCT/USER/0/ALIASE/2/SMTPNAME=mail.mymail.net
RAM/ACCT/USER/0/ALIASE/2/SMTPNUM=206.124.90.4
RAM/ACCT/USER/0/ADDR=1 MAIN ST
RAM/ACCT/USER/0/ADDR2=THREE LINCOLN CENTRE
RAM/ACCT/USER/0/ANNMAIL=1
RAM/ACCT/USER/0/AUTOADD=1
RAM/ACCT/USER/0/AUTOURL=F4:http://www.netsafe.net/start/
RAM/ACCT/USER/0/BIRTH=022960
RAM/ACCT/USER/0/BUSNAME=PENATEK INDUSTRIES INC
RAM/ACCT/USER/0/CCEXPY=1996
RAM/ACCT/USER/0/CHKMINUTES=10
                                          Page 24
```

*FIG. 45*

```
                                                APP_A.TXT
RAM/ACCT/USER/0/CIDSTATUS=Comp
RAM/ACCT/USER/0/CITY=DALLAS
RAM/ACCT/USER/0/CNTY=DALLAS
RAM/ACCT/USER/0/COLOR1=Blue
RAM/ACCT/USER/0/COLOR2=Silver
RAM/ACCT/USER/0/DELETEMAIL=1
RAM/ACCT/USER/0/DLST=TX
RAM/ACCT/USER/0/EMAIL=freddy@mymail.net
RAM/ACCT/USER/0/EMPTYTRASH=1
RAM/ACCT/USER/0/ERN=1234
RAM/ACCT/USER/0/ERROR=0
RAM/ACCT/USER/0/FNAME=FRED
RAM/ACCT/USER/0/FRIENDLY=Fred Astair
RAM/ACCT/USER/0/GROUP=NETSAFE
RAM/ACCT/USER/0/HEADERS=0
RAM/ACCT/USER/0/HNUM=2145309590
RAM/ACCT/USER/0/HOMEPAGE=http://www.myhomepage.net/~freddy
RAM/ACCT/USER/0/HPSERVER=www.myhomepage.net
RAM/ACCT/USER/0/HPSERVER/INITIALDIR=homepage
RAM/ACCT/USER/0/ISP=BOTH
RAMACCT/USER/0/LATTACH=0
RAM/ACCT/USER/0/LBOX=3
RAM/ACCT/USER/0/LNAME=ASTAIR
RAM/ACCT/USER/0/NID=freddy
RAM/ACCT/USER/0/NNCLOCKED=0
RAM/ACCT/USER/0/NPIN=1480
RAM/ACCT/USER/0/NPINN=smyr
RAM/ACCT/USER/0/NPW=ew6534hhjr
RAM/ACCT/USER/0/NUMREG=1
RAM/ACCT/USER/0/PAPID=na111234
RAM/ACCT/USER/0/PAPPW=ds TEWH2
RAM/ACCT/USER/0/PLANID=D
RAM/ACCT/USER/0/POPNAME=pop.mymail.net
RAM/ACCT/USER/0/POPNAME1=pop.mymail.net
RAM/ACCT/USER/0/POPNUM=206.124.90.4
RAM/ACCT/USER/0/REGDELAY=0
RAM/ACCT/USER/0/REGVER=102
RAM/ACCT/USER/0/REMOTEERN=NONE
RAM/ACCT/USER/0/REMOTEERN1=6591
RAM/ACCT/USER/0/REMOTENID=NONE
RAM/ACCT/USER/0/REMOTENID1=luca
RAM/ACCT/USER/0/SMTPNAME=mail.mymail.net
RAM/ACCT/USER/0/SMTPNUM=206.124.90.4
RAM/ACCT/USER/0/SP=gk07ao2yg2F2g5DDOggi
RAM/ACCT/USER/0/SPELLCHECK=0
RAM/ACCT/USER/0/ST=TX
RAM/ACCT/USER/0/STATUS=0
RAM/ACCT/USER/0/VALID=1
RAM/ACCT/USER/0/WINOS=16
RAM/ACCT/USER/0/WNUM=2146907233
RAM/ACCT/USER/0/ZIP=75044
RAM/ACCT/USER/CURRENT=0
RAM/SYS/SECURE/ALIASE/1/PRIVATEKEY=htr94387Sahyuhjt43Ho9u64yhgrey
RAM/SYS/SECURE/ALIASE/1/PUBLICKEY=Waqr4t3hu6n43g5q87t43hwFeAgf
RAM/SYS/SECURE/ALIASE/2/PRIVATEKEY=323xcsghr954nHOsaDj49u64jna
RAM/SYS/SECURE/ALIASE/2/PUBLICKEY=4276saediGFDSFRI35neirt459546
RAM/SYS/SECURE/EMAILDOMAINS/0=mymail.net
RAM/SYS/SECURE/EMAILDOMAINS/1=npn.net
RAM/SYS/SECURE/EMAILDOMAINS/ENCRYPT/0=Blowfish
RAM/SYS/SECURE/EMAILDOMAINS/ENCRYPT/1=PGP
RAM/SYS/SECURE/EMAILDOMAINS/USEBROKER/0=No
RAM/SYS/SECURE/EMAILDOMAINS/USEBROKER/1=Yes
RAM/SYS/SECURE/BROKER/0=NONE
                                                Page 25
```

*FIG. 46*

```
                                          APP_A.TXT
RAM/SYS/SECURE/BROKER/1=netsafe.com
RAM/SYS/SECURE/BROKER/PUBLICKEY/1=JIhehRw73 872435h85
RAM/SYS/SECURE/REQRCPALAISE/0=YES
RAM/SYS/SECURE/REQRCPALAISE/1=NO
RAM/SYS/SECURE/PRIVATEKEY=323xcsghr954nHDsaDj49u64jna
RAM/SYS/SECURE/PUBLICKEY=4276saed1GFDSFRI35neirt459546
RAM/SYS/SERVER/0/ADDRESS=206.124.90.5
RAM/SYS/SERVER/0/PORT=300
RAM/SYS/SERVERS/0/DNS1=206.124.64.253
RAM/SYS/SERVERS/0/DNS2=206.124.65.253
```

*FIG. 47*

APPENDIX B

The invention solves eight problems:
1. Eliminates the need for a computer user to configure and reconfigure computer networking software for network access through a multiplicity of Network Access Providers (NAP) (companies which own the telephone networks and modem banks such as AT&T, GTE, UUNet, PSI, etc.).
2. Allows a Network Re-seller such as an Internet Service Provider to offer network access via a multiplicity of Network Access Providers based on cost, location, availability, reliability, etc.
3. Allows a Network Re-seller to balance network loads through a multiplicity of Network Access Providers and across a multiplicity of network computer servers.
4. Eliminates the need for a computer user to know or configure network access telephone numbers or network access protocol identification numbers.
5. Eliminates the need for a computer user or mobile computer user to re-configure remote network access software to connect to a network from a remote location.
6. Allows multiple users to use a single computer each with their own unique networking attributes and unique network identity.
7. Allows separate and distinct identifications (ID) and passwords for different services and network functions such as Modem PAPID and PAP_Password, Email ID and password, etc.
8. Provides a user with true network anonymity by assigning independent non-user specific identifications and passwords for such things as PAP authentication, FTP and Email logins, News Server logins, and network server logins.

This invention relates to network connections, such as the internet, and allows systems to be independently, transparently and dynamically connected or reconnected to a network based upon any number of attributes

FIG. 48 such as user or group identity, cost, availability, reliability, etc. Further this invention supports many types of physical connections such as telephone dial-up connections, ISDN connections, Ethernet, and other local area networking connections.

A traditional network connection requires someone skilled in the art of computer networking to setup and configure both network related hardware (such as modems or Local Area Network cards (Ethernet, Token-ring or other cards) and network software. The invention eliminates the need for such network configuration skills.

The invention configures and reconfigures network related software to support multiple users with multiple network protocols and/or multiple networks using the same protocol without the need of any computer network configuration skills and further allows the configuration to be changed or modified dynamically without any user intervention.

In the drawings:
Figure 1 - is the International Standards Organization's Network Communication Model representation.
Figure 2 - is a software architecture block diagram of the Client Dispatch Application.
Figure 3 - is a flow diagram encompassing the Installation function of the Client Dispatch Application.
Figure 4 - is a flow diagram encompassing the Registration function of the Client Dispatch Application.
Figure 5 - is a flow diagram encompassing the Regular Use function of the Client Dispatch Application.
Figure 6 - is a flow diagram encompassing the Manual Update function of the Client Dispatch Application.
Figure 7- is a flow diagram encompassing the Multi-dial function of the Client Dispatch Application and its seven sub-functions.

FIG. 49

Figure 8 - is a software architecture block diagram of the MOT Script function.

The invention is software which is sometimes referred to as middle-ware because it resides between an operating system and the end-users interface. The invention has all the attributes of middle-ware as it configures and manages network communication equipment such as modems and Ethernet cards, network protocols such as the Transmission Control Protocol/Internet Protocol (TCP/IP), and the associated interfaces between the communication equipment, network protocol and the computer's operating system for each individual user or groups of users.

In the middle of Figure 2 is a Client Dispatch Application which provides five primary functions and seven sub-functions. The five primary functions of the Client Dispatch Application each configure the operating system, the network communications equipment (also referred to as an Adapter), and the network protocols for use in a computer networking applications such as Internet access. The five primary functions of the client dispatch application are: Installation (Figure 3), Registration (Figure 4), Regular Network Use (Figure 5), Manual Updates (Figure 6), Multi-dial Access (Figure 7). The seven sub-functions are shown in Figure 7 and are: Low Cost sub-function, Reliability sub-function, Location sub-function, Availability sub-function, Busy-Sequence sub-function, Service Selected sub-function, and Single-dial Multi-Login sub-function. The Client Dispatch Application manages the functions based upon data read from database such as the Network Service Database or other inputs received from a Network Server, the computer's user, or the computer operating system files. In the current implementation, the databases are all encrypted to prevent a user from tampering with its entries.

Figure 3 is a flow diagram of a primary Client Dispatch Application function called "Installation Procedure." The function starts by reading information from the Network Services Database (NS.db) which is pre-

FIG. 50 loaded with basic configuration and initialization information necessary to configure and manage the network communication equipment, network protocol and the associated interfaces between the communication equipment, network protocol and the computer's operating system. After the Installation Procedure reads the NS.db it inspects the operating system files (Registry and INI files, Protocol files, and Physical Adapter files) to determine if any networking options have been installed and whether or not the files, if installed, are correct and configured properly. If no Protocol or Adapter has been installed or if the Protocol or Adapter that is installed is misconfigured then the Installation function will correct correctly configure or reconfigure the Adapter and necessary Protocol to successfully connect a computer to a network such as the Internet. Correct configuration for utilization of the TCP/IP Protocol would include configuring and setting the proper Operating System Registry and INI (initialization) files with the necessary Protocol configuration information. Such information includes: IP addresses whether statically or dynamically assigned, Domain Name System (DNS) name server addresses whether statically or dynamically assigned, Gateway Addresses whether statically or dynamically assigned, Other operating system Binding functions, Dynamic Host Control Protocol options, Windows Internet Naming Service (WINS) options whether statically or dynamically assigned, and the assignment of such Protocol functions to be utilized by the appropriate Adapter. The function of configuring or reconfiguring ((Re)Configure) is executed near the beginning of all five primary function tasks of the Client Dispatch Application to ensure successful operation of a network connection even if a computer user accidentally misconfigures their system and thereby making it networking inoperable.

After the successful configuration of both the Adapter and the Protocol, the Installation Procedure will utilize the appropriate Adapter which is either the Adapter pre-programmed into the NS.db (if available) or if there is only one Adapter then it will be used. If the Adapter is a Modem then it will read from the NS.db to determine if the computer user chooses a dial-in

FIG. 51 location or if the modem shall be programmed to dial a pre-defined phone number. If the NS.db database entry is set to allow the computer user to choose a dial-in location then said user chooses a location based on Country, State or Province, and City. After the users selects the proper dial-in location, the Installation function reads from the Phone database (Phone.db) to determine what phone number to use. If a given location has multiple phone numbers, the Client Dispatch Application will select a dial-in number based upon attributes read from the NS.db. Such attributes include Installation dial-in numbers (dial-in phone numbers which are only available during Installation or testing), Registration Dial-in Numbers (phone numbers and locations which appear to a user during registration), Sequence Numbers (prioritized list of phone numbers which shall be tried in sequential order to produce the highest probability of connection), Available NAP numbers (phone numbers of a given NAP's modems), Currently Valid Numbers (phone numbers which are currently valid for use by a given users), or any combination of the aforementioned. If value in the NS.db is set for the modem to use a pre-defined dial-in number (such as an 800 toll-free number) the Client Dispatch Application will read the appropriate predefined phone number entry from the Phone.db and use it to dial. After the Client Dispatch Application has determined the proper dial-in phone number, whether user selected or pre-defined, it initializes the modem and dials. If the modem is busy it will either continue to retry the same phone number or call the Multi-Dial Procedure (one of the five primary functions of the Client Dispatch Application) based upon a database entry in the NS.db. Once a connection is made communication with a network server begins by sending the "Installation PAPID and PAP_Password" (read from the NS.db) to the server for transparent login authentication. Once the login has occurred, communication with the Network server is established, transfer of data begins. The data transferred during the Installation procedure may contains some basic system information about the users computer system, the type of connection they are using and the location that they are connecting from. Once this information is received at the Network server, the Network server will send

FIG. 52 the appropriate information back to the Client Dispatch Application such information may include Phone.db updates including Location addition or subtractions, Phone number changes, and NS.db updates including NAP additions and subtractions, group, user, or multiple user specific configuration, DNS and IP information, etc. These types of updates to the NS.db, Phone.db, and other databases which reside on the users computer can occur transparently to the computer users whenever the user is connected to the network; thereby ensuring that the users network related information is always current and accurate. Any updates received from the Network server are written to the appropriate database (i.e. NS.db, Phone.db, or others) by the Client Dispatch Application. The Client Dispatch Application also updates the NS.db to reflect "Installation complete" next execution "Case" to start is "Registration."

The invention's dial-in location attributes (Installation dial-in numbers, Registration Dial-in Numbers, Sequence Numbers, Available Network Access Provider (NAP) numbers, Currently Valid Numbers) provide control mechanisms to ensure that a users receives the appropriate level of service for which they subscribed such as "the lowest cost service", "the highest reliability service", "the most available service", or combinations thereof. Further, the attributes allow for remote testing, network load balancing and the reduction of fraud by dynamic control of phone number validity.

If the Adapter used to connect to the network is a Local Area Network device such as an Ethernet card then once communication with the Network server is established, transfer of data and updates begin as described in the paragraphs above.

Figure 4 is a flow diagram of a primary Client Dispatch Application function called "Registration Procedure." This function, as all primary functions starts by reading NS.db to determine the appropriate execution "Case". In the Registration "Case" the Client Dispatch Application starts the Registration Process by reading the NS.db to gather the necessary

FIG. 53 information such as which Adapter and Protocol to use and proceeds to
configure and initialize the appropriate networking functions to start the
user registration process. The registration processes consists of several
forms which a user enter specific information about themselves. Such
information includes Name, Address, Phone Numbers, Credit Card and/or
Banking Information, Referral Information (if available), Personal Security
information (like: mother's maiden name), Birth-date , and Preferred E-
mail Identity and Preferred E-mail Domain Choice. The registration
information for each user is stored in the NS.db and/or a User Specific
Database as well as information about the user's system and revision levels
of the invention software and invention databases (NS.db, Phone.db,
User.db, BTN.db. Upon the user completing the registration forms, the
Client Dispatch Application initiate its communications with the server as
described earlier. Note, the Adapter used will be the Adapter used during
the installation process. Once communication with Network Server begins,
the Client Dispatch Application sends all the information which was added
or updated into the NS.db to the Network Server. The Network Server
sends the received information plus additional information such as server
assigned User PAPIDs and PAP_Passwords, Email IDs and Email
Passwords, back to the Client Dispatch Application for comparison and
verification of the information that was sent. If the information returned is
not identical to the information which was sent, the Client Dispatch
Application will resend the information again to the Network Server. This
processes will continue until all transmitted information from the Client
Dispatch Application to the Network Server matches all information
returned to the Client Dispatch Application from the Network Server or
when a maximum retry value is reached. The current implementation has a
maximum retry value of 5. If the Client Dispatch Application reaches a
maximum retry value an error message is sent to the user notifying them
that an Error has occurred and to try reconnecting or registering again.
Alternatively the user may be prompted to use an alternate Adapter or
Protocol and then retry. The Registration process for other users can be
started during the Regular Use Process. Upon completion of a users initial

FIG. 54 registration, the user's computer display's an Electronic Registration Number (ERN) which with other personal security information can be used later to refresh a system as described below.

The Registration Process also allows users registered with the Network Server to temporarily use a computer or permanently use a secondary computer by using a refresh function which bypasses the standard registration form screens by asking the user if they have already registered? If the user has registered, the refresh process of the Registration function will connect to the Network Server, download all the user information sent during the user's initial registration and the Client Dispatch Application will update the appropriate databases (NS.db, Phone.db, User.db, and BTN.db) on the user's computer system.

Figure 5 is a flow diagram of a primary Client Dispatch Application function called "Regular Use Procedure." This function is enabled after a user has installed and registered the software on a particular computer system. This function allows a user to connect to the network with transparent login and password access to the user. This is accomplished by the Client Dispatch Application reading NS.db for login information such as the User PAPID and PAP_Password. After reading the necessary information from NS.db and prior to the user logging on to a Network, the user is given an opportunity to change their Dial-in Location if they are using a modem as their Adapter. If the Adapter is a modem the user desires to change locations the user is presented the same "chooses a location" form as they saw during registration. The "chooses a location form" allows the user to select a local dial-in location from pull down menu selections based on Country, State or Province, and City selections for the given NAP which the User PAPID and PAP_Password are valid for. After the users selects the proper dial-in location, the Installation function reads from the Phone database (Phone.db) to determine what phone number to use. If a given location has multiple phone numbers, the Client Dispatch Application will select a dial-in number based upon attributes read from the NS.db. Such

FIG. 55 attributes include Installation dial-in numbers (dial-in phone numbers which are only available during Installation or testing), Registration Dial-in Numbers (phone numbers and locations which appear to a user during registration), Sequence Numbers (prioritized list of phone numbers which shall be tried in sequential order to produce the highest probability of connection), Available NAP numbers (phone numbers of a given NAP's modems), Currently Valid Numbers (phone numbers which are currently valid for use by a given users), or any combination of the aforementioned.

After the user's computer establishes a connection to the Network Server the Client Dispatch Application send some information to the Network Server. Such information includes a Unique Identification string for the user, a unique computer identification string, the revision levels of the invention software and databases. The Network server reviews the information sent to determine what if any updates are required to the users invention software, databases, or computer system. Such updates would include: New Dial-in locations, new PAPIDs, PAP_Passwords, other IDs, other Passwords, change of phone numbers, change of area codes, low cost NAP, dial-in location priority sequence numbers, or any combination thereof. If any updates are required the Network Server notifies the Client Dispatch Application and any necessary updates will take place transparent to the user. If such updates require user intervention, such as rebooting the users computer, the user will be notified prior to the update and/or prior to a reboot. Updates which require a lot of time, may span multiple logins by the user with partial updates being performed until the full completion of the update. The partial updates will take place when the users system is connected but idle and/or during a "heart beat." The heart beat is a millisecond function which bi-directionally transfers data between the Client Dispatch Application and the Network Server. The heart beat interval is derived from a value in NS.db. In its current operation the heart beat interval is 5 minutes for the first 3 hours of connection, 10 minutes for the forth hour of connection, and 20 minutes after 5 hours of connection.

FIG. 56

The heart beat also provides a way of keeping a user's modem network connection alive even when they haven't used it for some period of time.

Figure 6 is a flow diagram of a primary Client Dispatch Application function called "Manual Update Procedure." This function provides a mechanism for a user to recover, change, modify or update the invention software and databases manually. This function is useful for Internet Service Providers managing customers with billing issues, as well as customers with special system configuration issues. The Manual Update Procedure makes a network connection using the "Manual Update PAPID and PAP_Password" (this PAPID and PAP_Password like the Installation, Multi-dial and Test PAPIDs and PAP_Passwords are shipped in invention's NS.db and are not accessible to the user). After the Client Dispatch Application, establishes communication with the Network Server the Client Dispatch Application sends the Network Server information from the NS.db and User.db in order to establish the user and system which are currently requesting an update of information from the Network Server. The Network Server takes the information received from the Client Dispatch Application and uses it to generate any updated information which is needed to update a specific user, group of users, a specific computer, a group of computers, or any combination thereof and sends any required information back to the Client Dispatch Application to update the appropriate Databases, Registry or INI files, Adapter files, and/or Protocol files. Upon completion of the update the Client Dispatch Application will disconnect from the network (break the network connection) and if appropriate, will notify the user that the computer system must be rebooted in order for the update to take effect.

Figure 7 is a flow diagram of a primary Client Dispatch Application function called Multi-dial Procedure. This function provides a Network Service Provider, such as an Internet Service Provider, a mechanism to control a user, group, computer, a Local Area Network of computers, or any combination thereof network access, based upon any one of the following

FIG. 57 seven sub-function attributes: Cost, Availability, Reliability, Location, Busy-Sequence, Service Selected, or "Single Dial / Multi-Login". This function can be initiated by any of the other Primary Functions of the Client Dispatch Application or by a programmed entry into NS.db. If the Multi-dial Procedure is initiated because of a busy signal from one of the other Client Dispatch Application functions and the Multi-dial procedure is enabled in the NS.db then the Multi-dial feature initiates the Busy-Sequence sub-function. The Busy-Sequence sub-function may initiate anyone of the other Multi-dial Procedure sub-functions, re-dial the same number before initiating another Multi-dial Procedure sub-function, or dial into the next sequential "area" location from a list of area locations available. The list of "area locations available" is based upon User PAPIDs and PAP_Passwords stored in the NS.db and the type of service plan (also found in the NS.db) which a user has chosen to subscribe to. If a user has chosen to subscribe to a high cost plan, multiple PAPIDs and PAP_Passwords for multiple NAPs may be stored in the NS.db and therefore the list of available dial-in locations may contain dial-in numbers from multiple NAPs. Alternatively, multiple NAPs may have PAPID and PAP_Password sharing agreements allowing a single User PAPID and PAP_Password entry in NS.db to generate a dial-in location list from multiple NAPs. In any case, the Busy-Sequence sub-function will sequentially attempt to make a connection at each location until either a successful connection is made or the user aborts the connection attempt. If the Multi-dial Procedure is initiated for any reason other than a busy signal, then it will determine, based on data in NS.db, whether or not to initiate a connection to the network using a pre-defined dial-in number or location. If the Multi-dial Procedure is to make a network connection using a pre-defined dial-in number or location it will do using either a "Multi-dial PAPID and PAP_Password", "Group PAPID and PAP_Password", "User PAPID and PAP_Password", or a "Test PAPID and PAP_Password." In the current implementation, when both the "Pre-defined dial-in number" and "General Use" NS.db entries are enabled a general use connection is established using either a "Group PAPID and PAP_Password" or "User PAPID and PAP_Password." If the "Pre-defined

FIG. 58 dial-in number" entry in the NS.db is disabled, then the Multi-dial Procedure executes one or more of its seven sub-functions based upon entries in NS.db. If the "Pre-defined dial-in number" entry is enabled but the "General Use" entry in NS.db is disabled then the Multi-dial Procedure establishes a connection using either the "Multi-dial PAPID and PAP_Password" or a "Test PAPID and PAP_Password" and initiates the "Service Selected" sub-function. The Service Selected sub-function reads from both the NS.db and User.db and sends the appropriate information to the Network Server. The Network Server uses the information to generate database updates which may or may not assign, reassign, or update NAPs, Dial-in Location, any PAPID and PAP_Password, Phone number, network routing information, Adapters, Protocol, or any other information which can be stored in any of the four Client Dispatch Application's databases. Such information is then sent back to the Client Dispatch Application where it appropriately updates the proper database and associated database entries. After the databases are updated the Client Dispatch Application's Regular User function is initiated using the information received from the Network Server. NOTE: The Network Server generated updates may include dial-in location availability information which a NAP may provide a Network Reseller (on a regularly scheduled interval) in order to assign a dial-in location that has a very high probability of connecting to a modem without any busy signals or telephone line noise related disconnects.

The "Low Cost" Multi-dial Procedure sub-function reads from both the NS.db and Phone.db to determine which NAP and what Locations have the lowest priced service for a given user's dial-in location. The sub-function next determines if the User PAPID and PAP_Password stored in NS.db are valid for the NAP which provides the Low Cost connection point-of-presence at said location. If the User PAPID and PAP_Password are valid, the network connection sequence will dial and connect as described in the Client Dispatch Application's Regular Use function. If the User PAPID and PAP_Password are not valid then this sub-function will initiate a Manual Update function requesting a valid User PAPID and PAP_Password

FIG. 59 for the NAP's dial-in network at the user selected location from a Network Server. Then this sub-function will initiate a network connection dial-in sequence as described in the Client Dispatch Application's Regular Use function.

The "Reliability" Multi-dial Procedure sub-function reads from both the NS.db and Phone.db to determine which NAP and what Locations have the highest reliability of connecting based upon prior data transmitted to the Client Dispatch Application each time the user's computer connects to the network. NOTE: The data transmitted to the Client Dispatch Application each time the user's computer connects to the network is a server based histogram of the probability of a successful connection at a given location. This data is only transferred to those user's systems whose NS.db have the Reliability entry enabled. The sub-function next determines if the User PAPID and PAP_Password stored in NS.db are valid for the NAP which provides the highest Reliability at the selected location. If the User PAPID and PAP_Password are valid, the network connection sequence will dial and connect as described in the Client Dispatch Application's Regular Use function. If the User PAPID and PAP_Password are not valid then this sub-function will initiate a Manual Update function requesting a valid User PAPID and PAP_Password for the NAP's dial-in network at the user's selected location from a Network Server. Then this sub-function will initiate a network connection dial-in sequence as described in the Client Dispatch Application's Regular Use function.

The "Location" Multi-dial Procedure sub-function reads from the Phone.db to determine all the Dial-in phone numbers available to a user from a selected location. The user then selects from a list, generated by this sub-function, of "surrounding area" locations in which to dial into. The sub-function next determines if the User PAPID and PAP_Password stored in NS.db is valid for the NAP in which the user's computer will dial into the selected location. If the User PAPID and PAP_Password are valid, the network connection sequence will dial and connect as described in the

FIG. 60

Client Dispatch Application's Regular Use function. If the User PAPID and PAP_Password are not valid then this sub-function will initiate a Manual Update function requesting a valid User PAPID and PAP_Password for the NAP's dial-in network at the user's selected location from a Network Server. Then this sub-function will initiate a network connection dial-in sequence as described in the Client Dispatch Application's Regular Use function.

The "Availability" Multi-dial Procedure sub-function builds a dial-in location list based upon User PAPIDs and PAP_Passwords stored in the NS.db and the type of service plan (also found in the NS.db) which a user has chosen to subscribe to. If a user has chosen to subscribe to a high cost plan, multiple PAPIDs and PAP_Passwords for multiple NAPs may be stored in the NS.db and therefore the list of available dial-in locations may contain dial-in numbers from multiple NAPs. Alternatively, multiple NAPs may have PAPID and PAP_Password sharing agreements allowing a single User PAPID and PAP_Password entry in NS.db to generate a dial-in location list from multiple NAPs.

The "Availability" sub-function uses one or more mechanisms or the Service Selected sub-function to determine "Availability" at a given location based upon historical data (Histogram Data) or real time data supplied by a NAP to the Network Re-seller. The mechanisms and sub-function consist of the Server Histogram Data, Client Histogram Data, the "Service Selected" sub-function, or any combination thereof. Obviously the Client Histogram Data is not of much value until a particular client has consistently established a Network connection for a least 90 days. However, after 90 days a client histogram can be built to determine the probability of success of connecting to the Network the first time and minimize the necessity of having the Client Dispatch application perform a second dial-attempt to connect to the Network. The Server Histogram Data is always sent to the client's NS.db upon any connection to the network when the Availability sub-function is enabled. This data is normally used in

FIG. 61 conjunction with the Client Histogram Data (when appropriate) to determine the highest probability of success of connecting to the Network without a second dial. Thus, the Client Histogram Data and the Server Histogram Data are used to facilitate a statistical approach to determine the highest probability of a user connecting to the network on the first attempt. However, there are cases when a client needs 100% connection confidence or the Histogram Data for a particular area is irrational and therefore useless. In these cases "Service Selected" sub-function is initiated and the "Double-dial" Process takes place.

The last sub-function of the Multi-dial Procedure is the Single-dial Multi-Login function. This sub-function requires a "multi-dial" attempt when modem receives a busy signal; otherwise this function is a single-dial function with a multiple PAPID / PAP_Password assignment/reassignment function This function requires that all user (client) authentication happens centrally. Thus, this function works with multiple NAPs when each allows user authentication to take place at a centrally located server independent of each NAP's own user authentication server. For example, an Internet Service Provider which has its own Radius Authentication Server and resells the underlying NAPs modem access to dial-up customer, could support this function by allowing a dial-in modem user to dial and connect using a "Initial Access PAPID and PAP_Password" then assigning a unique session PAPID and PAP_Password and "re-logging" into the Radius Authentication server without disconnecting the modem. Thereby eliminating the time that would otherwise be required to disconnect and re-dial using a newly assigned PAPID and PAP_Password.

The last attribute of the Client Dispatch Application Architecture is the ability to provide users with network identity anonymity. That is, the architecture of the Client Dispatch Application provides anonymity for users during network access as ID and Passwords (such IDs and Passwords would include PAPIDs and PAP_Passwords, Email IDs and Email Passwords, NEWS IDs and NEWS Passwords, FTP and Web Space IDs and

FIG. 62

Password, and custom network application IDs and Passwords) can be dynamically reassigned for a given user, a given system, a given group of users, a given group of systems, or any combination thereof. Thus, if a users has three computer systems (A_Computer, B_Computer, and C_Computer) each requires a unique user/system identification which is generated during installation and registration and stored in the client's NS.db and/or User.db. This unique user/system identification allow the Network Server to maintain unique and independent IDs and Passwords for the user/system pair. Thus, when a user connects the A_Computer to the network, unique IDs and Passwords which may be distinctly different from the B_Computer and C_Computer's IDs and Passwords (stored in NS.db and/or User.db) may be used to transparently log the user into such things as the Network, Email, FTP/Web Space, NEWS groups, Bulletin Boards, or any other application requiring login identification and password. Thus, the architecture supports single life IDs and/or Passwords for all Network and application logins.

All communications between the Client Dispatch application and the Network Server take place through the Pinger. The Pinger provides secure and unsecure bi-directional communication between the Client and Network Server. The functions of the Pinger are as follows:
- Read, Write or Update any entry in any ".db" and further initiate a secondary transmission when appropriate.
- Execute a program or script with command line entries if appropriate.
- Save a file or script and further initiate the execution of the file or script when appropriate.
- Continue Transaction Thus with these functions the Client can request and/or the Network Server can initiate events, database updates, or save files for execution later. The Pinger also servers as a "Heartbeat" mechanism to prevent the premature connection to the Network by a NAP. That is, many NAPs have a modem inactivity time-outs that disconnect users after some short interval of time if

FIG. 63 there has been no network activity during that interval of time. The heartbeat function is programmable and in the current implementation is set at 5 minutes during the users first 3 hours of connection time and increases by 5 minutes each half hour thereafter.

The Pinger is initiated by the Client upon connection. The Client Pinger sends Header information to the Server. Such information includes, the current User ID, Account Owner ID, PAPID, the current IP address assigned to the users System, Group ID, the users system's current time, database ".db" files revision levels, client dispatch and other related software revision levels. With this information the server can determine such things as if a user is making two connection whilst only paying for one and thus needs to be disconnected, or if a user needs a database or file update. The Continue Transaction function comes into play with the later as file updates can be large and may take several sessions to complete the transaction. That is, the Continue Transaction function provides a mechanism to partially transmit data and commands over multiple sessions without have to restart the transaction from the beginning.

The Script language used by the Pinger and elsewhere is called MOT (see Figure 8). The script language is an interpretive language which is stored in an encrypted file format which the interpreter reads to initiate the MOT client dispatch application. The MOT client dispatch application can read and write database (.db) entries, Operating System initialization file entries (INI and Registry files), and ACSII Text files. Further the MOT client dispatch application can spawn executable programs, network connection, AWK scripts, and other MOT scripts.

All functions may be initiated through the human interface – a Toolbar. The Toolbar has some unique properties as it can be dynamically changed or updated via the Pinger or a MOT script. Further the MOT script can be part of an E-mail message, an HTTP web document, FTP download, etc. which transparently automates the Toolbar update. The Toolbar can be

FIG. 64 integrated with a ticker tape which can spawn MOT scripts, URLs, or execute programs. Each Toolbar button is programmed with a function in the BTN.db. The Toolbar reads five attributes from the BTN.db database:
1. Caption – Title or Button Name
2. Enabled – Enables or disables the button function
3. Execution Type – This attribute supports the following types and further determines if the fifth attribute read by the toolbar would be "Execute File" (5.a.) or "URL" (5.b.)
   - DDE to a URL
   - DDE to a URL without going online
   - Launch a Program or Script
   - Launch a Program or Script and wait to complete before continuing
   - Go online and then launch a program or Script
   - Change Preferences
   - Change Passwords
   - Display Account Information
   - Set Dialing Properties
   - Execute a MOT script
   - Jump to another Tab or Button on the Toolbar
   - Reload the Toolbar's Tabs and/or Buttons
4. Hint – Button functionality description.
5.a. Execute File – Command line of file to be executed.
5.b. URL – URL for a browser to open whether remote or local.

When the user clicks on one of the Toolbar functions or the Ticker tape the appropriate procedure is started. For example, if a button is programmed to go the USA Today (button Caption) web site the Execution type would be set to "DDE to a URL" and the "URL" would be set to something similar to http://www.usatoday.com/ and the "Hint" would be set to something similar to "Open to USA Today's Web site for the latest news!"

FIG. 65

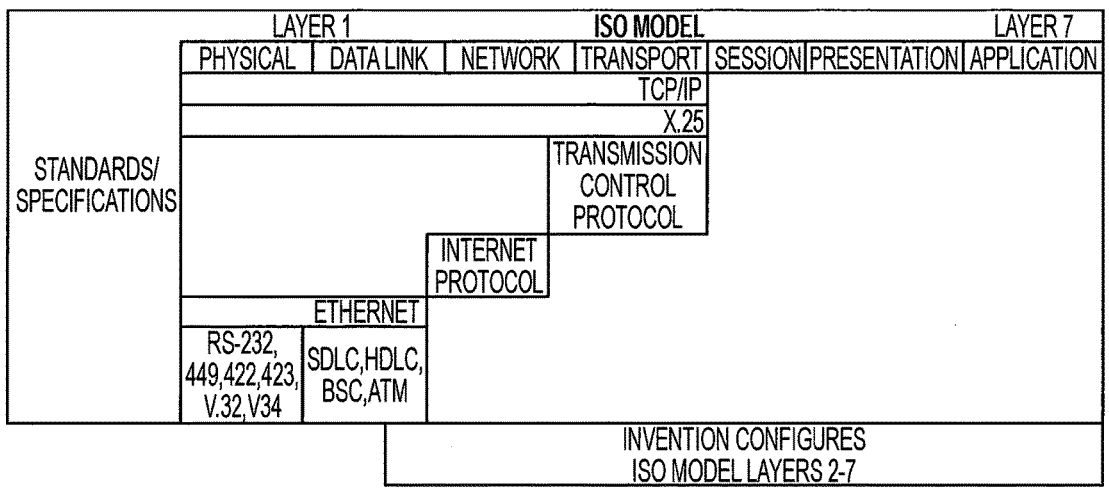
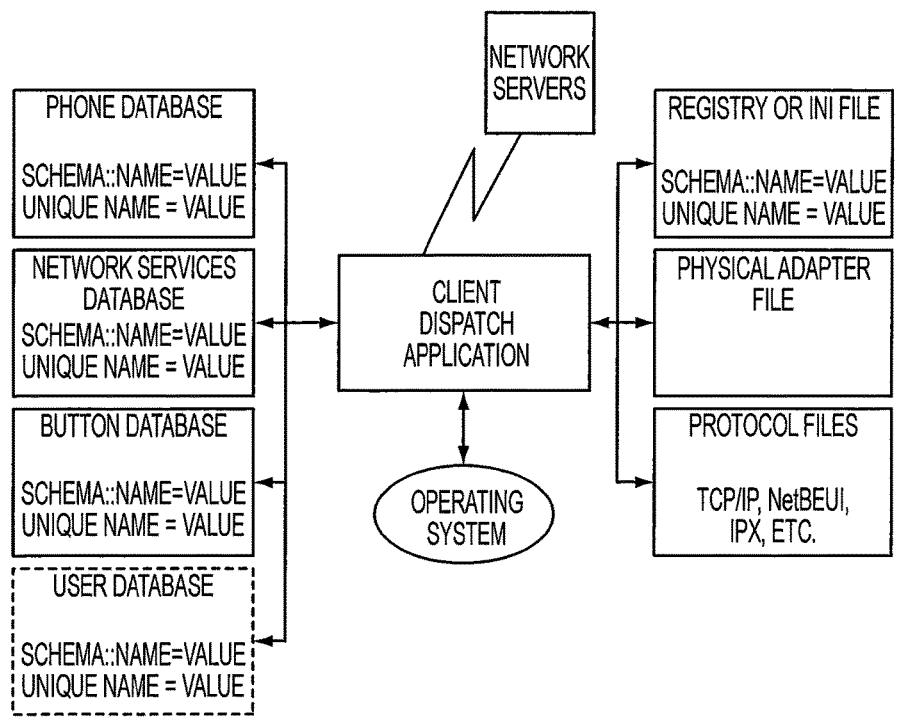
FIG. 66

The "Availability" Multi-dial Procedure sub-function builds a dial-in location list based upon User PAPIDs and PAP_Passwords stored in the NS.db and the type of service plan (also found in the NS.db) which a user has chosen to subscribe to. If a user has chosen to subscribe to a high cost plan, multiple PAPIDs and PAP_Passwords for multiple NAPs may be stored in the NS.db and therefore the list of available dial-in locations may contain dial-in numbers from multiple NAPs. Alternatively, multiple NAPs may have PAPID and PAP_Password sharing agreements allowing a single User PAPID and PAP_Password entry in NS.db to generate a dial-in location list from multiple NAPs.-

The "Availability" sub-function uses one or more mechanisms or the Service Selected sub-function to determine "Availability" at a given location based upon historical data (Histogram Data) or real time data supplied by a NAP to the Network Re-seller. The mechanisms and sub-function consist of the Server Histogram Data, Client Histogram Data, the "Service Selected" sub-function, or any combination thereof. Obviously the Client Histogram Data is not of much value until a particular client has consistently established a Network connection for a least 90 days. However, after 90 days a client histogram can be built to determine the probability of success of connecting to the Network the first time and minimize the necessity of having the Client Dispatch application perform a second dial-attempt to connect to the Network. The Server Histogram Data is always sent to the client's NS.db upon any connection to the network when the Availability sub-function is enabled. This data is normally used in conjunction with the Client Histogram Data (when appropriate) to determine the highest probability of success of connecting to the Network without a second dial. Thus, the Client Histogram Data and the Server Histogram Data are used to facilitate a statistical approach to determine the highest probability of a user connecting to the network on the first attempt. However, there are cases when a client needs 100% connection confidence or the Histogram Data for a particular area is irrational and therefore

FIG. 67

<u>useless. In these cases "Service Selected" sub-function is initiated and the "Double-dial" Process takes place.</u>

The last sub-function of the Multi-dial Procedure is the Single-dial Multi-Login function. This sub-function requires a "multi-dial" attempt when modem receives a busy signal; otherwise this function is a single-dial function with a multiple PAPID / PAP_Password assignment/reassignment function This function requires that all user (client) authentication happens centrally. Thus, this function works with multiple NAPs when each allows user authentication to take place at a centrally located server independent of each NAP's own user authentication server. For example, an Internet Service Provider which has its own Radius Authentication Server and resells the underlying NAPs modem access to dial-up customer, could support this function by allowing a dial-in modem user to dial and connect using a "Initial Access PAPID and PAP_Password" then assigning a unique session PAPID and PAP_Password and "re-logging" into the Radius Authentication server without disconnecting the modem. Thereby eliminating the time that would otherwise be required to disconnect and re-dial using a newly assigned PAPID and PAP_Password.

~~One side~~<u>The last</u> attribute of the Client Dispatch Application Architecture is the ability to provide users with network identity anonymity. That is, the architecture of the Client Dispatch Application provides anonymity for users during network access as ID and Passwords (such IDs and Passwords would include PAPIDs and PAP_Passwords, Email IDs and Email Passwords, NEWS IDs and NEWS Passwords, FTP and Web Space IDs and Password, and custom network application IDs and Passwords) can be dynamically reassigned for a given user, a given system, a given group of users, a given group of systems, or any combination thereof. Thus, if a users has three computer systems (A_Computer, B_Computer, and C_Computer) each requires a unique user/system identification which is generated during installation and registration and stored in the client's NS.db and/or User.db. This unique user/system identification allow the

FIG. 68

Network Server to maintain unique and independent IDs and Passwords for the user/system pair. Thus, when a user connects the A_Computer to the network, unique IDs and Passwords which may be distinctly different from the B_Computer and C_Computer's IDs and Passwords (stored in NS.db and/or User.db) may be used to transparently log the user into such things as the Network, Email, FTP/Web Space, NEWS groups, Bulletin Boards, or any other application requiring login identification and password. Thus, the architecture supports single life IDs and/or Passwords for all Network and application logins.

All communications between the Client Dispatch application and the Network Server take place through the Pinger. The Pinger provides secure and unsecure bi-directional communication between the Client and Network Server. The functions of the Pinger are as follows:
- Read, Write or Update any entry in any ".db" and further initiate a secondary transmission when appropriate.
- Execute a program or script with command line entries if appropriate.
- Save a file or script and further initiate the execution of the file or script when appropriate.
- Continue Transaction Thus with these functions the Client can request and/or the Network Server can initiate events, database updates, or save files for execution later. The Pinger also servers as a "Heartbeat" mechanism to prevent the premature connection to the Network by a NAP. That is, many NAPs have a modem inactivity time-outs that disconnect users after some short interval of time if there has been no network activity during that interval of time. The heartbeat function is programmable and in the current implementation is set at 5 minutes during the users first 3 hours of connection time and increases by 5 minutes each half hour thereafter.

The Pinger is initiated by the Client upon connection. The Client Pinger sends Header information to the Server. Such information includes, the

FIG. 69 current User ID, Account Owner ID, PAPID, the current IP address assigned to the users System, Group ID, the users system's current time, database ".db" files revision levels, client dispatch and other related software revision levels. With this information the server can determine such things as if a user is making two connection whilst only paying for one and thus needs to be disconnected, or if a user needs a database or file update. The Continue Transaction function comes into play with the later as file updates can be large and may take several sessions to complete the transaction. That is, the Continue Transaction function provides a mechanism to partially transmit data and commands over multiple sessions without have to restart the transaction from the beginning.

The Script language used by the Pinger and elsewhere is called MOT (see Figure 8). The script language is an interpretive language which is stored in an encrypted file format which the interpreter reads to initiate the MOT client dispatch application. The MOT client dispatch application can read and write database (.db) entries, Operating System initialization file entries (INI and Registry files), and ACSII Text files. Further the MOT client dispatch application can spawn executable programs, network connection, AWK scripts, and other MOT scripts.

All functions may be initiated through the human interface – a Toolbar. The Toolbar has some unique properties as it can be dynamically changed or updated via the Pinger or a MOT script. Further the MOT script can be part of an E-mail message, an HTTP web document, FTP download, etc. which transparently automates the Toolbar update. The Toolbar can be integrated with a ticker tape which can spawn MOT scripts, URLs, or execute programs. Each Toolbar button is programmed with a function in the BTN.db. The Toolbar reads five attributes from the BTN.db database:
    1. Caption – Title or Button Name
    2. Enabled – Enables or disables the button function

FIG. 70

3. Execution Type – This attribute supports the following types and further determines if the fifth attribute read by the toolbar would be "Execute File" (5.a.) or "URL" (5.b.)
   - DDE to a URL
   - DDE to a URL without going online
   - Launch a Program or Script
   - Launch a Program or Script and wait to complete before continuing
   - Go online and then launch a program or Script
   - Change Preferences
   - Change Passwords
   - Display Account Information
   - Set Dialing Properties
   - Execute a MOT script
   - Jump to another Tab or Button on the Toolbar
   - Reload the Toolbar's Tabs and/or Buttons
4. Hint – Button functionality description.
5.a. Execute File – Command line of file to be executed.
5.b. URL – URL for a browser to open whether remote or local.

When the user clicks on one of the Toolbar functions or the Ticker tape the appropriate procedure is started. For example, if a button is programmed to go the USA Today (button Caption) web site the Execution type would be set to "DDE to a URL" and the "URL" would be set to something similar to http://www.usatoday.com/ and the "Hint" would be set to something similar to "Open to USA Today's Web site for the latest news!"

FIG. 71

This is a modification of the POP3 authentication.

Invention for secure authentication and transfer of encrypted data using a one time generated cipher/decipher key. This invention relates to transferring data securely across a TCP layer protocol.

The method allows for authentication, but does not involve sending a password in the clear over the network.

If at anytime the server receives an incorrect header or protocol from the client, the server disconnects the socket.

> User authentication;
> Once a connection is made, the server sends an acknowledgement header ( '+OK' ), the client then sends the string 'USER <SKEY>' where <SKEY> is a one-time generated key that will be used to cipher/decipher data. <SKEY> is comprised of '<data><hostname>' where hostname is the host IP address of the client and data is unique data generated by the client (generally a process id and timestamp). The server replies with another acknowledgement ( '+OK' ). The client then sends the password header 'PASS MD5(<SKEY><SP>)' which is comprised of an MD5 digest of the USER header (<SKEY>) concatenated with 'SP' (a client/server known secret string unique to the user). The server replies with '+OK'.

During the authentication phase, the server qualifies the user by comparing the IP address sent in the USER header with the IP address received from the socket connection. The Server then compares the MD5 digest created with USER header and shared unique string. Authentication is granted if there is an agreement.

> i.e.
> SERVER: +OK
> CLIENT: USER pid.time@hostname
> SERVER: +OK

FIG. 72

CLIENT: PASS MD5(pid.time@hostname<SP>)
SERVER: +OK <KEY>

Client Server version information;
The next header the client sends is the version of the client software 'VER <client version>'. This allows the client/server to 'sync' with version specific data protocols. The server then replies with '+OK <server version>'.

i.e.

CLIENT: VER <client version>
SERVER: +OK <server version>

Encrypted/decrypted data protocol;
From this point on I will refer to KEY as a MD5 generated string derived from '<SKEY><SP>' and 'data stream packet' as a crypted data stream using 'KEY' as the encrypted/decrypted key.

one possible stream implementation is as follows;
Data of n lines of uuencoded data encrypted with the key 'KEY' and a final line ending in a single '.'. Each line is ended with a <CR><LF>
The Client now sends a command header to specify the data protocol. 'REQ <cmd>' and follows with a data stream packet. The Server sends a reply header in the form, '+OK REQ <cmd>' and may follow with a data stream packet;

i.e.
CLIENT: REQ <cmd>
CLIENT: <data>CRLF
CLIENT: ...
CLIENT: <data>CRLF
CLIENT: .CRLF
SERVER: +OK REQ <cmd>
SERVER: <data>CRLF
SERVER: ...

FIG. 73

SERVER: <data>CRLF
SERVER: .CRLF

The data exchange continues until the client issues the following command 'QUIT', the server replies with '+OK' and the exchange is complete.

CLIENT: QUIT
SERVER: +OK

FIG. 74

APPENDIX C

Executive Overview

Now for the first time the end-user's Internet experience can be controlled like the old proprietary mainframe based networks of Prodigy, AOL, and CompuServe. The NetSafe NEAT!™ Software Suite of integrated Internet tools is designed to address the needs of Internet Service Providers (ISPs), Affinity Marketers, and Content Providers with a rich suite of tools that enhance an end-user's Internet experience. The NEAT! Software provides Marketers, ISPs and Content Providers with valuable end-user based demographic information, custom event controls, and a significant reduction in technical support costs.

The NEAT! Software Suite of tools includes:

- An integrated installation and registration application that enables end users to sign up in minutes and begin using the Internet immediately.

- Application configuration and event controls to configure, upgrade and update the end user's Internet and TCP/IP applications.

- A customizable application-control toolbar to tailor content to specific user or group requirements and enhance branding opportunities for companies, associations or organization on the Web.

- A full suite of easy-to-use Internet applications that include a customized Microsoft Internet Explorer browser, NetSafe's unique multi-user FamilE-mail™ application, NetSafe's Homepage Wizard with Automagic™ upload for developing and publishing home pages, and security mechanisms such as single life password access controls, data encryption, and tools to facilitate commerce on the Internet with features like client-side authentication.

FIG. 75

- Independence from underlying network and telecommunication infrastructures.

Tested under real-world conditions. The NetSafe NEAT! Software is being used by thousands of end-users throughout North America, using many different networks, a variety of end user "configured" and "misconfigured" systems and modem combinations. The dynamic architecture of the NEAT! Software has handled local dial-in phone-number and area-code changes with no intervention by end users. It has handled numerous updates of the Windows 95 Operating System Releases and several Windows 3.1x patches without user intervention and without incurring heavy costs for technical support calls.

The NEAT! Software architecture supports a true client-server model which provides capabilities for customized toolbars and default browsing locations for each individual user (mother, father, son or daughter) on a single dial-in account. Hence, each individual user's Internet experience can be tailored to their own personal requirements. Thereby giving each individual user a unique identification, customized toolbar with browser preferences, and secure private E-mail accounts, independent of the underlying dial-in account.

Individual user authentication enhances business use of the Web. The exclusive NetSafe NEAT! Software user identification system provides true Client-side authentication. This means that ISPs, Content Providers, and Marketers can use the NEAT! software to dynamically direct Web content, advertising, and application events to specific users in the household. Now, for the first time, marketers can see who's watching "TV" and focus content on the needs and tastes of known individuals rather than developing content to appeal to an average audience.

Check out the competition and see the advantages of the NEAT! Registration process for yourself. The NetSafe NEAT! Software Suite contains the most thorough and complete Installation and Registration Internet software available. There is no competitor whose product comes

FIG. 76 close to comparison. The table below shows the advantages of the NEAT! Software Installation & Registration over Microsoft and Netscape.

| | NetSafe NEAT! Installation | Microsoft's IEAK 3.01 Kit | Netscape's Installation |
|---|---|---|---|
| Simple Client Only Registration Wizard | ☑ | ☐ | ☐ |
| Complete System Diagnosis for Internet Operation including "OS Leveling" | ☑ | ☐ | ☐ |
| Automatic Modem Detection and Selection For both Windows 3.1 & Windows 95 | ☑ | ☐ | ☐ |
| Two Windows 3.1 Dialers for operation with Win-modems and Rockwell Chip-sets | ☑ | ☐ | ☐ |
| Dynamic Configuration of Phone Numbers | ☑ | ☐ | ☐ |
| Dynamic Configuration of DNS and Network Configuration Entries | ☑ | ☐ | ☐ |
| Dynamic Configuration of E-mail Passwords | ☑ | ☐ | ☐ |
| Dynamic Configuration of FTP Passwords | ☑ | ☐ | ☐ |
| Single System Reboot | ☑ | ☐ | ☐ |
| Fast, Low Cost Registration Process | ☑ | ☐ | ☐ |
| Groups and Associations Service Plans | ☑ | ☐ | ☐ |

FIG. 77

|  | NetSafe NEAT! Installation | Microsoft's IEAK 3.01 Kit | Netscape's Installation |
|---|---|---|---|
| Dynamic Branding for Affinity Marketers | ☑ | ☐ | ☐ |
| Dynamic Internet Application Configuration | ☑ | ☐ | ☐ |

Installation & Registration

Fast, easy installation and registration gives the end user a more enjoyable Internet experience. The NetSafe NEAT! Software Suite meets all user requirements for ease of use by removing the "technical" from the Internet and eliminating the need for end users to know local dial-up phone numbers, DNS and network configuration information, modem IDs and modem passwords, and the like. Installation and registration is therefore simple, and straightforward.

Installation & Registration Process Overview

The NEAT! Software is delivered on either a two-diskette set or CD-ROM. The two-diskette set includes the NEAT! Software with an installation processes for both Windows 3.1x and Windows 95 environments as well as both the 16-bit and 32-bit versions of Microsoft's Internet Explorer 2.0 browser. The single CD-ROM version of NEAT! Software includes everything on the two-diskette set plus both versions (16 and 32-bit) of Microsoft's Internet Explorer 3.x family of browsers as well as Adobe's Acrobat Reader.

The NEAT! installation process significantly reduces the number of technical support calls and their associated costs while providing the user with a fast, easy way to begin using the Internet. The installation process is fully customizable and can be privately branded for a company, association, or organization to build awareness or further loyalty. The installation process also includes a capability for transparent updates, upgrades and

FIG. 78 changes such as dial-in phone numbers, DNS network entries, user changes, installation instructions, and service plan pricing options.

Thus, the NetSafe NEAT! Software Installation & Registration process provides:

1. Complete system diagnosis for Internet operation
2. Automatic modem detection and selection
3. Complete installation and setup of all Internet-related entries including
   - All local dial-in phone numbers
   - All DNS and network configuration entries
   - All E-mail and FTP space identifications, passwords, space, etc.
4. A single reboot of the user's system
5. Private/custom branding
6. Dynamic updates

End User Installation Process

The NEAT! Software installation process consists of three simple steps.

I. Install the software.

- Insert the first floppy disk or the CD ROM into the appropriate drive.
- Type Setup.
- If applicable, insert the second floppy into drive.
- If prompted to do so, insert the requested Operating System disk, Windows 3.1x or Windows 95, so the NEAT! Software can automatically install the proper drivers onto the user's system.

FIG. 79

II. Detect and test the modem

- The NEAT! Software will automatically detect the user's modem(s). It will ask the user to confirm the detected modem, or it will give the user the opportunity to install a new modem.
- The user reboots the system to properly initialize the modem and the new drivers.
- The NEAT! Software will run a full local dial-up Internet network test (no longer than 90 seconds) during which time you can automatically modify any specific registration instructions, service plan descriptions, service plan offerings or pricing without user intervention.

III. Register the users

- Start the user registration process with a simple point, fill-in-the-blank, and click wizard.
- Upon completion of required registration data entry, a second local dial-up connection is made to transmit the user's data.

System Diagnosis for Internet Operation

System diagnosis ensures smooth Internet operation for the end user. The NetSafe NEAT! Software thoroughly inspects the end user's system to provide a complete system diagnosis for Internet operation. This inspection detects the current Operating System (OS) release number and its associated dynamically linked libraries (DLLs), and it determines if the associated DLL dates match the system revision level. In addition, the NEAT! Software determines if any patches or upgrades have been applied to the OS and to what level.

When the NEAT! Software detects a DLL that will adversely effect the operation of Internet software, such as the modem dialer, TCP/IP stack, Web browser, etc., it automatically makes the necessary correction for the user and renames the old offending DLL to a file with an OEM extension.

FIG. 80

Automatic Modem Detection and Selection

Automatic modem detection and selection makes it easy to set up the user's system for Internet access. Modem detection and configuration under Windows 3.1x are the leading technical support problems encountered when connecting end users to the Internet. NetSafe has significantly reduced that burden, cutting technical support calls by more than 60 percent, by incorporating a utility for automatically detecting and configuring modems.

Make It Easy to Use — Remove the "Technical" from the Internet

Ease of use is one of the most important reasons why ISPs and Content Providers should consider using the NEAT! Software. The NEAT! Software removes the "Technical" from the Internet by eliminating the need for users to know: Local dial-up phone numbers, DNS and Network configuration information, PAP IDs and PAP passwords (modem IDs and modem passwords) and the like.

The NEAT! Software ships with three encrypted databases (Phone, NS, and BTN) for local dial-up phone numbers (Phone Database), Internet and user related entries such as DNS, POP mail server, and individual demographic based information (NS Database), and group content and event controls (BTN database). The Phone Database contains local dial-up phone numbers (including 800 numbers) from a wide range of dial-up network providers. The database is completely independent of any one dial-up network provider and can be easily modified to include any local ISP or content provider's dial-up phone numbers. The NS database contains all of the DNS and network configuration entries for each of the underlying network providers or ISPs that are to be supported as well as all user related information obtained during registration or user financial data validation. The NS Database is referenced by the other databases to properly configure dialers, TCP/IP stacks, and applications for the appropriate underlying network and user. The last database, BTN Database, contains group content and event controls which can be used to start events (DDE to a URL, execute a program, etc.) through a toolbar or transparently through the

FIG. 81 browser. Each of the encrypted database can be dynamically changed by the ISP, Content Provider, or Affinity Marketer through NetSafe's Secure Courier Protocol, during installation or whenever their end user is on-line.

The NEAT! Software provides ISPs, Content Providers and Affinity Marketers with underlying network provider independence. Such providers might include UUNET, PSI, or BBN. Because the NEAT! software is dynamic, ISPs, Content Providers and Affinity Marketers can actually change dial-in characteristics and switch their users to another underlying network without interrupting their service in any way. This means that the NEAT! software gives ISPs, Content Providers and Affinity Marketers the controls they need to control pricing and quality of service independent of the underlying network provider.

The NEAT! Software eliminates the need for end users to remember a variety of user IDs and passwords including modem, E-mail, and controlled web site access IDs and passwords. The NEAT! software support a true single-user sign-on model for user identification and password maintenance. The NEAT! Software stores all identification and password entries into the NS encrypted database. The database contains all the modem (PAP) IDs and Passwords that users need to register and access the Internet via different underlying providers. And since end users are not given their PAP IDs and PAP Passwords, ISPs and content providers can:

1. Reduce theft and losses associated with illegal sharing of IDs and passwords. If many users share their modem IDs and passwords with their friends, they significantly reduce revenues and profits. Indeed, NetSafe knows of one ISP that had over 4,000 users sharing the same PAP ID and PAP Password.

2. Strengthen independence from network providers. Since each network provider has its own login identification scheme and PAP ID & Password scheme, you can increase your independence by incorporating these IDs and Passwords into your dynamic database, enabling you to change without causing your users any inconvenience.

FIG. 82

3. Reduce the costs of maintenance and support. Often, ISPs encounter unacceptable levels of technical support calls because the underlying network provider lacks the capability to provide quality service in an area for any number of reasons, such as lack of modems, quality of modems, or placement of modems. In these areas, the NetSafe NEAT! Software allows ISPs to use several network providers to reduce or even eliminate the technical support calls.

4. Balance network loads. The NEAT! Software enables ISPs and content providers to use multiple Network Providers as a load balancing strategy to provide higher quality service to its customer base. Such assignment of underlying networks is made automatically when users dial in at registration or for subsequent use.

The NetSafe NEAT! Software installation process requires a single reboot making registration faster and easier for end users. The result, fewer technical support calls and better perceived value. To many in the Internet industry, this may not seem like a big deal but real world customers tell us that this is one of the biggest reasons they believe the NEAT! Software is just easier to install than any other Internet software they have previously tried.

Registration

The NetSafe NEAT! registration process helps simplify your business processes and reduce costs. In addition to all the benefits previously mentioned about the installation and registration process, the NetSafe NEAT! Software registration process helps simplify your business processes with:

1. Easy to use, dynamic registration application
2. Support for multiple service plans
3. Credit card and direct debit (ACH) banking support

FIG. 83

4. Client-side authentication with verification by First USA and/or ACH
5. Creation of E-mail address and Web/FTP space
6. Creation of secure E-mail and FTP space passwords Let's look at each of these six features of the registration process and see how they help improve your business processes.

1. Easy-to-use, dynamic registration application. The NEAT! Software includes a registration application with all the flexibility of a dynamic registration system that:

- Is easier to use - Simple wizard interface allows user to point, fill-in the blank, and click without having to worry about scroll bars, screen resolutions, or browser settings. Many users don't understand how to use the browsers scroll bar, and it shouldn't be your technical support department's job to teach them.

- Provides client data pre-screening - The NEAT! Software provides prescreening such as credit card number and bank routing number validity to eliminate the server overhead that is needed to accomplish the same thing using a browser-based registration process.

- Ensures faster registration - The NEAT! Software registration process doesn't require the user to be connected to the Internet while entering their personal information. This eliminates the time required waiting for the browser to open and fill in its content. After the user fills in the appropriate data, the on-line connection time to complete the registration process takes less than 90 seconds.

- Lowers registration costs - Since the NEAT! Software registration process uses local dial-up numbers, there's no need to pay for a separate 800 phone number for registration. Since users fill out their registration information off-line, they're not

FIG. 84 using your modems, saving you an average of $1.20 per customer based on a 15 minute on-line registration time.

- Puts less system stress on the end-user's PC - The NEAT! Software registration process also eliminates many technical support calls that result when users get an insufficient memory error message during a browser-based registration process. Browsers such as Netscape's Navigator 2.0 and 3.0 family of browsers require a lot of overhead for their Secure Sockets Layer (SSL) component, and the resulting error messages generate many technical support calls to help users reconfigure their systems in order to register.

2. Support for multiple service plans means more customized service for users. The NEAT! Software supports multiple dial-up service plans including support for groups, associations, and other similar community sets of individuals. This support is dynamic. That means that during the installation process when the full "network dial test" is performed, one of the encrypted databases created during installation can be modified to change plan content, plan descriptions, plan pricing, and more.

The use of the Multiple Service Plan support allows a single copy of the NetSafe NEAT! Software to be used by many types of groups and organizations. For example, a Christian community organization wants its users to use news servers that contain no smut. Other organizations may want their customers to access the Internet through their specific web-sites. The architecture and design of NetSafe's NEAT! Software provides these and many other capabilities such as private chat, controlled Internet Radio Broadcast, etc., to address the needs of these virtual communities.

3. Credit card and direct debit banking support reduce opportunities for fraud and pre-screen information. The NetSafe NEAT! Software supports credit card and ACH transactions without requiring the user to purchase a First Virtual account or Cyber-Cash account. During

FIG. 85 registration, the NEAT! Software pre-screens credit card entry information prior to transmission by validating that the credit card number format is valid and that the issuing bank information which the user enters corresponds to the card number. This significantly reduces fraud prior to credit card validation by First USA.

The NEAT! Software also supports Direct-Debit banking transactions via the Automated Clearing House (ACH) system. During registration the NEAT! Software pre-screens the user-entered data prior to transmission for correct bank routing numbers.

4. Client-side authentication with verification by First USA and/or ACH means you know you're dealing with a valid customer. The NEAT! Software supports client-side authentication to facilitate commercial transactions and single-user sign-on capabilities. With NetSafe's NEAT! Software, merchants, content providers, and ISPs can be assured that the user that they are transacting business with is indeed that user and not an impostor. That is, the NetSafe NEAT! Software complements server-side authentication: it authenticates the user for the merchant rather than the merchant for the user.

Popular browsers such as Microsoft's Internet Explorer and Netscape's Navigator both support the Secure Sockets Layer (SSL) for server-side authentication which assures the user that they are communicating with a real and valid merchant. However, most credit card fraud isn't committed by people pretending to be merchants but rather by people, such as gas station and restaurant employees, that steal valid credit card numbers from old credit card receipts, carbons, or have an opportunity to make a copy of the credit card imprint. Thus, knowing that a purchase is being made by the rightful credit card holder should be of at least as much concern as knowing that a user is giving their credit card to a valid merchant. NetSafe's NEAT! Software addresses this key concern and facilitates on-line commercial transactions without a need for costly services such as Cyber-Cash or First Virtual.

FIG. 86

Upon completion of the registration transmission, an encrypted client-side authentication database is created on the user's system. The database contains all the data entered by the user during registration and will be validated by a credit card processor such as First USA or by the user's Bank shortly after the user makes their first connection to the Internet. Any differing information received from the credit-card processor or bank (such as a differing address or phone number) can be added to the users encrypted client-side authentication database or alternatively can be used to terminate the user's service for failing to fill in correct information.

During registration the NEAT! Software will prompt users to pick their E-mail name(s) and an associated predefined domain from a pull down box. The user will also be prompted to choose a Web/FTP space address from a pull down box of predefined web domains. This feature is dynamic and thus can be enabled or disabled prior to registration as well as making additions and deletions to available domain names for load balancing purposes.

5. Generation of E-mail and FTP passwords enhances security for end users. During completion of the registration process the NetSafe registration server(s) will generate MD5 based secure E-mail and FTP space passwords. These passwords will automatically be added and configured into the appropriate and predefined applications for the user.

6. Single-user sign-on assures transparent and secure web site access. The NetSafe NEAT! Software architecture with its client side authentication provides one of the best ease of use features on the Internet today: single-user sign-on. What is single-user sign-on? It's the capability for a user to log in to the Internet without worrying about passwords and log-ins for secure web sites. The NetSafe NEAT! Software automatically identifies the user without any user intervention. Unlike cookies, the latest security buzz word, which only validates a machine based on data that has not been validated, the

FIG. 87

NetSafe NEAT! Software identifies the user (mother, father, son or daughter) that has been validated by, for example, a financial institution and allows access by only the appropriate user to secure web sites that contain private, personal information.

The NEAT! Software uses an "Application Wrapper" which reads configuration information from one of the user's encrypted databases that were created during installation and registration. This wrapper is run every time the user makes a connection to the Internet and assures proper application operation even if the user has tinkered with the application's settings. Since such application tinkering results in about 20% of the ongoing technical support calls, this capability of the NEAT! Software to reconfigure is a real cost saver for ISPs.

Transparent Application Configuration and Event Controls

Transparent application configuration and event controls increase ease of use, reduce technical support calls, and improve marketing data. The NetSafe NEAT! Software Suite contains the NEAT! Wrapper Software which automates the configuration and control of TCP/IP and SMTP applications for end-user ease of use, security and custom event controls. For the ISP, this wrapper technology significantly reduces technical support costs, improves network use through dynamic and transparent reconfiguration, and provides valuable individual user-based demographic information. For the marketer, the NEAT! Wrapper technology can guarantee web site hits and event controls, allow transparent access to secure web sites, and provide valuable individual user based demographic information.

Customizable Application Control Toolbar

The Customizable application control toolbar increases ease of use and improves functionality for end users. The NEAT! Software ships with two integrated toolbars and can easily be integrated with other third party toolbars such as Prodigy Internet. The toolbar significantly increases ease of use and can be dynamically updated whenever the end user dials in. It

FIG. 88 provides auto-launch functionality that includes automatically starting a browser at a specified Web site, automatically launching and continuing a program, changing preferences and passwords, displaying account information, changing dialing properties, jumping to another toolbar, and updating or changing buttons.

Client Interface

The Client Interface consists of a fully customizable application control toolbar capable of starting any application, URL, DDE, or commonly executed scripts such as FTP, AWK, MOT and more. The Client Interface also supports NetSafe's unique client-side authentication which can be used to:

1. Control and track individual user state.

2. Maintain secure E-mail tracking.

3. Maintain single-user sign-on capabilities across a wide range of differing content.

4. Support multiple user "logins" on a single PC; for example, a single dial-in account can support multiple users such as mom, dad, son, and daughter with each having their own customized tool-bar geared towards the content that each is to receive.

To summarize, the NetSafe NEAT! Client Interface with its client-side authentication and tracking capabilities provide: A higher level of security, the ability to have content directed to each specific user rather than the user trying to find the content for himself, and "single sign-on" for an infinite amount of content from differing content providers. The benefits for the content producer are: Guaranteed reception and control of content (including intellectual property), transparent tracking of user with quality demographic based information, and ease of access control via transparent user name and password controls.

Further, the toolbar provides the following functionality:

FIG. 89

- Ease of Use
- Dynamic Updates
- Auto-launch Functionality

✓ Dynamic Data Exchange (DDE) to Universal Resource Locator (URL)
  ✓ Automatically start browser to specified URL while online or off-line
  ✓ Launch a program and continue
  ✓ Launch a program and wait for program to complete
  ✓ Go online and then Launch a program
  ✓ Change Preferences
  ✓ Change Lock-out Password
  ✓ Display Account Information
  ✓ Set or Change Dialing Properties
  ✓ Execute a NEAT! Script
  ✓ Jump to Another Toolbar TAB
  ✓ Update or Change Buttons

Full Suite of Easy to Use Internet Applications

Full suite of easy-to-use Internet applications. The NEAT! Software suite includes Microsoft's Internet Explorer family of browsers, NetSafe's FamilE-mail multi-user E-mail program, NetSafe's Homepage Wizard with Automagic upload capabilities, and NetSafe's easy-to-use toolbar. The NEAT! Software architecture is so flexible that any one of these components can be easily interchanged with other components such as the Netscape Navigator browser. This functionality, however, requires the ISP, content provider, or affinity marketer to secure their own third-party software license agreements. All third-party software shipped with the NEAT! Software suite is fully licensed.

FIG. 90

Customized Microsoft IE Browser

Customized MS Internet Explorer browser can be private branded to enhance company or organizational awareness. The NEAT! Software suite ships with both Microsoft's Internet Explorer (IE) 2.x and 3.x versions. The 2.x versions ship on the 2 disk floppy set only; whereas the CD-ROM version ships with both the 2.x family and 3.x family of browsers. Each of the browsers can be "Private Branded" for the specific ISP, Content Provider, or Affinity Marketer.

NetSafe ships the IE 2.x browser versions for low cost distribution, minimal system strain (IE 3.x and Netscape versions 3.x puts a lot of excess strain on older Windows 3.1x systems which leads to unnecessary technical support calls when using IE 2.x) and instant end-user gratification (less than 10 minutes to install, register, get on-line and see pictures).

NetSafe's Integrated FamilE-mail Supporting Multiple Users

Multi-user E-mail capability enables everyone in an account to have their own private mail. NetSafe NEAT! Client software includes NetSafe's FamilE-mail program with multiple user / E-mail box support. In addition to the multiple user / E-mail box support, the FamilE-mail program provides unlimited attachments and attachment sizes, simple "create a new E-mail box" feature, as well as many of the standard features found in popular E-mail programs such as Eudora.

NetSafe's Homepage Wizard with Automagic Upload

Create home pages with the simplest personal home page development tool available today. The NetSafe Homepage Wizard is the simplest personal home page development tool available in the market today. It includes state-of-the-art features that include a simple pick-a-look wizard, Automagic upload, and simple review, change and update capabilities.

The Automagic upload feature of the homepage wizard automatically logs the end-user into their private Web/FTP-space and transparently uploads all

FIG. 91 the associated HTML and graphics files generated by the Homepage Wizard for the user.

Conclusion

The NetSafe NEAT! Software suite is the most complete and comprehensive Internet Software available on the market today. With it, ISPs can lower technical support costs by as much as 60 percent and attract advertisers to their customer base. For content providers and affinity marketers, the NEAT! Software Suite gives you an unprecedented capability to track, monitor, and control customers, without using a proprietary mainframe-based network, with the speed and openness of the Internet.

FIG. 92

Introduction

The NetSafe NEAT!™ Software Suite of integrated Internet tools is designed to address the needs of Internet Service Providers, Affinity Marketers, and Content Providers with a rich suite of tools that enhance an end-user's Internet experience, provide marketers with valuable demographic based content and event controls, and significantly reduce technical support. Now for the first time the end-user's Internet experience can be controlled as the old proprietary mainframe based networks of Prodigy, AOL, and CompuServe.

The NEAT! Software Suite of tools consists of:

- Integrated Installation and Registration Client Application
- Transparent Application Configuration and Event Controls
- Customizable Application Control Toolbar
- Full Suite of Easy to Use Internet Applications
    - Customized Microsoft FE browser
    - NetSafe's Integrated FamilE-mail™ which Supports Multiple Users
    - NetSafe's Homepage Wizard with Automagic™ Upload
    - and more The NEAT! Software Architecture Provides the Following Benefits

- Dynamic Control of Each User's System and TCP/IP Applications
- Transparent Reconfiguration of Each User's System and TCP/IP Applications
- Single User Sign-on for Transparent Secure Web Site Access
- Guaranteed Web and Event Hit Controls
- Underlying Network and Telecommunication Infrastructure Independence
- Client-side Authentication for easy commercial commerce.

FIG. 93

The NetSafe NEAT! Software has been tested with thousands of real world end-users throughout North America on multiple underlying networks with a plethora of end-user "configured and misconfigured" systems and modem combinations. The NEAT! Software's dynamic architecture has endured local dial-in phone number and area code changes transparently to the end-user (i.e. without end-user intervention), multiple Windows 95 Operating System Releases with numerous updates, multiple Windows 3.1x patches, etc. All without user intervention and thus eliminating the dreaded technical support call.

Further the NEAT! Software architecture supports a true client-server model for content and event controls such as customized toolbars and default browsing locations for a specific user (i.e. mom, dad, son or daughter) with a single dial-in account. That is, the NEAT! Software supports multiple users with a single dial-up account with each user having his or her own unique identification, toolbar and browser preferences, and email accounts.

For marketers, the exclusive NetSafe NEAT! Software user identification system provides true Client-side authentication to dynamically target web content, advertising, and application events to the specific user of the household. Now for the first time marketers can see who's watching "TV" and focus their content to the specific individual rather than the generic audience.

Installation & Registration

The NetSafe NEAT! Software Suite includes the most thorough and complete Installation and Registration Internet software available.

Installation & Registration Process Overview

The standard NEAT! Software installation process is very simple and straight forward. The NEAT! Software consists of a single two diskette set

FIG. 94 which includes an installation process for both Windows 3.1 and Windows 95. The diskette set contains the NEAT! Software, 16-bit applications for Windows 3.1, 32-bit applications for Windows 95 and both a 16-bit and 32-bit version of Microsoft's Internet Explorer 2.0. The NEAT! Software is also shipped on a single CD with Microsoft Internet Explorer 3.x family of browsers and Adobe's Acrobat Reader. The 3 simple steps to perform an installation of the NEAT! Software are:

1. Install the software
   - Insert Floppy disk #1 or the CD ROM into the appropriate drive.
   - Type Setup
   - Insert the next (and last) floppy into drive if applicable.
   - If prompted to do so, install the requested Operating System Disk (Windows 3.1x or Windows 95) so the NEAT! Software can automatically install the proper DLLs onto the users system.
2. Detect and test the modem
   - The NEAT! Software will automatically detect the users modem(s) and asks the user to confirm the detected modem or gives the users the opportunity to install a new modem.
   - Reboot the users system to properly initialize the modem and new DLLs.
   - Run a full local dial-up Internet network test (no more than 90 seconds) during which time any specific registration instructions, service plan descriptions, service plan offerings or pricing can be modified on the client without user intervention.
3. Register the Users
   - Start the user registration process with a simple point, fill-in-the-blank, and click wizard.

FIG. 95

- Upon completion of required registration data entry, a second local dial-up connection is made to transmit the users data.

Installation

The NetSafe NEAT! Software Installation process provides the following features

1. Complete System Diagnosis for Internet Operation
2. Automatic Modem Detection and Selection
3. Complete Installation and Setup of all Internet related entries including:
    - All Local Dial-in Phone Numbers
    - All DNS and Network configuration Entries
    - All Email & FTP Space Identifications, Passwords, Space, etc.
4. Single (One) Reboot of the Users System
5. Private/Custom Branding
6. Dynamic Updates The Benefits of the NetSafe NEAT! Software Installation process are:

1. A Significant Reduction in Technical Support Calls and Costs
2. A More Enjoyable Internet Experience for the User
3. Brand Awareness for the Marketer, ISP, or Content Provider
4. Easy Updates, Upgrades and Additions to:
    - Phone Numbers
    - Network Entries
    - User Changes
    - Installation Instructions

FIG. 96

System Diagnosis for Internet Operation

The NetSafe NEAT! Software provides a complete system diagnosis for Internet operation by thoroughly inspecting the user system. The system inspection includes detecting the current Operating System revision level, its associated dynamic linked libraries (DLLs), and accordingly determines if the associated DDL dates match the system revision level. Further the NEAT! Software determines if any patches or upgrades have been applied to the Operating System and to what level.

When the NEAT! Software detects a DLL that will adversely effect the operation of Internet related software (Modem Dialer, TCP/IP stack, Browser, etc.) it automatically makes the necessary correction for the user and renames the old offending DLL to a file with a ".OEM" extension.

Automatic Modem Detection and Selection

The NetSafe NEAT! Software Uses a Windows 95 like Modem detection and associated Unicode for properly detecting and configuring Modems under Windows 3.1x. Most ISP's are aware of the fact that modem detection and configuration under Windows 3.1x is the leading technical support problem in getting a customer connected to the Internet. With NetSafe's NEAT! Software that burden has been significantly reduced by cutting technical support calls by more than 60% in actual real-world use.

Make It Easy to Use --- Remove the 'Technical" from the Internet

NetSafe believes ease of use is the single most important reason that Internet providers and content providers should consider the NEAT! Software. The NEAT! Software removes the "Technical" from the Internet by eliminating the need for users to know:

- Local dial-up phone numbers
- DNS and Network configuration information

FIG. 97

- PAP IDs and PAP passwords (modem IDs and modem passwords)
- etc.

*Local Dial-up Phone Numbers*

The NEAT! Software ships with an encrypted database which contains local dial-up phone numbers (including 800 numbers) from a multiplicity of dial-up network providers. The database is completely independent of any one dial-up network provider and can be easily modified to support any local ISP or Content provider's dial-up numbers. For local ISP's using other underlying network providers such as UUNET, PSI, or BBN the NEAT! Software provides you vendor independence because of its dynamic nature and architecture. That is, once your users are online you can actually change their dial-in characteristics and switch your users to utilize another underlying network without their knowledge or intervention; thereby giving the ISP and Content providers the controls necessary to dictate pricing, quality of service, etc. without being held hostage to an underlying network provider.

*DNS and Network Configuration Entries*

The NEAT! Software also has an encrypted database which store the DNS and Network configuration entries. This database is referenced by other databases including the phone database to properly configure dialers, TCP/IP stacks and application for the appropriate underlying network. Again, for local ISP's using other underlying network providers such as UUNET, PSI, or BBN the NEAT! Software provides you vendor independence as these database are also dynamically changeable (of course without user intervention or knowledge) both during installation or anytime after the user is online.

FIG. 98

*PAP Identification and PAP Passwords*

The NEAT! Software stores all PAP IDs and PAP Passwords (Modem ID and Password) into the DNS and Network Configuration Entries encrypted database. The database contains a multiplicity of PAP IDs & Passwords for registration and user access to the interne via differing underlying Network Providers without any user intervention or reconfiguration.

NetSafe believes that a user should never be given their PAP ID and PAP Password for the following reasons:

1. Theft - Many users share their modem id's and modem password with their friends significantly reducing your revenue and profit. NetSafe knows of one ISP that had over 4,000 users sharing the same PAP ID and PAP Password.

2. Network Provider Independence - Each Network Provider has its own login identification scheme and PAP ID & Password scheme; therefore in order to have Network Provider independence an ISP or content provider should not provide its users with PAP ID's and Passwords.

3. Maintenance and Support - Many times ISPs are faced with technical support calls because their underlying network provider's capability to provide quality service in an area is lacking due to lack of modems, quality of modems, or placement of modems. For such area's NetSafe's NEAT! Software allows ISPs to utilize multiple Network Providers to reduce or altogether eliminate the technical support call.

4. Network Load Balancing - The NEAT! Software allows ISPs and Content Providers to utilize multiple Network Providers as a "Load Balancing" mechanism for its own customer base. The assignment of which underlying network its users dials into can

FIG. 99 happen at registration or through a round robin dial-in attempt mechanism.

*Single System Reboot*

The NetSafe NEAT! Software installation process requires only one reboot -- the only Internet software on the market today that does this. To many in the Internet industry this may not seem like a big deal but from real world customers feedback this is one of the most mentioned items under "Why the NEAT! Software is just easier to install than any other internet software" that user have tried to previously install.

Registration

The NetSafe NEAT! Software Registration process provides the following features

1. Easy to use Registration Client
2. Multiple Service Plans Support
3. Credit Card and Direct Debit (ACH) Banking Support
4. Client-side Authentication with verification by First USA and/or ACH
5. Creation of Email Address and Web/FTP Space
6. Creation of Secure Email and FTP space passwords
7. Single User Sign-on Passwords
8. Dynamically Changeable The Benefits of the NetSafe NEAT! Software Installation process are:

1. A Significant Reduction in Technical Support Calls and Costs
2. A More Enjoyable Internet Experience for the User
3. Brand Awareness for the Marketer, ISP, or Content Provider
4. Higher Level of Security
5. Easy Updates, Upgrades and Additions to:
    - Phone Numbers

FIG. 100

- Network Entries
- User Account Updates and Changes
- Installation Instructions
- Web Site and Content Controls <u>Easy to use Registration Client</u>

The NEAT! Software includes a registration client with all the flexibility of a browser based registration system (dynamically changeable) but with the following features and benefits

- Easier to Use - Simple wizard interface allows user to point, fill-in the blank, and click next without-having to worry about browser scroll bar usage, the users screen resolution, or prior browser settings. Many users don't understand how to use the browsers scroll bar, and it shouldn't be your technical support department's job to teach them either.

- Client Data Pre-screening - The NEAT! Software also supports "Data-input" prescreening such as Credit Card number and Bank Routing number validity eliminating the server overhead that is needed to accomplish the same thing using a browser based registration process.

- Faster Registration - The NEAT! Software registration process doesn't require the user to be connected to the Internet while entering their personal information and thus, eliminates the time required waiting for the browser to open and fill in its content. After the user fills in the appropriate data, the online connection time needed to complete the registration process is less than 90 seconds.

- Lower Registration Cost - The NEAT! Software registration client supports local dial-up numbers; thereby eliminating the need for a separate 800 registration phone number. Also since

FIG. 101 users aren't online while filling in their registration information, modems are not in use and more accessible. The net result is an average cost savings of approximately $1.20 per customer based on a 15 minute online registration time.

- Less System Stress on Users PC - The NEAT! Software client registration also eliminate many technical support calls due to insufficient memory errors that many Windows 3.1x users get when trying to use a browser based registration. Browsers such as Netscape's Navigator 2.0 and 3.0 family of browsers require lots of overhead when using the Secure Sockets Layer (SSL) component (required to do online registration) which results in many technical support calls to help the user reconfigure their system to register.

Multiple Service Plans Support

The NEAT! Software supports multiple dial-up service plans including support for groups, associations, and other similar community sets of individuals. The multiple plan support is dynamic. That is, during the installation process, when the full "network dial test" is performed, one the encrypted databases created during installation can be modified to alter plan content, plan descriptions, plan pricing, and more.

The use of the Multiple Service Plan support allows a single copy of the NetSafe NEAT! Software to be utilized by many type of groups and organizations. For example, the Christian community wants their users to utilize only news servers without smut. While other organizations only want their customers to access the Internet through their specific web-sites. The architecture and design of NetSafe's NEAT! Software provides these and many other capabilities such as private chat, controlled Internet Radio Broadcast, etc., to address the needs of "virtual communities."

FIG. 102

Credit Card and Direct Debit (ACH) Banking Support

The NetSafe NEAT! Software supports credit card and ACH transactions without requiring the user to purchase a First Virtual account or Cyber-Cash account. During registration, the NEAT! Software pre-screens credit card entry information prior to transmission by validating that the credit card number format is valid and that the issuing bank information which the user enters corresponds to the card number. This significantly reduces fraud prior to credit card validation by First USA.

The NEAT! Software also supports Direct-Debit banking transaction via the Automated Clearing House (ACH) system. During registration the NEAT! Software pre-screens the user entered data prior to transmission for correct bank routing numbers.

Client-side Authentication with verification by First USA and/or ACH

The NEAT! Software supports client-side authentication to facilitate commercial transactions and single-user sign-on capabilities. With NetSafe's NEAT! Software merchants, content providers, and ISPs can be assured that the user that they are transacting business with is indeed that user and not an impostor. That is, the NetSafe NEAT! Software provides a complement yet opposite function to server-side authentication by authenticating the user for the merchant rather than the merchant for the user.

Popular browsers such as Microsoft's Internet Explorer and Netscape's Navigator both support the Secure Sockets Layer (SSL) for server-side authentication which assures the user that they are communicating with a real and valid merchant. However, most credit card fraud isn't committed by people pretending to be merchants but rather by people that steal valid credit card numbers from old credit card receipts, carbons, or have an opportunity to make a copy of the credit card imprint (the latter would include gas stations and restaurant employees). Thus, in the real world, knowing that a purchase is being made by the rightful credit card holder

FIG. 103 should be at least as much of a concern as knowing that a user is giving their credit card to a valid merchant, if not more. NetSafe's NEAT! Software addresses this key function. Further, the NEAT! Software facilitates online commercial transaction without the need of costly services such as Cyber-Cash or First Virtual.

Upon completion of the registration transmission, an encrypted client side authentication database is created on the users system. The database contains all the data entered by the user during registration and will be validated by a credit card processor such as First USA or by the users Bank shortly after the user makes their first connection to the Internet. Any differing information received from the credit-card processor or bank (such as a differing address or phone number) can be added to the users encrypted client-side authentication database or alternatively can be used to terminate the users service for failing to fill in correct information.

Creation of Email Address and Web/FTP Space

During registration the NEAT! Software will prompt users to pick their email name(s) and an associated predefined domain from a pull down box. The user will also be prompted to choose a web/ftp space address from a pull down box of predefined web domains. This feature is dynamic and thus can be enabled or disabled prior to registration as well as making additions and deletions to available domain names for load balancing purposes.

Secure Email & FTP Passwords

During completion of the registration process the NetSafe registration server(s) will generate MD5 based secure Email and FTP space passwords. These passwords will automatically be added and configured into the appropriate and pre-defined applications for the user.

Single User Sign-on — Transparent Secure Web Site Access

The NetSafe NEAT! Software architecture with its client side authentication provides one of the best ease of use features on the Internet today and that

FIG. 104 of Single User Sign-on. What is Single User Sign-on? It's the ability for a user to login to the Internet and never have to worry about logging into a secure web site because the user at the other end can be identified without any user intervention. Unlike cookies ( the latest security buzz word) which only validates a machine based on data that's not been validated, the NetSafe NEAT! Software identifies the user (Mom, Dad, Son or Daughter) that has been validated by a financial institution and allows access to secure web sites which contain intellectual property controlled information. Thus access is granted based on a validated user not a system that hasn't been validated.

Internet Application Configuration

The NEAT! Software uses an "Application Wrapper" which reads configuration information from one of the users encrypted databases that were created during installation and registration. This wrapper is run every time the user makes a connection to the internet; thereby assuring proper application operation even after a user tinkers with the application setting. Application tinkering results in about 20% of the ongoing technical support calls. The ability of the NEAT! Software to always reconfigure itself at internet run time is a real cost saver for ISP.

Installation & Registration Summary

The NetSafe NEAT! Software Suite contains most thorough and complete Installation and Registration Internet software available. There is no comparison. The table below shows the advantages of the NEAT! Software Installation & Registration over Microsoft and Netscape.

|  | NetSafe NEAT! Installation | Microsoft's IEAK 3.01 Kit | Netscape's Installation |
|---|---|---|---|
| Simple Client Only Registration Wizard | ☑ | ☐ | ☐ |

FIG. 105

|  | NetSafe NEAT! Installation | Microsoft's IEAK 3.01 Kit | Netscape's Installation |
|---|---|---|---|
| Complete System Diagnosis for Internet Operation including "OS Leveling" | ☑ | ☐ | ☐ |
| Automatic Modem Detection and Selection For both Windows 3.1 & Windows 95 | ☑ | ☐ | ☐ |
| Two Windows 3.1 Dialers for operation with Win-modems and Rockwell Chip-sets | ☑ | ☐ | ☐ |
| Dynamic Configuration of Phone Numbers | ☑ | ☐ | ☐ |
| Dynamic Configuration of DNS and Network Configuration Entries | ☑ | ☐ | ☐ |
| Dynamic Configuration of Email Passwords | ☑ | ☐ | ☐ |
| Dynamic Configuration of FTP Passwords | ☑ | ☐ | ☐ |
| Single System Reboot | ☑ | ☐ | ☐ |
| Fast, Low Cost Registration Process | ☑ | ☐ | ☐ |
| Groups and Associations Service Plans | ☑ | ☐ | ☐ |
| Dynamic Branding for Affinity Marketers | ☑ | ☐ | ☐ |
| Dynamic Internet Application Configuration | ☑ | ☐ | ☐ |

FIG. 106

Transparent Application Configuration and Event Controls

The NetSafe NEAT! Software Suite contains the NEAT! Wrapper Software which automates the configuration and control of TCP/IP and SMTP applications for end-user ease of use, security and custom event controls. For the ISP this wrapper technology significantly reduces technical support costs, improves network utilization through dynamic and transparent reconfiguration, and provides valuable individual user based demographic based information. For the marketer, the NEAT! Wrapper technology can guarantee web site hits and event controls, allow transparent access to secure web sites, and provide valuable individual user based demographic information.

Customizable-Application Control Toolbar

The NEAT! Software ships with two integrated toolbars and can easily be integrated with other third party toolbars such as Prodigy Internet. The toolbar provides the following functionality:

- Ease of Use
- Dynamic Updates
- Auto-launch Functionality
  ⇨ Dynamic Data Exchange (DDE) to Universal Resource Locator (URL)
  ⇨ Automatically start browser to specified URL while online or off-line
  ⇨ Launch a program and continue
  ⇨ Launch a program and wait for program to complete
  ⇨ Go online and the Launch a program
  ⇨ Change Preferences
  ⇨ Change Lock-out Password
  ⇨ Display Account Information
  ⇨ Set or Change Dialing Properties
  ⇨ Execute a NEAT! Script

FIG. 107

⇨ Jump to Another Toolbar TAB
⇨ Update or Change Buttons

Client Interface

The Client Interface consists of a fully customizable application control toolbar capable of starting any application, URL, DDE, or commonly executed scripts such as FTP, AWK, MOT and more. The Client Interface also supports NetSafe's unique client-side authentication which can be used to:

1. Control and track individual user state.
2. Maintain secure Email tracking.
3. Maintain single user sign-on capabilities across a wide range of differing content.
4. Support multiple user "login" on a single PC; for example, a single dial-in account can support multiple users such as mom, dad, son, and daughter with each having their own customized tool-bar geared towards the content that each is to receive.

To summarize, the NetSafe NEAT Client Interface with its client-side authentication and tracking capabilities provide: A higher level of security, the ability to have content directed to each specific user rather than the user trying to find the content for himself, and "single sign-on" for an infinite amount of content from differing content providers. The benefits for the content producer are: Guaranteed reception and control of content (including intellectual property), transparent tracking of user with quality demographic based information, and ease of access control via transparent user name and password controls.

Full Suite of Easy to Use Internet Applications

The NEAT! Software suite includes Microsoft's Internet Explorer family of Browsers, NetSafe's Fami1E-mail™ (multi-user email) program, NetSafe's Homepage Wizard with Automagic™ Upload capabilities, and NetSafe's

FIG. 108 easy to use Toolbar. The NEAT! Software architecture allows anyone of these components to easily interchanges with other components such as Netscape's Navigator Browser. The later however, requires the ISP, Content Provider, or Affinity Marketer to secure their own third party software license agreements. All third party software shipped with the NEAT! Software suite is fully licensed.

Customized Microsoft IE browser

The NEAT! Software suite ships with both Microsoft's Internet Explorer (IE) 2.x and 3.x versions. The 2.x versions ship on the 2 disk floppy set only; whereas the CD-ROM version ships with both the 2.x family and 3.x family of browsers. Each of the browsers can be "Private Branded" for the specific ISPs, Content Provider, or Affinity Marketer.

NetSafe ships the LE 2.x browser versions for low cost distribution, minimal system strain (LE 3.x and Netscape versions 3.x puts a lot of excess strain on older Windows 3.1x systems which leads to unnecessary technical support calls when using LE 2.x) and instant end-user gratification (less than 10 minutes to install, register, get online and see pictures).

NetSafe's Integrated FamilE-mail™ -- Supporting Multiple Users

NetSafe NEAT! Client software includes NetSafe's FamilE-mail program with multiple user / email box support. In addition to the multiple user / email box support the FamilE-mail program also provides unlimited attachments and attachment sizes, simple "create a new email box" feature, as well as many of the standard features found in popular email programs such as Eudora.

NetSafe's Homepage Wizard with Automagic™ Upload

The NetSafe Homepage Wizard is the simplest personal homepage development tool available in the market today. It includes state of the art features such as a simple pick-a-look wizard, Automagic upload, and simple review, change and update capabilities.

FIG. 109

The Automagic upload feature of the homepage wizard automatically logs the end-user into their . private web/ftp space and transparently uploads all the associated HTLM and graphics files generated by the homepage wizard for the user.

Conclusion

The NetSafe NEAT! Software suite is the most complete and comprehensive Internet Software available on the market today. The benefits to ISP's will results in lowering technical support costs by as much as 60% and providing other methods to attract advertisers to your customer base. For Content Providers and Affinity Marketers the NEAT! Software Suite gives you the ability to track, monitor, and control your customers as only thought possible using a proprietary mainframe based network such as AOL, but with the speed and openness of the Internet.

PRODUCTS

NetSafe Enhanced Access Technology neat!

NEAT!™ SOFTWARE

THE NEAT! (NetSafe ENHANCED ACCESS TECHNOLOGY) SOFTWARE IS THE ONLY SUITE OF INTEGRATED "PERSONAL INTERNET" TOOLS AND SERVICES THAT ENABLE COMPANIES AND ORGANIZATIONS TO CUSTOMIZE A USER'S ENTIRE ON-LINE EXPERIENCE IN AN OPEN, SECURE ENVIRONMENT. THE NEAT! PERSONAL NAVIGATOR AND ITS INTERNET CLIENTS ARE FULLY CUSTOMIZABLE, SO THE USER VIEWS CONTENT WHICH IS DEMOGRAPHICALLY TAILORED. NEAT! IS FULLY INTEGRATED WITH BUILT-IN MICROSOFT INTERNET EXPLORER™, NetSafe'S HOMEPAGE WIZARD, E-MAIL, FTP, CHAT, AND COMMERCIAL TRANSACTION CLIENTS.

PRODUCT FEATURES:

- PERSONAL NAVIGATION CENTER (PNC) TOOL BAR, SEEN BELOW
- MICROSOFT'S INTERNET EXPLORER™ BROWSER
- ENHANCED MULTI-USER E-MAIL PACKAGE
- ENHANCED HOMEPAGE WIZARD
- INTEGRATED FTP UTILITY WITH AUTOMAGIC™ FILE TRANSFER
- ABILITY TO CUSTOMIZE AND CONFIGURE PNC FOR INDIVIDUALS, COMPANIES, AND ASSOCIATIONS
- SECURITY MECHANISMS INCLUDING PASSWORD ACCESS CONTROL AND DATA ENCRYPTION

BENEFITS:

- PNC TOOL BAR INTEGRATES AND PROVIDES QUICK ACCESS TO INTERNET UTILITIES
- FREE BROWSER SAVES MONEY
- E-MAIL PACKAGE ALLOWS FLEXIBILITY FOR MULTIPLE E-MAIL BOXES (FAMILIE-MAIL™)
- HOMEPAGE WIZARD ALLOWS YOU TO CREATE YOUR HOMEPAGE WITH NO PROGRAMMING
- CUSTOMIZATION OPTIONS PROVIDE THE CAPACITY TO CONFIGURE PNC FOR SPECIFIC NEEDS
- PASSWORD ACCESS AND DATA ENCRYPTION ENSURES ACCOUNT INTEGRITY

THE NEAT! PERSONAL NAVIGATION CENTER:

NEAT NAVIGATOR © NetSafe, INC. DALLAS, TX

HANGUP | WEB BROWSER | START PAGE | SEARCH ENGINE | EMAIL | NEWSGROUPS | ? | ONLINE 00:01:45

\INTERNET TOOLS\HOMEPAGE TOOLS\MEMBER SERVICES\ISR TOOLS\CONFIGURATION\HELP\

CLICK TO OPEN BROWSER

CLICK TO GO TO CUSTOM START PAGE

CLICK TO USE SEARCH ENGINES

CLICK TO OPEN NetSafe MAIL APPLICATION

CLICK TO GO TO NEWSGROUPS

PRICE: INCLUDED WITH NetSafe INTERNET PLANS
NetSafe, INC. 2077 NORTH COLLINS BLVD. SUITE 202-R RICHARDSON, TX 75080-2636 WWW.NETSAFE.COM 972.690.7233

FIG. 112

PERSONAL INTERNET PLAN

The NetSafe Personal Internet Plan provides you personalized features integrated with direct access to the Internet.

Plan Features:

- Unlimited dial-up access in hundreds cities throughout the U.S.
- NetSafe NEAT!™ Software with The Personal Navigation Center
- Unlimited E-mail quantity, size and attachments
- One MB of combined FTP and Web space with Automagic™ file transfer
- Personal Homepage and Homepage Wizard
- Custom Startpage

Benefits:

- Unlimited Access with no hourly fees saves money
- The Personal Navigation Center provides easy Internet navigation
- E-mail features allow any size or number of attachments
- Homepage Wizard allows you to create your homepage with no programming
- Our state-of-the-art network gives you the fastest Internet connection possible

Options Available for Purchase with The Personal Internet Plan:

- Additional E-mail Boxes
- Additional Web Space
- Additional E-Mail Addresses
- E-mail Forwarding
- Domain Name Services
- Instant Web Domain Alias
- Homepage Counter
- Homepage Statistics Price: $24.95/month plus a one-time initial setup fee of $25.00

FIG. 113

FAMILY AND FRIENDS PLAN

The Family and Friends Plan offers high quality Internet access *and* the opportunity to earn free Internet access service. This service plan provides the features to customize your Internet experience and includes the ability to earn recurring monthly credits toward the Internet service fee. Help enroll six people and your monthly Internet access is free!*

Plan Features:

- Unlimited dial-up access in hundreds of cities throughout the U.S.
- NetSafe NEAT!™ Software with The Personal Navigation Center
- Up to four separate E-mail Addresses
- Unlimited E-mail quantity, size and attachments
- One MB of combined FTP and Web space with Automagic™ file transfer
- Personal Homepage and Homepage Wizard
- Custom Startpage
- Ability to earn credits toward Internet service fees

Benefits:

- Unlimited Access with no hourly fees saves money
- The Personal Navigation Center provides easy Internet navigation
- E-mail features allow any size or number of attachments
- Homepage Wizard allows you to create your homepage with no programming
- Our state-of-the-art network gives you the fastest Internet connection possible

FIG. 114

Options Available for Purchase with The Family and Friends Plan:

- Additional E-mail Boxes
- Additional Web Space
- Additional E-Mail Addresses
- E-mail Forwarding
- Domain Name Services
- Instant Web Domain Alias
- Homepage Counter
- Homepage Statistics Price: $29.95/month plus a one-time initial setup fee of $30.00

*A maximum of 6 recurring credits per month are earned for referred customers who remain registered NetSafe subscribers.

FIG. 115

BUSINESS CREDIT PLAN

NetSafe's Business Credit Plan provides the features to customize your Internet experience *and* includes the ability to reduce your subscription cost based on the number of customers who register for NetSafe service through your business.

Plan Features:

- Unlimited dial-up access in hundreds of cities throughout the U.S.
- NetSafe NEAT!™ Software with The Personal Navigation Center
- Unlimited E-mail quantity, size and attachments
- Five MB of combined FTP and Web space with Automagic™ file transfer
- Personal Homepage and Homepage Wizard
- Custom Startpage
- Online Presentation and Support Materials
- Online Sales Reports and Summaries
- Ability to earn recurring monthly credits toward Internet service fees

Benefits:

- Unlimited Access with no hourly fees saves money
- The Personal Navigation Center provides easy Internet navigation
- E-mail features allow any size or number of attachments
- Homepage Wizard allows you to create your homepage with no programming
- Our state-of-the-art network gives you the fastest Internet connection possible

FIG. 116

Options Available for Purchase with The Business Credit Plan:

- Additional E-mail Boxes
- Additional Web Space
- Additional E-Mail Addresses
- E-mail Forwarding
- Domain Name Services
- Instant Web Domain Alias
- Homepage Counter
- Homepage Statistics Price: $29.95/month plus a one-time initial setup fee of $30.00

*A maximum of 6 recurring credits per month are earned for referred customers who remain registered NetSafe subscribers.

FIG. 117

NETREPRENEUR • PLAN

The Netrepreneur Plan provides an Internet business opportunity to generate recurring monthly income through a tiered commission plan. This plan allows you to promote NetSafe Services as an Independent Sales Representative, or ISR. Each person or business you directly sign up for NetSafe's Service will generate a 10% recurring monthly commission. NetSafe also pays commissions on the sales of service through the next five levels down. Each person or business that indirectly signs up for NetSafe's Service, as an indirect referral, generates a 1.6% recurring monthly commission. The commissions are paid on new & existing customers whose accounts are current. Each ISR may have an unlimited number of direct customers, but is only paid on indirect customers through another five levels (for a total of six levels of tiered commission). The Netrepreneur Plan includes NetSafe's Personal Internet Plan.*

Plan Features:

- Unlimited dial-up access in hundreds of cities throughout the U.S.
- NetSafe NEAT!™ Software with The Personal Navigation Center
- Unlimited E-mail quantity, size and attachments
- One MB of combined FTP and Web space with Automagic™ file transfer
- Personal Homepage and Homepage Wizard
- Custom Startpage
- Online Presentation and Support Materials
- Online Sales Reports and Summaries
- Ability to earn recurring monthly tiered commissions

Benefits:

- Unlimited Access with no hourly fees saves money
- The Personal Navigation Center provides easy Internet navigation

FIG. 118

- E-mail features allow any size or number of attachments
- Homepage Wizard allows you to create your homepage with no programming
- Our state-of-the-art network gives you the fastest Internet connection possible
- Online materials means less paperwork and no order fulfillment time

Options Available for Purchase with The Netrepreneur Plan:

- Additional E-mail Boxes
- Additional Web Space
- Additional E-Mail Addresses
- E-mail Forwarding
- Domain Name Services
- Instant Web Domain Alias
- Homepage Counter
- Homepage Statistics Price: $24.95/month plus a one-time initial setup fee of $45.00 and a one-time plan election fee of $5.00.

*It is not necessary to subscribe to NetSafe's Service to become an Independent Sales Representative. To become an ISR without NetSafe service, fill out an Application and Agreement Form. Indicate on the form that you would like to become an ISR without service. Mail or fax the form to NetSafe. You will receive notification of your referral information within 10 working days of receipt of your form.

FIG. 119

ORGANIZATION PLAN

NetSafe offers customized plans for associations, organizations and businesses based upon the NEAT! Branded Business and Affinity Marketing Software product. Organizations can choose from a variety of NEAT! components to tailor an Internet or Intranet Plan specifically for their user base. Organization Plans are incorporated with the underlying NetSafe Internet service to facilitate the generation of non-dues revenues and Intranet type services over the Internet.

Plan Features:

- NetSafe's NEAT! Branded Business and Affinity Marketing Software
- Choice of components
  - Standard or Enhanced E-mail
  - Web and FTP Space
  - Homepage Wizard
  - Enhanced Personal Navigation Center Features
- Organization Defined Service Plans for User Base
  - Standard Personal Internet Plan
  - Family and Friends Plan
  - Custom Designed Plans
- Unlimited dial-up access with hundreds of points-of-presence in U.S cities

Benefits:

- Intranet Plan links employees for chat, file sharing, calendars, announcements
- Builds organizational community awareness
- Customized Navigation Center enhances users on-line experience
- Users' plan options defined by community needs

FIG. 120

- Access to a state-of-the-art network for the fastest Internet connection possible
- Non-dues revenue

Other Options Available for Purchase with The Organization Plan:

- Additional E-mail Boxes
- Additional Web Space
- Additional E-Mail Addresses
- E-mail Forwarding
- Domain Name Services
- Instant Web Domain Alias
- Homepage Counter
- Homepage Statistics Price: Subject to organization's plans and options selected

FIG. 121

NetSafe

- The Only Company Providing An Integrated Internet Solution That Enables Businesses & Organizations to Create and Service On-line Communities

- The Emerging Leader of the Next Internet Business Paradigm

NetSafe, Inc.

NEAT! - Integration

- Automagically™ Configures TCP/IP Applications
  Email POP Entries; DNS Entries; PAP-Id's and PAP-Passwords; Winsock.DLL
  Email Password(s); Dial-up Adapter Properties; Network Entries; and more.

- Integrated Applications
  Microsoft Internet Explorer; NetSafe's Personal Email, Homepage Wizard,
  Personal FTP Client, Personal Navigation Center (PNC)

- Dialers
  Windows 3.1x - Two dialers to support Win Modem and Old Rockwell Chips
  Windows 95 - Standard Microsoft Windows 95 dialer

*NetSafe, Inc.*

FIG. 137

NEAT! - Security

- Client-Side Authentication
- Secure-Key "Like" Password Generation & Utilization
- Encrypted Email Storage and Database Information
- Server-Side Authentication (Secure Sockets Layer)

NetSafe, Inc.

NEAT! - Products

- Personal Email
  With NetSafe's Exclusive FamilE-mail™ Support

- Personal FTP
  With NetSafe's Revolutionary Automagic™ Connection Feature

- Personal Navigation Center
  With NetSafe's Revolutionary Dynamagic™ Button Configuration

- Personal Homepage Wizard
  With NetSafe's Exclusive Personal Casting Attributes

- Customized Microsoft Internet Explorer

*NetSafe, Inc.*

FIG. 140

DYNAMICALLY MODIFYING A TOOLBAR

This application is a continuation of U.S. patent application Ser. No. 13/923,115, filed Jun. 20, 2013, and entitled "DYNAMICALLY MODIFYING A TOOLBAR," which is a continuation of U.S. patent application Ser. No. 13/573, 311, filed Sep. 10, 2012, and entitled "METHOD OF MODIFYING A TOOLBAR," which is a continuation of U.S. patent application Ser. No. 10/417,853, filed Apr. 16, 2003, and entitled "METHOD OF MODIFYING A TOOLBAR," (now U.S. Pat. No. 8,275,863), which is a divisional of U.S. patent application Ser. No. 09/100,619, filed Jun. 19, 1998, and entitled "METHOD AND APPARATUS FOR PROVIDING FUNGIBLE INTERCOURSE OVER A NETWORK," (now U.S. Pat. No. 6,571,290), which claims the benefit of the filing date of U.S. Provisional Patent Application No. 60/050,186, filed Jun. 19, 1997, and entitled "MULTI-USER INTERNET DISPATCH SYSTEM," the disclosures of all of which are hereby incorporated by reference for all purposes.

Submitted as FIGS. 22-47 herewith is Appendix A, created on Jun. 20, 2001, a computer listing that constitutes a part of the specification of this invention.

A portion of the drawings contain material that is subject to copyright protection. The copyright owner has no objection to the facsimile reproduction by anyone of the patent disclosure, as it appears in the Patent and Trademark Office patent files or records, but otherwise reserves all copyrights whatsoever.

FIELD OF THE INVENTION

The present invention relates in general to digital data networks and, more particularly, to network access and to minimizing unauthorized interception of data and denial of network services.

BACKGROUND OF THE INVENTION

There are many networks of computers throughout the world and there is a need for the computers to communicate with each other across the network. To provide order and security, many networks require a computer wishing access to be authenticated before that computer is granted access. After establishing that the computer should be allowed to communicate over the network, it may be given an identification number so that the computer may be contacted by other computers on the network in accordance with network protocol. In general this process applies to a system designated as the Internet.

The Internet comprises a network of computers that interconnect many of the world's businesses, institutions, and individuals. The Internet, which means interconnected network of networks, links tens of thousands of smaller computer networks.

The Internet can be accessed directly through telephone lines with a device called a modem or indirectly through a local area network (LAN). Most users do not have the expertise to connect their computers and associated equipment to the Internet and/or finances to have a continuous connection to the Internet. Thus most users access the Internet through an Internet Service Provider (ISP). The ISP can distribute the costs of necessary equipment and telephone lines to many users on some time multiplexed basis. While an ISP may have access to only one server and a few modems for receiving incoming calls from users, some ISPs have access to hundreds and even thousands of modems and many servers to interface between users and one or more high speed telephone lines of at least DS 1 standard communication capacity.

Usually the ISPs that charge the lowest prices to the user are the busiest and users often find that access to a low cost ISP is blocked by a "busy signal". On the other hand, a user of the high priced ISPs seldom encounters busy signals. The high priced ISPs have fewer customers, can afford to add modems as needed and are not confronted with suddenly increased demands on equipment capacity.

Some ISPs use less expensive (i.e. slower rate, poorer quality or lower capacity) telephone lines or equipment to provide low cost and as a result the data transmission rate of communications between the user and the Internet may be substantially less than the capability of the users modem. Many sets of information on the Internet, such as Web pages, include pictures, pointers to other pages, music etc, that require large amounts of data to be transmitted for ultimate display. When a user is attempting to access material requiring the transmission of large volumes of data, a low data transmission rate equates to a long time spent waiting to obtain that data.

When a user first installs software in a computer to be used in connecting the computer to a given ISP, many items of information need to be provided to the software before the user can communicate with the ISP and be connected to the Internet. While some of the information such as the specific communication port to be used (i.e. com1 or com2) and the modem type used in the computer would be universal and would be identical regardless of the ISP used, other information is ISP specific. ISP specific type information would include the ISP dial-in number, a Password Authentication Protocol (PAP) identification number and a PAP password for that ISP.

Different ISPs provide different services to users. Some ISPs (no or low service) may offer only a connection to the Internet without technical help to a user connected to that ISP and further without any additional features. Other ISPs (full service) may offer many features such as encyclopedia type information, interactive games, access to otherwise costly databases, etc.

A user in a commercial environment may operate a computer that is connected to a LAN and also is connected to a modem. There are often business considerations that require some communications with the Internet be accomplished through the LAN and other, especially personal, communications be accomplished through a modem. If a single software entity such as a browser is used for both types of Internet connection, several items of information need to be altered with the accompanying chance for error and frustration of the user.

When a computer is subjected to stress such as by a large and sudden variation in supply voltage (i.e. an electrical spike), there may be corruption of data in the software and/or data banks of the computer. When such corruption concerns the data needed to communicate with the Internet, a considerable amount of time is often required to ascertain the cause of the failure to attain communication and further time is required to correct the problem.

Some Internet users are highly mobile and may need to access the Internet from various locations, some of which locations do not have a local phone number for communicating with the normally used ISP. Such a user either must pay the cost of a long distance call or access a different ISP after modifying the appropriate data the operating system's networking, dial-up-networking, or communications properties used to accomplish such access. Such modification always invites a chance for erroneous data entry in the process and the accompanying time required to rectify the situation.

Another problem related to network use is related to electronic mail which terminology is popularly shortened to email. Email is used to quickly communicate with other users of connected network terminals. The process is normally accomplished by sending a set of data including a header portion, a message body and sometimes one or more file attachments. Typically, the header contains the name of the recipient in a TO line, the sender in a FROM line and a subject in a SUBJECT line. Even if the message body and the attachments are scrambled or otherwise encrypted a persistent entity monitoring the email being sent to and from a given terminal may glean considerable information from the subject matter listed and from the number of messages sent between same parties. This information is typically sent in clear text (unencoded) to facilitate the delivery of email to the proper temporary storage facility, normally a post office box like repository of the service provider of the recipient, until such time as the recipient retrieves the email from the service provider. The recipient also uses the header information in determining priority of messages to be read.

A further problem is third party mail relay. This is a process whereby junk emailers use a service system other than their own to send massive amounts of mail without paying for the service. The massive amount of mail can so overload the system that an invaded system can crash, overload or otherwise be damaged. This overload is termed in the art as a denial of service attack. The overall process of sending massive amount of junk email is termed "spamming". The third party mail relay process is also used to bypass other systems filters which are set up to block mail from the junk emailers system.

In view of the above, there exists a need to quickly and easily access the Internet from various locations, being able to access ISPs providing different types of services, using various adaptors (ie modem or LAN card) and being able to choose whether preference should be given to items such as cost and quality of service, without the user having to be concerned about correctly modifying associated data and parameters such as phone numbers, IDs, passwords etc used by the Internet software.

There is a further need to be able to send email to others in a manner which minimizes the possibility that unauthorized entities may be able to retrieve significant data from email header information.

Also there is a need to prevent junk emailers or other unauthorized parties from using the third party mail relay process in connection with a network service system.

SUMMARY OF THE INVENTION

The present invention comprises a method of and apparatus for simplifying the process of access to a network for a roaming computer user, divides the responsibility of servicing a given user wanting to access the network between multiple parties and minimizes the possibility of improper dissemination of email header data as well as improper use of network resources (including server systems) by non-clients.

BRIEF DESCRIPTION OF THE DRAWINGS

For a more complete understanding of the present invention, and the advantages thereof, reference is now made to the following descriptions taken in conjunction with the accompanying drawings, in which:

FIG. 10 comprises a simple diagrammatic showing of how the present invention may be used in combination with browser plug in software to minimize unauthorized viewing of email messages;

FIG. 11 provides more detail for illustrating the process of FIG. 10;

FIGS. 22-47 represent the contents of Appendix A;

FIGS. 48-74 represent the contents of Appendix B; and

FIGS. 75-142 represent the contents of Appendix C.

DESCRIPTION OF THE INVENTION

Figure 1:
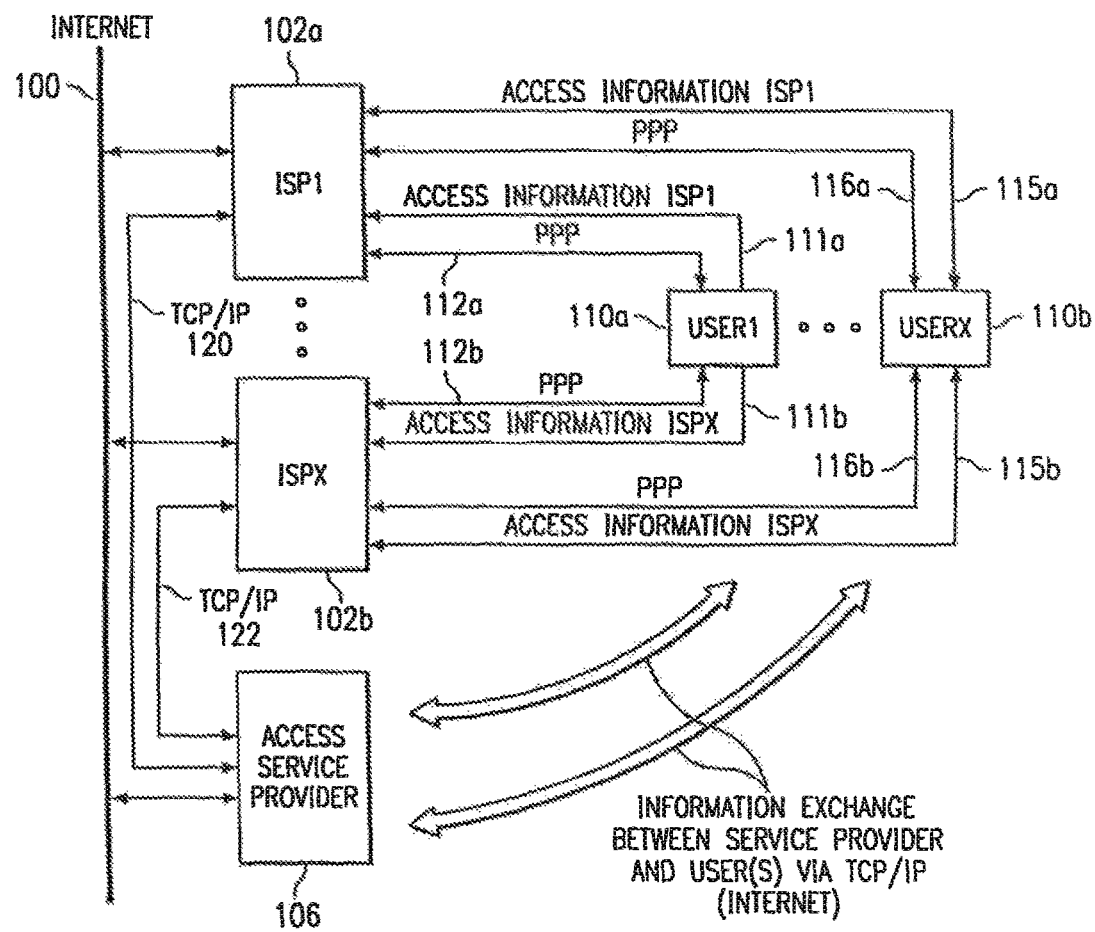
FIG. 1 illustrates signal communication paths between clients, ISPs and network access providers.

The entire contents of Provisional Patent Application Ser. No. 60/050,186, entitled: "Multi-User Internet Dispatch System," filed on Jun. 19, 1997, including appendices, are incorporated herein by reference for all purposes.

It should be noted that the present invention applies to any network or interconnected set of networks. However, since the Internet is a well known example of an interconnected set of networks, Internet terminology and interaction examples will be used in the explanation of this invention.

The present invention solves all or some of at least ten problems:

1. Eliminates the need for a computer user to configure and reconfigure computer networking software for network access through a multiplicity of ISPs and Network Access Providers (NAP) (companies which own the telephone networks and modem banks such as AT&T, GTE, UUNet, PSI, etc.).
2. Allows a Network Re-seller such as an Internet Service Provider to offer network access via a multiplicity of Network Access Providers based on cost, location, availability, reliability, etc.
3. Allows a Network Re-seller to balance network loads through a multiplicity of Network Access Providers and across a multiplicity of network computer servers.
4. Eliminates the need for a computer user to know or configure network access telephone numbers or network access protocol identification numbers.
5. Eliminates the need for a computer user or mobile computer user to reconfigure remote network access software to connect to a network from a remote location.
6. Allows multiple users to use a single computer each with their own unique networking attributes and unique network identity.
7. Allows separate and distinct identifications (ID) and passwords for different services and network functions such as PAP IDs and PAP password, Email ID and password, etc.
8. Provides a user with true network anonymity by assigning independent non-user specific identifications and passwords for such things as PAP authentication, FTP and Email logins, News Server logins, and network server logins.
9. Provides Email anonymity by transmitting and receiving all email through a third party (broker) wherein, if appropriate, aliases may be used for all un-encrypted data and these aliases may be changed periodically by the system in a manner transparent to the user.
10. Eliminates third party email relay (SPAMMING) by transparently authenticating each user-system prior to giving access to a sendmail server.

This invention relates to network connections, such as the Internet, and allows systems to be independently, transparently and dynamically connected or reconnected to a network based upon any number of attributes such as user or group identity, cost, availability, reliability, etc. Further this invention supports many types of physical connections such as telephone dial-up connections, ISDN connections, Ethernet, and other local area networking connections. It should be noted that while Internet terms such as ISP are used throughout this description, the invention is operable with any network or portion of any network and thus terms such as NSP (Network Service Provider) have been coined for use in the claims to identify similar or analogous systems and devices.

A traditional network connection requires someone skilled in the art of computer networking to setup and configure both network related hardware (such as modems or Local Area Network cards (Ethernet, Token-ring or other cards) and network software. The invention eliminates the need for such network configuration skills.

The invention configures and reconfigures network related software to support multiple users with multiple network protocols and/or multiple networks using the same protocol without the need of any computer network configuration skills and further allows the configuration to be changed or modified dynamically without any user intervention.

The principles of the present invention and their advantages are best understood by referring to the illustrated embodiment depicted in FIGS. 1-21 of the drawings, in which like numbers designate like parts.

The invention includes software which is sometimes referred to as middle-ware because it resides between an electronic device operating system and the end-users interface. The inventive software has all the attributes of middle-ware as it configures and manages network communication equipment such as modems and Ethernet cards, network protocols such as the Transmission Control Protocol/Internet Protocol (TCP/IP), and the associated interfaces between the communication equipment, network protocol and the computer's operating system for each individual user or groups of users.

Now referring to FIG. 1, there is illustrated a plurality of Internet service providers (ISP1 through ISPx) 102*a*, 102*b* connected to a network 100 (sometimes referred to as the Internet). As will be appreciated, an Internet service provider (ISP) provides access for one or more users 110*a*, 110*b* to the Internet 100 through a physical interface. The term "internet service provider" includes network access providers (NAPs) and Network Service Providers (NSPs) as well. In general terms, a user 110 connects to the ISP 102 via a communications link and the ISP 102 provides connection to the Internet 100. As will be appreciated by many users of the Internet, the ISP typically has many modems accessible from a limited number of telephone numbers. Each of these modems has an assigned internet protocol (IP) address and normally an assigned DNS name. Such assigned names and (IP) addresses will look something like "1cust239.tnt.orl1.da.uu.net" and [208.250.77.239] respectively. When a user 110 contacts the ISP 102, the user 110 is connected to the next available modem and the IP address of that modem becomes the IP address of that user 110 for the remainder of that connection session. The user 110 may include a single computer, group of computers, local area network, or a larger network connected to the ISP 102 via a communications link. However, in most applications, the user 110 will include a single user requesting access time to the Internet 100.

The present invention provides a means for transmitting ISP-specific access information to a user 110 via a communications link (preferably, the Internet 100) that allows the user 110 to gain access to the Internet 100 through a selected one of the plurality of ISPs 102.

To begin the process of the present invention, the user 110 installs (downloads) a client dispatch application program 200 (see FIG. 2) that furnishes the user 110 with one or more ISP access telephone numbers, one or more valid test and Registration Password Authentication Protocol (PAP) identification (ID) numbers, and a valid PAP password associated with a predetermined one of the ISPs 102. The client dispatch application 200 will be described in more detail further below. The access information allows the user 110 to authenticate the user's right to connect to the Internet via the predetermined ISP 102. The access information mentioned comprises the previously mentioned access telephone number, the PAP ID, the PAP password and additional ISP-specific information required by the user 110 to gain access to the Internet 100 via the predetermined ISP 102 (collectively, ISP-specific configuration information) is initially provided by the client dispatch application 200. In addition, the client dispatch application 200 provides basic configuration and initialization information (installation and configuration) to the user's computer to configure and manage the network communication equipment, network protocols and the associated interfaces needed to develop the capability to access the Internet 100, regardless of the particular ISP.

After the client dispatch application 200 is installed and the initial ISP-specific information is known, the client dispatch application 200 causes the user 110 to automatically transmit access information to the predetermined ISP 102 (ISP1 102a or ISPX 102b). The line of communication through which the access information is transmitted to the predetermined ISP 102 by the user 110 (USER1 110a or USERX 110b) is identified by the reference numerals 111a, 111b, 115a, 115b, depending on the particular user (USER1 110a or USERX 110b) and the particular ISP (ISP1 102a or ISPX 102b). Upon receipt of the access information, the ISP "authenticates" the user 110. The ISP 102 checks to see whether the PAP ID and PAP password received from the user 110 is valid. It will be understood that the authentication process performed by the ISP 102 utilizes one or more appropriate methods (such as Remote Authentication Dial-In User Service (RADIUS)) which are normally associated with an authentication server running a database at the ISP, Network Service Provider (NSP) or the NAP. If the PAP ID and/or PAP password are not valid, the ISP 102 will disconnect the user 110 or notify the user 110 that the PAP ID and/or PAP password is invalid. If valid, the user 110 and the ISP 102 create a point-to-point protocol (PPP) (i.e., communications connection) which is identified in FIG. 1 by reference numerals 112a, 112b, 116a, 116b, depending on the particular user (USER1 110a or USERX 110b) and the particular ISP (ISP1 102a or ISPX 102b). The PPP allows the ISP 102 to transmit/receive information to/from the user 110. As a result, the user 110 is given access to the Internet 100 and the ISP 102 generates an internet protocol (IP) address to uniquely identify the user 110 on the Internet 100. The particular IP address assigned to the user 110 depends on the IP addresses that are available and assigned to the particular ISP 102 to which the user 110 is connected. An IP address is presently 32 bits and is normally represented with four decimal numbers each ranging from 0 to 255 (e.g. 128.54.28.200) where each decimal number represents one byte of the 32 bits.

In accordance with the present invention, an Internet service provider access service or ASP (Access Service Provider) 106 is connected to the Internet 100. The external location, or physical address of the access service 106 is defined by a predetermined and unique address (i.e., IP address). After the user 110 gains access to the Internet 100 via one of the ISPs 102, the client dispatch application 200 resident in the user's computer transmits a data message to the access service 106 through the Internet 100 using the predetermined address of the access service 106. This data message is sent via a path identified as TCP/IP 120 or TCP/IP 122, depending on the particular ISP 102 to which the user 110 is connected for access to the Internet 100. The communications link protocol used for Internet 100 communications is defined as Transmission Control Protocol/Internet Protocol (TCP/IP) and is well known in the art. As will be appreciated, other network communications protocols and standards may be used during the present or in the future by the present system invention due to the flexibility provided in the use of multiple databases to store various types of data.

The data message transmitted from the user 110 and received by the access service 106 contains information about the user 110, including the user's identification and address, current PAP ID, time stamp information, and version information of the client dispatch application 200 operating on the user's computer, etc. In response to the user information received, the access service 106 transmits an access information data message that includes access information for a particular ISP 102. The access information is specific to a dial-in telephone number of a particular ISP 102 and, upon receipt by the user 110, allows the user 110 to gain access to the Internet 100 via that particular ISP 102. The ISP-specific access information includes an ISP phone number (for dial-in to the ISP), a PAP ID for the ISP 102, and a PAP password for the ISP 102, and may also include default routing information (i.e., gateway address information), default directory information (including domain name server information), sub-protocols for the PPP for the ISP 102, and configuration information for the hardware (i.e. modem) of the ISP 102 (to configure the user's modem), such as data compression information and speed. The ISP-specific information may also include service option defaults such as Email IDs, POP protocols and browser information. The PAP ID may or may not be sent depending on the current PAP ID information transmitted from the user 110 to the access service in the data message (e.g., if the current PAP ID and the new PAP ID are the same, a new PAP ID does not need to be sent).

After receiving the ISP-specific access information, the client dispatch application 200 may disconnect the user 110 from the current ISP 102 and automatically dial and reconnect the user 110 to the desired ISP 102 associated with the ISP-specific access information. As will be appreciated, the desired ISP 102 may be another ISP or may be the same ISP to which the user 110 was previously connected, depending on the attributes of the particular ISP 102 desired to be used for access to the Internet 100. If the ISP phone number (for dial-in to the ISP) and a PAP ID received with the new access information, refer to the same ISP 102, the client dispatch application 200 will not disconnect the user 110 and the user's session will continue uninterrupted.

The access information data message includes the information necessary (PAP ID, PAP password, and other information if needed) to access a desired ISP 102 and, may include information for a plurality of desired ISPs 102, or multiple PAP IDs and PAP passwords for a desired single ISP 102. It will be understood that more than one access information data message packet may be utilized and transmitted, each packet containing a portion of the information packet or each may contain access information for a specific ISP 102.

The access service 106 offers Internet 100 access to the user 110 via a plurality of ISPs 102 based on cost, location, availability, reliability, etc. Based on the geographic location of the user 110, the access service 106 identifies, to the user 110, one or more ISPs 102 that provide local access availability (via local telephone numbers or toll free numbers) and provide the user 110 with information needed to access one of the identified ISPs 102 (using the ISP-specific access information). For desired low cost operation, the access service 106 identifies the ISP 102 that provides the lowest cost access service through which the user 110 may access the Internet 100 from the identified ISP 102 at the user's location. For the reliability operation, the access service 106 identifies one or more ISPs 102 that provide the highest reliability of connecting through which the user 110 may access the Internet 100 from the identified ISPs 102 at the user's location. For the availability operation, the access service 106 periodically receives availability information from each of the plurality of ISPs 102. In response to this information, the access service 106 identifies one or more ISPs 102 that provide the highest availability through which the user 110 may access the Internet 100 from the identified ISPs 102.

As will be appreciated, the location operation, reliability operation, and availability operation may each provide to the user 110 the identity of multiple ISPs 102 or multiple dial-in numbers for a particular ISP 102 whereby the user 110 will attempt connection in order of priority. For example, the user 110 may attempt access to a first ISP 102 contained in a list of multiple ISPs 102 that have been identified based on availability or reliability. If a connection is not successful with the first ISP 102, the user 110 will next try a second ISP 102 in the list, and so on, until a connection is made. In another mode of operation example, the user 110 may attempt access to a first ISP 102 utilizing a first dial-in number contained in a list of multiple dial-in numbers for the first ISP 102 that have been identified based on availability or reliability. If a connection is not successful with the first dial-in number, the user 110 will next try a second dial-in number in the list, and so on, until a connection is made. Further a combination of multiple ISPs 102 and multiple dial-in numbers may be used.

Figure 2:
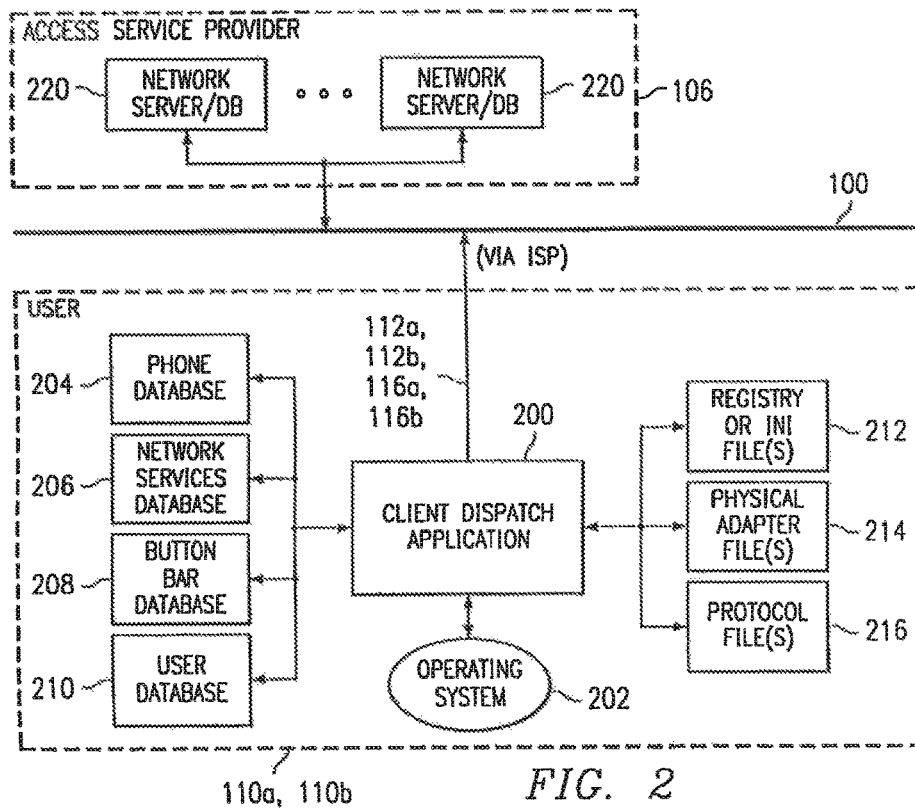
FIG. 2 illustrates in more detail the software interaction between a client and an access service provider.

Now referring to FIG. 2, there is illustrated a block diagram of the access service 106 connected to the Internet 100 and a block diagram of the user 110 connected to the Internet 100 via the ISP 102. The user 110 may be a computer system that includes the client dispatch application 200 and the computer's operating system 202, as well as a registry or initialization file(s) 212, a physical adaptor file(s) 214, and a protocol file(s) 216. The files 212, 214, 216 are operating system files (system configuration files) that provide the user 110 with system configuration information for supplying the basic capabilities needed to successfully connect the user 110 to a network, such as the Internet 100. The client dispatch application 200 correctly configures and sets the system configuration files 212, 214, 216 with the necessary system configuration information, including network protocols, adapter information, IP addresses, domain name system (DNS) server addresses, gateway addresses, other operating system binding functions, dynamic host control protocol options, and any other system options. As will be appreciated, the system configuration information necessary for the user 110 to access the Internet 100 is well known in the art.

The user 110 also includes several databases for storing information, including a phone database 204, a network services database 206, a button bar database 208, and a user database 210. As will be appreciated, the databases 204, 206, 208, 210 may be combined into a single database, may be separate, and/or may be relational. Generally, the client dispatch application 200 includes the databases, or generates the databases and stores pre-loaded information into the databases, inserting data or at least a portion of the data into the database upon installation of the client dispatch application 200 on the user 110 computer.

The phone database 204 includes one or more dial-up telephone numbers for the access location(s) of each of the ISPs 102. Each dial-up number entry includes associated information including on-off field data, state (or a toll free number), city, dial-up telephone number, type of modems supported (analog or digital), whether the number is available for registration, identity of the ISP 102 that owns the dial-in number (ID for provider), sequence number (order for putting number in a specific area). Some of the foregoing data is access information. An example of some of the contents of the phone database 204 and its data entries is set forth in Appendix A, which is illustrated in FIGS. 22-47.

The network services database 206 includes access information for each dial-in number contained within the phone database 204. Each of the stored dial-in numbers is associated with an ISP 102. The access information for each dial-in number (for a particular ISP) includes one or more PAP IDs, one or more PAP passwords, default routing information (i.e., gateway address information), default directory information (including domain name server information), sub-protocols for the PPP, and configuration information for the hardware (i.e. modem of the ISP) to configure the user's modem, such as data compression information and speed. The network services database 206 may also include service option defaults such as Email IDs and the POP protocols and browser information associated with the dial-in number. The network services database 206 also includes the basic configuration and initialization information necessary to configure and manage the network communications equipment, network protocols and associated interfaces for the user 110 for basic communications between the user 110 and the Internet 100. In addition, the network services database 206 includes information relating to the type of service (type of account) requested by the user 110, such as the "lowest cost service", the "highest reliability service", the "most reliable service", or combinations thereof, plan pricing and descriptions, and includes information identifying one or more primary processes to be performed by the client dispatch application 200. As will be appreciated, some of the information in the network services database 206 and the phone database 204 may overlap. An example of the network services database 206 and its data entries is set forth in Appendix A.

The button bar database 208 includes information related to button bar creation and modification. All functions may be initiated through the human interface—a Toolbar (also described in the art as a button bar and basic examples of which may be found in many present day computer applications). Software responsive to the button bar database 208, for displaying the Toolbar in accordance with data in the button bar database 208, may be provided as part of a network browser. The Toolbar of the present invention has some unique properties as it can be dynamically changed or updated via a Pinger process or a MOT script. As defined in this application and as will be described in more detail later, a Pinger process comprises an entity that acts transparently as a "services" coordinator to provide and/or administer the following:

1. Heartbeat service to help maintain network connectivity with a client.
2. Authentication services that securely authenticate client access to email, commerce, and other public and private network servers and services.
3. Update services that can perform client software, database, and maintenance services during periods of inactivity.

The Pinger entity, as suggested above, has, as one of its functions, the responsibility of providing database updates to the client user. When a MOT script is used, it can be a "mime type" definition part of an E-mail message, an HTTP web document download and so forth, which transparently automates the Toolbar update. The Toolbar can be integrated with ticker tape which can spawn MOT scripts, URLs, or execute programs. Each Toolbar button may be programmed with a function in the button bar database 208. The Toolbar reads a plurality, for this example five, of attributes from the button bar database 208:
1. Caption—Title or Button Name.
2. Enabled—Enables or disables the button function
3. Execution Type—This attribute supports the following types and further determines if the fifth attribute read by the toolbar would be "Execute File" (5a) or "URL" (5b)
   DDE to a URL
   DDE to a URL without going online
   Launch a Program or Script
   Launch a Program or Script and wait to complete before continuing
   Go online and then launch a program or Script
   Change Preferences
   Change Passwords
   Display Account Information
   Set Dialing Properties
   Execute a MOT script
   Jump to another Tab or Button on the Toolbar
   Reload the Toolbar's Tabs and/or Buttons
4. Hint—Button functionality description
5a. Execute File—Command line of file to be executed
5b. URL—URL for a browser to open whether remote or local When a user 110 clicks on one of the Toolbar functions or the Ticker tape, the appropriate procedure is started. For example, if a button is programmed to go to the USA Today (button Caption) web site the Execution type would be set to "DDE to a URL" and the "URL" would be set to something similar to http://www.usatoday.com/ and the 'Hint" would be set to something similar to "Open to XXXXXXXXX Web site for the latest news!".

As will be appreciated, a MOT script defines how to build a button bar using the button bar database 208 and its database entries. The MOT script is typically associated with a Web page and when the user 110 clicks on the Web page, the MOT script associated with the Web page is read back by the client dispatch application 200. The client dispatch application 200 uses the particular MOT script and the button bar database 208 information and builds the button bar automatically according to the MOT script specifications. An example of the button bar database 208 and its data entries is set forth in Appendix A.

The user database 210 includes information related to the user 110, such as name, address, phone numbers, billing information, Email ID and Email password, type of account, and unique PAP ID and PAP password, if applicable. It will be understood that the user database 210 may be merged into the network services database 206. An example of the user database 210 and its data entries is set forth in Appendix A.

The access service 106 is connected to the Internet 100 and is defined by a predetermined and unique address (i.e., IP address). The access service 106 includes one or more network servers/databases 220. It will be understood that access service 106 includes a computer system having one or more processors, memory, and support hardware (all not shown in this figure) for processing and storing information and data communications. The network servers/databases 220 store information relating to the user(s) 110, including the same information that is (or would normally be) in the user database 210, and also includes session keys (transaction keys) billing data, connection history data, ISP-specific access information, and information about what procedures a user 110 has performed, and the like. Specific functions of the access service 106 have been described in the foregoing and will be described in more detail below. The Pinger entity may be a part of the access service provider 106 or it may be separate. For the present discussion, it will be assumed to be part of the access service provider 106.

After the user 110 connects to the Internet 100 via a predetermined ISP 102, the client dispatch application 200 dispatches an initial "pinger" message to the access service 106 via the Internet 100. Included within the pinger message is header information that includes the current user ID, account owner ID, PAP ID, the current IP address assigned to the user 110, Group ID, the users system's current time, database (204, 206, 208, 210) revisions levels, client dispatch application 200 and other related software revision levels.

All communications between the client dispatch application 200 and the access service 106 take place through a process identified as the Pinger. The Pinger provides secure and unsecure periodic bi-directional communication between the user 110 and the access service 106. The functions of the Pinger are as follows:

Read, Write or Update any entry in any of the databases 204, 206, 208, 210 of the user 110 and any of the databases 220 of the access service 106 and further initiate a secondary transmission when appropriate.

Execute a program or script with command line entries if appropriate.

Save a file or script and further initiate the execution of the file or script when appropriate.

Continue Transaction.

With these functions, the client dispatch application 200 can request database updates or save files for execution later, and the access service 106 can initiate events, database updates, or save files for execution later. The Pinger process also provides a "heartbeat" mechanism to prevent the premature disconnection of the user 110 from the network by an ISP 102. That is, many ISPs 102 have a modem inactivity timeout interval that disconnects users 110 after some short interval of time if there has been no network activity during that interval of time. The heartbeat function is programmable and, in the preferred embodiment, is set at five minutes during the user's first three hours of connection time and increases by five minutes each half hour thereafter. In the heartbeat function, the client dispatch application 200 transmits the user's ID to the access service 106.

The pinger is initiated by the client dispatch application 200 upon connection to the network 100. The client dispatch application 200 transmits header information to the access server 106 using the IP address of the access server 106. The header information includes the current user ID, account owner ID, PAP ID, the current IP address assigned to the user 110, Group ID, the users system's current time, database (204, 206, 208, 210) revisions levels, and client dispatch application 200 and other related software revision levels. With this information, the access server 106 determines whether a user 110 is making two connections while only paying for one and thus needs to be disconnected, or is a user 110 that needs a database or file update. The Continue Transaction function provides a mechanism to partially transmit data and commands over multiple sessions (successive connections by the user 110 to the network 100) without having to restart the transaction from the beginning.

While the pinger process (transparent to the user 110) allows the client dispatch application 200 and the access service 106 to interact and download database updates (or other information) to the user 110, there is an alternative way to provide the updates to the databases, etc. at the request of the user 110. The access service 106 may provide a Web page whereby when the user 110 clicks on the Web page, a MOT script and other data associated with the Web page is transmitted from the Web page site to the client dispatch application 200. This gives the user 110 the capability to request a data update (or to receive other information). Alternatively a MOT script and other data can be transmitted via an email message, an FTP (file transfer procedure) site or other similar networking storage and transport mechanism to the client dispatch application 200.

Figure 8:
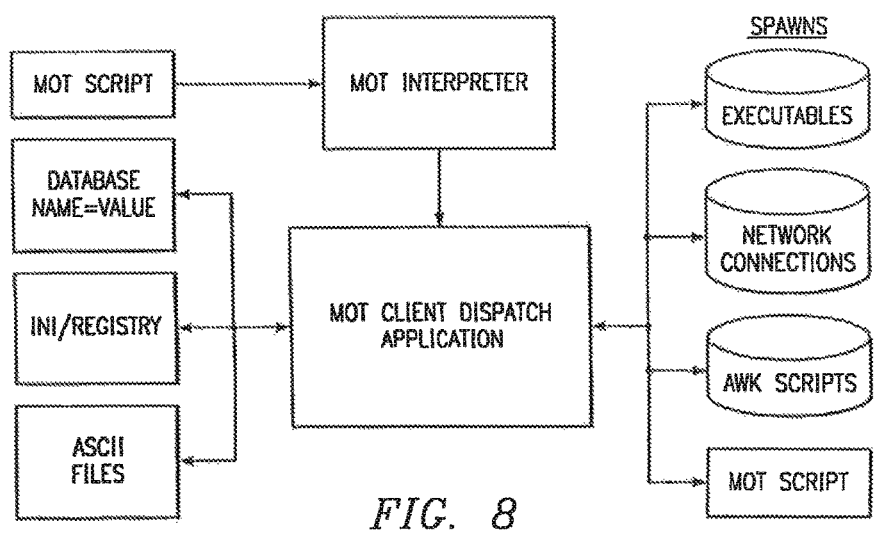
FIG. 8 illustrates a plurality of MOT (a computer script language) potential processes.

The Script Language used by the Pinger and elsewhere in this application for patent is designated by the term MOT (see FIG. 8). MOT is not, however, an acronym for anything meaningful. The script language is an interpretive language which is stored in an encrypted file from which the interpreter reads to initiate the MOT client dispatch application 200. The MOT client dispatch application 200 can read and write database (db) entries, Operating System initialization file entries (INI and Registry Files), and ASCII Text files. Further, the MOT client dispatch application 200 can spawn executable programs, network connection, AWK scripts, and other MOT scripts. A MOT script may have a "mime type" defining the MOT script language as the language of the MOT script.

Now referring to FIGS. 3 through 7, there is illustrated the process of the client dispatch application 200. The flow diagrams of FIGS. 3-7 are representations of closed-loop programming (structured programming). The client dispatch application 200 performs five primary procedures or functions as set forth in the CASE block. These include the installation, registration, regular use, manual update, and multi-dial procedures. Within the multi-dial procedure are several sub-functions defined as the low cost, reliability, location, availability, busy-sequence, and single dial/multi-login sub-functions shown and explained subsequently in connection with FIG. 7. The client dispatch application 200 manages the procedures based upon data from one or more databases of the access service 106 or other inputs received from the access service 106, the user's databases 204, 206, 208, 210, and/or the user's computer operating system files. It will be understood that databases and database information may be encrypted to prevent a user 110 from tampering with entries contained therein.

Figure 3:
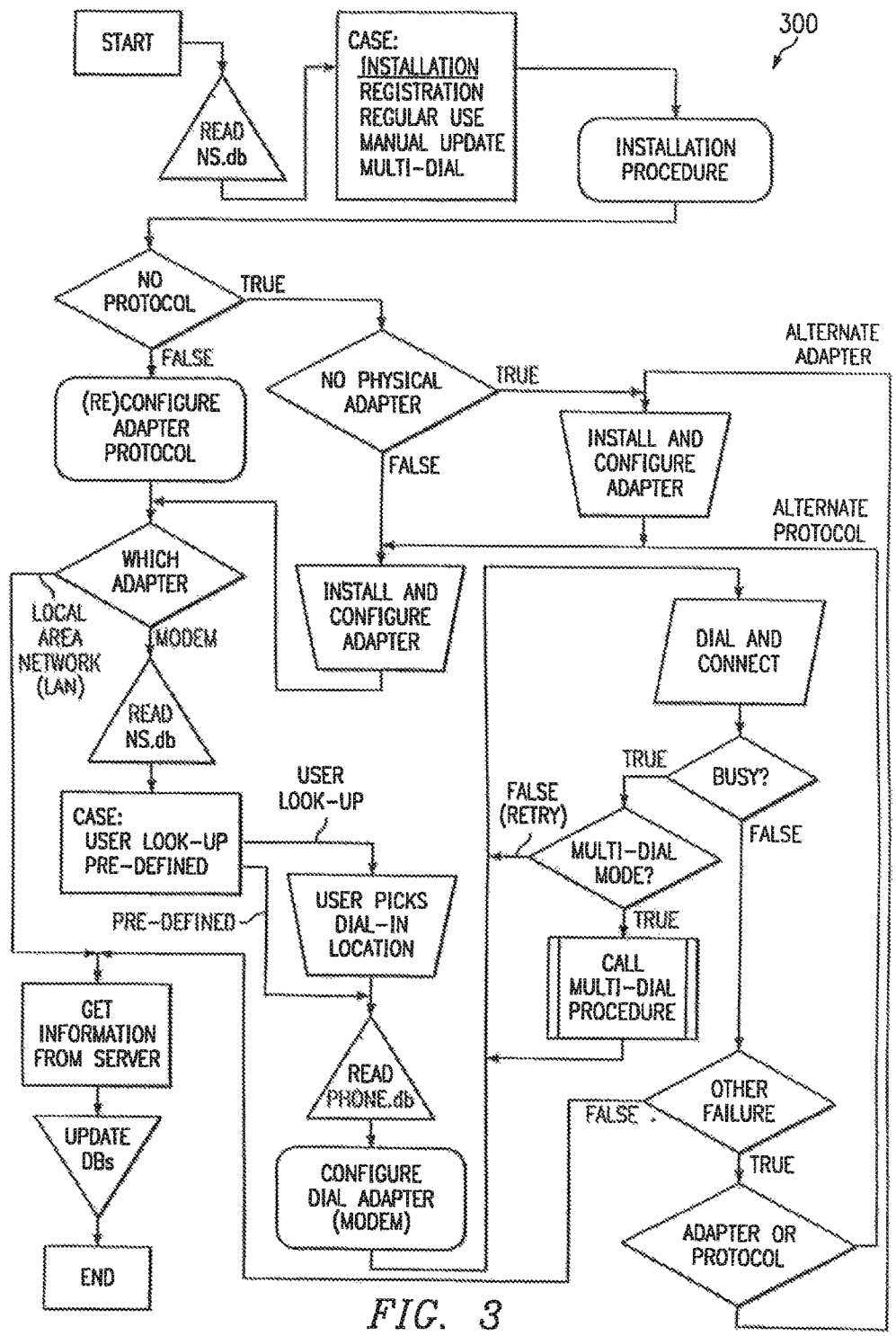
FIG. 3 illustrates a flow diagram of an installation procedure of the client dispatch application.

Now referring to FIG. 3, there is illustrated a flow diagram of an installation procedure 300 of the client dispatch application 200. The procedure 300 starts by reading information from the network services database 206. The network services database 206 forms part of the software package which is loaded into a network access device, such as the user 110 (computer). The network services database 206 includes basic configuration and initialization information necessary to configure and manage the network communication equipment, network protocols and the associated interfaces between the communication equipment and network protocols and the computer's operating system.

After the network services database 206 is read, the user's operating system files (which in the case of a Windows operating system comprises Registry and INI files, Protocol files, and Physical Adapter files) are examined to determine if any networking options have been installed and whether or not the files, if installed, are correct and configured properly as part of the "No Protocol" decision block. If no Protocol or Adapter has been installed, the "True" path will be followed whereby the Installation function will configure the Adapter and necessary Protocol to successfully connect the user 110 to a network such as the Internet 100. If the Protocol or Adapter that is installed is misconfigured, the "False" path will be used whereby the Installation function will reconfigure the Adapter and necessary Protocol to successfully connect the user 110 to a network such as the Internet 100. As part of the configuration process, it may be noted that the correct configuration for utilization of the TCP/IP Protocol would include configuring and setting the proper Operating System Registry and INI (initialization) files with the necessary Protocol configuration information in instances where the operating system is a version of windows. Such information includes: IP addresses whether statically or dynamically assigned, Domain Name System (DNS) name server addresses whether statically or dynamically assigned, Gateway Addresses whether statically or dynamically assigned, Other operating system Binding functions, Dynamic Host Control Protocol options, Windows Internet Naming Service (WINS) options whether statically or dynamically assigned, and the assignment of such Protocol functions to be utilized by the appropriate Adapter. The function of configuring or reconfiguring is executed near the beginning of each of the five primary procedural (300, 400, 500, 600, 700) tasks of the client dispatch application 200 to ensure successful operation of a network connection even for those instances where a computer user 110 accidentally misconfigures their system and thereby makes networking inoperable.

After the successful configuration of both the Adapter and the Protocol, the procedure 300 proceeds to the "Which Adapter" decision block. The appropriate adapter is utilized which is either the adapter pre-programmed into the network services database 206 (if available) or if there is only one Adapter then it will be used. If the Adapter is a Modem, the "Modem" path will be followed to read from the network services database 206 to determine if the user 110 chooses a dial-in location under the case of "User Look-up" or if the modem shall be programmed to dial a "Pre-Defined" dial-in phone number reference in the network services database 206 and stored in the phone database 204. If a database entry in the network services database 206 is set to allow the user 110 to choose a dial-in location, then the user 110 chooses a location based on Country, State or Province, and City in accordance with the "User Picks Dial-In Location" block. After the user 110 selects the proper dial-in location, the installation procedure 300 reads from the phone database 204 to determine the dial-in phone number to use. If a given location has multiple dial-in phone numbers, a dial-in number is selected based upon attributes read from the network services database 206 (and/or the phone database 204). Such attributes include installation dial-in numbers (dial-in phone numbers which are only available during installation or testing). Although not pertinent to the installation procedure 300, other attributes of phone numbers appearing in the phone database 204 include Registration Dial-in Numbers (phone numbers and locations which appear to a user 110 during registration), Sequence Numbers (a prioritized list of phone numbers which shall be tried in sequential order to produce the highest probability of connection), Available ISP numbers (phone numbers of a given ISP's modems), Currently Valid Numbers (phone numbers which are currently valid for use by a given user 110), or any combination of the aforementioned.

If a value in the network services database 206 is set for the user 110 to use a predefined dial-in number (such as an 800 type toll-free number) the client dispatch application 200 will read the appropriate predefined phone number entry from the phone database 204. After the client dispatch application 200 has determined the proper dial-in phone number, whether user selected or pre-defined, the user's modem is initialized and dialing occurs, as set forth in the "Dial & Connect" block. If the modem is busy, it will either continue to retry the same phone number or initiate a multi-dial procedure 700 (as set forth in FIG. 7) depending on the outcome of the "Multi-dial Mode?" decision block (from an entry in the network services database 206). If the "False (Retry)" path is followed, the same number is dialed until the user 110 "gives up". If a Multi-Dial mode "True" path is followed, based upon the entry in the network services database 206, the multi-dial procedure 700 is initiated and other dial-in numbers will be tried to gain access to the network. The multi-dial procedure 700 is one of the five primary procedures of the client dispatch application 200 and is explained in more detail in connection with FIG. 7.

Once a connection is made, the "False" path from the "Busy?" decision block is followed and communication with the access service 106 begins by sending an installation PAP ID and PAP password (read from the network services database 206) to the access service 106 for transparent login authentication as shown by the "Get Information From Server" block. Once the login has occurred, communication with the access service 106 is established, and transfer of data begins. The data transferred during the installation procedure 300 may contain some basic system information about the user's computer system, the type of connection being used and the location from which the connection has occurred. Once this information is received at the access service 106, the access service 106 sends appropriate information back to the client dispatch application 200 and inserts at least a portion of the data into the database. Such information (data) may include updates to the phone database 204 including "Location" addition or subtractions, phone number changes, and updates to the network services database 206 including ISP 102 additions and subtractions, group, user, or multiple user specific configuration, DNS and IP information, etc. Updates to the databases 204, 206, 208, 210 which reside on the user's computer can occur transparently to the user 110 whenever the user 110 is connected to the Internet 100; thereby ensuring that the user's network related information is always current and accurate. Any updates received from the access service 106 are written to the appropriate database (i.e. network services database 206, phone database 204, or others) by the client dispatch application 200. The client dispatch application 200 also updates the network services database 206 to reflect "installation complete". Thus, the client dispatch application 200 is informed that the next execution "Case" to start is "Registration" as will be shown in FIG. 4.

At this point, the dial-in location attributes (Installation dial-in numbers, Registration Dial-in Numbers, Sequence Numbers, Available ISP numbers, Currently Valid Numbers) provide control mechanisms to ensure that a user 110 receives the appropriate level of service for which they are subscribed such as "the lowest cost service", "the highest reliability service", "the most available service", or combinations thereof. Further, these updated and database stored attributes allow for remote testing of the network communications (full connection TCP/IP test to the Internet 100), the user's system for basic configuration, database integrity, network load balancing and the reduction of fraud by dynamic control of phone number validity.

If the Adapter used to connect to the network is a Local Area Network device such as an Ethernet card, the "LAN" path is followed from the "Which Adapter" decision block. In this situation, once communication with the access service 106 is established, transfer of data and updates begin as described in the paragraphs above.

Figure 4:
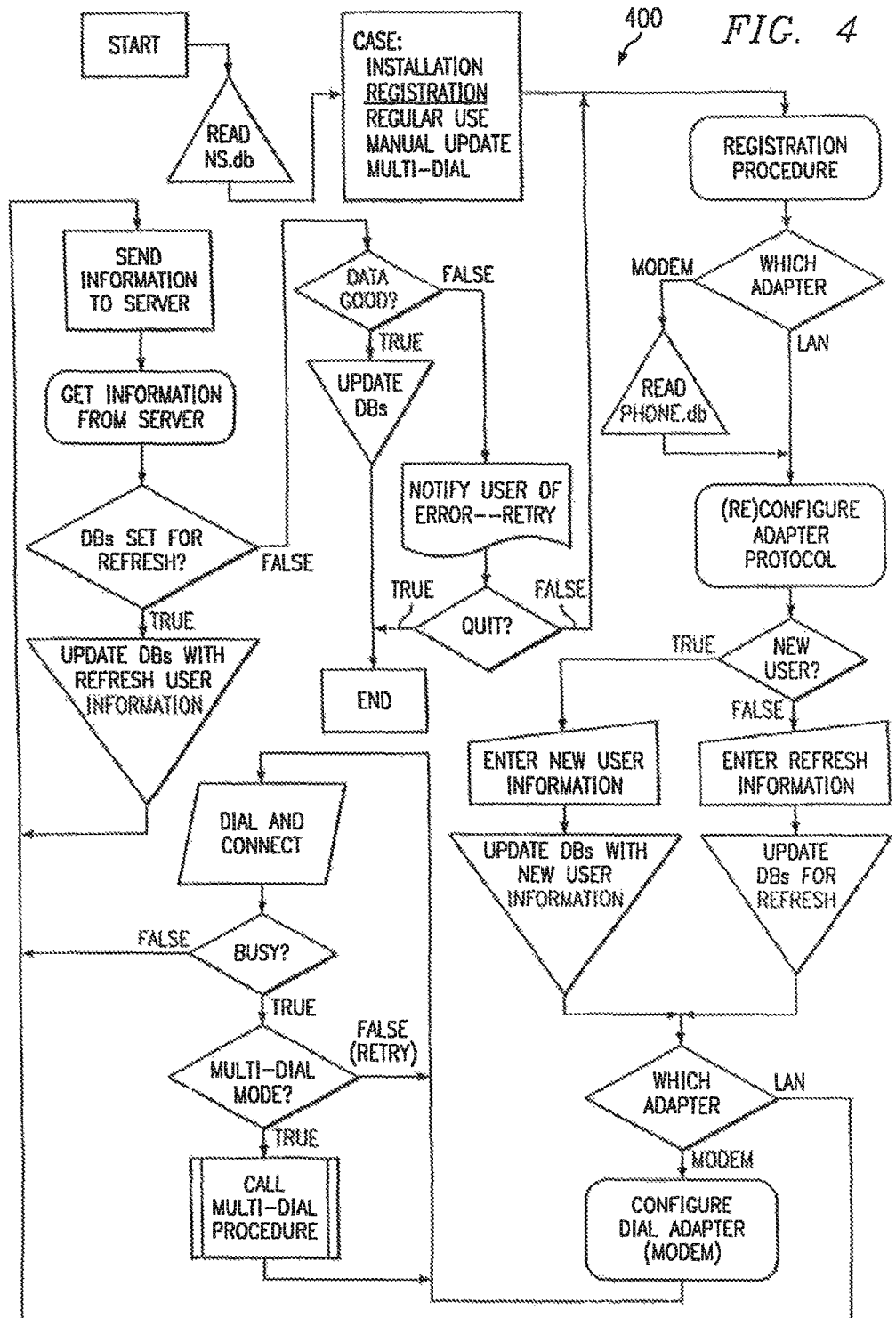
FIG. 4 illustrates a flow diagram of a registration procedure of the client dispatch application.

Now referring to FIG. 4, there is illustrated a flow diagram of the registration procedure 400 of the client dispatch application 200. The registration procedure 400, as all primary procedures, starts by reading the network services database 206 to determine the appropriate execution "Case", and in this case, the registration procedure 400. The registration procedure 400 starts by reading the network services database 206 to gather the necessary information, such as which Adaptor and Protocol to use and proceeds to configure and initialize the appropriate networking functions to start the user registration process. A "Which Adapter" decision block includes the two paths of "Modem" and "LAN". After a determination is made as to which Adapter and Protocol to use, the process proceeds to the "(Re)Configure Adapter Protocol" block to configure and initialize the appropriate networking functions to start the user registration procedure 400 (i.e. configuration process for the user's computer).

The registration procedure 400 comprises several forms (pop-up forms) into which the user 110 enters specific information about the user 110. Such information typically will include Name, Address, Phone Numbers, Credit Card and/or Banking Information, Referral Information (if available), Personal Security information (like: mother's maiden name), Birthdate, and Preferred E-mail Identity and Preferred E-mail Domain Choice. The registration information for each user 110 is stored in the network services database 206 and/or a user specific database 210, as well as information about the user's system and revision levels of the client dispatch application 200 and databases (204, 206, 208, 210). Upon completion of the new user registration forms as indicated by the "Update DBs with New User Information" block, the client dispatch application 200 initiates communications with the access service 106 as described earlier. The adapter used, as determined by the lower most "Which Adapter" decision block, will be the adapter determined and used during the installation process. Once communication with the access service 106 begins, the client dispatch application 200 sends all the information that was added or updated into the network services database 206 (or user database 210) of the user 110 to the access service 106 as indicated by the "Send Information To Server" block. The access server 106 transmits the received information plus additional information, such as one or more user 110 assigned PAP IDs and PAP passwords, Email IDs and Email Passwords, back to the client dispatch application 200 for comparison and verification of the information that was sent as indicated by the "Get Information From Server" block. If the information returned is not identical to the information which was sent, the client dispatch application 200 will resend the information again to the access service 106 along the path commencing with the "Notify User of Error-Retry" block. This process will continue until all transmitted information from the client dispatch application 200 to the access service 106 matches all information returned to the client dispatch application 200 from the access service 106 or when a maximum retry value is reached in accordance with the "Quit?" decision block. In the preferred embodiment, the maximum retry value is five. If the client dispatch application 200 reaches a maximum retry value, an error message is sent to the user 110 notifying the user 110 that an Error has occurred and to try reconnecting or registering again. This error message comprises a part of the "True" path output of the "Quit?" decision block.

It will be understood that registration procedure 400 may be designed to have an alternate process of prompting the user 110 to use an alternate Adapter or Protocol and then retry where such an alternate process may be deemed appropriate.

If other users (sub-users) are permitted to access the network under this initial user's authority, such as other family members, the registration process for these other users can be started during a regular use procedure 500 described in connection with FIG. 5. Upon completion of a user's 110 initial registration, the user's network access display device will display an Electronic Registration Number (ERN) which, with other personal security information, can be used later to refresh a system as described below.

The registration procedure 400 also allows users 110 registered with the access service 106 to temporarily use a computer or other network access device or permanently use a secondary network access device by using a refresh function which bypasses the standard registration form screens by asking the user 110 if they have already registered. If the user 110 has previously registered, the refresh process of the registration procedure 400 will connect, communicate with the access service 106 and download all the user information sent during the user's initial registration and the client dispatch application 200 will update the appropriate databases (204, 206, 208, 210) on the user's network access devices storage system.

Figure 5:
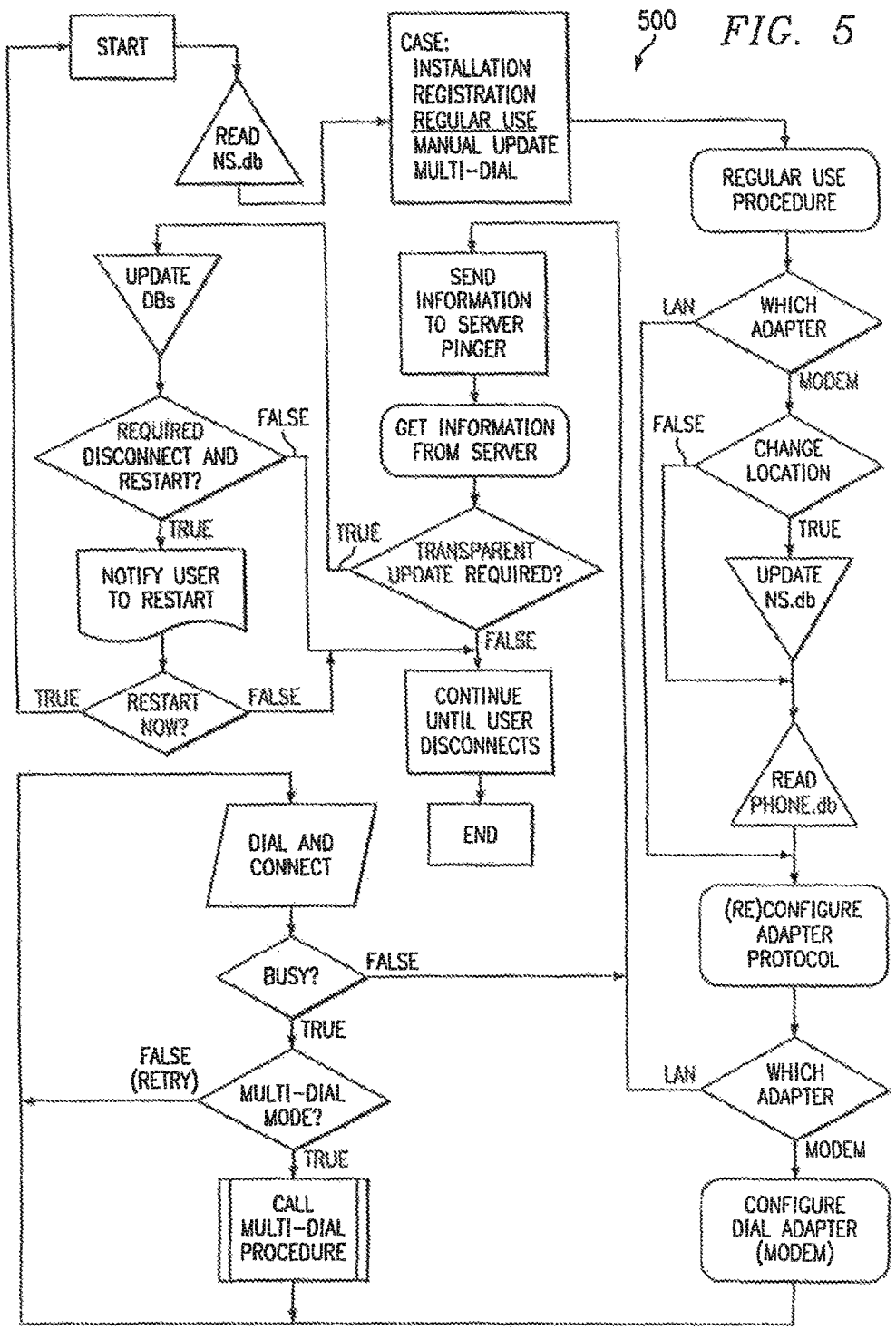
FIG. 5 illustrates a flow diagram of a regular use procedure of the client dispatch application.

Now referring to FIG. 5, there is illustrated a flow diagram of a regular use procedure 500 of the client dispatch application 200. The regular use procedure 500 is enabled after a user 110 has both installed client dispatch application 200 on a particular computer system or other network access device and registered with the access service 106.

The regular use procedure 500 functions to connect a user 110 to the network 100 using a login and password access which is transparent to the user 110. This is accomplished by reading the network services database 206 for login information such as the user PAP ID and PAP password as shown in the "Read NS.db" block. After reading the necessary information from the network services database 206 and prior to the user 110 logging onto the network 100, the user 110 is given an opportunity to change the user's dial-in Location if the user 110 is using a modem as an Adapter, as illustrated by the "Change Location" decision block. If the Adapter is a modem, and the user 110 desires to change locations, the user 110 is presented with a "chooses a location" form that may be identical to one seen by the user 110 during registration. The "chooses a location" form allows the user 110 to select a local dial-in location from pull down menu selections based on Country, State or Province, and City selections for a given ISP 102 for which the user PAP ID and PAP password are valid. After the user 110 selects the proper dial-in location, the phone database 204 is read to determine what dial-in phone number to use.

If a given location has multiple dial-in phone numbers, a dial-in number is selected based upon attributes that are read from the phone database 204, user db, network services database 206 or any combination thereof as part of the "Dial & Connect" block. As discussed elsewhere, and in particular in connection with FIG. 3, such attributes include Installation dial-in numbers (dial-in phone numbers which are only available during Installation or testing), Registration Dial-in Numbers (phone numbers and locations which appear to a user 110 during registration), Sequence Numbers (a prioritized list of phone numbers which shall be tried in sequential order to produce the highest probability of connection), Available ISP numbers (phone numbers of a given ISP's modems), Currently Valid Numbers (phone numbers which are currently valid for use by a given user 110), or any combination of the aforementioned.

After the user 110 establishes a connection to the access service 106, a "pinger" function is initiated as discussed previously. The pinger function causes the client dispatch application 200 to transmit header information to the access service 106, as set forth in the "Send Information To Server (Pinger)" block. The header information may include a Unique Identification string for the user (user ID, PAP ID, etc.), a unique computer identification string (IP address, etc.), time stamp information, and revision information for the client dispatch application 200 and databases 204, 206, 208, 210, as described earlier. After receipt, the access service 106 reviews the header information to determine what, if any, updates are required to be made to the user client's dispatch application, databases, or network access devices operating system. Such updates may include: new dial-in locations, new identification information such as PAP IDs, network authentication passwords such as PAP passwords, other IDs, other passwords, change of phone numbers, change of area codes, low cost ISP, dial-in location priority sequence numbers, or any combination thereof, or any other information relating to gaining access to the ISP 102. If any updates are required, these are supplied by the access service 106 and any necessary updates will take place transparent (automatic while the user 110 is logged on) to the user 110 as part of the "True" process path emanating from the "Transparent Update Required?" decision block. If such updates require user intervention, such as rebooting the user's computer, the user 110 will be notified prior to the update and/or prior to a reboot as part of the "Notify User to Restart" block. Updates which require a lot of time, may span multiple log-ins (to the network 100) by the user 110 with partial updates being performed until the full completion of the update. The partial updates will take place when the user's system is connected but idle and/or during a "pinger/heartbeat" function.

Figure 6:
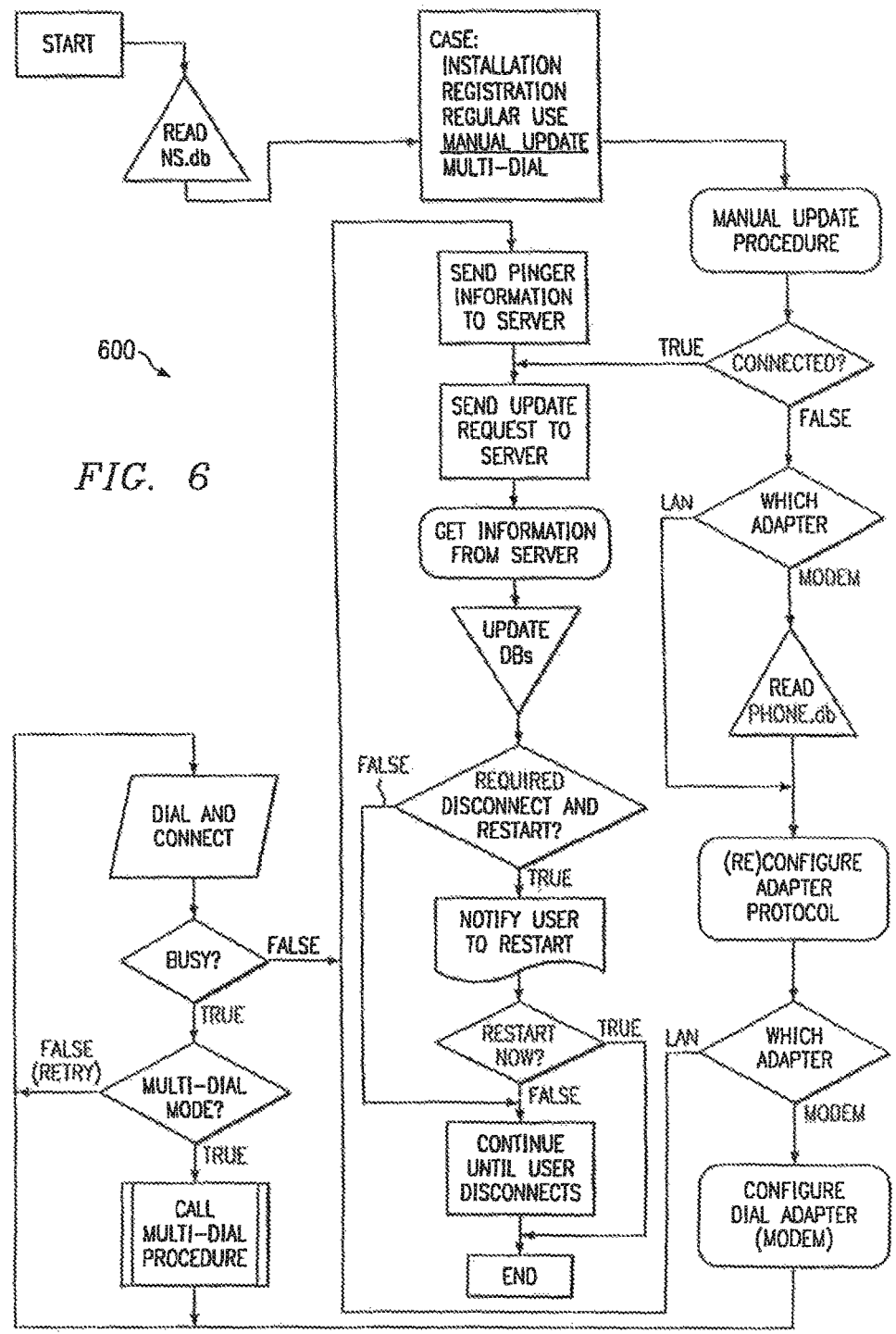
FIG. 6 illustrates a flow diagram of a manual update procedure of the client dispatch application.

Now referring to FIG. 6, there is illustrated a flow diagram of a manual update procedure 600 of the client dispatch application 200. The manual update procedure 600 provides a mechanism for a user 110 to manually recover, change, modify or update the client dispatch application 200 and the databases 204, 206, 208, 210. This capability is useful for ISPs 102 managing customers with billing issues, as well as for servicing customers with special system configuration issues.

The manual update procedure 600 initiates and makes a network connection using a special set of log-in information defined herein as the "Manual Update PAP ID and PAP password" (the manual update PAP ID and PAP password, including the Installation, Multi-dial and Test PAP IDs and PAP passwords are incorporated into the user's installed client dispatch application 200 as part of the network services database 206 and are not easily accessible to the user 110). If a connection is not immediately obtained, the adapter and protocol checking is completed as set forth in connection with the previous Figure (and description thereof) and as set forth in this flow diagram, via the "False" path output of the "Connected?" decision block. Once the connection is established, either via the "LAN" path from the "Which Adapter" decision block or the "False" path from the "Busy?" decision block, the "pinger" function is initiated as indicated by the "Send Pinger Information to Server" block. If there already is a connection, the "True" path is followed from the "Connected?" decision block.

Once communication is established by the client dispatch application 200 with the access service 106, pinger header information, any special database update request, and the like, etc. is transmitted from the client dispatch application 200 (generated from the network services database 206 and/or the user database 210) to the access service 106, as shown by the "Send Update Request to Server", in order to establish the identity of the user 110 and system that is requesting an update of information from the access service 106. The access service 106 uses this update request information to generate any updated information which is needed to update a specific user 110, group of users, a specific network access device such as the computer, a group of computers, or any combination thereof and sends any required information back to the user 110 to update the appropriate databases 204, 206, 208, 210 or Registry or INI, Adapter, and/or Protocol files 212, 214, 216 (operating system files). Upon completion of the update, the client dispatch application 200 disconnects the user 110 from the network 100 (breaks the network connection) and if appropriate, the user 110 will be notified that the network access devices operating system must be rebooted in order for the update to take effect.

Figure 7A:
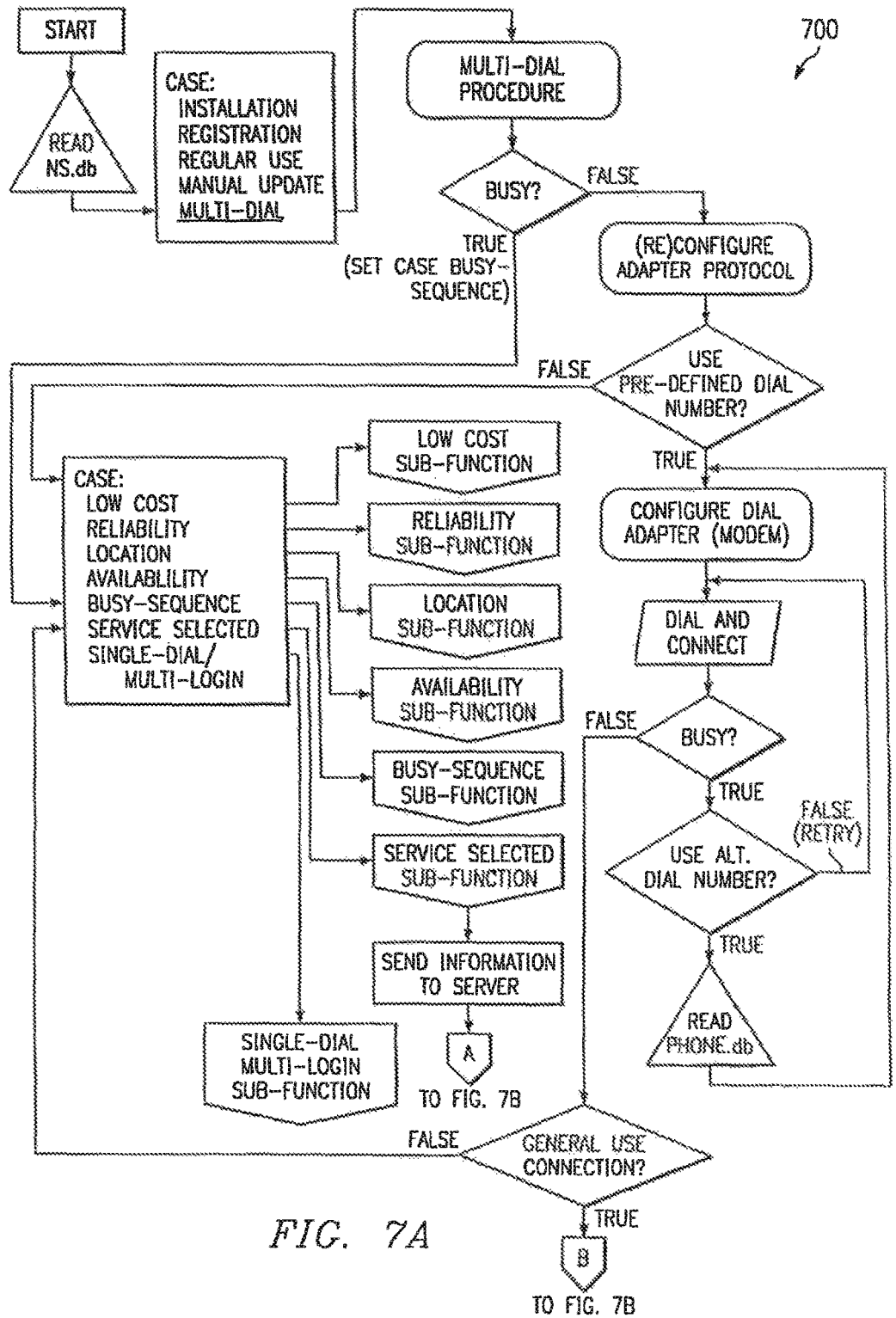
FIGS. 7A and 7B illustrate a flow diagram of a multi-dial procedure of the client dispatch application.
Figure 7B:
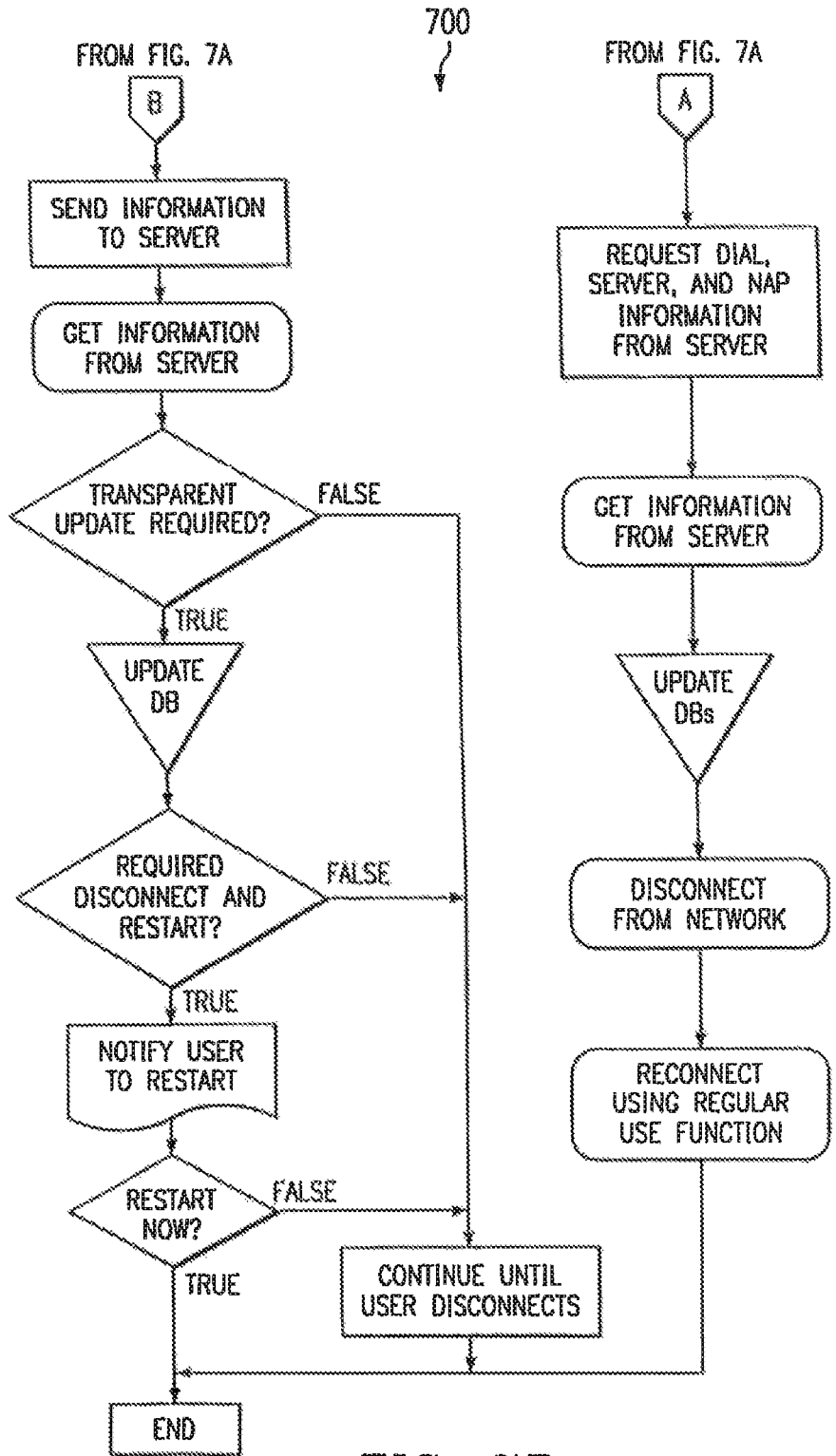

Now referring to FIG. 7, there is illustrated a flow diagram of a multi-dial procedure 700 of the client dispatch application 200. The multi-dial procedure 700 provides the access service 106 with a mechanism to control access by a user 110, a group of users, a computer, a group of computers, a local area network (LAN) of computers, or any combination thereof, to the Internet 100, based upon any one of the following seven sub-function attributes: Cost, Availability, Reliability, Location, Busy-Sequence, Service Selected, or Single Dial/Multi-Login. The multi-dial procedure 700 is initiated by one of the other primary procedures 300, 400, 500, 600 (see FIGS. 3 through 6) of the client dispatch application 200 and/or by a multi-dial procedure tag programmed into the network services database 206.

When the multi-dial procedure 700 is initiated in response to a busy signal received during operation of one of the other primary procedures 300, 400, 500, 600 and the multi-dial procedure tag is enabled in the network services database 206, the multi-dial procedure 700 initiates a Busy-Sequence sub-function. The Busy-Sequence sub-function initiates one of the other multi-dial procedure sub-functions, re-dials the same dial-in number before initiating one of the other multi-dial procedure sub-functions, or dials a new dial-in number identified in the next sequential "area" location from a list of area locations available, all in response to database information based on the user's selected plan. The list of "area locations available" is based on the type of service plan (also found in the network services database 206) subscribed to by the user 110 and/or on PAP IDs and PAP passwords stored in the network services database 206. If the user 110 has chosen to subscribe to a higher cost plan, multiple PAP IDs and PAP passwords for multiple ISPs 102 may be stored in the network services database 206 (certain locations may only have a single ISP). As a result, a list of available dial-in locations may contain one or more dial-in numbers from one or more ISPs 102. Alternatively, multiple ISPs 102 may have PAP ID and PAP password sharing agreements allowing a single user PAP ID and PAP password entry in the network services database 206 to generate a dial-in location list from multiple ISPs 102. In any case, the Busy-Sequence sub-function sequentially attempts to make a connection to an ISP 102 at each location until either a successful connection is made or the user 110 aborts the connection attempt.

When the multi-dial procedure 700 is initiated for any reason other than a busy signal, the client dispatch application 200 reconfigures or reinstalls the system configuration adaptor and protocol information necessary for network connection. Thereafter, based on data in network services database 206, it is determined whether or not to initiate a connection attempt to the Internet 100 using a pre-defined dial-in number or location. If a connection is desired using a predefined dial-in number or location, the multi-dial procedure 700 uses one of four types of possible PAP IDs and PAP passwords. These types are defined as a "multi-dial PAP ID and PAP password", a "group PAP ID and PAP password", a "user PAP ID and PAP password", and a "test PAP ID and PAP password."

When both the "pre-defined dial-in number" entry and a "General Use" entry are enabled in the network services database 206, a general use connection to the Internet 100 is established using either the "group PAP ID and PAP password" or the "user PAP ID and PAP password." When the "pre-defined dial-in number" entry is enabled and the "General Use" entry is disabled, then the multi-dial procedure 700 establishes a connection to the Internet 100 using either the "multi-dial PAP ID and PAP password" or the "test PAP ID and PAP password". In either case, the user's 110 dial adaptor (modem) is configured with the ISP-specific access information associated with the predefined dial-in number. After proper configuration, the client dispatch application 200 automatically dials and attempts connection to the ISP 102. If the line is busy, it is determined whether an alternate dial-in number should be used. If an alternate number is not to be used, the dial and connect is retried with the previous dial-in number. If an alternate number is to be used, the alternate dial number is read from the phone database 204 and the user's dial adaptor (modem) is configured with the ISP-specific access information associated with the alternate dial-in number.

Upon successful connection, if the connection is not a "general use" connection, the Service Selected sub-function is initiated (a double dial procedure). If the connection is a "general use" connection, the client dispatch application 200 transmits pinger header information to the access service 106. In response, the access service 106 transmits information to the user 110 (client dispatch application 200). The multi-dial procedure 700 determines from this received information whether a transparent update is needed (i.e., update information in the database(s) without user 110 intervention). If so, the client dispatch application 200 updates the database(s) and determines whether a disconnect is required. If not, the user 110 continues regular use until disconnected by some other means. If so, the user 110 is notified and may be given the option to choose to disconnect or may be forced to disconnect.

If after a connection is made and the user 110 has used a PAP ID and PAP password that is used by another in order to establish the user 110 connection, then the access service 106 updates the user's database(s) (possibly with a new and valid PAP ID and PAP password) and the client dispatch application 200 either disconnects the user 110 (and notifies the user 110 that the PAP ID is not valid) or allows the user 110 to stay connected (if the user 110 has received a new and valid PAP ID). This particular process also applies to the regular use procedure 500 (see FIG. 5).

In the preferred embodiment, when a "pre-defined dial-in number" entry in the network services database 206 is disabled, then the multi-dial procedure 700 executes one or more of the seven sub-functions in response to entries in the network services database 206.

The Service Selected sub-function reads pinger header information from the network services database 206 and the user database 210 and sends this information in a data message to the access service 106 (to the network server/ database 220). The access service 106 uses the information to generate database updates (including new PAP ID, etc.) which may or may not assign, reassign, or update ISPs 102, dial-in locations, PAP IDs and PAP passwords, dial-in numbers, network routing information, Adapters, Protocol, or any other information stored in the databases 204, 206, 208, 210. Such database updates are then transmitted to the user 110 and the client dispatch application 200 to update the appropriate database 204, 206, 208, 210. After the database information is updated, the user 110 is disconnected, and the Regular Use primary procedure 500 is initiated using the updated information received from the access service 106.

The "Low Cost" sub-function obtains information from both the network services database 206 and the phone database 204 and determines which ISP 102 and what locations (dial-in phone numbers for local access) have the lowest priced service for a given user's dial-in location. The lowest cost sub-function next determines if the user's PAP ID and PAP password stored in network services database 206 are valid (compare the current user's PAP ID and PAP password with the user's currently selected dial-in location) for the ISP 102 that provides the low cost connection point-of-presence at the user's location. If the user PAP ID and PAP password are valid, the network connection sequence will dial and connect as described in the regular use procedure 500. If the user PAP ID and PAP password are invalid then this sub-function will initiate the manual update procedure 600 requesting from the access service 106 a valid user PAP ID and PAP password for the ISP's 102 dial-in network at the user 110 selected location. Then, the network connection sequence will dial as described in the regular use procedure 500.

The "Reliability" sub-function obtains information from both the network services database 206 and the phone database 204 and determines which ISP 102 and what locations (dial-in phone numbers for local access) have the highest reliability of connecting the user 110 to the Internet 100. This determination is based upon prior data (reliability data) transmitted to the client dispatch application 200 from the access service 106 that is used to update the user databases. This data transmission occurs during a previous session when the user 110 is connected to the Internet 100. The reliability data is transferred by the access service 106 to the users 110 who have a reliability entry enabled in their network services database 206. The reliability sub-function next determines if the user PAP ID and PAP password stored in the NS.db are valid (compare the current user's PAP ID and PAP password with the user's 110 currently selected dial-in location) for the ISP 102 that provides the highest reliability at the selected location. When the user PAP ID and PAP password are valid, the network connection sequence will dial and connect as described in the regular use procedure 500. When the user PAP ID and PAP password are invalid, then this sub-function will initiate the manual update procedure 600, as described in connection with FIG. 6, requesting from the access service 106 a valid user PAP ID and PAP password for the ISP's dial-in network at the user selected location. Then, the network connection sequence will dial as described in the regular use procedure 500 of FIG. 5.

Reliability refers to the ability to reliably connect on a first or second attempt (availability) and the ability to stay connected for a substantial period of time without disconnection, due mainly because of line noise problems, faulty equipment, etc. (integrity). Availability information used to determine availability of various ISPs 102 (and dial-in numbers) may include at least three types of information. The first type of information includes availability information that is received by the access service 106 from the ISPs 102 themselves (typically updated periodically). The second type of information includes information in a client histogram (client specific) that is generated by the client dispatch application 200 of the user 110. Over an extended time during which the user 110 makes more and more connections to the Internet 100 (via an ISP 102), the client dispatch application 200 keeps track of the times a connection is made on the first try, second try, etc. for each dial-in phone number (and/or ISP 102) used by the user 110. From this, a client-specific histogram is generated that contains information about the past history of the user's 110 connections. The third type of information includes information in a server histogram that is generated by the access service 106. The access service 106 tracks and stores information relating to all ISPs 102 and dial-in numbers regarding past history connections. See also, the description set forth below in the availability sub-function description. As will be appreciated, the reliability sub-function may use any one of the types of availability information, or combination thereof, for determining the dial-in number (or multiple numbers in priority) that will provide the user 110 with a high reliability connection.

With respect to the integrity information used to determine the integrity of the various ISPs 102 (and dial-in numbers), there are at least two types of information. The first type of information includes information received via technical support inquiries to the access service 106 by the users 110. If the access service 106 receives a call (or calls) from users 110 regarding faulty lines and/or premature disconnects, this information can be tabulated and stored for determining integrity. Since the access service 106 stores data relative what ISP(s) 102 (and dial-in number(s)) a particular user 110 has been using (through information in the access service 106 database gained through the pinging or heartbeat process—described earlier), the access service 106 can determine which ISP(s) 102 (and/or dial-in number(s)) have relatively high and/or low integrity. In response to this information, the access service 106 can update the user's 110 databases with this information. The second type of information includes information automatically gathered by the access service 106 that includes a history of the number of users 110, how long each has been connected, and what ISP(s) 102 (and/or dial-in number(s)) to which each user 110 has been connected (through information in the access service 106 database gained through the pinging or heartbeat process described earlier). The access service 106 can transmit the integrity data to the user 110 for use by the reliability sub-function of the client dispatch application 200. As will be appreciated, the reliability sub-function may use any one of the types of integrity information, or combination thereof, for determining the dial-in number (or multiple numbers in priority) that will provide the user 110 with a high reliability connection.

From a combination of the availability information and the integrity information, the reliability sub-function determines the dial-in number (or multiple numbers in priority) that will provide the user 110 with high reliability connection.

The "Location" sub-function obtains information from the phone database 204 and determines all the dial-in phone numbers available to a user 110 from a selected location. The location sub-function generates a list of "surrounding area" locations into which user 110 may dial. The user 110 then selects a dial-in number from this list. The location subfunction next determines if the user PAP ID and PAP password stored in the network services database 206 are valid (compare the current user's PAP ID and PAP password with the user's currently selected dial-in location) for the ISP 102 in which the user's 110 computer will dial into the selected location. When the user PAP ID and PAP password are valid, the network connection sequence will dial and connect as described in the regular use procedure 500. When the user PAP ID and PAP password are invalid, this subfunction will initiate the manual update procedure 600 requesting from the access service 106 a valid user PAP ID and PAP password for the ISP's 102 dial-in network at the user 110 selected location. Then, a network connection sequence will dial as described in the regular use procedure 500 of FIG. 5.

The "Availability" sub-function generates a dial-in location (number) list based upon user PAP IDs and PAP passwords stored in the network services database 206 and the type of service plan (also found in the network services database 206) to which a user 110 has subscribed. If a user 110 has chosen to subscribe to a higher cost plan, multiple PAP IDs and PAP passwords for multiple ISPs 102 may be stored in the network services database 206. Accordingly, the list of available dial-in locations may contain one or more (multiple) dial-in numbers from one or more (multiple) ISPs 102. Alternatively, multiple ISPs 102 may have PAP ID and PAP password sharing agreements allowing a single user PAP ID and PAP password entry in the network services database 206 to generate a dial-in location list from multiple ISPs 102.

As will be appreciated, the availability sub-function utilizes the same type of availability information as described above in the reliability sub-function.

The availability sub-function utilizes one or more methods or the service selected sub-function to increase the probability that the user 110 at a given location will successfully connect on the first try. This functionality is based upon historical data (Histogram data) or real time data supplied by an ISP 102 to the access service 106. The historical data may include two types of data—Client Histogram data or Server Histogram data. To accomplish the availability function, the Server Histogram data, Client Histogram data, or the service Selected sub-function is utilized, or any combination thereof is utilized, as desired.

The Client Histogram data is based upon connection history of the user 110. The Client Histogram data is not as beneficial, as other data, until a particular user 110 has consistently established a network connection (to the Internet 100) for a period of time sufficient to create a meaningful histogram. It has been determined that a period of at least ninety days is sufficient if a user 110 accesses regularly. After a sufficient period of time, a Client Histogram can be built to determine the probability of success of the user 110 connecting to the network 100 the first time. This minimizes the necessity of having the client dispatch application 200 perform a second dial-attempt to connect to the network 100.

The Server Histogram data is based upon the connection history of each particular ISP 102 and its dial-in numbers. This information is stored in the access service 106 in response to the monitoring of all the users 110 (through the "pinging" process). The Server Histogram data is transmitted to the user's network services database 206 upon any connection to the network 100 when the availability subfunction is enabled within the client dispatch application 200.

In the preferred embodiment, the Server Histogram data is normally used in conjunction with the Client Histogram data (when appropriate) to determine the highest probability of success of connecting to the network 100 without a second dialing attempt. Accordingly, upon the user 110 initiating a connection to the network 100, the client dispatch application 200 automatically selects a dial-in phone number that it has determined to have a high probability of success for connection. Thus, the Client Histogram data and the Server Histogram data are used to facilitate a statistical approach to determine the highest probability of a user 110 connecting to the network 100 on the first attempt.

However, there may be times when a user 110 desires a very high confidence (near 100% or 100%) connection, or the Histogram data is not desired to be used, such as when the data for a particular area is unreliable (i.e. certain geographic areas may have insufficient telecommunications infrastructure that may skew the data) and therefore possibly useless. In these cases the service selected sub-function is initiated and a "double dial" process takes place (see FIG. 7 and the description of service selected sub-function). In the service selected sub-routing, availability information of ISPs 102 is used by the access service 106 to give the user 110 a dial-in number that is available. This availability information for the ISPs 102 is periodically transmitted or given to the access service 106, typically every five minutes. The "double dial" process is also exemplified in FIG. 7 and the accompanying text.

The last sub-function of the multi-dial procedure 700 is the "Single-dial Multi-Login" sub-function. Initiation of the single-dial/multi-login sub-function requires a "multi-dial" attempt only when the user 110 receives a busy signal; otherwise this sub-function is a single-dial function with a multiple PAP ID and PAP password assignment/reassignment function. This function (the assignment/reassignment) requires that all user (client) 110 authentication for all ISPs 102 happens at the access service 106 (i.e., all authentication for all ISPs 102 is centralized) or at a centrally located database point. Thus, this function works with multiple ISPs 102 when each allows user authentication to take place at a centrally located server independent of each ISP's 102 own user authentication server. For example, an ISP 102 that has its own Authentication Server, and who resells the underlying ISPs modem access to a user 110, may support this function by allowing a user 110 to dial and connect using an "Initial Access PAP ID and PAP password", then assigning a unique session PAP ID and PAP password and "relogging" into the Authentication server without disconnecting the user 110. This eliminates the time that would otherwise be required to disconnect and re-dial using a newly assigned PAP ID and PAP password.

The client dispatch application 200 also functions to provide users 110 with network identity anonymity. That is, the architecture of the client dispatch application 200 provides anonymity for users 110 during access to the network 100 as IDs and passwords (such IDs and passwords would include PAP IDs and PAP passwords, Email IDs and Email passwords, NEWS IDs and NEWS passwords, FTP and Web Space IDs and passwords, and custom network application IDs and passwords) can be dynamically reassigned for a given user 110, a given system, a given group of users, a given group of systems, or any combination thereof. Thus, if a user 110 has three computer systems (A_Computer, B_Computer, and C_Computer) each requires a unique user/system identification which is generated during installation and registration and stored in the client's network services database 206 and/or the user database 210. This unique user/system identification allows the access service 106 to maintain unique and independent IDs and passwords for the user/system pair. Thus, when a user 110 connects the A_Computer to the network, unique IDs and passwords which may be distinctly different from the B_Computer and C_Computer's IDs and passwords (stored in the network services database 206 and/or the user database 210) may be used to transparently log the user 110 into such things as the network, Email, FTP/Web Space, NEWS groups, Bulletin Boards, or any other application requiring login identification and password. Thus, the architecture supports single life IDs and/or passwords for all network and application logins.

Figure 9:
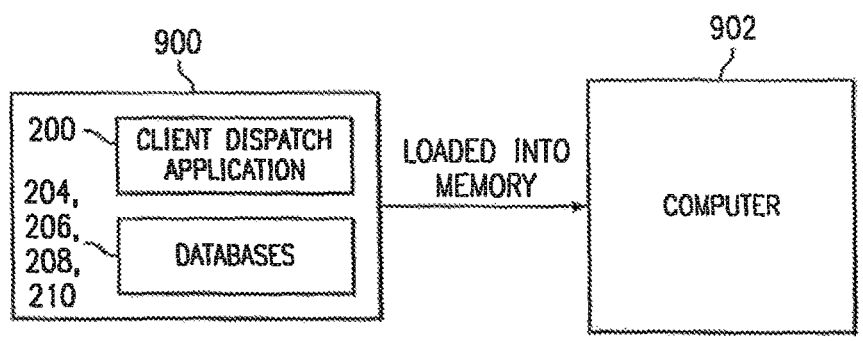
FIG. 9 is a block diagram of a storage medium comprising the client dispatch application for causing a computer to function in accordance with the present invention.

Now referring to FIG. 9, there is illustrated a block diagram of a storage medium 900 and a computer 902. The storage medium 900 includes client dispatch application 200 (computer program) and may also include the databases 204, 206, 208, 210. The computer 902 also includes a means (not shown) for reading or downloading the client dispatch application 200 (computer program) into the computer 902 to cause the computer 902 to perform one or more steps in accordance with the principles of the present invention. As will be appreciated, the storage medium 900 may include a floppy or hard disk, magnetic or optical taps; or any other data storage medium known presently or developed in the future for storing a computer program, such as the client dispatch application 200 of the present invention.

As will be realized by those skilled in the art of email (electronic mail) sent between parties on a network, email is typically held in a post office box type storage facility at the recipient's ISP 102 until retrieved by the recipient. However the ISP 102 typically keeps a copy of the email for a period of time after receipt thereof for various purposes. Many people have the technical capability to access and read these stored messages at the ISP 102. Even where the message body is encrypted, considerable information may be gleaned over a period of time by keeping track of who is sending messages to whom, the frequency of messages to given parties and data gleaned from the subject matter portion of the header.

The structure of the present invention combined with an email program, software plug-in for a standard email program or browser lends itself to a method of minimizing the possibility of unauthorized gleaning of information from email and further minimizes the possibility of spamming where spamming is defined as the sending of large amounts of email to a given recipient for harassment like purposes.

One way to minimize the gleaning of information is to send all mail through a third party to recipients. The third party acts as a trusted banker or broker. Such an operation is shown diagrammatically in FIG. 10 where the sender sends the email to a Broker. The broker repackages email as deemed appropriate by agreement with the sender and/or the recipient and sends it on its way. The simplest form is to merely place the entire original message including header information in message body of the email and send the package to the recipient with the recipient also listed as the sender and placing an innocuous subject in the visible header.

A next level of security is for either the sender or the broker or both to encrypt the package sent by that party to the next party. This could result in double encryption of the message body. Similar plug-in software comprising part of the recipient's email program, software plug-in for a standard email program or browser may be used to decipher the received package and the original email would then be recreated for reading by the recipient. The deciphering may be accomplished by keys transmitted by the pinger entity to the recipient's software. As part of this next level of security, the email sent to the broker or third party in a preferred embodiment of this invention has the TO and FROM portions of the visible header listing the broker, has the subject changed to innocuous data and the entire original message encrypted as shown in the drawing.

FIG. 11 presents the above process in a slightly different format where a row labeled 1010 illustrates the original message composed by the sender. Either the sender of the plug-in software may then provide a first level of encryption to the data as shown in row 1012. Transparent to the user 110, the plug-in software then repackages the original message by encrypting the entire message and generating a new header with the third party (here the third party is listed as NetSafe) listed as both the sender and the recipient. The email sent to the broker is labeled 1014. Since the broker is in contact with the data bases in the plug-in software via the pinger entity, the broker may decipher to second layer of encryption to determine the destination address. The broker may then re-encrypt and send the email 1018 if the recipient is also a client of that broker and/or has similar plug-in software in contact with a network pinger. Otherwise, the originally composed, and possibly encrypted, message is sent to the recipient as shown by the labeled message 1020.

Figure 12:
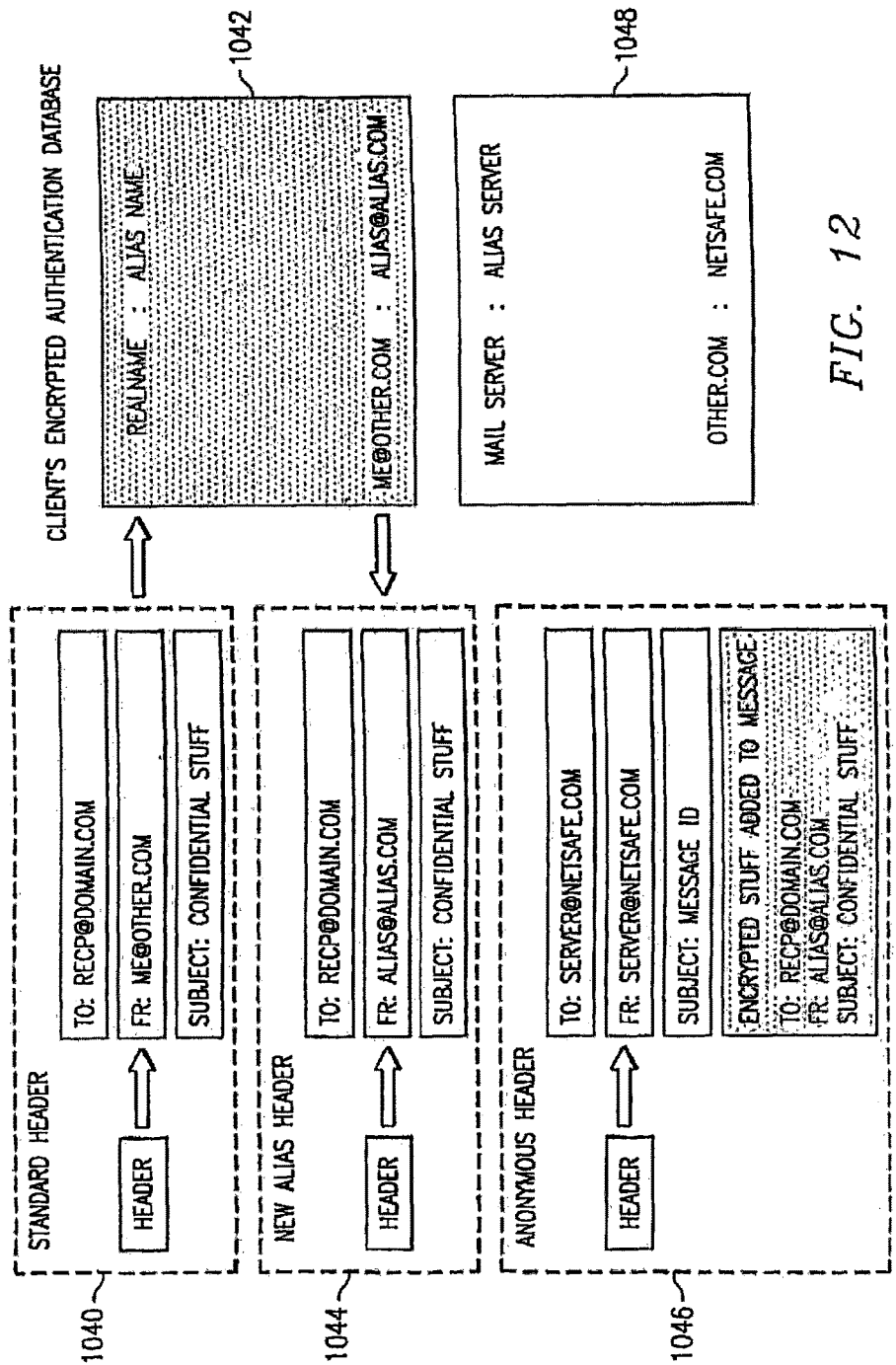
FIG. 12 shows details of sender plug-in software process for email transmission that is more secure than that shown in FIG. 11.

There may be times that the sender of email may not want the recipient to know the sender's true identity or even the network service provider of the sender. Alternatively, the sender may wish to use different aliases or names for different classes of email contacts so that the sender may quickly sort incoming mail into a set of priority stacks. Further the recipient of email in a system using the present invention may have similar requirements. FIG. 12 illustrates a second order anonymity header process for email transmission.

In this figure a block 1040 represents a standard header of email composed by the sender. When the sender has completed the email and posts it, the sender's email program, software plug-in for a standard email program or browser plug-in intercepts the email and checks the appropriate database. It is determined in block 1042 that for identity "me@ other.com" the address "alias@alias.com" should be used. The plug-in software thus creates a new header in substitution for the one composed by the sender and encrypts the entire message including the altered header as shown in the lower portion of block 1046. The software then consults the database represented by block 1048 and determines that the most recent data received from the pinger entity suggests that the network service provider to be used for "other.com" in this instance should be "netsafe.com". Accordingly, a new anonymous header is prepared in accordance with that shown in block 1046 before the message is forwarded to a third party for retransmission to the recipient.

Figure 13:
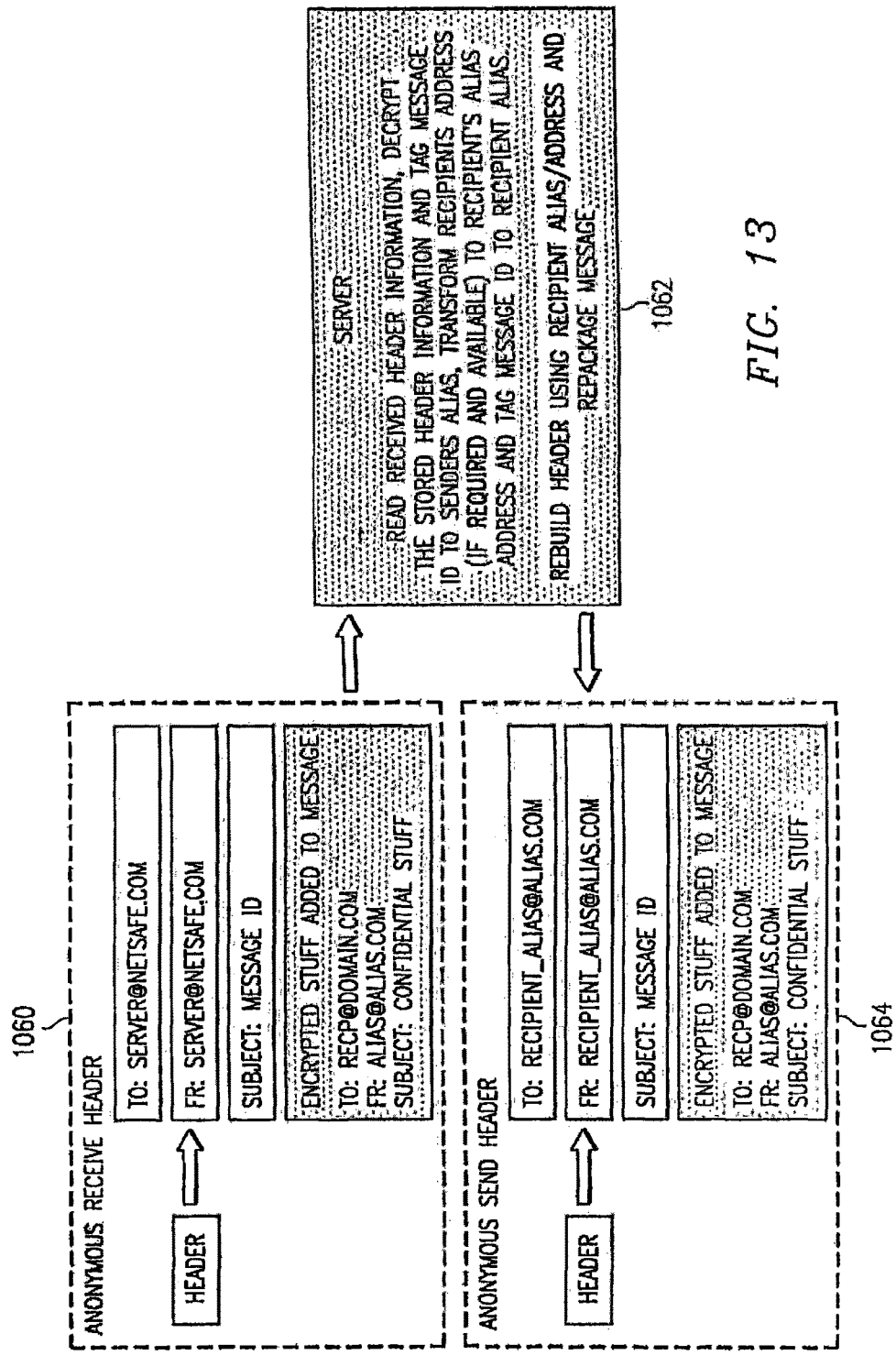
FIG. 13 shows details of the process of FIG. 12 at a third party site.

As shown in FIG. 13, the third party or broker receives the email as represented by block 1060 where 1060 is identical to block 1046. The software in the server of the third party, as set forth in block 1062, decrypts the stored header information after noting the form of the visible header information. It is able to do so because the pinger entity that determines the encryption code to be used in the senders encryption process and provides the senders database with the third party to be used, also informs the third party the encryption code to be used for deciphering. This code may be part of the visible message id or may be inserted in the server database of that specific third party. If the recipient has signed up for anonymity service, the server will retrieve from its database a presently assigned alias for the recipient. Whether or not an alias is used for the recipient, the third party server will rebuild the header using an address for the recipient in both the TO and FROM portions of the visible header as shown in block 1064.

Figure 14:
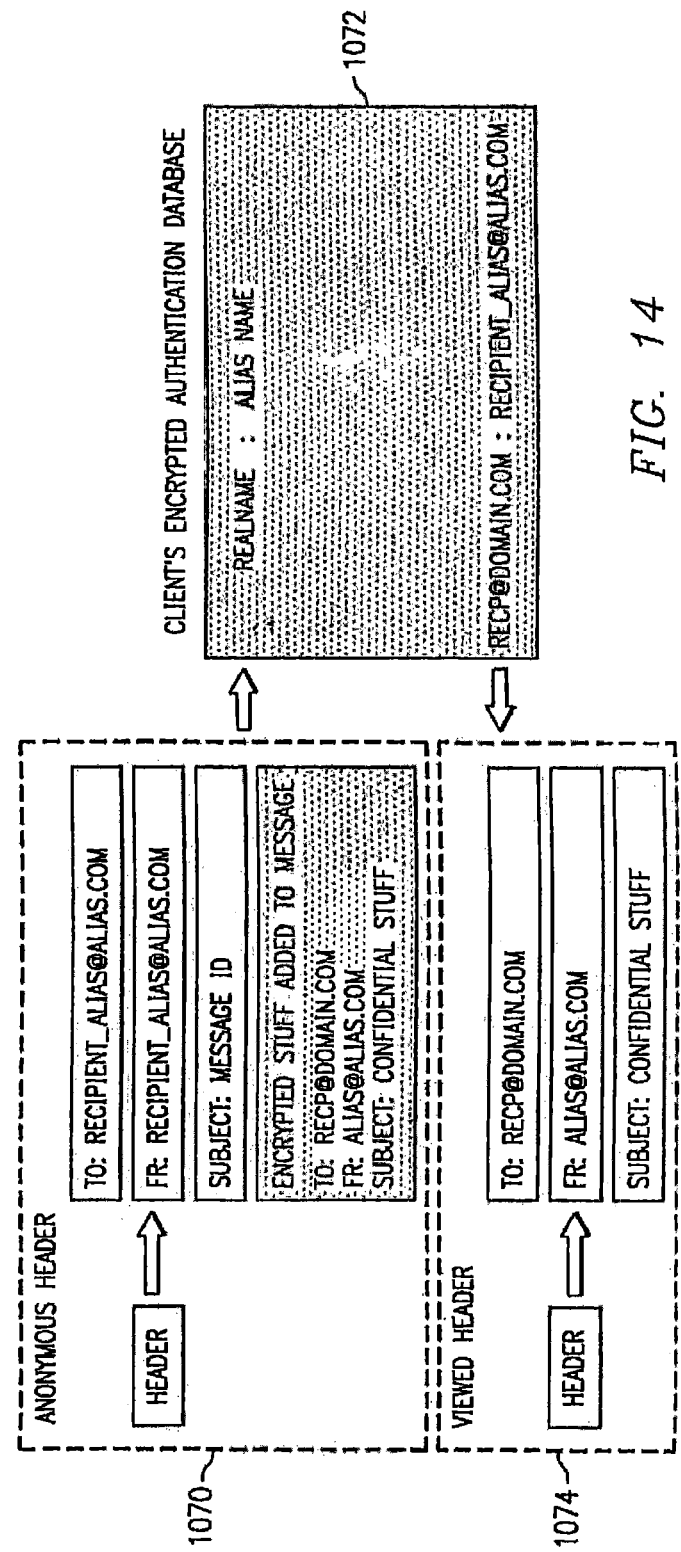
FIG. 14 shows details of the process of FIG. 12 at a recipient site.

FIG. 14 presents a block 1070 representing a received email as retrieved from the server storing email for alias-.com. This message is identical to the previously designated block 1064. The recipient's software checks the database and in accordance with block 1072 deciphers the message and creates the viewable header set forth in block 1074.

Figure 15:
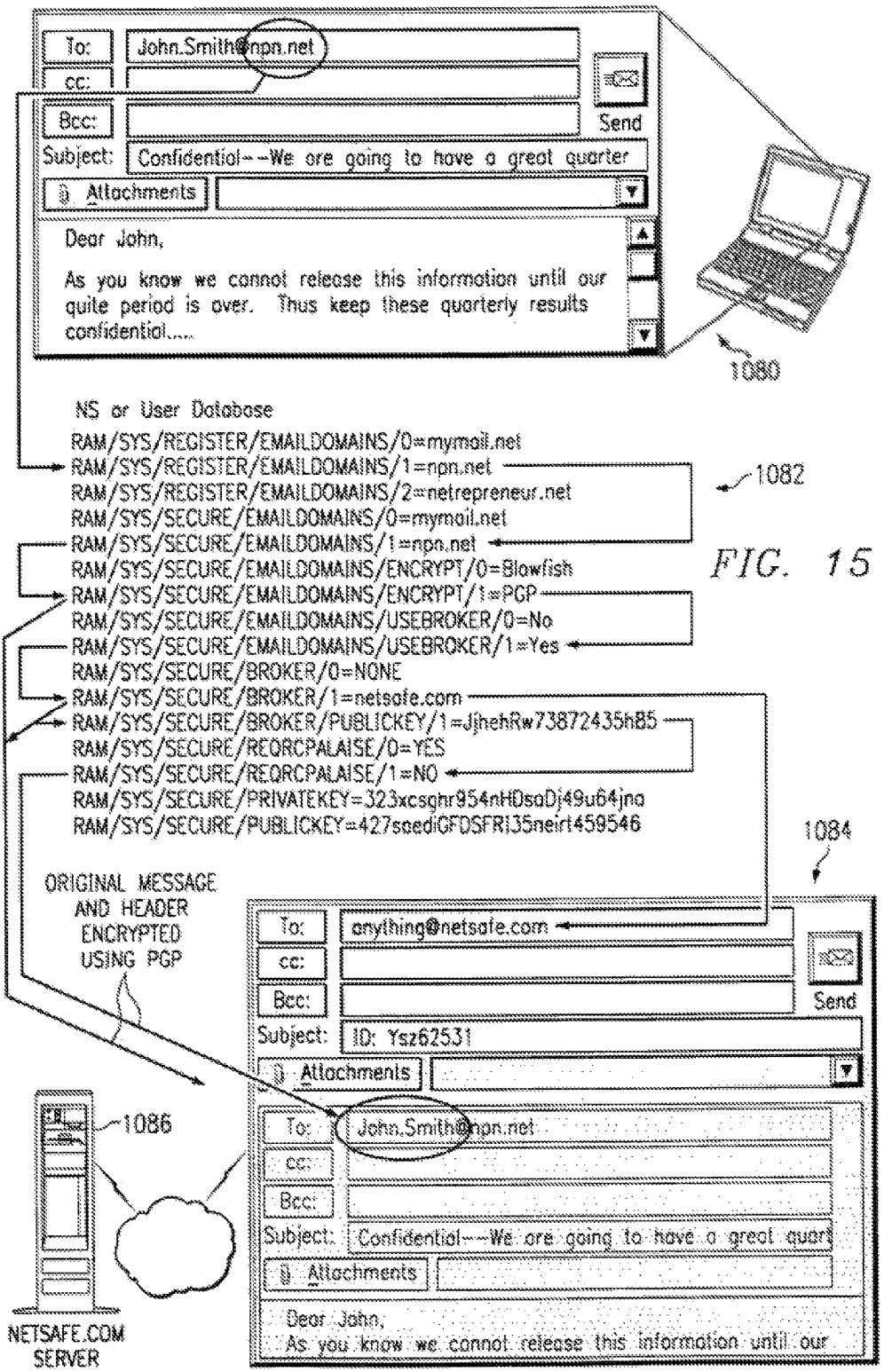
FIG. 15 shows the process of FIG. 12 as applied to a changeable internal database.

FIG. 15 shows a sender composed message designated as 1080 and a partial representation of an Internet device database such as a sender computer stored database 1082 along with a revised message 1084 wherein block 1084 corresponds with previously designated block 1046 in FIG. 12. The software checks the database and notes the subscript 1 for the server listed as "npn.net" in the registered email domain portion of the database. The same subscript is checked under the SECURE/EMAILDOMAIN portion to determine whether or not to encrypt the message, the encryption code whether or not to use a third party and if so the address to be used. As may be observed by the arrow lines, for npn.net, a PGP encryption is to be used, a broker is to be used and the broker listed with a subscript "1" is "netsafe.com". Thus "netsafe.com" is inserted in the visible header of the message shown as 1084. The database also specifies the public key to be used for the encryption and deciphering processes. The NO in the third to the last line of the illustrated database 1082 provides an indication that the sender wants the recipient to be advised of the sender's name as composed on his computer. This is in contradistinction to that shown in FIG. 12 previously. When the server 1086 receives the message 1084, it will consult a database similar to that illustrated as 1082 and perform the functions set forth in FIG. 13.

The generation of software for intercepting a message, consulting a database, altering header data in accordance with the database, encrypting the entire message including the altered header and then creating a new header before sending the entire data package is well within the capability of anyone skilled in the art of network computer programming in view of the presentation in FIGS. 10-15 and the accompanying explanatory material. As will be apparent, the software will be different for each different operating system email program, software plug-in for a standard email program or browser and thus no pseudo code or detailed flow diagram has been presented herein.

Figure 16:
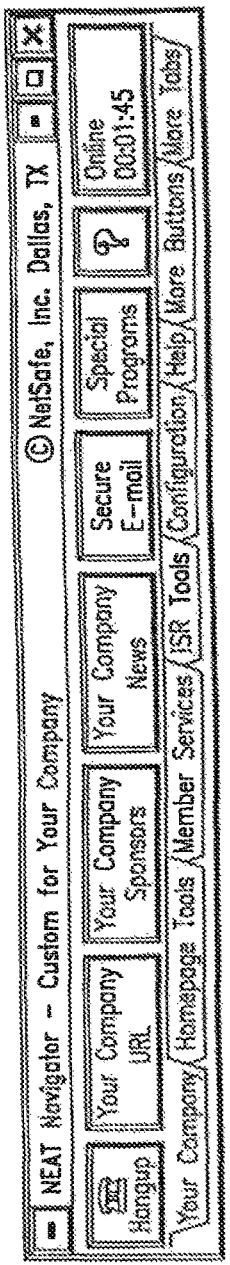
FIG. 16 illustrates an example of a customized button bar that may be generated using the MOT script in accordance with the teachings of this invention.

FIG. 16 provides a simplified example of a button bar, power bar, or tool bar that can be generated using the referenced MOT script language in combination with data retrieved from the data bases. If a client were traveling away from home and accessed the network from New York, this information would be provided to the pinger entity. If the client then logged onto a web page of an airline who was also a client of a service using the present inventive components, the web page could be programmed, since data would be available that the client's home was, for example, Dallas, Tex., to immediately bring up a list of all flights leaving New York and bound for other destinations that the client had regularly traveled to in the recent past such as Dallas. The MOT generated bar or graphic in one implementation including a moving display. Such a display may provide advertising or information like ticker tape like stock market data.

Figure 17:
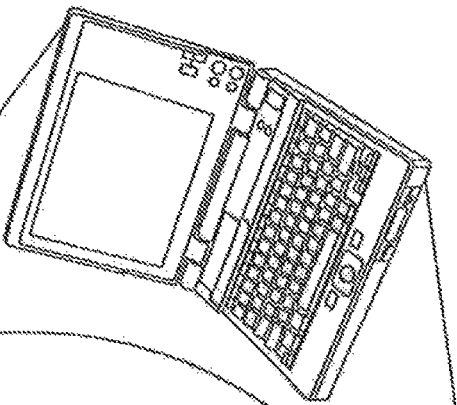
FIG. 17 summarizes the software installation process of a client users system that wishes to access the present invention.

In FIG. 17, an illustrative commentary is provided of the databases and their contents upon initial installation of software of a new client wishing to access the services of the present invention.

Figure 18:
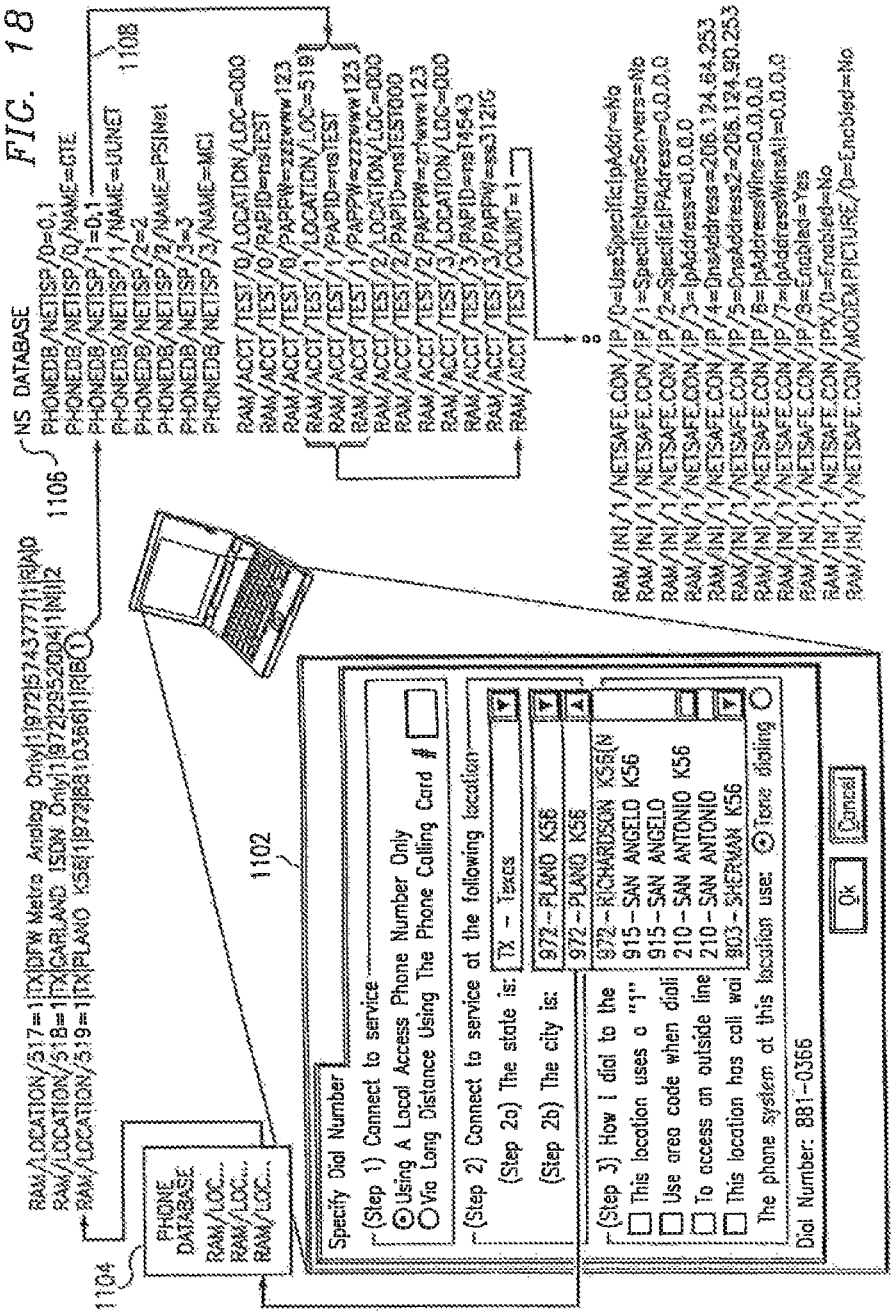
FIG. 18 provides a graphic description of the procedure used by a client in testing the installed software by selecting a location from which to access the components of the present invention.

In FIG. 18 a selection menu 1102 is representative of a display that would be presented upon a client's system for selecting a test location to initially use the software installed in FIG. 17. The phone database is represented by 1104 while the NS (network services) database is represented by 1106. When the client selects a city in Tex. such as Plano, the software will note the number "1" at the end of the data of database 1104. In the NS database a "1" is shown to refer to UUNET services. As may be observed, if Garland had been picked, a "2" would have been detected and PSINet services would be used. As shown by arrow line 1108, the software would determine that the test location number is "519", the PAPID to be used is "nsTEST" and the PAP password is "zzzwww123". Other data that may be utilized is also contained in the database.

Figure 19:
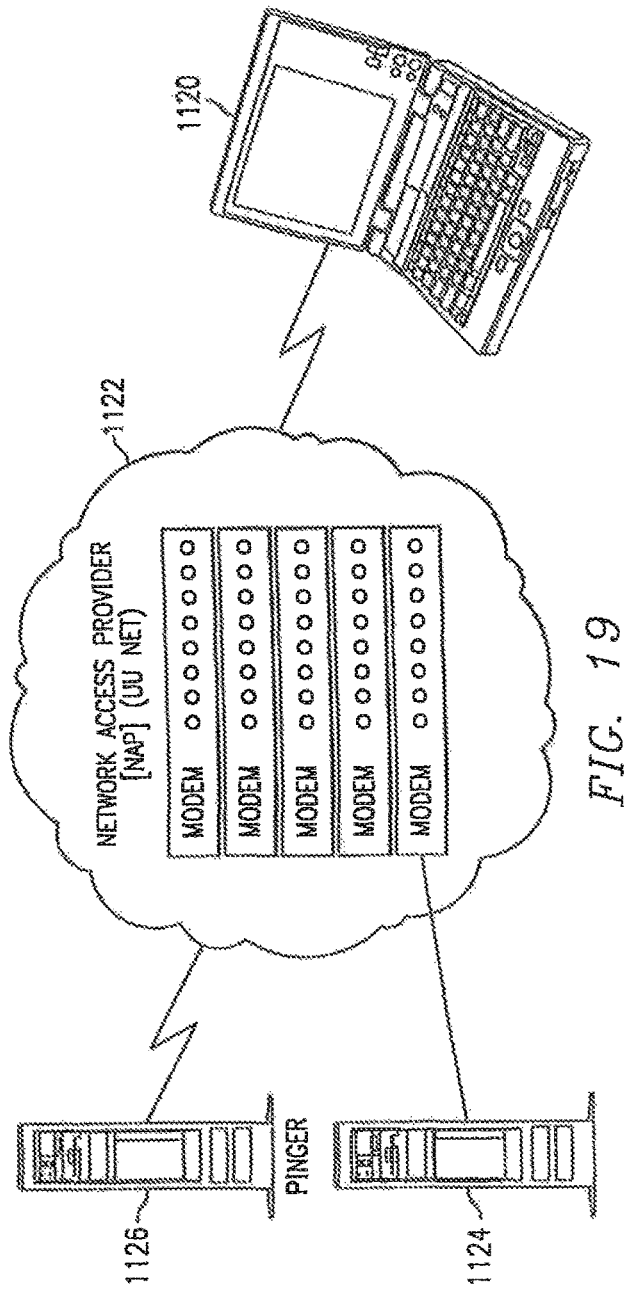
FIG. 19 further illustrates the network test and client system update procedure.

In FIG. 19 the client's computer is designated as 1120, the network as 1122, the network access provider as 1124 and the pinger entity as 1126. The test and update procedure is illustrated. The first action is for 1120 to connect through the NAP shown within network cloud 1122 to 1124 using the PAPID and PAP password in the NS database for the selected NAP. As set forth in FIG. 18, these values would be "nsTEST" and "zzzwww123". The NAP 1124 validates or authenticates the ID and password. For security reasons, the test ID and registration ID network connection, in a preferred embodiment of the invention, is limited to 90 seconds. The system 1120 initiates a full network protocol test to the pinger 1126 by sending information about the client's system (1120) and the software revision installed therein. As will be realized, the installed database includes the address of an appropriate pinger 1126. The pinger 1126, after receiving the information, performs minimal processing on the received data and sends back any update information such as DNS changes, phone number updates and the like. The pinger may then send back some static information as well as any further update information that the system 1120 may require. The client software in 1120 checks the static information received, validates a reliable connection and then processes any update information for storage in an appropriate location(s).

Figure 20:
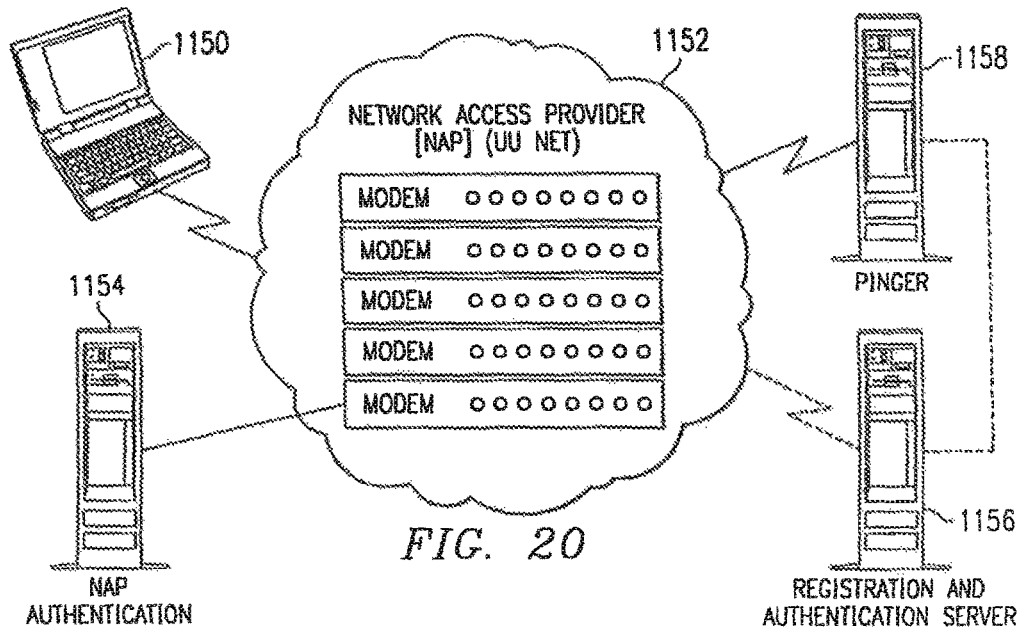
FIG. 20 illustrates the system interaction for providing client registration with the inventive system.

FIG. 20 is presented to help in the description of client registration. The client's system 1150, connects to an NAP in the network 1152 using the registration PAPID and PAP password stored in the NS database for a selected NAP as provided in the originally installed software. Such data may be found in the Appendix A NS database in the appropriate lines RAM/ACCT/REG. The authentication portion of the NAP (1154) validates the PAPID and PAP password so that the client 1150 may communicate with a pinger entity such as 1158. (Although the preferred embodiment of the invention has the client 1150 send a registration request to pinger 1158 to provide further "security by obscurity", the registration request can be made directly to a registration and authentication server such as 1156 if so desired and thus proceed directly to a later portion of this paragraph description.) When pinger 1158 receives the registration request, it returns addressing, ID and password information to client 1150. This information will normally have a single life (that is it may only be used once) since the inventive system is designed to continually change passwords and other data such as addresses. With this information, the client 1150 may now initiate a registration request to the server 1156 as referenced above. The server 1156 processes the user's supplied information and issues a unique authentication token, a temporary PAPID and PAP password and/or a permanent PAPID and PAP password in accordance with system design. In an alternate embodiment, only a unique authentication token may be issued wherein the software in client 1150 is required to obtain the PAPID and PAP password from a pinger such as 1158. This supplied user registration information is stored in an appropriate database in 1156 for later authentication purposes. It may be noted that blocks 1156 and 1158 may share the same physical hardware but may also be remotely located and be interconnected via the network.

Figure 21:
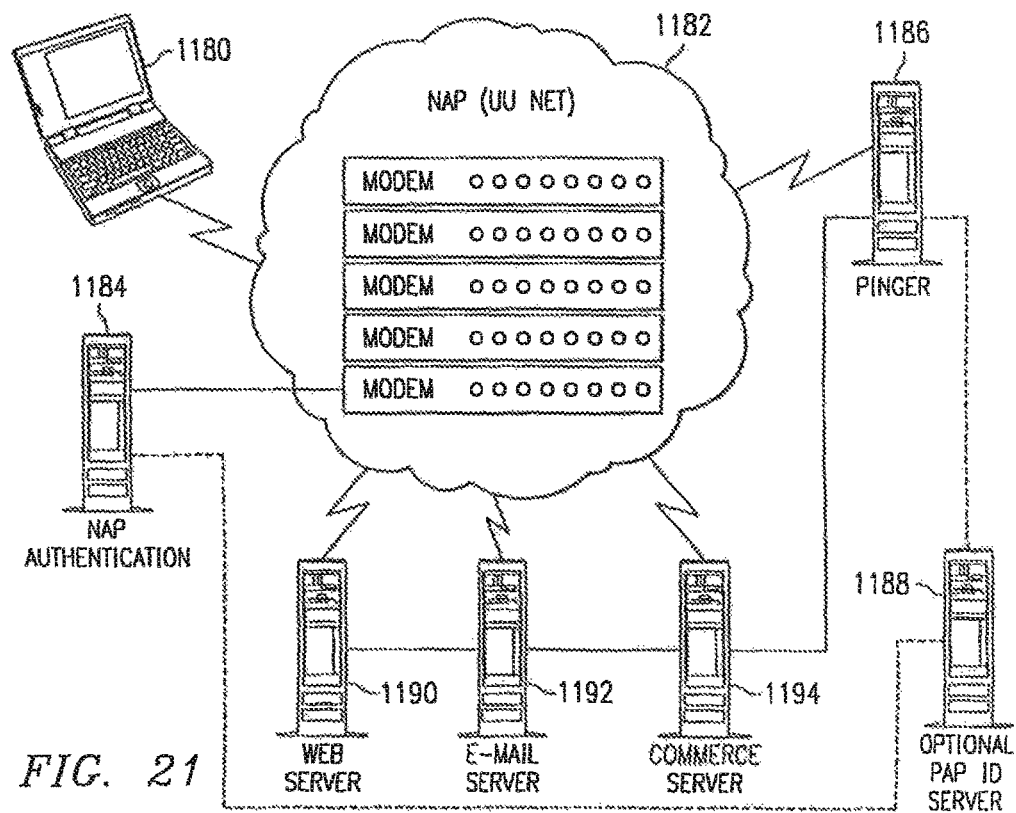
FIG. 21 provides additional illustrative material for the interaction of the client systems software and the components of the inventive system in obtaining general and anonymous access to the system.
Figure 122:
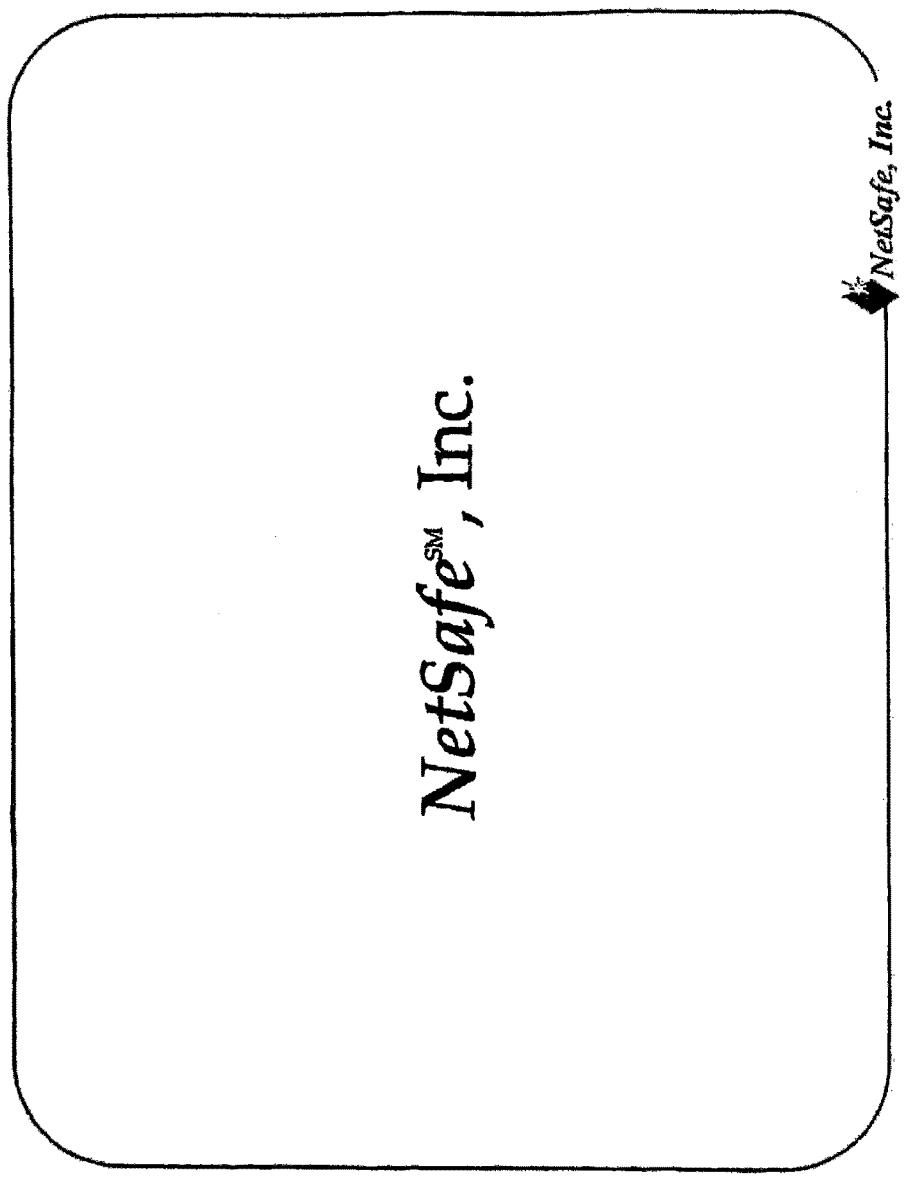
Figure 123:
Figure 124:
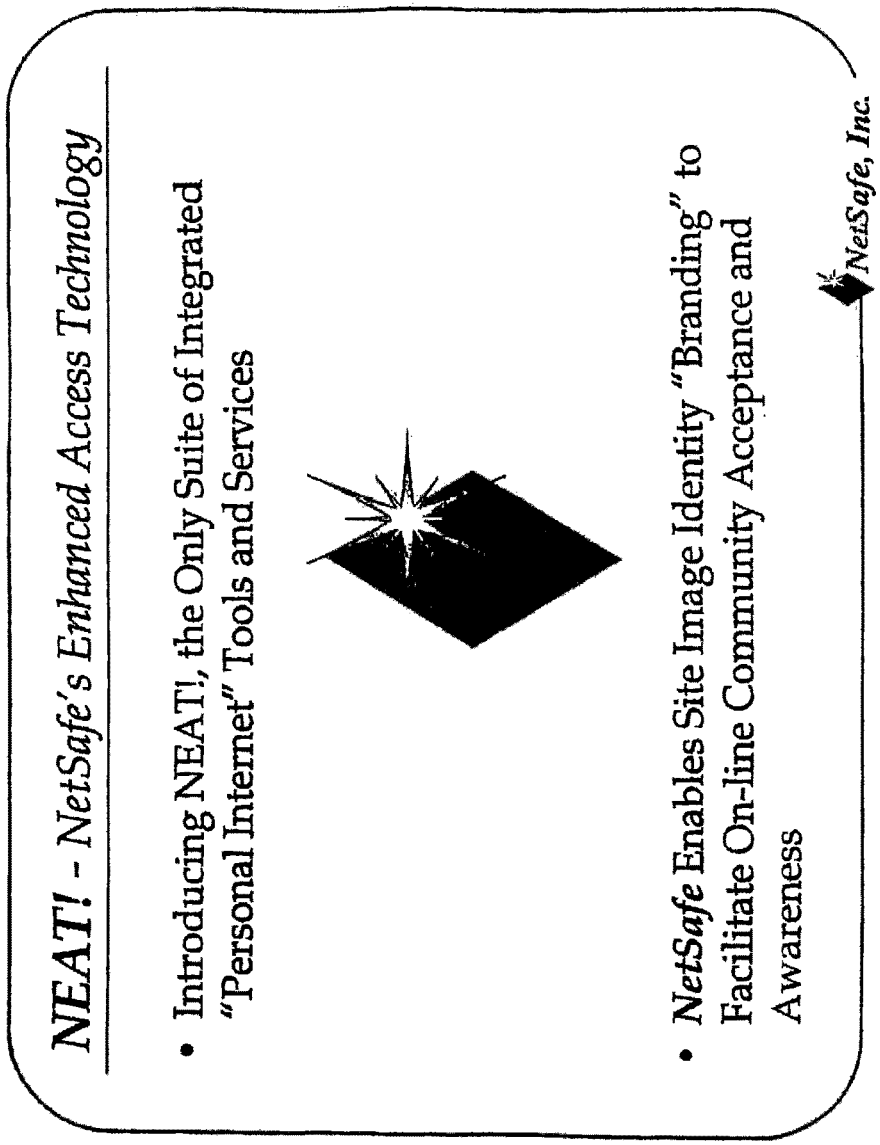
Figure 125:
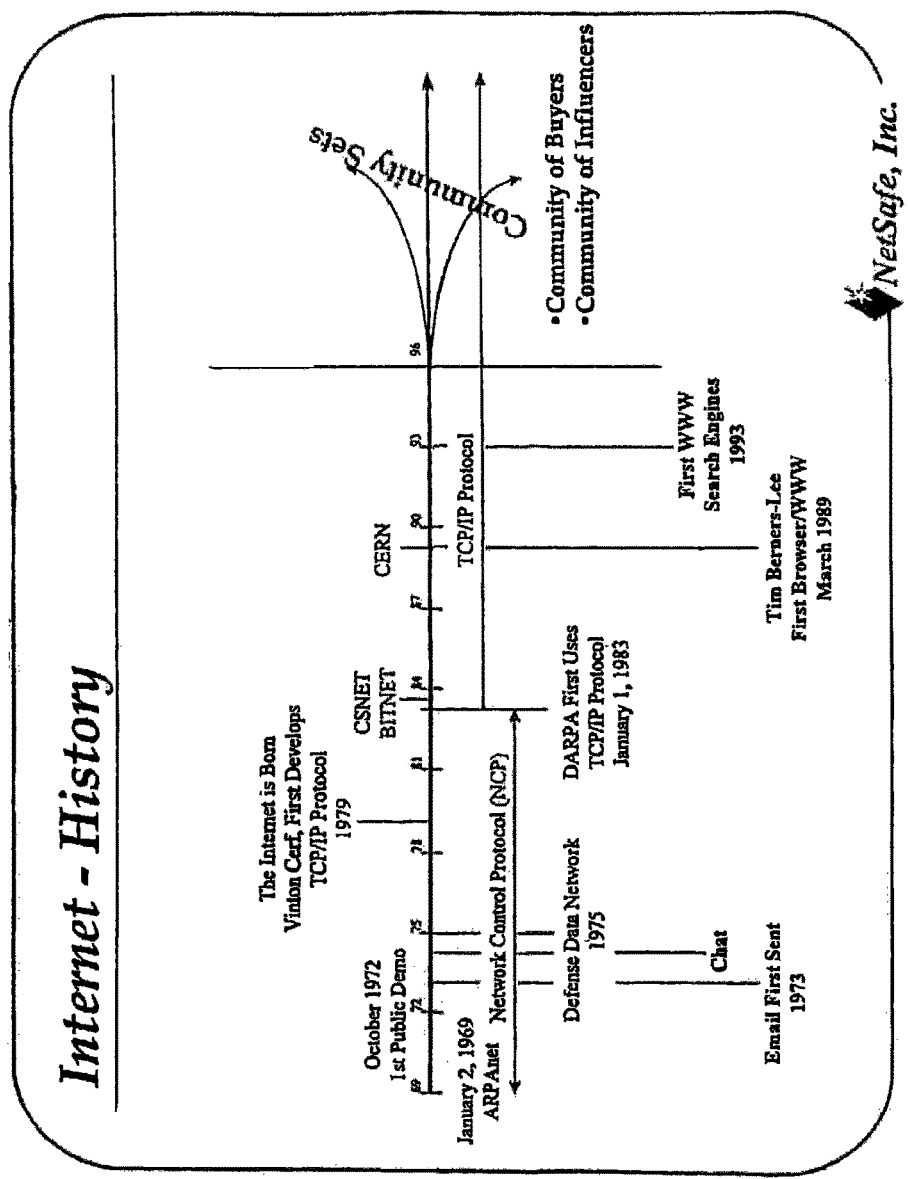
Figure 126:
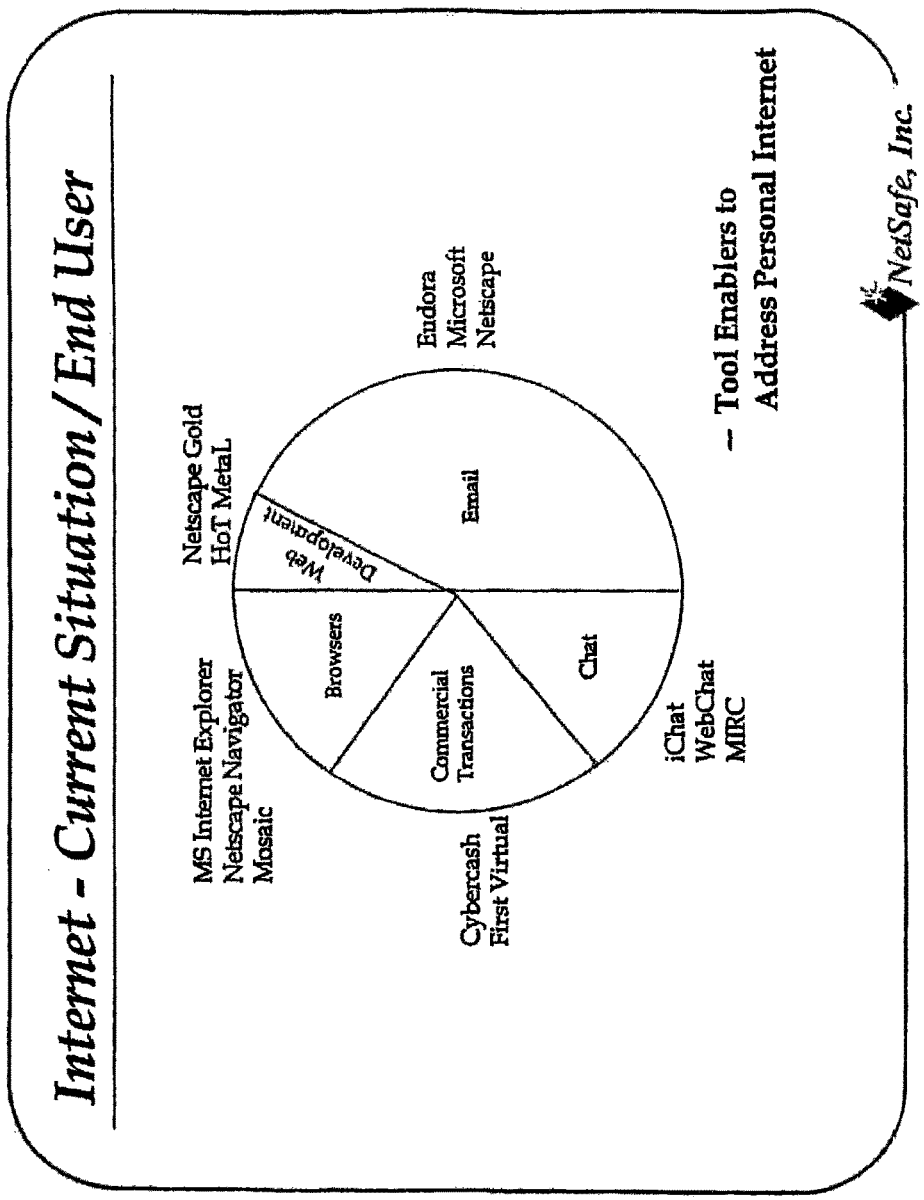
Figure 127:
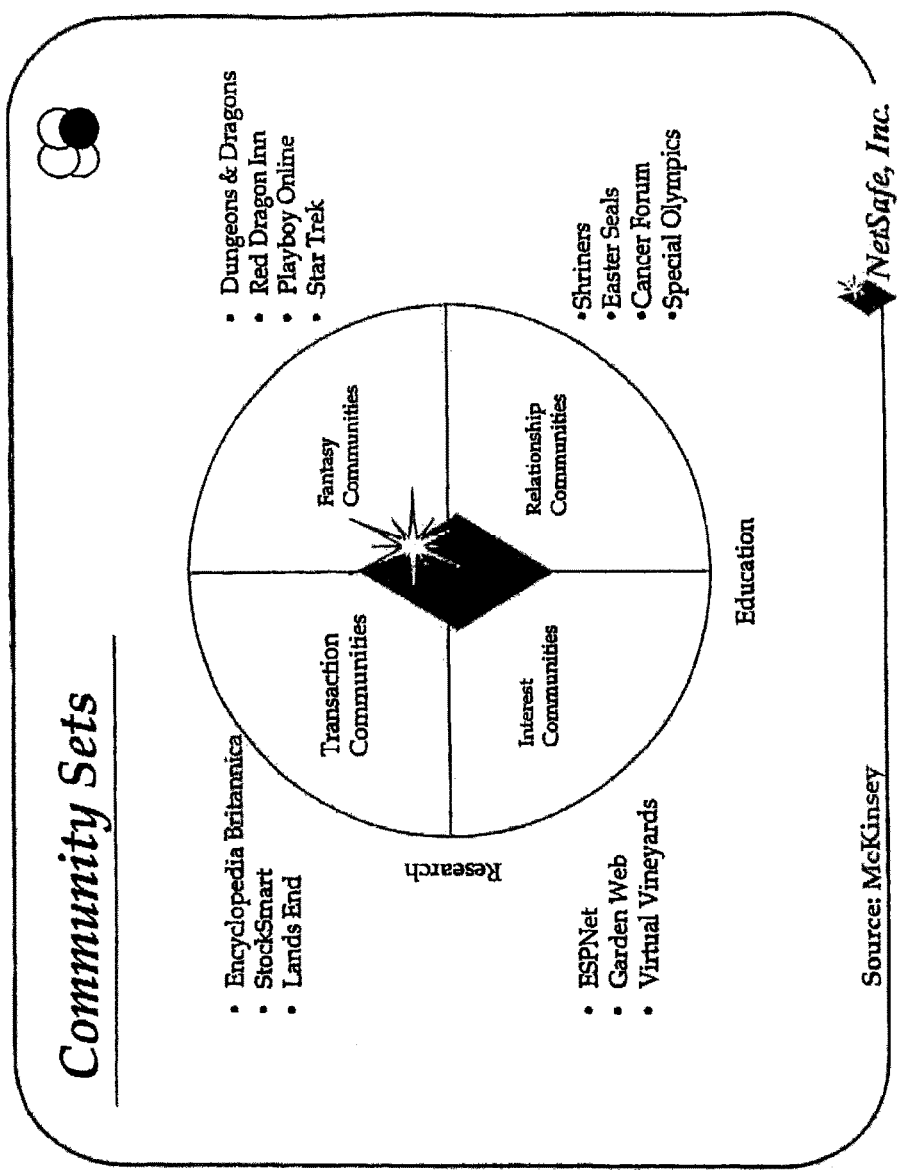
Figure 128:
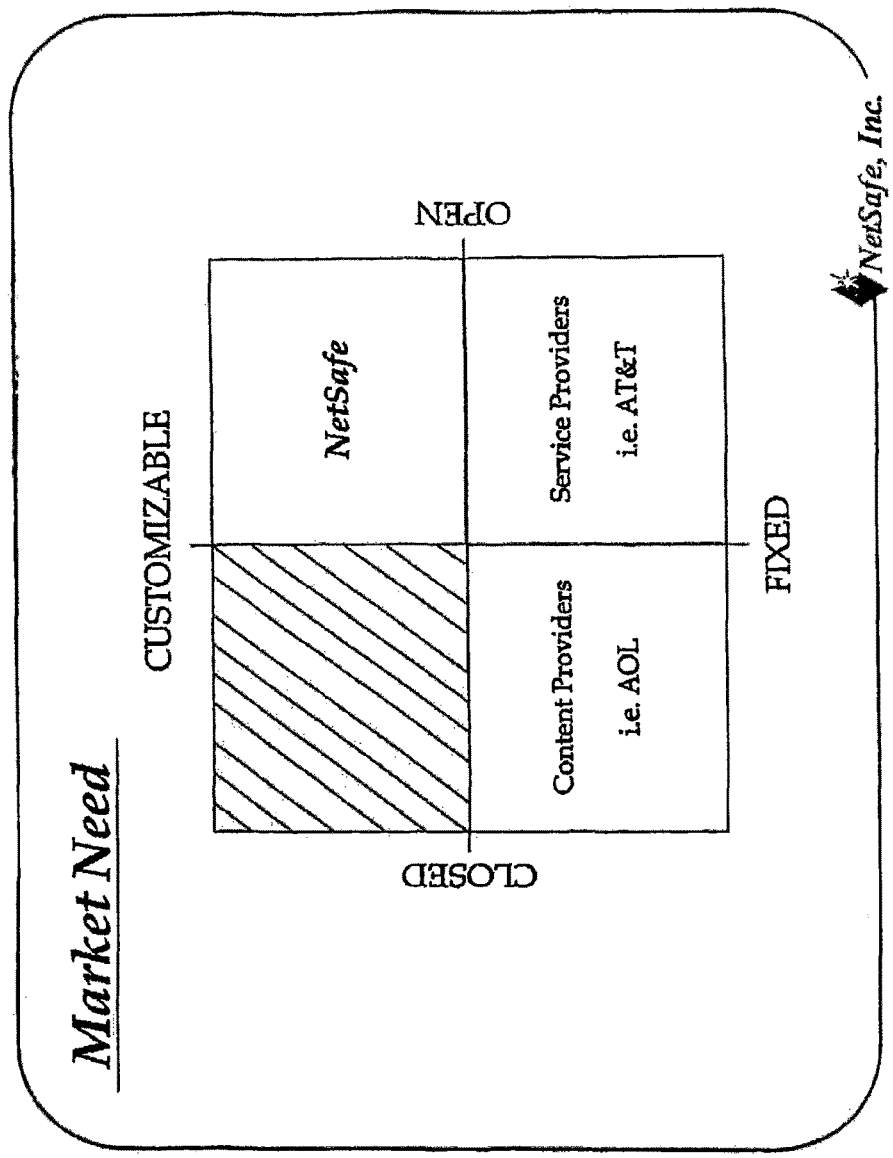
Figure 129:
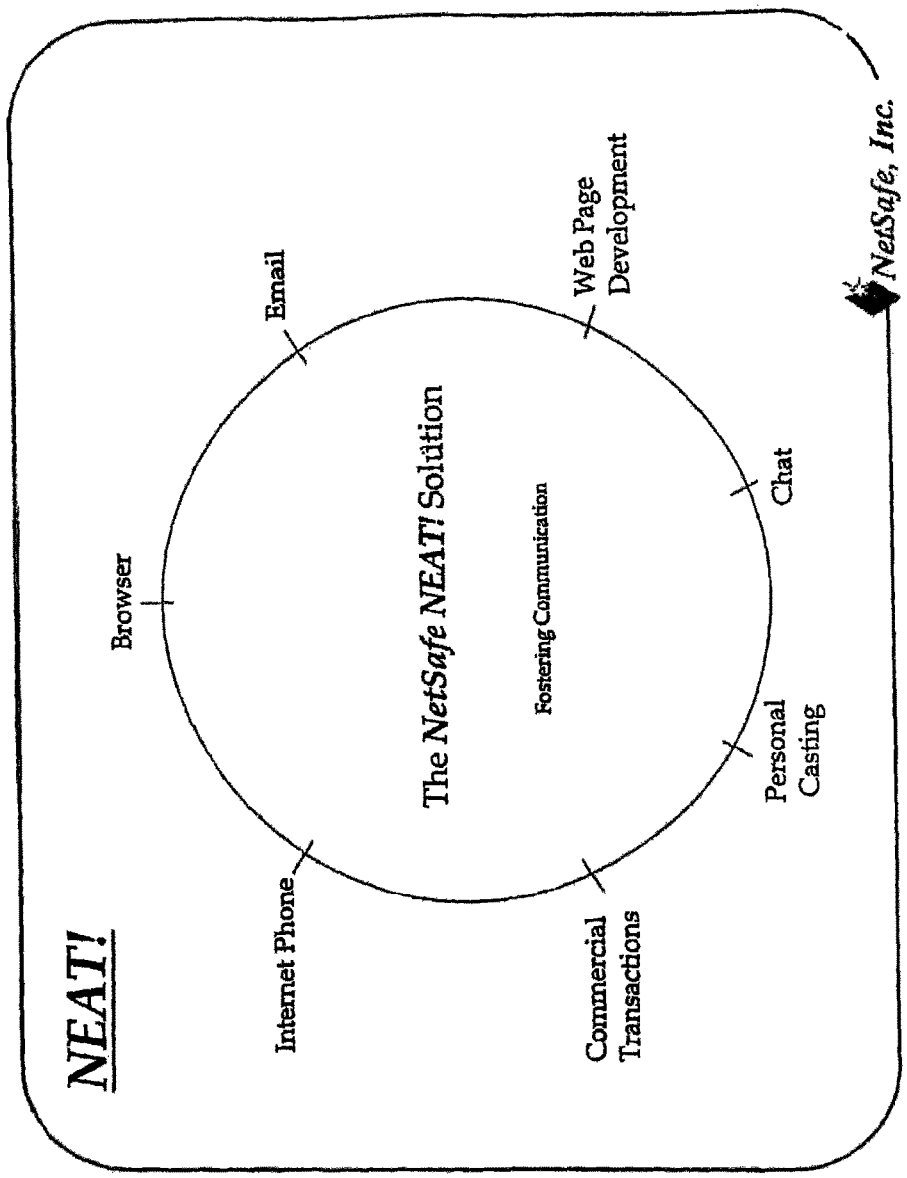
Figure 130:
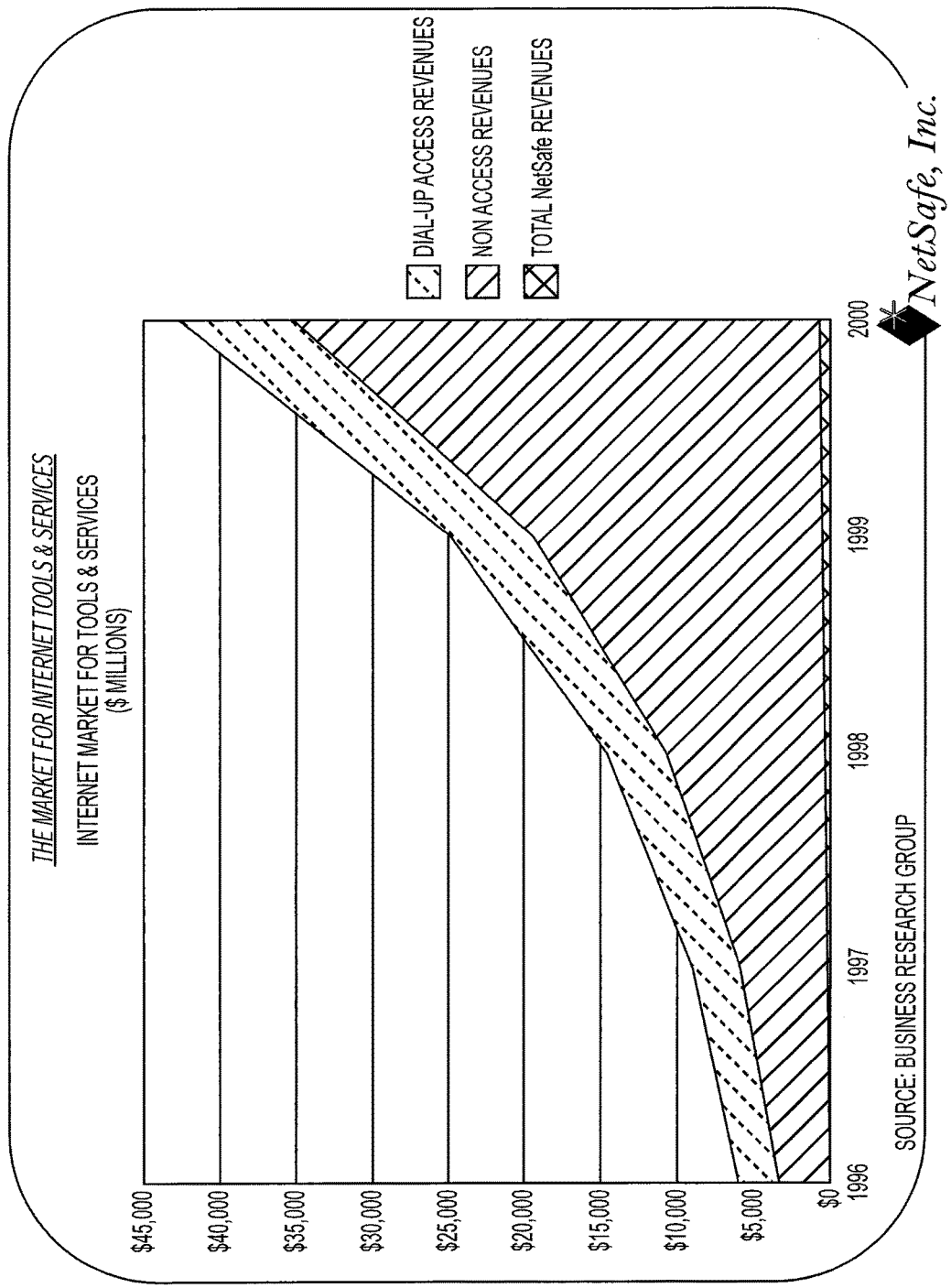
Figure 131:
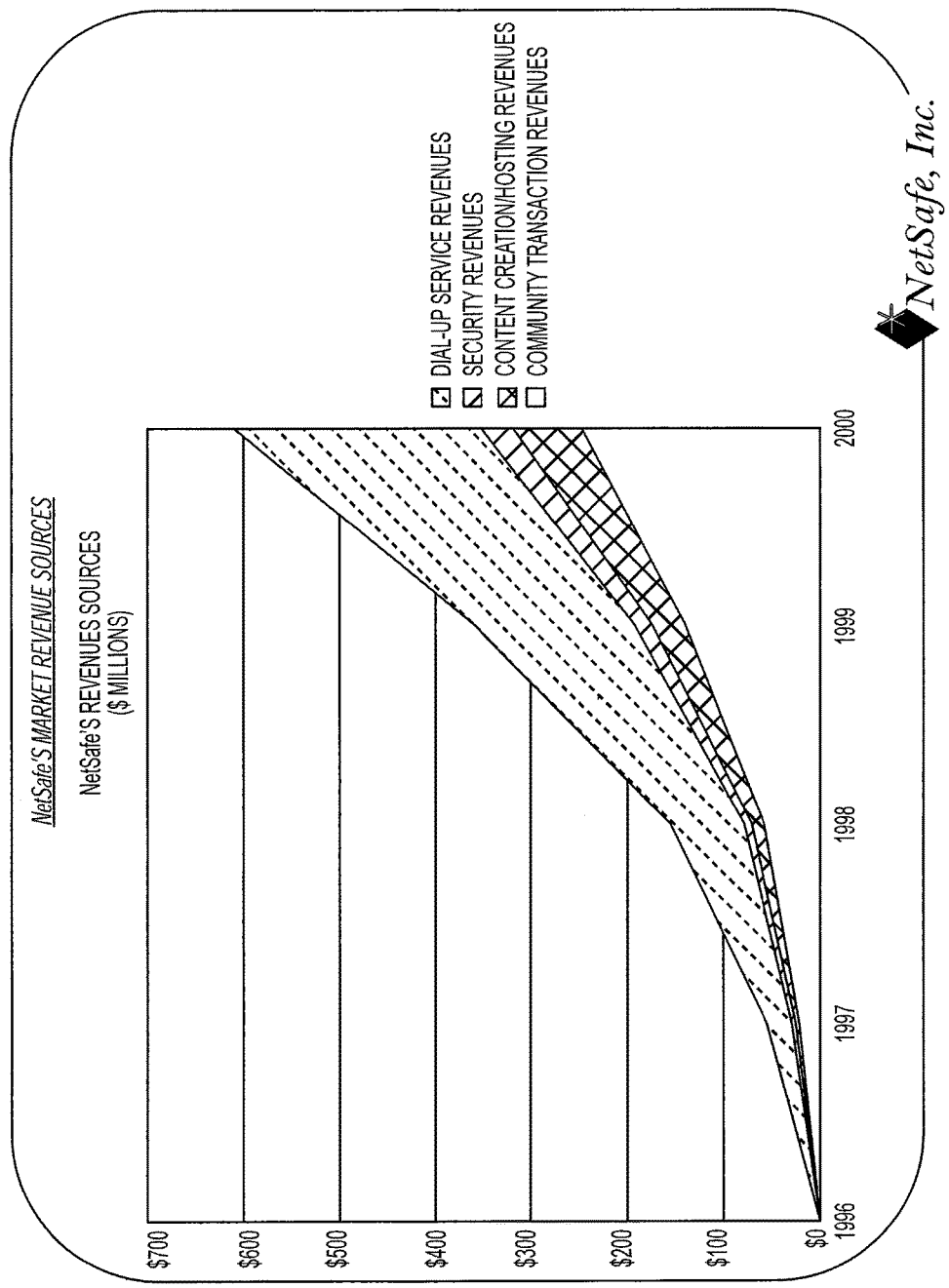
Figure 132:
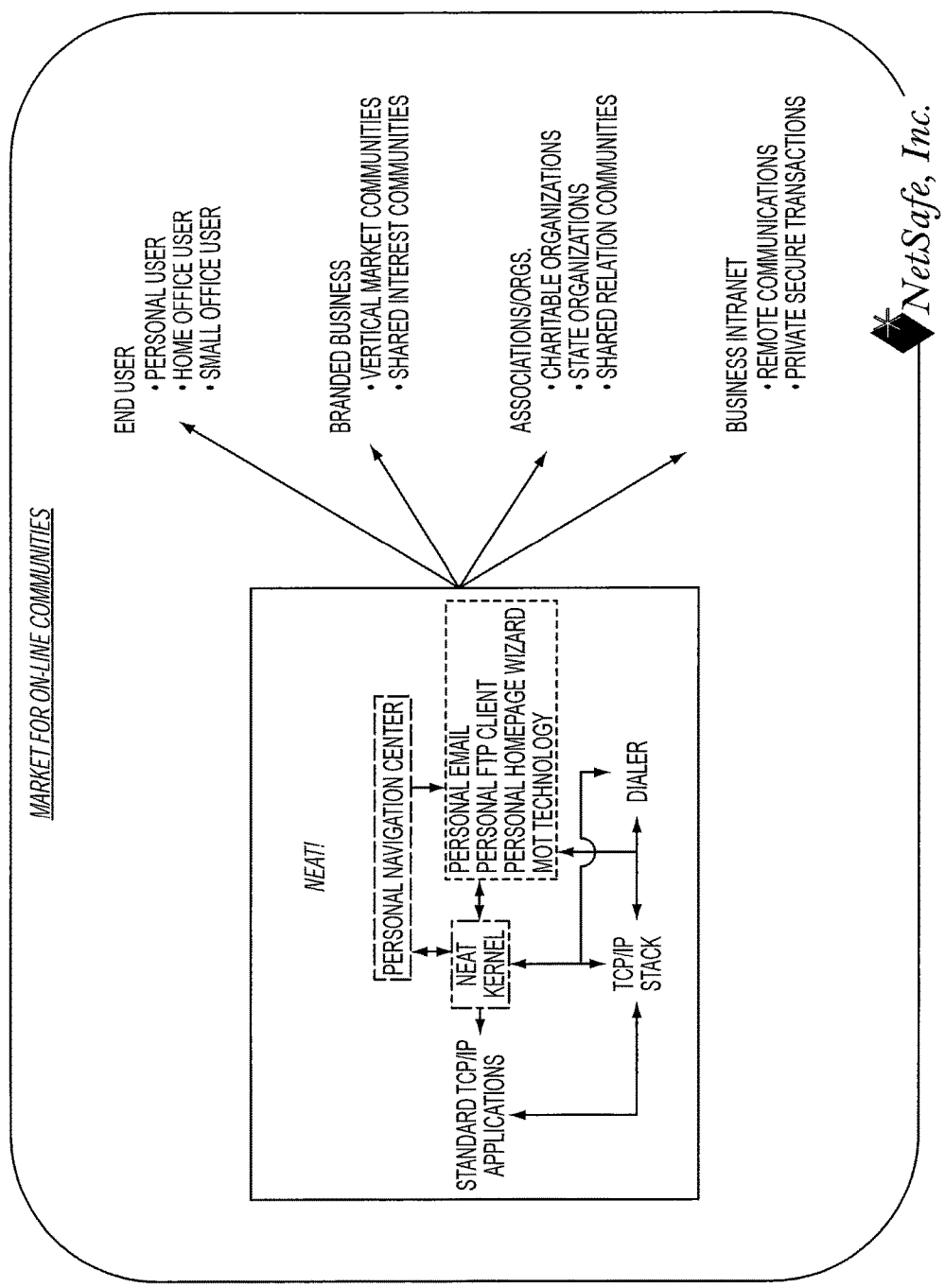
Figure 133:
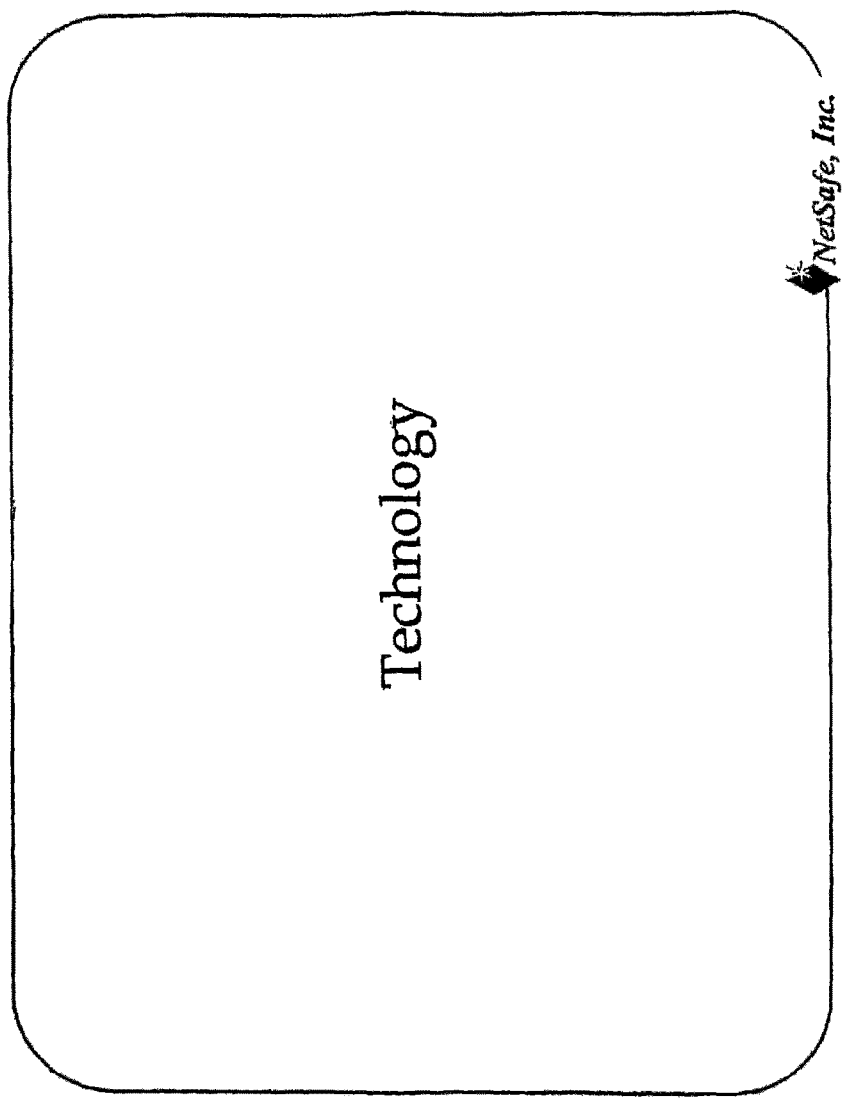
Figure 134:
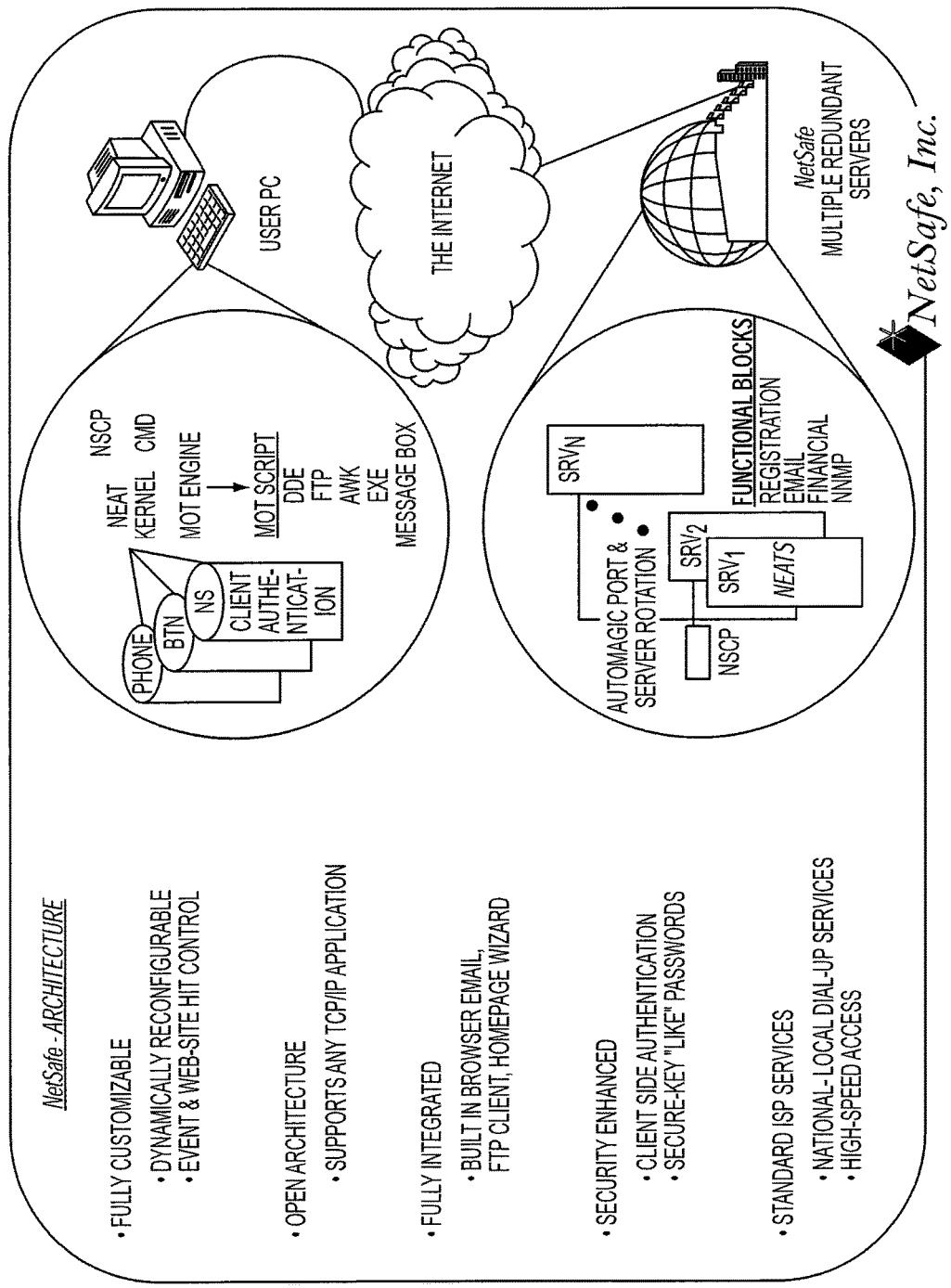
Figure 135:
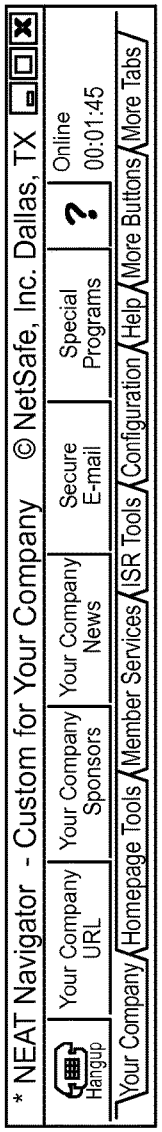
Figure 136:
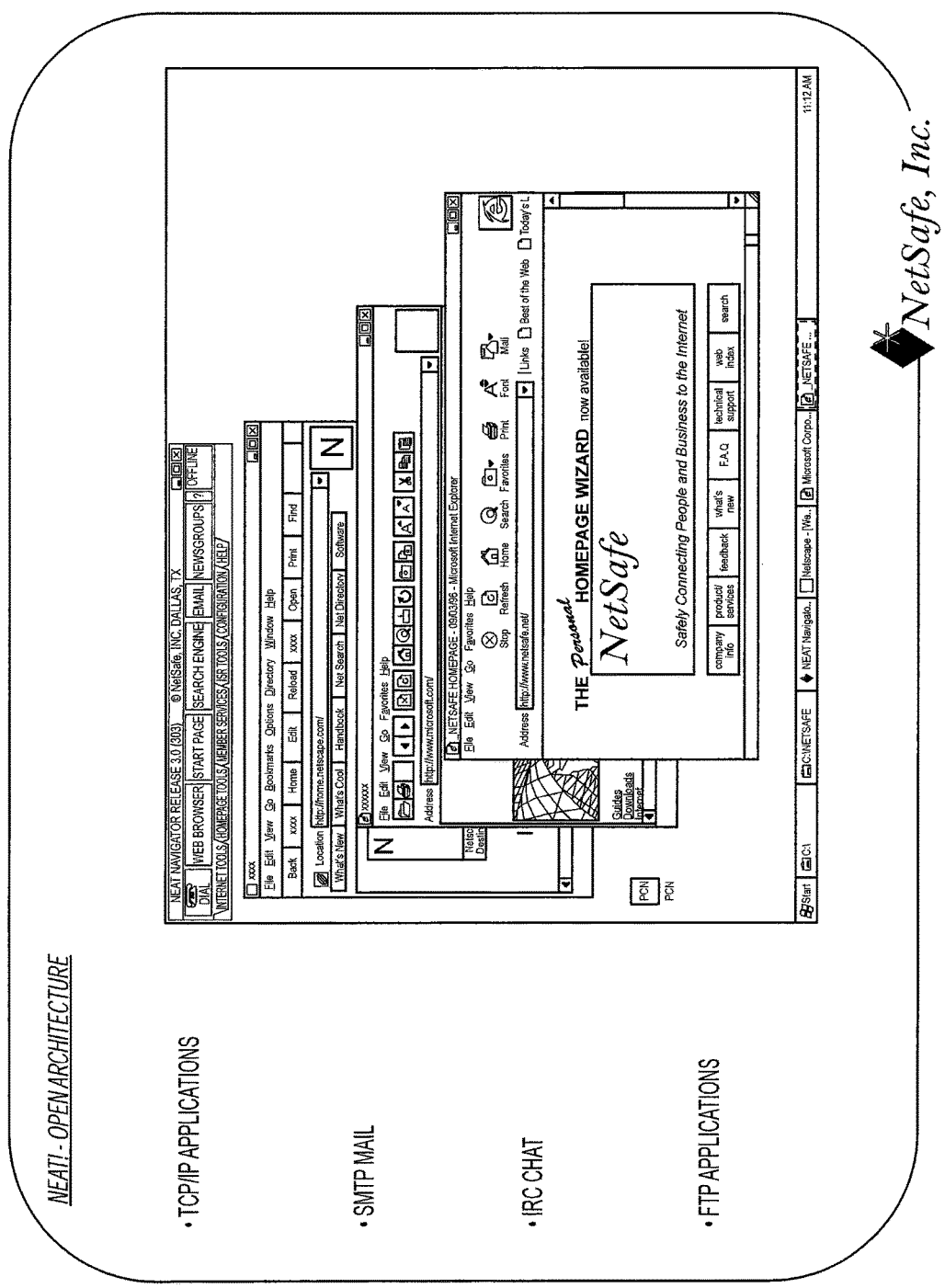
Figure 138:
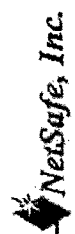
Figure 139:
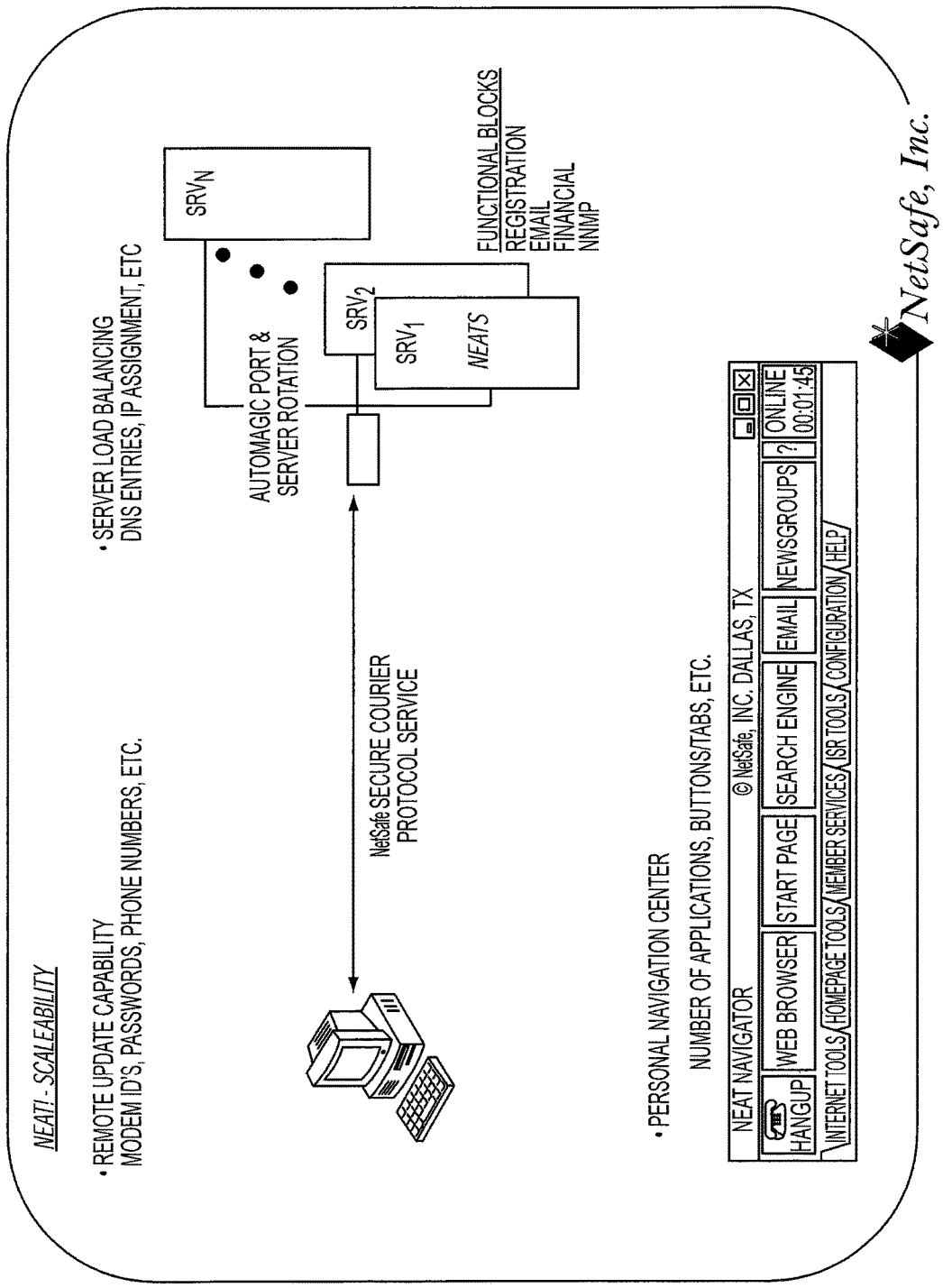
Figure 141:
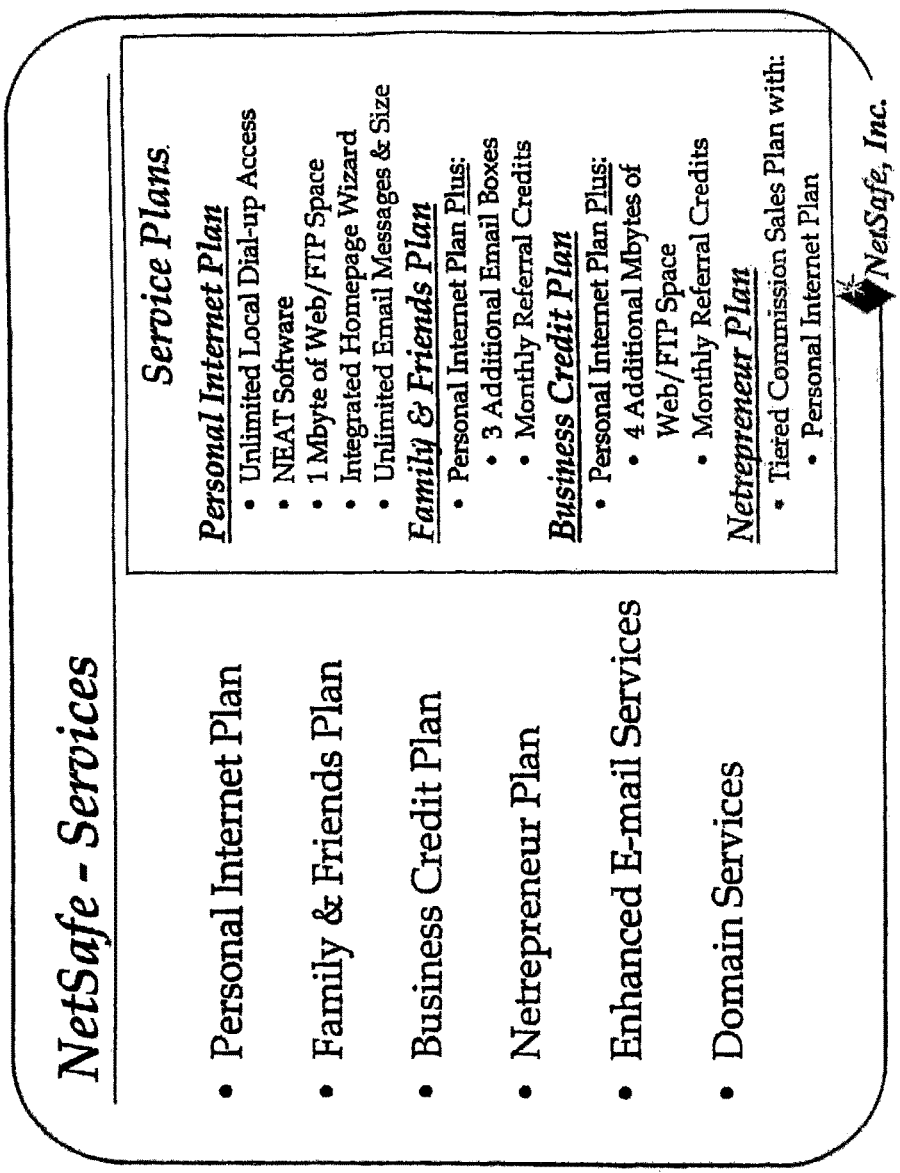
Figure 142:
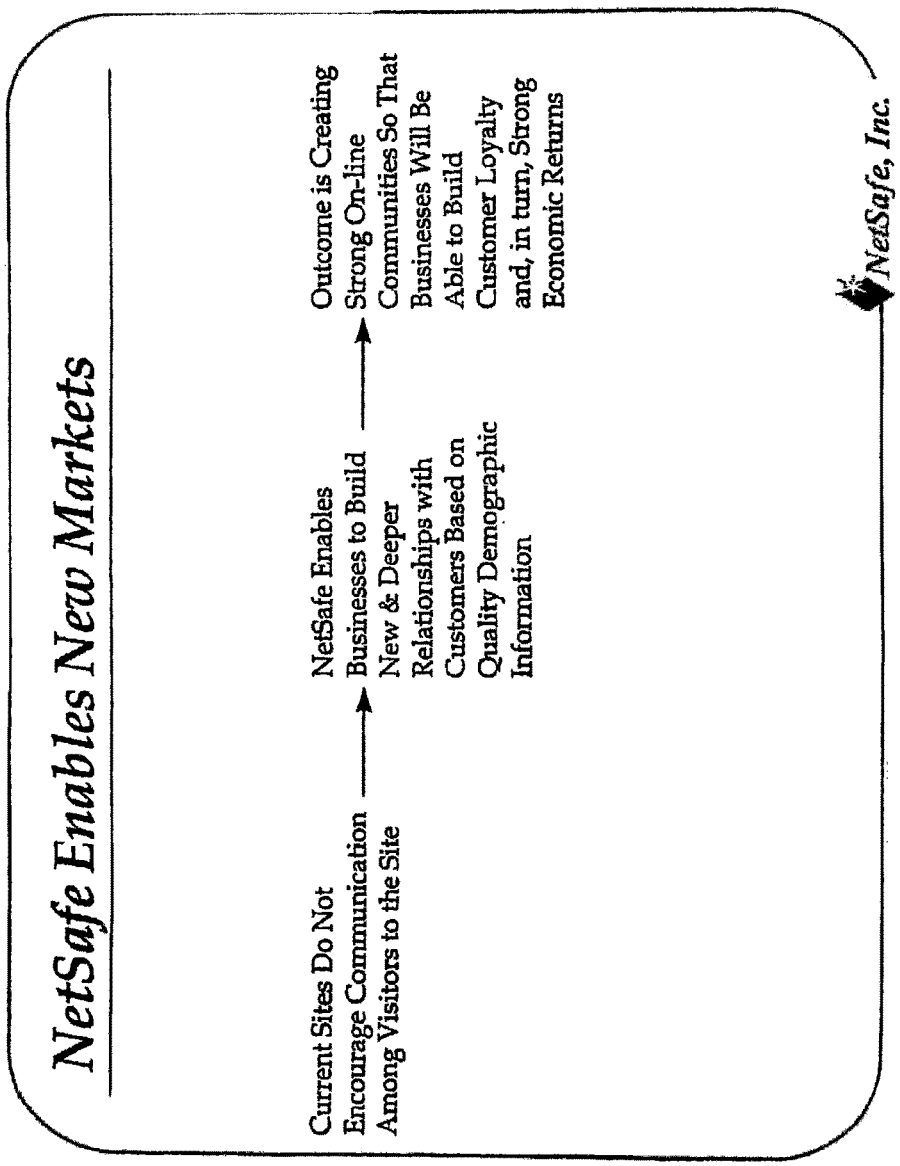

FIG. 21 is similar to FIG. 20 in having a client system 1180, a network 1182, a NAP authentication entity 1184, and a pinger entity 1186. In addition an optional PAP ID server 1188 is illustrated connected to the blocks 1184 and 1186. This connection may be through the network or direct as illustrated in the drawing. A further plurality of blocks representing at least a web server 1190, an email server 1192 and a commerce server 1194 are shown connected to the network and directly to pinger 1186. When operating in a general or anonymous access mode, the client 1180 connects to a NAP within network 1182 using a PAPID and PAP password assigned and stored in the NS database for a selected NAP. The NAP validates the ID and password via block 1184. Once connected, client 1180 initiates a "Network Presence Notification" to the appropriate pinger such as 1186. If the client 1180 is set in a selectable "Anonymous Mode" the "Network Presence Notification" will include a request for a new alias along with revised PAPID and PAP password data for use in the next network login attempt.

When the pinger 1186 receives the notification, the date and time of receipt is logged along with the client's authentication token and the network address assigned to the client 1180 by the selected NAP. The pinger 1186 returns a response which may, from time to time, include a new authentication token in addition to data requested when the client 1180 is in the "Anonymous Mode". It should be noted that the pinger entities such as 1188 may be used to facilitate "Client side Authentication" when used in conjunction with servers such as 1190, 1192 and 1194 as examples. The client 1180, or others attempting to access the system, does not have access to the information contained in any of the client databases and the client 1180 and others cannot spoof a commerce server into believing that a transaction is originating somewhere else or by someone else.

From the above discourse, it may be appreciated that the various databases residing at the access provider and each of the client's systems, along with a script language such as MOT and the two way communication between clients and an access provider, permits dynamic or constantly changeable network access and encryption parameters to minimize the possibility of unauthorized access to the network access provider or its client's communications. This is accomplished by:

1 Dynamic network login ID and password;
2 Dynamically assigned network address;
3 Dynamically assigned resource user Ids, passwords and so forth;
4 Dynamic encryption algorithm use; and
5 Dynamic encryption key generation and use.

With respect to item 1 above, since a user's network login and password change periodically transparent to the user client and they are hidden from the user so as to be not accessible by the user, network fraud and abuse may be significantly reduced. Further the dynamic assignment process allows the login access to be different from system to system. Since the physical address of a server can be changed on any random or periodic basis, Item 2 causes a significant reduction in the risk of service attacks, network lockouts and unauthorized access to data. The dynamic assigning and reassigning of email alias as occurs in accordance with Item 3 significantly reduces the risk of unauthorized viewing of a given client's email messages. The changing domain aliases minimizes the risk of denial of access service while the dynamically generated and authenticated session IDs for network commerce reduces the risk of fraud.

In addition to the above discussion and description, one or more aspects of the present invention are also described and disclosed in Appendices A, B and C.

Although the invention has been described with reference to a specific embodiment, these descriptions are not meant to be construed in a limiting sense. Various modifications of the disclosed embodiments, as well as alternative embodiments of the invention will become apparent to persons skilled in the art upon reference to the description of the invention. It should also be noted that while terms such as "network device user" may be used to describe a single client, it may also be used to describe a network of users having a common factor such as an employer. It is therefore, contemplated that the claims will cover any such modifications or embodiments that fall within the true scope of the invention.

What is claimed:

1. A method for dynamically modifying a toolbar using a remote source accessible through a network, wherein the toolbar is displayable on a user Internet device and includes one or more toolbar buttons that are defined by toolbar data stored in one or more toolbar-defining databases of the user Internet device, the toolbar data includes a plurality of toolbar button attributes associated with the one or more toolbar buttons of the toolbar, wherein at least one of the plurality of toolbar button attributes identifies a function to be performed by a specific toolbar button, the method comprising:

receiving by the remote source an initiating message from a user Internet device via the network;

establishing, by the remote source, a connection between the remote source and the user Internet device in response to the receiving;

receiving, at the remote source, information from the user Internet device associated with the toolbar data, wherein the toolbar data is stored in the one or more toolbar-defining databases of the user Internet device;

determining, by the remote source, based on the information associated with the toolbar data stored in the one or more toolbar-defining databases of the user Internet device, that the user Internet device should receive updated toolbar data; and sending, from the remote source via the network to the user Internet device, the updated toolbar data to be stored in the one or more toolbar-defining databases of the user Internet device, wherein the toolbar of the user Internet device is configured to receive the updated toolbar data, and to perform an operation that includes at least one member of a group comprising (a) and (b):

(a) updating the toolbar data to include at least one new attribute of the toolbar data to change the toolbar by adding a toolbar button to the toolbar; and (b) updating the toolbar data to modify an attribute of at least one of the one or more toolbar buttons of the toolbar, wherein the information associated with the toolbar data includes at least one member of a group comprising a revision level, version, time, date, user ID, account owner ID, PAP ID, IP address, session keys, billing data, name, address, account information, connection history, procedures performed by a user, group ID, e-mail address, e-mail ID, e-mail password, residential address, phone number, and data about a user;

causing, by the remote source in response to the sending, a client dispatch application of the user Internet device to execute a script, wherein the executing the script causes the toolbar button to instantiate a connection to a further remote source comprising a web page;

receiving, from the client dispatch application and by the remote source, tracking data representative of a user interaction history with the toolbar, in response to the instantiating the connection to the further remote source;

causing, by the client dispatch application, the remote source to update the toolbar data of the user Internet device to include a text display within the toolbar comprising a third-party advertisement in response to the connection to the further remote source; and causing, by the remote source, the client dispatch application to update the toolbar data of the user Internet device to refrain from instantiating a further connection to the further remote source comprising the web page in response to a load balancing instruction from the further remote source to the remote source.

2. The method of claim 1, further comprising associating one or more advertisements to the user based on the data about the user.

3. The method of claim 2, further comprising transmitting the one or more advertisements to the user Internet device.

4. A method for dynamically modifying a toolbar using a remote source accessible through a network, wherein the toolbar is displayable on a user Internet device and includes one or more toolbar buttons that are defined by toolbar data stored in one or more toolbar-defining databases of the user Internet device, the toolbar data includes a plurality of toolbar button attributes associated with the one or more toolbar buttons of the toolbar, wherein at least one of the plurality of toolbar button attributes identifies a function to be performed by a specific toolbar button, the method comprising:

receiving by the remote source an initiating message from a user Internet device via the network;

establishing, by the remote source, a connection between the remote source and the user Internet device in response to the receiving;

receiving, at the remote source, information from the user Internet device associated with the toolbar data, wherein the toolbar data is stored in the one or more toolbar-defining databases of the user Internet device;

determining, by the remote source, based on the information associated with the toolbar data stored in the one or more toolbar-defining databases of the user Internet device, that the user Internet device should receive updated toolbar data; and sending, from the remote source via the network to the user Internet device, the updated toolbar data to be stored in the one or more toolbar-defining databases of the user Internet device, wherein the toolbar of the user Internet device is configured to receive the updated toolbar data, and to perform an operation that includes at least one member of a group comprising (a) and (b):

(a) updating the toolbar data to include at least one new attribute of the toolbar data to change the toolbar by adding a toolbar button to the toolbar; and (b) updating the toolbar data to modify an attribute of at least one of the one or more toolbar buttons of the toolbar, wherein the information associated with the toolbar data data about a user, wherein the data about the user is transparently collected by the remote source from the user Internet device;

causing, by the remote source in response to the sending, a client dispatch application of the user Internet device to execute a script, wherein the executing the script causes the toolbar button to instantiate a connection to a further remote source comprising a web page;

receiving, from the client dispatch application and by the remote source, tracking data representative of a user interaction history with the toolbar, in response to the instantiating the connection to the further remote source; and causing, by the client dispatch application, the remote source to update the toolbar data of the user Internet device to include a text display within the toolbar comprising a third-party advertisement in response to the connection to the further remote source; and causing, by the remote source, the client dispatch application to update the toolbar data of the user Internet device to refrain from instantiating a further connection to the further remote source comprising the web page in response to a load balancing instruction from the further remote source to the remote source.

5. A method for dynamically modifying a toolbar using a remote source accessible through a network, wherein the toolbar is displayable on a user Internet device and includes one or more toolbar buttons that are defined by toolbar data stored in one or more toolbar-defining databases of the user Internet device, the toolbar data includes a plurality of toolbar button attributes associated with the one or more toolbar buttons of the toolbar, wherein at least one of the plurality of toolbar button attributes identifies a function to be performed by a specific toolbar button, the method comprising:

establishing a connection with a user Internet device, the connection initiated by the user Internet device;

receiving, at the remote source, information associated with the toolbar data stored in the one or more toolbar-defining databases of the user Internet device;

determining, based on the information associated with the toolbar data stored in the one or more toolbar-defining databases of the user Internet device, that the user Internet device should receive updated toolbar data;

sending, from the remote source via the network to the user Internet device, the updated toolbar data to be stored in the one or more toolbar-defining databases of the user Internet device, wherein the toolbar of the user Internet device is configured to receive the updated toolbar data, and to perform an operation that includes at least one member of a group comprising (a) and (b):

(a) updating the toolbar data to include at least one new attribute of the toolbar data to change the toolbar by adding a toolbar button to the toolbar; and (b) updating the toolbar data to modify an attribute of at least one of the one or more toolbar buttons of the toolbar, wherein the information associated with the toolbar data includes ID, account owner ID, PAP ID, IP address, session keys, billing data, data about a user; and storing the data about the user in one or more network-accessible databases separate from the user Internet device;

causing, by the remote source in response to the sending, a client dispatch application of the user Internet device to execute a script, wherein the executing the script causes the toolbar button to instantiate a connection to a further remote source comprising a web page;

receiving, from the client dispatch application and by the remote source, tracking data representative of a user interaction history with the toolbar, in response to the instantiating the connection to the further remote source.

6. One or more computer-readable memory embodied with computer-executable instructions that, when executed by one or more processors, perform a method for dynamically modifying a toolbar, the method comprising:

displaying the toolbar, at a user Internet device, the toolbar including one or more toolbar buttons, the toolbar defined by toolbar data stored in one or more toolbar-defining databases, the toolbar data comprising a plurality of toolbar button attributes associated with the one or more toolbar buttons of the toolbar, wherein at least one of the plurality of toolbar button attributes identifies a function to be performed by a specific toolbar button upon actuation of the specific toolbar button;

invoking, at the user Internet device and without user interaction, communication of information associated with the one or more toolbar-defining databases to a server associated with a network address;

receiving the information associated with the one or more toolbar-defining databases at the server;

determining, based on the information associated with the one or more toolbar-defining databases, that the user Internet device should receive updated toolbar data;

receiving, at the user Internet device, the updated toolbar data;

initiating, at the user Internet device and without user interaction, an operation to update the toolbar data in accordance with the received updated toolbar data;

updating the toolbar data at the user Internet device based on the operation and in accordance with the updated toolbar data, thereby updating the toolbar data, the updating comprising at least one member of a group comprising (a) and (b):

(a) updating the toolbar data to include at least one new attribute of the toolbar data to change the toolbar by adding a toolbar button to the toolbar; and (b) updating the toolbar data to modify an attribute of at least one of the one or more toolbar buttons of the toolbar; and displaying at the user Internet device the toolbar as defined by the updated toolbar data, wherein the information associated with the toolbar data includes at least one member of a group comprising a revision level, version, time, date, user ID, account owner ID, PAP ID, IP address, session keys, billing data, name, address, account information, data about a user, connection history, procedures performed by a user, group ID, e-mail address, e-mail ID, e-mail password, residential address, and phone number;

causing, by the remote source in response to the displaying, a client dispatch application of the user Internet device to execute a script, wherein the executing the script causes the toolbar button to instantiate a connection to a further remote source comprising a web page;

receiving, from the client dispatch application and by the remote source, tracking data representative of a user interaction history with the toolbar, in response to the instantiating the connection to the further remote source;

causing, by the client dispatch application, the remote source to update the toolbar data of the user Internet device to include a text display within the toolbar comprising a third-party advertisement in response to the connection to the further remote source; and causing, by the remote source, the client dispatch application to update the toolbar data of the user Internet device to refrain from instantiating a further connection to the further remote source comprising the web page in response to a load balancing instruction from the further remote source to the remote source.

7. The one or more computer-readable memory of claim 6, wherein the determination that the user Internet device should receive the updated toolbar data is performed by the server.

8. The one or more computer-readable memory of claim 7, wherein the server is located at the network address.

9. The one or more computer-readable memory of claim 6, wherein the determination that the user Internet device should receive the updated toolbar data is performed at the user Internet device.

10. A method for dynamically modifying a toolbar, the method comprising:

displaying the toolbar, at a user Internet device, the toolbar including one or more toolbar buttons, the toolbar defined by toolbar data stored in one or more toolbar-defining databases, the toolbar data comprising a plurality of toolbar button attributes associated with the one or more toolbar buttons of the toolbar, wherein at least one of the plurality of toolbar button attributes identifies a function to be performed by a specific toolbar button upon actuation of the specific toolbar button;

invoking, from the user Internet device and without user interaction, communication of information associated with the one or more toolbar-defining databases to a server associated with a network address;

receiving, at the server, the information associated with the one or more toolbar-defining databases;

determining, based on the information associated with the one or more toolbar-defining databases, that the user Internet device should receive updated toolbar data;

receiving, at the user Internet device, the updated toolbar data in response to determining that the user Internet device should receive the updated toolbar data;

initiating, at the user Internet device and without user interaction, an operation to update the toolbar data in accordance with the received updated toolbar data;

updating the toolbar data at the user Internet device based on the operation and in accordance with the updated toolbar data, thereby updating the toolbar data, the updating comprising at least one member of a group comprising (a) and (b):

(a) updating the toolbar data to include at least one new attribute of the toolbar data to change the toolbar by adding a toolbar button to the toolbar; and (b) updating the toolbar data to modify an attribute of at least one of the one or more toolbar buttons of the toolbar; and displaying at the user Internet device the toolbar as defined by the updated toolbar data, wherein the information associated with the toolbar data includes at least one member of a group comprising a revision level, version, time, date, user ID, account owner ID, PAP ID, IP address, session keys, billing data, name, address, account information, connection history, procedures performed by a user, group ID, e-mail address, e-mail ID, e-mail password, residential address, and phone number;

causing, by the server, the client dispatch application to further update the toolbar data of the user Internet device to refrain from instantiating a further connection to the remote source in response to a load balancing instruction from the remote source.

11. The method of claim 10, wherein the determination that the user Internet device should receive the updated toolbar data is performed by the server.

12. The method of claim 11, wherein the server is located at the network address.

13. The method of claim 10, wherein the determination that the user Internet device should receive the updated toolbar data is performed at the user Internet device.

\* \* \* \* \*